(12) United States Patent
Seta

(10) Patent No.: US 6,430,993 B1
(45) Date of Patent: Aug. 13, 2002

(54) METHOD OF ESTIMATING TIRE PERFORMANCE

(75) Inventor: Eisuke Seta, Tokyo (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 09/530,886

(22) PCT Filed: Sep. 7, 1999

(86) PCT No.: PCT/JP99/04848
§ 371 (c)(1),
(2), (4) Date: May 5, 2000

(87) PCT Pub. No.: WO00/14504
PCT Pub. Date: Mar. 16, 2000

(30) Foreign Application Priority Data

| | | |
|---|---|---|
| Sep. 7, 1998 | (JP) | 10-252879 |
| Sep. 21, 1998 | (JP) | 10-267061 |
| Apr. 26, 1999 | (JP) | 11-118830 |
| Apr. 26, 1999 | (JP) | 11-118831 |

(51) Int. Cl.$^7$ ............................................. G01M 17/02

(52) U.S. Cl. ...................................................... 73/146

(58) Field of Search ................. 73/146, 8, 9; 51/165 R, 51/165.77, 281 R; 409/166

(56) References Cited

FOREIGN PATENT DOCUMENTS

| | | |
|---|---|---|
| EP | 0 865 890 | 9/1998 |
| EP | 0 937 570 | 8/1999 |
| WO | WO98/06550 | 2/1998 |

OTHER PUBLICATIONS

Tire Science and Technology, TSTCA, vol., 25, No. 4, Oct.–Dec. 1997, pp. 265–287.
MSC/DYTRAN Catalogue, Nov. 1994.
Introduction to Eulerian and Coupled Analysis Using MSG/Dytran, Nov. 1993.
"Journal of Engineering for Gas Turbines and Power" Oct. 1990, vol. 112, pp. 573–578.
Articles of LS–DYNA User Conference Nov. 1997 1997, 6–1 to 6–8.
Tyre Modelling in LS–DYNA, User Conference Nov. 1997.
Tire Science and Technology TSTCA, vol. 25, No. 3, Jul.–Sep. 1997, pp. 154–176.
Pneumatic Tire Technology, Apr. 15, 1995, p. 113.
9–1. Facsimile letter form MacNeal Schwendler Corporation to Yokohama Rubber Co., Ltd., regarding a demostration of hydroplaning analysis on Nov. 11, 1997.

(List continued on next page.)

Primary Examiner—William Oen
(74) Attorney, Agent, or Firm—Sughrue Mion, PLLC

(57) ABSTRACT

The estimation of the performance of an actually used tire in the presence of a fluid, such as drainage performance, in-snow performance, and noise performance.

A tire model and a fluid model based on a finite element method are constructed from a draft design of a tire including the shape, structure, and the like, and a road surface condition is inputted by selecting a coefficient of friction $\mu$ in conjunction with the construction of a road surface model (Steps 100 to 106). Boundary conditions during tire rolling or tire nonrolling are set (Step 108); deformation calculation and fluid calculation of the tire model are performed (Steps 110 to 114); and a boundary surface between the tire model and the fluid model is recognized to update the boundary conditions (Steps 118 and 120). The result of calculation is outputted as a result of estimation, the result of estimation is evaluated (Step 122), and the draft design with satisfactory performance is adopted (Step 124 to 132). If the performance is unsatisfactory, the draft design is changed (corrected) (Step 134).

62 Claims, 67 Drawing Sheets

OTHER PUBLICATIONS

9–2. Documents prepared by MacNeal Schwendler Corporation dated Oct. 14, 1997, which were references distributed at the demonstration on Nov. 11, 1997.

10. Declarations.

"Simulation of The Aquaplane Problem" vol. 64, No. 5–6, pp. 1155–1164, XP001030062 Computer Structures, 1997, Elsevier, UK ISSN: 0045–7949 (No mo.).

"Optimum Young's Modulus Distribution in Tire Design" Tire Sci Technol; Tire Science & Technology Jul.–Sep. 1996, vol. 24, No. 3, Jul. 1996, pp. 204–219, XP001030061.

F I G. 4
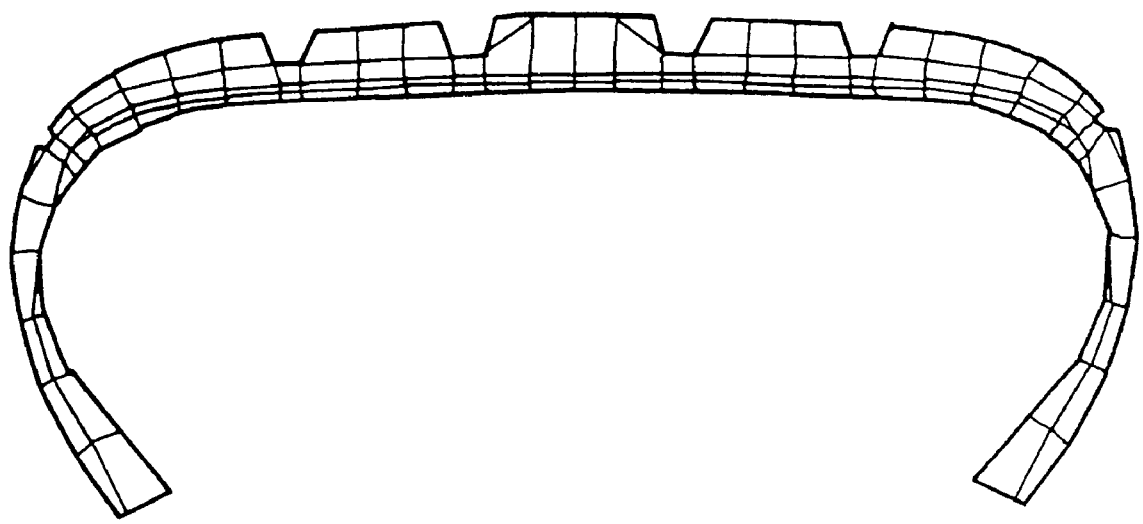

F I G. 5
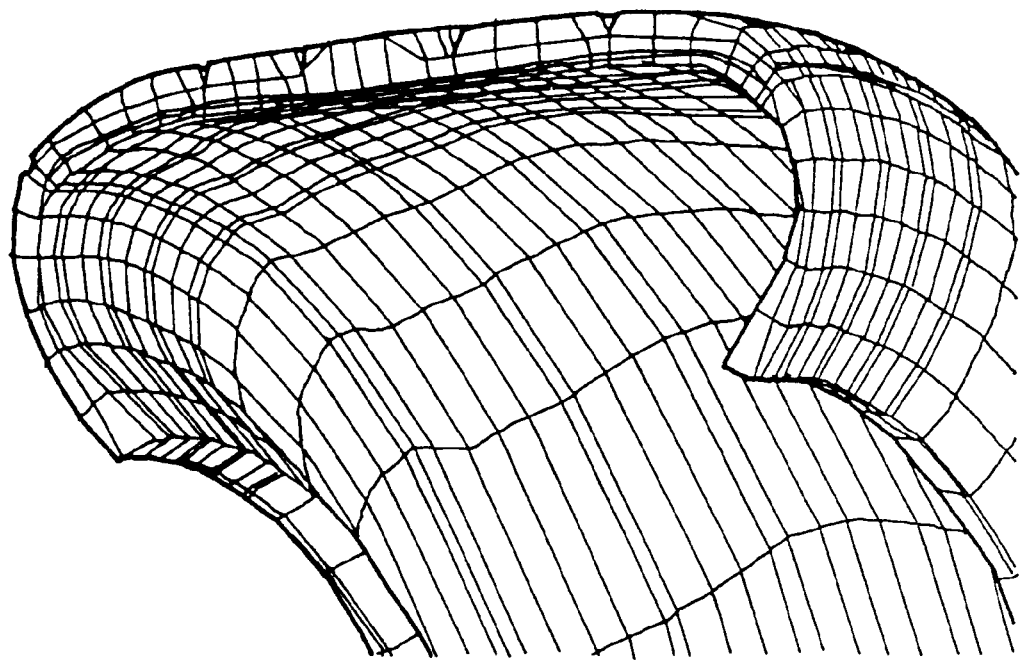

SOLID ELEMENT

SHELL ELEMENT

F I G. 9 A
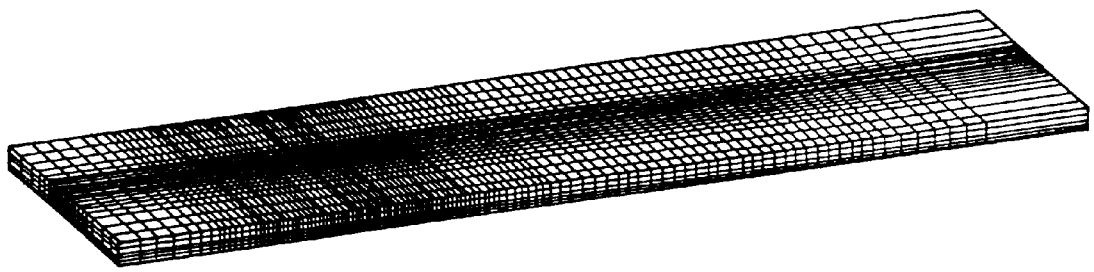
F I G. 9 B
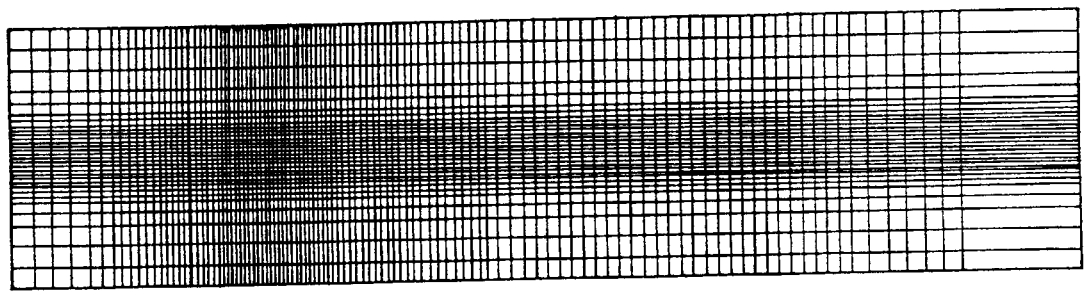

PATTERN A

PATTERN B

WATER PRESSURE DISTRIBUTION OF PATTERN A

WATER PRESSURE DISTRIBUTION OF PATTERN B

FLOW OF PATTERN A

FLOW OF PATTERN B

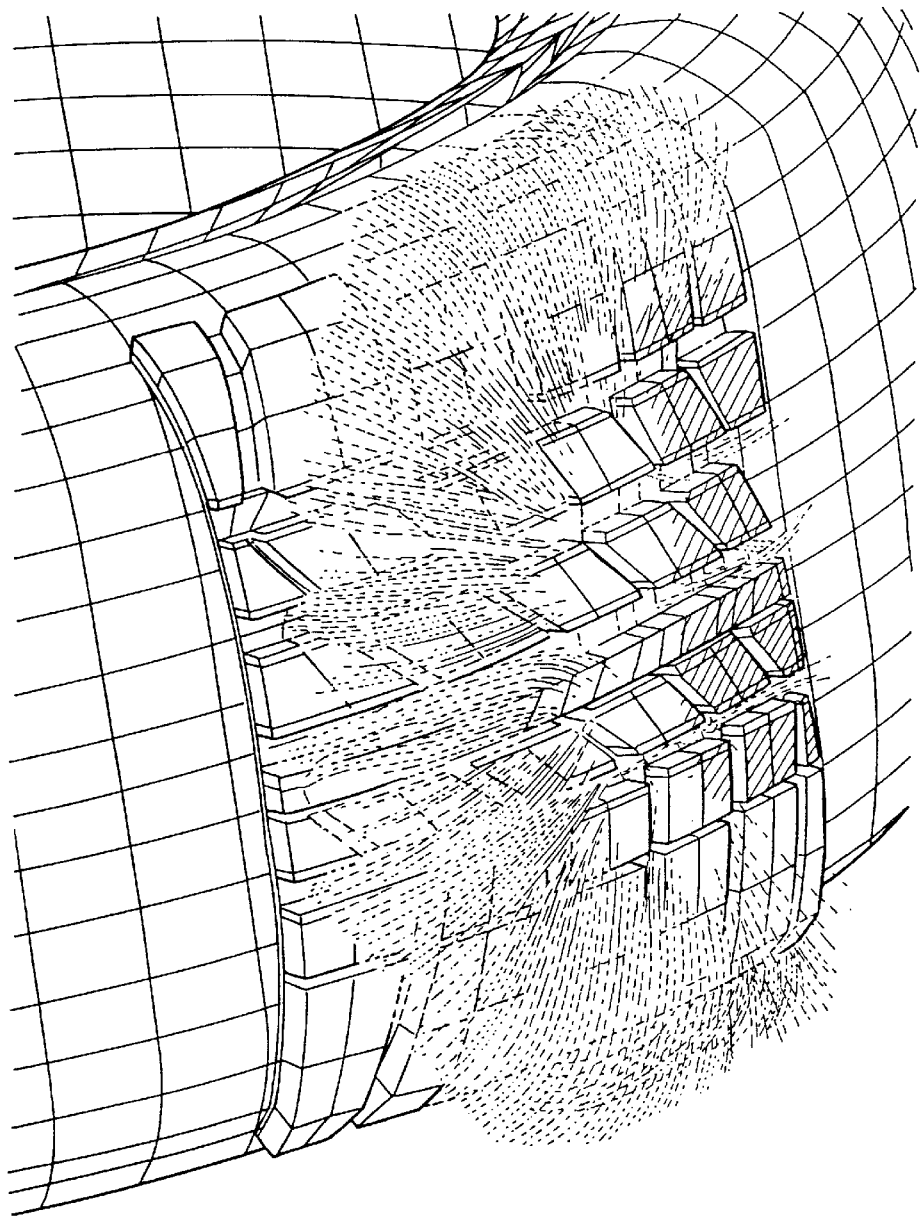
F I G. 32

CONTACT PORTION

F I G. 4 3 A
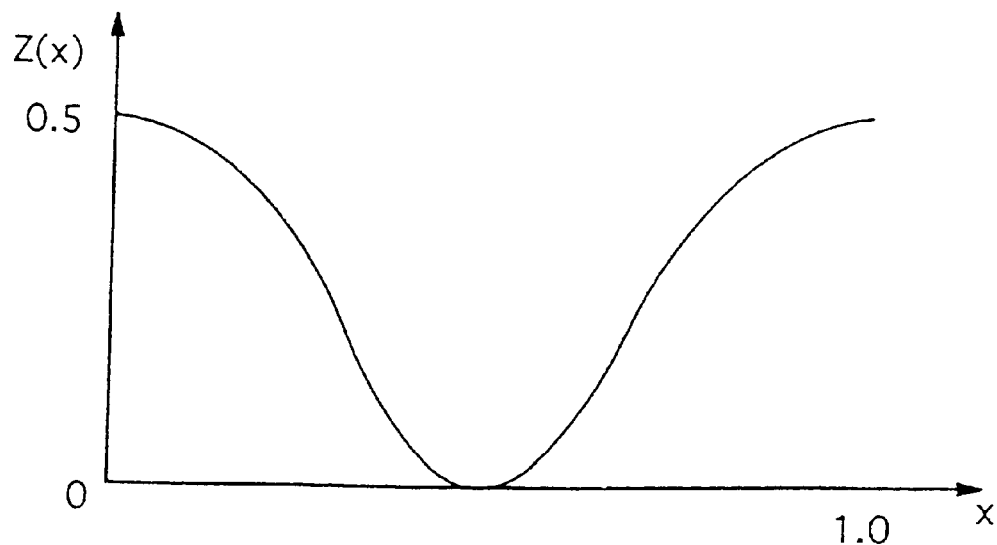
F I G. 4 3 B
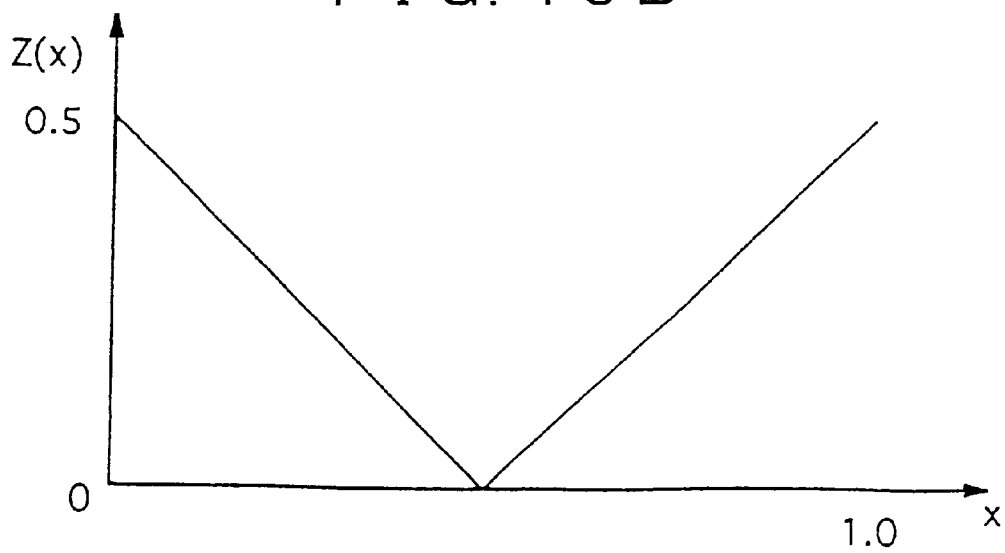

F I G. 5 9
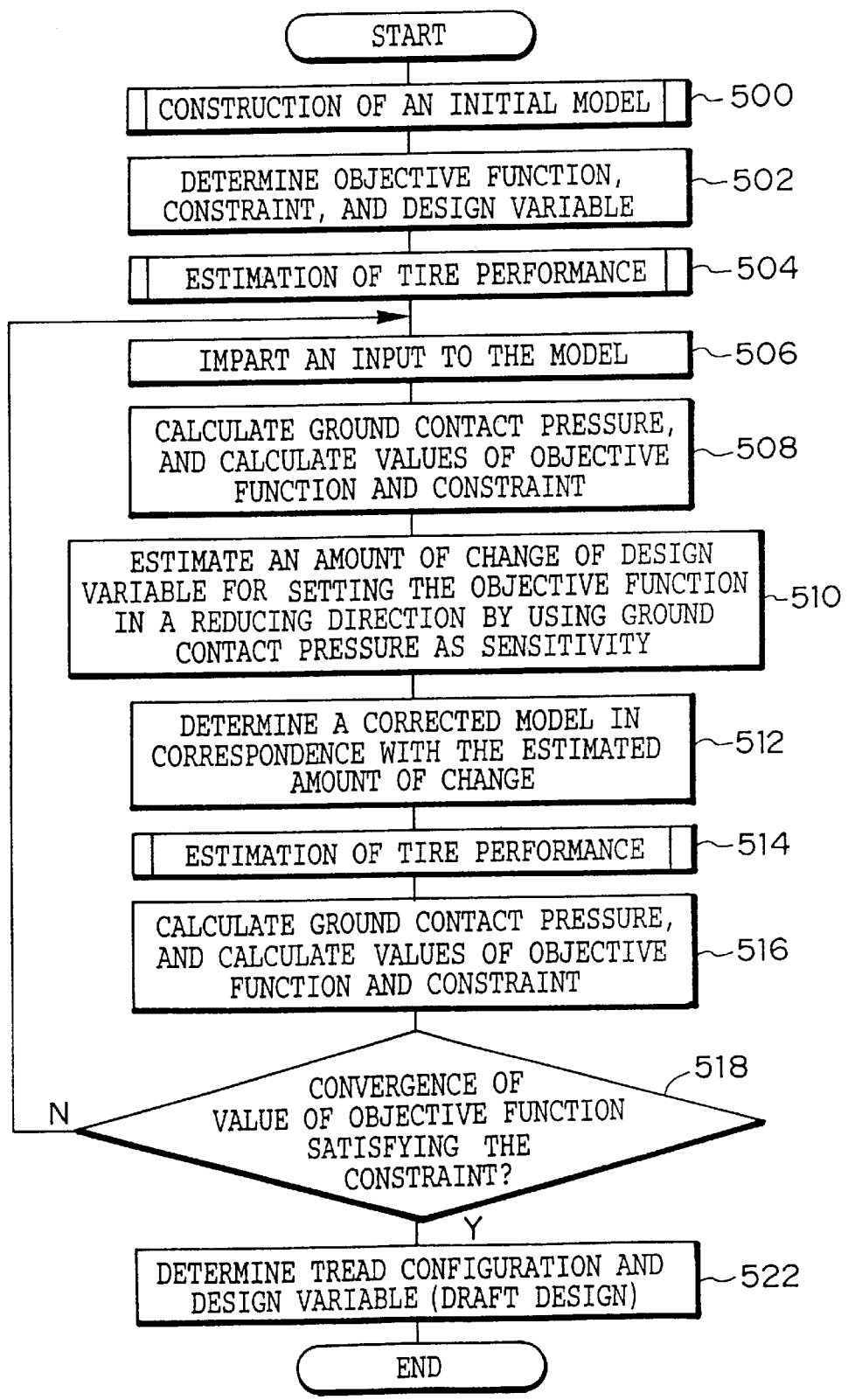

F I G. 6 2
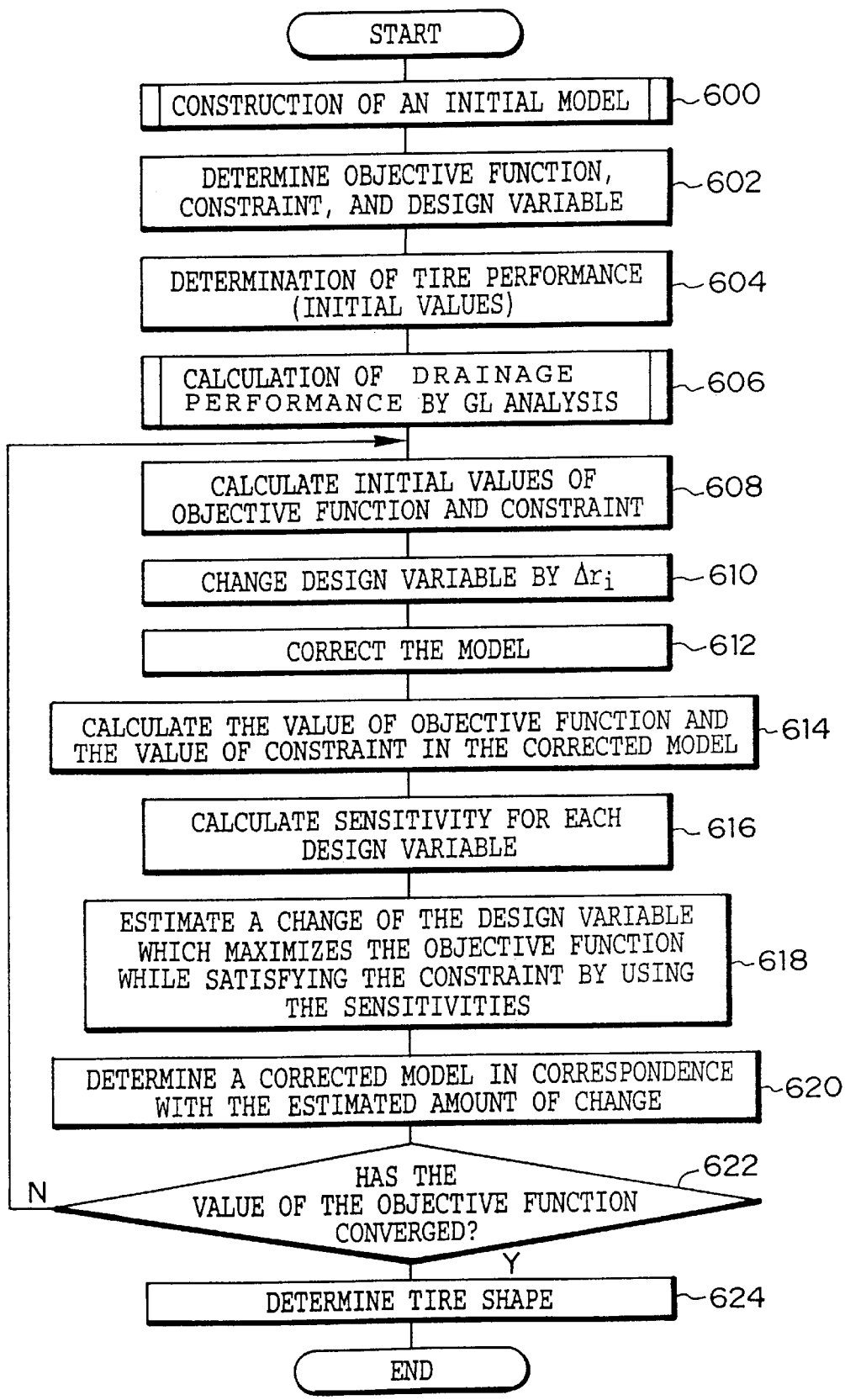

BLOCK CONFIGURATION (CARAMEL BLOCK)
BEFORE OPTIMIZATION

BLOCK CONFIGURATION (CONFIGURATION WITH
BLOCK TIP REMOVED) AFTER OPTIMIZATION

MANNER IN WHICH FLUID RESISTANCE IS REDUCED
BY REMOVING BLOCK TIP BY OPTIMIZATION

F I G. 6 8
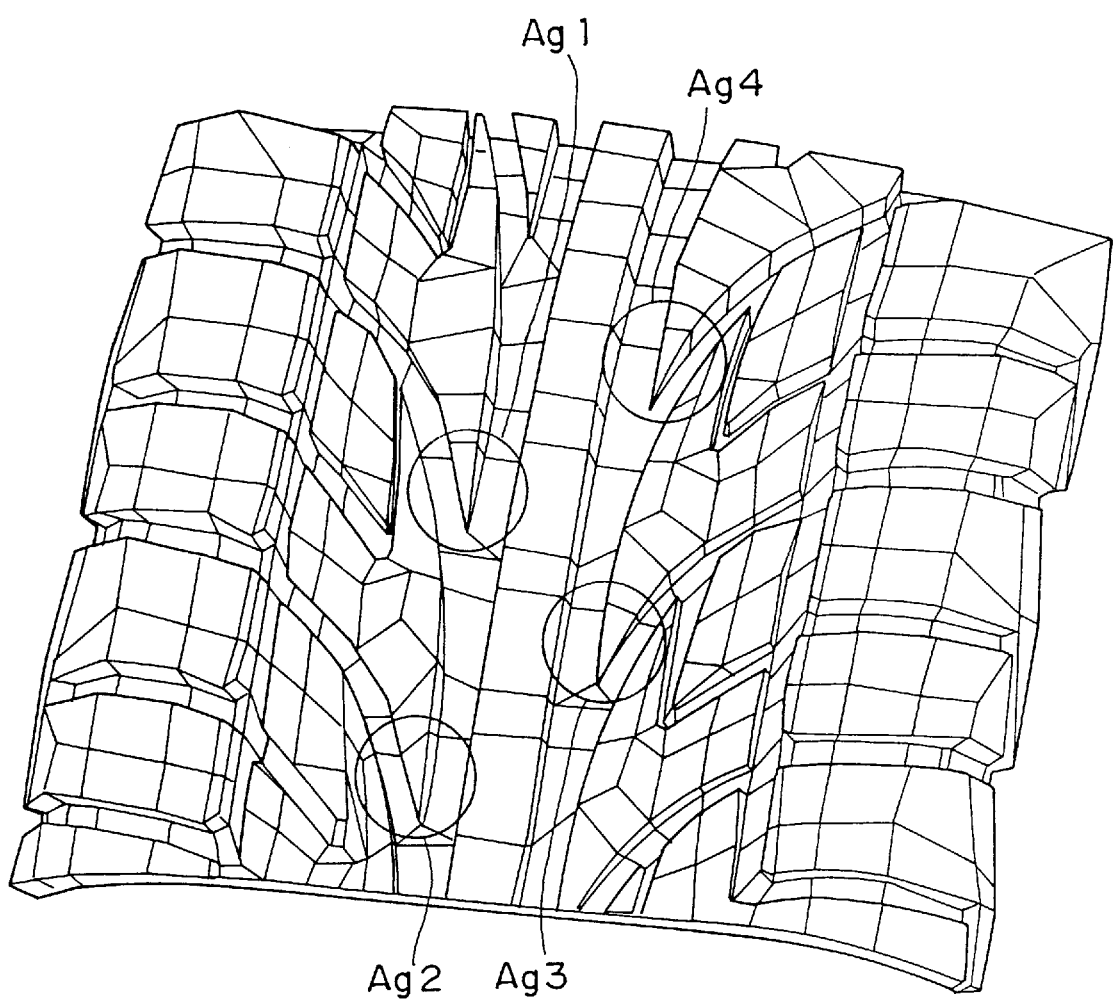

F I G. 7 1
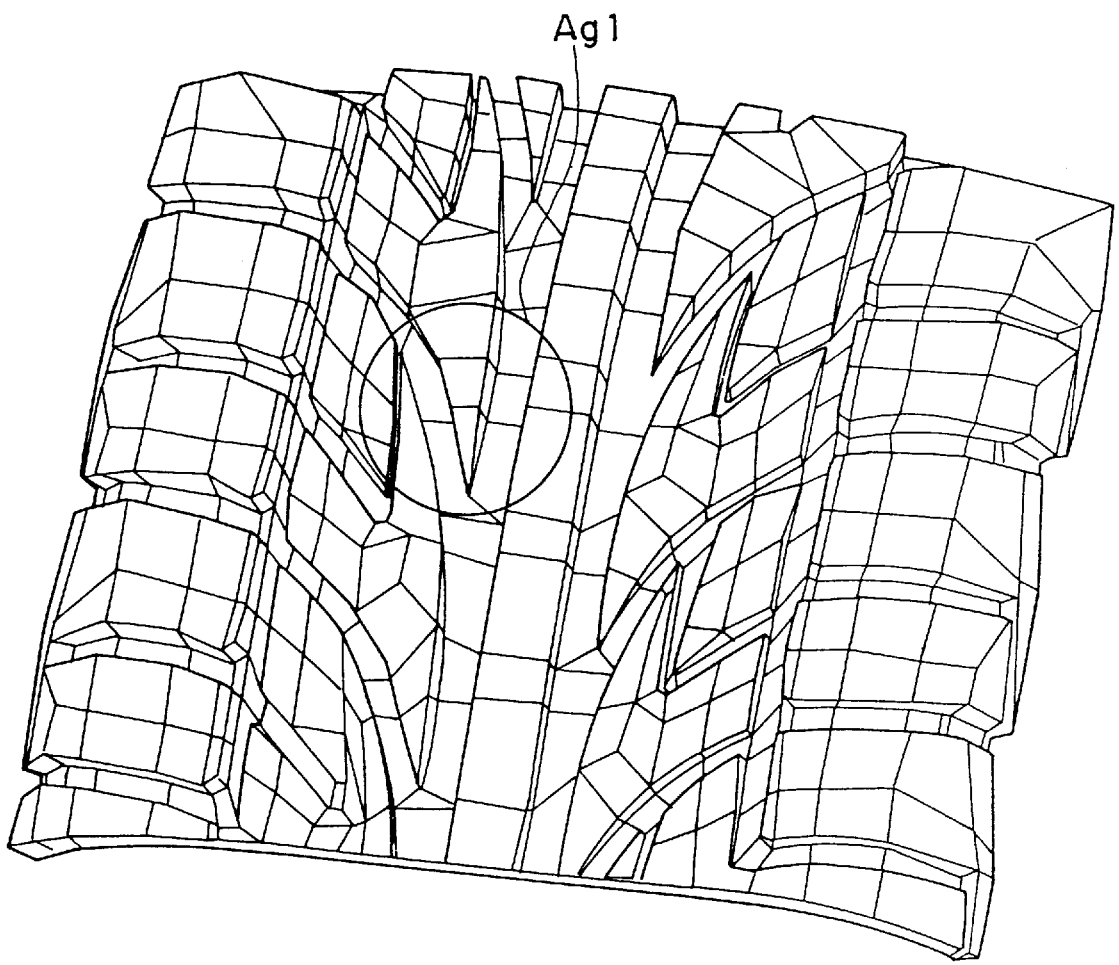

METHOD OF ESTIMATING TIRE PERFORMANCE

TECHNICAL FIELD

The present invention relates to a method of estimating tire performance, a method of fluid simulation, a method of designing a pneumatic tire, a method of designing a vulcanizing mold for a tire, a method of make a vulcanizing mold for a tire, a method of manufacturing a pneumatic tire, an optimization analyzer, a recording medium with a tire-performance estimation program recorded thereon, and a recording medium with a tire optimization analysis program recorded thereon. Specifically, the present invention relates to a tire-performance estimating method for estimating the performance of a pneumatic tire used in an automobile or the like, particularly the tire performance in the presence of a fluid such as the drainage performance, in-snow performance, and noise performance, a fluid simulation method for simulating the flow of a fluid around a tire, a method of designing a pneumatic tire, a method of designing a vulcanizing mold for a tire for designing a vulcanizing mold for manufacturing a tire, a method of manufacturing a pneumatic tire, and a recording medium with a tire-performance estimation program recorded thereon, or a method of designing a pneumatic tire which makes it possible to efficiently and easily design and develop the structure, shape and the like of a tire for attaining the single-purpose performance, mutually incompatible performances and the like of the tire, and which makes it possible to determine an optimal structure and shape of the tire and design a tire exhibiting high cost performance, as well as an optimization analyzer and a recording medium with a tire optimization analysis program recorded thereon.

BACKGROUND ART

Conventionally, in the development of a pneumatic tire, tire performance is obtained by conducting performance tests by actually designing and fabricating a tire and mounting it on an automobile, and a procedure has been adopted in which the development is redone starting from the design and fabrication unless the results of the performance tests are satisfactory. In recent years, owing to the development of numerical analysis techniques such as the finite element method and the computer environment, it has become possible to estimate by computers such as the state of inflation of the tire with internal pressure and the state of load at the time the tire is not rolling, and it has become possible to estimate a number of performances from this estimation. However, it has hitherto been impossible to compute those tire performances that are determined by the behavior of a fluid, such as the drainage performance, in-snow performance, and noise performance. For this reason, the present situation is such that it is impossible to conduct the estimation of tire performance and efficiently perform tire development.

A technical document is known in which an attempt was made to analyze the drainage performance, particularly hydroplaning, of a tire with respect to a smooth tire (grooveless tire) and a tire provided with only circumferential grooves ("Tire Science and Technology, TSTCA, Vol. 25, No. 4, October–December, 1997, pp. 265–287").

However, in this conventional technical document, analysis is attempted with respect to only the smooth (i.e., grooveless) tire and the tire provided with only circumferential grooves, and no reference is given to tires with patterns having inclined grooves intersecting the circumferential direction of the tire, which largely contribute to the drainage performance in actual tires, nor to how the fluid during the ground contacting and rolling of the tire can be brought close to a flowing state and how transient analysis can be made possible. Namely, no consideration is given to the analysis in which an actual environment is assumed with respect to an actual tire.

In view of the above-described facts, an object of the invention is to obtain a method of estimating tire performance which is capable of facilitating the estimation of the performance of an actually used tire in the presence of a fluid, such as the drainage performance, in-snow performance, and noise performance, a method of fluid simulation, a method of designing a pneumatic tire which renders tire development efficient and is capable of obtaining a tire exhibiting excellent performance, a method of designing a vulcanizing mold for a tire, a method of making a vulcanizing mold for a tire, a method of manufacturing a pneumatic tire, and a recording medium with a tire-performance estimation program recorded thereon.

The design of tires has been based on experiential rules obtained through repeated numerical experiments using experiments and computers. For this reason, the number of trial manufactures and tests required for development has been enormously large, resulting in increased development cost and making it impossible to readily reduce a development period.

The design of a tire includes the design of the structure, shape, and pattern of the tire. To design the structure, shape, and pattern of the tire is to determine, for example, the structure, shape, pattern, and manufacturing conditions for obtaining the targeted tire performance. This tire performance is a result of evaluation of physical quantities determined by computations and experiments as well as actual-vehicle feeling. The conventional methods of designing a tire including, for example, the design of the structure, shape, and pattern of the tire have been based on experiential rules obtained on a trial-and-error basis through repeated numerical experiments using experiments and computers. For this reason, the number of trial manufactures and tests required for development has been enormously large, resulting in increased development cost and making it impossible to readily reduce the development period.

As means for overcoming these problems, techniques for obtaining optimal solutions have been proposed such as optimization methods using mathematical programming and genetic algorithms. As a technique relating to this mathematical programming, the present applicant already proposed a designing method disclosed in already-filed International Publication No. WO 94/16877.

Obtaining an optimal solution is likened to mountain-climbing. At this time, since the altitude of the mountain is related to the performance, the optimal solution corresponds to the peak of the mountain. In a case where the objective function is simple, its design space (i.e., the shape of the mountain) has the shape of a mountain with one peak, so that the optimal solution can be obtained by an optimization technique based on mathematical programming.

In the development of a pneumatic tire, the tire performance to be considered is obtained by conducting performance tests by actually designing and fabricating a tire and mounting it on an automobile, and a procedure has been adopted in which the development is redone starting from the design and fabrication unless the results of the performance tests are satisfactory. In recent years, due to the development of numerical analysis techniques such as the finite element method and the computer environment, it has become possible to estimate by the computer such as the state of inflation of the tire with internal pressure and the state of load when the tire is not rolling, and it has become possible to estimate a number of performances from this estimation. However, it has been impossible to compute those tire performances that are determined by the behavior of a fluid, such as the drainage performance, in-snow performance, and noise performance. For this reason, the present situation is such that it has been impossible to conduct the estimation of tire performance and efficiently perform tire development.

A technical document is known in which an attempt was made to analyze the drainage performance, particularly hydroplaning, of a tire with respect to a smooth tire (grooveless tire) and a tire provided with only circumferential grooves ("Tire Science and Technology, TSTCA, Vol. 25, No. 4, October–December, 1997, pp. 265–287").

However, in such conventional consideration of the drainage performance of the tire, an attempt is made in the analysis with respect to only the smooth (i.e., grooveless) tire and the tire provided with only circumferential grooves, but no reference is given to tires with patterns having inclined grooves intersecting the circumferential direction of the tire, which large contribute to the drainage performance in actual tires, nor to how the fluid during the ground contacting and rolling of the tire can be brought close to a flowing state and how transient analysis can be made possible. Namely, no consideration is given to the analysis in which an actual environment is assumed with respect to an actual tire.

In addition, in the design and development of a tire, a targeted value is set for a certain performance, and if this targeted value is cleared, the design and development of the tire are considered to be completed for the present, and have not been such that the best performance is obtained with the given resources. In addition, the tire design and tire performance tests are conducted independently, and the development of the tire is effected by repeating trial manufacture and testing on a trial-and-error basis, so that the development of the tire has been very inefficient.

In view of the above-described facts, another object of the invention is to obtain a method of designing a pneumatic tire which is capable of the design and development of a tire with high efficiency while estimating the performance of an actually used tire in the presence of a fluid, such as the drainage performance, in-snow performance, and noise performance, as well as an optimization analyzer and a recording medium with a tire optimization analysis program recorded thereon.

SUMMARY OF THE INVENTION

To attain the above objects, in the present invention, the performance of an actually used tire in the presence of a fluid, such as the drainage performance, in-snow performance, and noise performance, is estimated. In particular, the fluid during the ground contacting and rolling of the tire is brought close to a flowing state, and transient analysis is made possible. In addition, the development of the tire is made efficient, and the provision of the tire having excellent performance is facilitated.

Specifically, the method of estimating tire performance according to claim 1 comprises the steps of: (a) determining a tire model having a pattern configuration to which deformation can be imparted by at least one of ground contacting and rolling, and determining a fluid model which is partially or wholly filled with a fluid and which comes into contact with at least a portion of the tire model; (b) executing a deformation calculation of the tire model; (c) executing a fluid calculation of the fluid model; (d) identifying a boundary surface between the tire model after the deformation calculation in step (b) and the fluid model after the fluid calculation in step (c), imparting a boundary condition concerning the identified boundary surface to the tire model and the fluid model, and performing the deformation calculation and the fluid calculation until the fluid model assumes a state of pseudo flow; (e) determining a physical quantity occurring in at least one of the tire model and the fluid model in step (c) or step (d); and (f) estimating the tire performance on the basis of the physical quantity.

In accordance with the invention according to claim 2, in the method of estimating tire performance according to claim 1, in step (a), a road surface model in contact with the fluid model is further determined.

In accordance with the invention according to claim 3, in the method of estimating a tire performance according to claim 1 or 2, in step (b), the deformation calculation is performed repeatedly for only a predetermined time duration.

In accordance with the invention according to claim 4, in the method of estimating a tire performance according to claim 3, the predetermined time duration is 10 msec or less.

In accordance with the invention according to claim 5, in the method of estimating a tire performance according to any one of claims 1 to 4, in step (c), the fluid calculation is performed repeatedly for only a fixed time duration.

In accordance with the invention according to claim 6, in the method of estimating a tire performance according to claim 5, the fixed time duration is 10 msec or less.

In accordance with the invention according to claim 7, in the method of estimating a tire performance according to any one of claims 1 to 6, in step (d), the calculations are performed repeatedly for only a time duration determined in advance.

In accordance with the invention according to claim 8, in the method of estimating a tire performance according to claim 7, the time duration determined in advance is 10 msec or less.

In accordance with the invention according to claim 9, in the method of estimating a tire performance according to any one of claims 1 to 8, in a case where the tire model is rolled, in step (a), the tire model is determined for which the calculation for charging with internal pressure and load calculation is performed, and to which a rotational displacement or a speed or a straightly advancing displacement is imparted.

In accordance with the invention according to claim 10, in the method of estimating a tire performance according to any one of claims 1 to 8, in a case where the tire model is rolled, in step (a), influx and efflux conditions representing that the fluid flows out freely from a top surface of the fluid model and that the fluid does not flow into or flow out of surfaces other than the top surface of the fluid model are imparted to the fluid model.

In accordance with the invention according to claim 11, in the method of estimating a tire performance according to any one of claims 1 to 8, in a case where the tire model is not rolled, in step (a), the tire model is determined for which the deformation calculation for a time of charging with internal pressure is performed, and for which load calculation is performed after the deformation calculation.

In accordance with the invention according to claim 12, in the method of estimating a tire performance according to any one of claims 1 to 8 or claim 11, in a case where the tire model is not rolled, in step (a), influx and efflux conditions representing that the fluid flows into a front surface of the fluid model at an advancing velocity, that the fluid flows out freely from a rear surface of the fluid model and a top surface of the fluid model, and that the fluid does not flow into or flow out of side surfaces of the fluid model and a lower surface of the fluid model are imparted to the fluid model.

In accordance with the invention according to claim 13, in the method of estimating a tire performance according to any one of claims 1 to 12, the tire model has a pattern partially.

In accordance with the invention according to claim 14, in the method of estimating a tire performance according to any one of claims 1 to 13, as for a road surface model, a road surface condition is set by selecting a coefficient of friction $\mu$ representing at least one of road surface conditions including dry, wet, icy, snowy, and unpaved conditions.

In accordance with the invention according to claim 15, in the method of estimating a tire performance according to any one of claims 1 to 14, in step (d), an interfering portion between the tire model and the fluid model is generated, an interference portion is identified, and the fluid model is divided by fluid elements with a surface of the tire model as a boundary surface.

In accordance with the invention according to claim 16, in the method of estimating a tire performance according to any one of claims 1 to 15, the fluid model contains at least water, at least one of a ground contact area and a ground contact pressure of the tire model is used as the physical quantity, and a wet performance of the tire is estimated as the tire performance.

In accordance with the invention according to claim 17, in the method of estimating a tire performance according to any one of claims 1 to 16, the fluid model contains at least water, at least one of a pressure, flow volume, and flow velocity of the fluid model is used as the physical quantity, and a wet performance of the tire is estimated as the tire performance.

In accordance with the invention according to claim 18, in the method of estimating a tire performance according to any one of claims 1 to 16, the fluid model contains at least one of water and snow, at least one of a ground contact area, ground contact pressure, and shearing force of the tire model on at least one of an icy road surface and a snowy road surface is used as the physical quantity, and an on-ice and in-snow performance of the tire is estimated as the tire performance.

In accordance with the invention according to claim 19, in the method of estimating a tire performance according to any one of claims 1 to 16, the fluid model contains at least one of water and snow, at least one of a pressure, flow volume, and flow velocity of the fluid model on at least one of an icy road surface and a snowy road surface is used as the physical quantity, and an on-ice and in-snow performance of the tire is estimated as the tire performance.

In accordance with the invention according to claim 20, in the method of estimating a tire performance according to any one of claims 1 to 16, the fluid model contains at least air, at least one of pressure, flow volume, flow velocity, energy, and energy density of the fluid model is used as the physical quantity, and a noise performance of the tire is estimated as the tire performance.

The fluid simulation in accordance with the invention according to claim 21 comprises the steps of: (a) determining a tire model having a pattern configuration to which deformation can be imparted by at least one of ground contacting and rolling, and determining a fluid model which is partially or wholly filled with a fluid and which comes into contact with at least a portion of the tire model; (b) executing a deformation calculation of the tire model; (c) executing a fluid calculation of the fluid model; and (d) identifying a boundary surface between the tire model after the deformation calculation in step (b) and the fluid model after the fluid calculation in step (c), imparting a boundary condition concerning the identified boundary surface to the tire model and the fluid model, and performing the calculations until the fluid model assumes a state of pseudo flow.

The method of designing a pneumatic tire in accordance with the invention according to claim 22 comprises the steps of: (1) determining a plurality of tire models each having a pattern configuration to which deformation can be imparted by at least one of ground contacting and rolling, and determining a fluid model which is partially or wholly filled with a fluid and which comes into contact with at least a portion of a tire model; (2) executing a deformation calculation of the tire model; (3) executing a fluid calculation of the fluid model; (4) identifying a boundary surface between the tire models after the deformation calculation in step (2) and the fluid model after the fluid calculation in step (3), imparting a boundary condition concerning the identified boundary surface to the tire models and the fluid model, and performing the calculations until the fluid model assumes a state of pseudo flow; (5) determining a physical quantity occurring in at least one of the tire models and the fluid model in step (3) or step (4); (6) estimating a plurality of tire performances on the basis of the physical quantity; and (7) designing a tire on the basis of a tire model having a tire performance selected from the plurality of tire performances.

The method of designing a vulcanizing mold for a tire in accordance with the invention according to claim 23 comprises the steps of: ($\alpha$) determining a plurality of tire models having a pattern configuration to which deformation can be imparted by at least one of ground contacting and rolling, and determines a fluid model which is partially or wholly filled with a fluid and which comes into contact with at least a portion of the tire model; ($\beta$) executing a deformation calculation of each of the tire models; ($\gamma$) executing a fluid calculation of the fluid model; ($\delta$) identifying a boundary surface between the tire models after the deformation calculation in step ($\beta$) and the fluid model after the fluid calculation in step ($\gamma$), imparting a boundary condition concerning the identified boundary surface to the tire model and the fluid model, and performing the calculations until the fluid model assumes a state of pseudo flow; ($\epsilon$) determining a physical quantity occurring in at least one of the tire models and the fluid model in step ($\gamma$) or step ($\delta$); ($\zeta$) estimating a plurality of tire performances of each of the tire models on the basis of the physical quantity; and ($\eta$) designing the vulcanizing mold for the tire on the basis of one of the tire models having the tire performance selected from the plurality of tire performances.

In accordance with the invention according to claim 24, in the method of make a vulcanizing mold for a tire, a vulcanizing mold for a pneumatic tire, designed by the method of designing a vulcanizing mold for a tire according to claim 23, is made.

In accordance with the invention according to claim 25, in the method of manufacturing a pneumatic tire, a vulcanizing mold for a pneumatic tire, designed by the method of designing a vulcanizing mold for a tire according to claim 23, is made, and the pneumatic tire is manufactured by using the vulcanizing mold.

The method of manufacturing a pneumatic tire in the invention in accordance with claim 26 comprises the steps of: (I) determining a plurality of tire models each having a pattern configuration to which deformation can be imparted by at least one of ground contacting and rolling, and determining a fluid model which is partially or wholly filled with a fluid and which comes into contact with at least a portion of the tire models; (II) executing a deformation calculation of each of the tire models; (III) executing a fluid calculation of the fluid model; (IV) identifying a boundary surface between each of the tire models after the deformation calculation in step (II) and the fluid model after the fluid calculation in step (III), imparting a boundary condition concerning the identified boundary surface to each of the tire models and the fluid model, and performing the calculations until the fluid model assumes a state of pseudo flow; (V) determining a physical quantity occurring in at least one of the respective tire models and the fluid model for each of the tire models in step (III) or step (IV); (VI) estimating a tire performance of each of the tire models on the basis of the physical quantity; and (VII) manufacturing the tire on the basis of a tire model having a tire performance selected from the plurality of tire performances.

The recording medium with a tire-performance estimation program recorded thereon for estimating a tire performance by a computer in the invention in accordance with claim 27 comprises the steps of: (A) determining a tire model having a pattern configuration to which deformation can be imparted by at least one of ground contacting and rolling, and determining a fluid model which is partially or wholly filled with a fluid and which comes into contact with at least a portion of the tire model; (B) executing a deformation calculation of the tire model; (C) executing a fluid calculation of the fluid model; and (D) identifying a boundary surface between the tire model after the deformation calculation in step (B) and the fluid model after the fluid calculation in step (C), imparting a boundary condition concerning the identified boundary surface to the tire model and the fluid model, and performing the calculations until the fluid model assumes a state of pseudo flow.

In the method of estimating tire performance in accordance with the present invention, first, a draft design of the tire is incorporated into a model in numerical analysis so as to estimate the performance of a tire to be evaluated (such as the change of the shape, structure, materials, and pattern of the tire). Further, modeling of a fluid and a road surface concerning the targeted performance is performed to construct a fluid model and a road surface model (numerical analysis models), numerical analysis which simultaneously takes into consideration the tire, the fluid, and the road surface is carried out, and the targeted performance is numerically estimated. The acceptability of the draft design of the tire is determined from the result of this estimation, and if the result is favorable, the draft design is adopted, or a tire of this draft design is manufactured, and the performance evaluation is conducted. If these results up to this stage are satisfactory, the draft design is adopted. If the estimate d performance (or actually measured performance) based on the draft design is unsatisfactory, a part or the whole of the draft design is corrected, and the procedures are carried out again starting with the construction of the numerical analysis models. If these procedures are used, the number of times the tire is manufactured and the performance is evaluated can be minimized, so that the development of the tire can be made efficient.

Accordingly, to undertake the development of the tire based on the estimation of performance, numerical analysis models for the tire performance estimation which is efficient and highly accurate are essential. Accordingly, in the present invention, to estimate the tire performance, in step (a), a tire model having a pattern configuration to which deformation can be imparted by at least one of ground contacting and rolling, as well as a fluid model which is filled with a fluid and comes into contact with at least a portion of the tire model, are determined. Incidentally, a road surface model may be further determined. In step (b), deformation calculation of the tire model is executed and, in step (c), fluid calculation of the fluid model is executed. In step (d), a boundary surface between the tire model after the deformation calculation in step (b) and the fluid model after the fluid calculation in step (c) is recognized, a boundary condition concerning the recognized boundary surface is imparted to the tire model and the fluid model, and the calculation is performed until the fluid model assumes a state of pseudo flow. In step (e), a physical quantity occurring in at least one of the tire model and the fluid model in step (c) or step (d) is determined and, in step (f), the tire performance is estimated on the basis of the physical quantity.

In the deformation calculation of the tire model in step (b), deformation calculation at a time when deformation is imparted by at least one of ground contacting and rolling can be executed. In this case, at least one of the ground contacting and rolling may be set as the input.

In addition, when a boundary condition concerning the recognized boundary surface is imparted to the tire model and the fluid model, the fluid model may be determined in such a manner that the fluid is present on the road surface model side relative to the boundary surface.

It should be noted that, in at least one of the deformation calculation of the tire model and fluid calculation, repeated calculation may be performed. In the deformation calculation of the tire model, 10 msec or less may be adopted as the elapsed time of the predetermined time duration during which the repeated calculation is performed. Preferably, it is possible to adopt 1 msec or less, more preferably $1\mu$·sec or less. In addition, in the fluid calculation, 10 msec or less may be adopted as the elapsed time of the fixed time duration during which the repeated calculation is performed. Preferably, it is possible to adopt 1 msec or less, more preferably $1\mu$·sec or less. If this elapsed time is too long, the fluid in the fluid model fails t o assume a state of pseudo flow conforming to the behavior of the tire, and the accuracy as a numerical model deteriorates. For this reason, it is necessary to adopt an appropriate value as the elapsed time.

In addition, repeated calculation may be performed also in the calculation until the fluid model assumes the state of pseudo flow. In this calculation, 10 msec or less may be adopted as the elapsed time of the predetermined time duration during which the repeated calculation is performed. Preferably, it is possible to adopt 1 msec or less, more preferably $1\mu$·sec or less.

The aforementioned tire model may have a pattern partially. Further, as for the road surface model, an actual road surface condition can be reproduced by selecting a coefficient of friction $\mu$ representing a road surface condition among the dry, wet, icy, snowy, unpaved and other conditions depending on the road surface condition.

When the boundary condition is imparted, it is important that the fluid model recognize the surface of the tire model as the boundary surface of the fluid. However, if the very fine elements making up the fluid model are always made sufficiently small with respect to the tire (particularly pattern) model, and the number of constituent elements of the fluid model hence increases, an increase in the calculation time results, which entails difficulty. Accordingly, it is preferable to prevent an increase in the calculation time by making the very fine elements making up the fluid model large to a certain measure. At the same time, it is preferable to produce (overlap) an interfering portion between the tire model and the fluid model, recognize the interference portion, and divide the fluid model with the surface of the tire model as a boundary surface, so as to allow the boundary surface between the tire model and the fluid model to be recognized with high accuracy.

In addition, if the fluid model contains at least water, and the ground contact area or ground contact pressure of the tire model is used as the physical quantity, it is possible to estimate the wet performance of the tire. Further, if the fluid model contains at least water, and the pressure, flow volume, or flow velocity of the fluid model is used as the physical quantity, it is possible to estimate the wet performance of the tire.

Further, if the fluid model contains at least one of water and snow, and at least one of the ground contact area, ground contact pressure, and shearing force of the tire model on at least one of an icy road surface and a snowy road surface is used as the physical quantity, it is possible to estimate the on-ice and in-snow performance of the tire. In addition, if the fluid model contains at least one of water and snow, and at least one of the pressure, flow volume, and flow velocity of the fluid model on at least one of an icy road surface and a snowy road surface is used as the physical quantity, it is possible to estimate the on-ice and in-snow performance of the tire.

Further, if the fluid model contains at least water, and at least one of the pressure, flow volume, flow velocity, energy, and energy density of the fluid model is used as the physical quantity, it is possible to estimate the noise performance of the tire.

Further, in a case where the behavior of the fluid around the tire is simulated, if the following steps are taken which include: (a) determining a tire model having a pattern configuration to which deformation can be imparted by at least one of ground contacting and rolling, and a fluid model which is partially or wholly filled with a fluid and comes into contact with at least a portion of the tire model; (b) executing deformation calculation of the tire model; (c) executing fluid calculation of the fluid model; and (d) recognizing a boundary surface between the tire model after the deformation calculation in step (b) and the fluid model after the fluid calculation in step (c), imparting a boundary condition concerning the recognized boundary surface to the tire model and the fluid model, and performing the calculation until the fluid model assumes a state of pseudo flow, then it is possible to evaluate the flow of the fluid around the tire and estimate the smoothness of flow and the occurrence of disturbance, thereby making it possible to contribute to the estimation of tire performance.

In addition, in the case where the tire is designed, if the following steps are taken which include: (1) determining a plurality of tire models each having a pattern configuration to which deformation can be imparted by at least one of ground contacting and rolling, and a fluid model which is partially or wholly filled with a fluid and comes into contact with at least a portion of the tire model; (2) executing deformation calculation of the tire model; (3) executing fluid calculation of the fluid model; (4) recognizing a boundary surface between the tire model after the deformation calculation in step (2) and the fluid model after the fluid calculation in step (3), imparting a boundary condition concerning the recognized boundary surface to the tire model and the fluid model, and performing the calculation until the fluid model assumes a state of pseudo flow; (5) determining a physical quantity occurring in at least one of the tire model and the fluid model in step (3) or step (4); (6) estimating the tire performance on the basis of the physical quantity; and (7) designing the tire on the basis of the tire model having the tire performance selected from the plurality of tire performances, then it is possible to evaluate the flow of the fluid around the tire and contribute to the design while estimating the smoothness of flow and the occurrence of disturbance.

In addition, in a case where a vulcanizing mold for a tire for manufacturing a tire is designed, if the following steps are taken which include: ($\alpha$) determining a tire model having a pattern configuration to which deformation can be imparted by at least one of ground contacting and rolling, and a fluid model which is partially or wholly filled with a fluid and comes into contact with at least a portion of the tire model; ($\beta$) executing deformation calculation of the tire model; ($\gamma$) executing fluid calculation of the fluid model; ($\delta$) recognizing a boundary surface between the tire model after the deformation calculation in step ($\beta$) and the fluid model after the fluid calculation in step ($\gamma$), imparting a boundary condition concerning the recognized boundary surface to the tire model and the fluid model, and performing the calculation until the fluid model assumes a state of pseudo flow; ($\epsilon$) determining a physical quantity occurring in at least one of the tire model and the fluid model in step ($\gamma$) or step ($\delta$); ($\zeta$) estimating the tire performance of each of the tire models on the basis of the physical quantity; and ($\eta$) designing the vulcanizing mold for a tire on the basis of the tire model having the tire performance selected from the plurality of tire performances, then it is possible to evaluate the flow of the fluid around the tire to be manufactured and contribute to the design of the mold for manufacturing a tire while estimating the smoothness of flow and the occurrence of disturbance.

If the vulcanizing mold for a tire thus designed is made, the manufacture of the tire which is to assume the estimated tire performance is facilitated. In addition, if this vulcanizing mold for a tire is made, and the tire is manufactured by using it, its tire performance substantially agrees with the estimated performance, and it is possible to obtain a tire in which the evaluation of the flow of the fluid, the smoothness of the flow, the occurrence of disturbance, and the like have been taken into consideration.

In addition, in a case where a tire is manufactured, if the following steps are provided which include: (I) determining a plurality of tire models each having a pattern configuration to which deformation can be imparted by at least one of ground contacting and rolling, and a fluid model which is partially or wholly filled with a fluid and comes into contact with at least a portion of the tire model; (II) executing deformation calculation of each of the tire models; (III) executing fluid calculation of the fluid model; (IV) recognizing a boundary surface between each of the tire models after the deformation calculation in step (II) and the fluid model after the fluid calculation in step (III), imparting a boundary condition concerning the recognized boundary surface to each of the tire models and the fluid model, and performing the calculation until the fluid model assumes a state of pseudo flow; (V) determining a physical quantity occurring in at least one of each of the tire models and the fluid model for each of the tire models in step (III) or step (IV); (VI) estimating the tire performance of each of the tire models on the basis of the physical quantity; and (VII) manufacturing the tire on the basis of the tire model having the tire performance selected from the plurality of tire performances, then the tire performance substantially agrees with the estimated performance, and it is possible to obtain a tire in which the evaluation of the flow of the fluid, the smoothness of the flow, the occurrence of disturbance, and the like have been taken into consideration.

Further, in a case where tire performance is estimated by a computer, if a tire-performance estimation program which includes the following steps is stored in a storage medium and is executed, and if data is collected: (A) determining a tire model having a pattern configuration to which deformation can be imparted by at least one of ground contacting and rolling, and a fluid model which is partially or wholly filled with a fluid and comes into contact with at least a portion of the tire model; (B) executing deformation calculation of the tire model; (C) executing fluid calculation of the fluid model; and (D) recognizing a boundary surface between the tire model after the deformation calculation in step (B) and the fluid model after the fluid calculation in step (C), imparting a boundary condition concerning the recognized boundary surface to the tire model and the fluid model, and performing the calculation until the fluid model assumes a state of pseudo flow, then it is possible to make a comparison with the performance evaluation of the past and contribute to the accumulation of data in the future.

In addition, as a result of conducting various studies, the present inventors took note of the fact that an "optimization design technique" which is being used in different fields is applicable to the special field of tires, and conducted studies from various angles, and specifically established this technique specifically as a method of designing a tire, so as to estimate tire performance in the optimization process, i.e., to estimate the performance of an actually used tire in the presence of a fluid, such as the drainage performance, in-snow performance, and noise performance, to bring the fluid during the ground contacting and rolling of the tire close to a flowing state and enable transient analysis, to make efficient the development of the tire, and to facilitate the provision of the tire having excellent performance.

Specifically, the method of designing a pneumatic tire according to claim 28 of the invention comprises the steps of: (11) determining a tire model which includes at least a cross-sectional shape of a tire including an internal structure and which has a pattern configuration to which deformation can be imparted by at least one of ground contacting and rolling, determining a fluid model which is partially or wholly filled with a fluid and which comes into contact with at least a portion of the tire model, determining an objective function representing a physical quantity for evaluating tire performance, a design variable for determining a cross-sectional shape of the tire, a tire structure, or a pattern configuration, and determining a constraint for constraining at least one of the cross-sectional shape of the tire, the tire structure, the pattern configuration, the physical quantity for evaluating performance, and a tire size; (12) estimating the tire performance on the basis of the physical quantity occurring in at least one of the tire model and the fluid model in at least one of a state of deformation of the tire model and a state of pseudo flow of the fluid model; (13) determining a value of the design variable which gives an optimum value of the objective function while satisfying the estimated tire performance and the constraint; and (14) designing the tire on the basis of the design variable which gives the optimum value of the objective function.

In accordance with the invention according to claim 29, in the method of designing a pneumatic tire according to claim 28, wherein step (12) includes the steps of: (15) executing a deformation calculation of the tire model; (16) executing a fluid calculation of the fluid model; (17) identifying a boundary surface between the tire model after the deformation calculation in step (15) and the fluid model after the fluid calculation in step (16), imparting a boundary condition concerning the identified boundary surface to the tire model and the fluid model, and performing the calculations until the fluid model assumes a state of pseudo flow; (18) determining a physical quantity occurring in at least one of the tire model and the fluid model in step (15) or step (16); and (19) estimating the tire performance on the basis of the physical quantity.

In accordance with the invention according to claim 30, in the method of designing a pneumatic tire according to claim 28 or 29, in step (11), a road surface model in contact with the fluid model is further determined.

In accordance with the invention according to claim 31, in the method of designing a pneumatic tire according to claim 29 or 30, in step (15), the deformation calculation is performed repeatedly for only a predetermined time duration.

In accordance with the invention according to claim 32, in the method of designing a pneumatic tire according to any one of claims 29 to 31, wherein, in step (16), the fluid calculation is performed repeatedly for only a fixed time duration.

In accordance with the invention according to claim 33, in the method of designing a pneumatic tire according to any one of claims 29 to 32, in step (17), the deformation calculation and fluid calculation are performed repeatedly for only a time duration determined in advance.

In accordance with the invention according to claim 34, in the method of designing a pneumatic tire according to any one of claims 28 to 33, in a case where the tire model is rolled, in step (11), the tire model is determined for which the calculations for a time of charging with internal pressure and a time of load calculation is performed, and to which a rotational displacement or a speed or a straightly advancing displacement or speed is imparted.

In accordance with the invention according to claim 35, in the method of designing a pneumatic tire according to any one of claims 28 to 34, in a case where the tire model is rolled, in step (11), influx and efflux conditions representing that the fluid flows out freely from a top surface of the fluid model and that the fluid does not flow into or flow out of surfaces other than the top surface of the fluid model are imparted to the fluid model.

In accordance with the invention according to claim 36, in the method of designing a pneumatic tire according to any one of claims 28 to 35, wherein in a case where the tire model is not rolled, in step (11), the tire model is determined for which the calculations for charging with internal pressure are performed, and for which load calculation is performed after the calculations.

In accordance with the invention according to claim 37, in the method of designing a pneumatic tire according to any one of claims 28 to 34 or claim 36, wherein in a case where the tire model is not rolled, in step (11), influx and efflux conditions representing that the fluid flows into a front surface of the fluid model at an advancing velocity, that the fluid flows out freely from a rear surface of the fluid model and a top surface of the fluid model, and that the fluid does not flow into or flow out of side surfaces of the fluid model and a lower surface of the fluid model are imparted to the fluid model.

In accordance with the invention according to claim 38, in the method of designing a pneumatic tire according to any one of claims 28 to 37, the tire model has a pattern partially.

In accordance with the invention according to claim 39, in the method of designing a pneumatic tire according to any one of claims 28 to 38, wherein, as for the road surface model, a road surface condition is set by selecting a coefficient of friction $\mu$ representing at least one of road surface conditions including dry, wet, icy, snowy, and unpaved conditions.

In accordance with the invention according to claim 40, in the method of designing a pneumatic tire according to any one of claims 28 to 39, wherein, in step (17), an interfering portion between the tire model and the fluid model is generated, the interference portion is identified, and the fluid model is divided by fluid elements with a surface of the tire model as a boundary surface.

In accordance with the invention according to claim 41, in the method of designing a pneumatic tire according to any one of claims 28 to 40, the fluid model contains at least water, at least one of a ground contact area and a ground contact pressure of the tire model is used as the physical quantity, and a wet performance of the tire is estimated as the tire performance.

In accordance with the invention according to claim 42, in the method of designing a pneumatic tire according to any one of claims 28 to 41, wherein the fluid model contains at least water, at least one of a pressure, flow volume, and flow velocity of the fluid model is used as the physical quantity, and a wet performance of the tire is estimated as the tire performance.

In accordance with the invention according to claim 43, in the method of designing a pneumatic tire according to any one of claims 28 to 42, wherein the fluid model contains at least one of water and snow, at least one of a ground contact area, ground contact pressure, and shearing force of the tire model on at least one of an icy road surface and a snowy road surface is used as the physical quantity, and an on-ice and in-snow performance of the tire is estimated as the tire performance.

In accordance with the invention according to claim 44, in the method of designing a pneumatic tire according to any one of claims 28 to 43, wherein the fluid model contains at least one of water and snow, at least one of a pressure, flow volume, and flow velocity of the fluid model on at least one of an icy road surface and a snowy road surface is used as the physical quantity, and an on-ice and in-snow performance of the tire is estimated as the tire performance.

In accordance with the invention according to claim 45, in the method of designing a pneumatic tire according to any one of claims 28 to 44, the fluid model contains at least water, at least one of a pressure, flow volume, flow velocity, energy, and energy density of the fluid model is used as the physical quantity, and a noise performance of the tire is estimated as the tire performance.

In accordance with the invention according to claim 47, in the method of designing a pneumatic tire according to claim 28, the design variable includes at least one of: a function representing a shape of at least one line selected from a carcass line, a turn-up ply line, a line representing an outer configuration of the tire, a line representing a tire crown shape, and a reinforcing-material line; a variable representing at least one gauge distribution of a tire rubber member selected from a gauge distribution of a bead filler, a gauge distribution of a rubber chafer, a gauge distribution of side rubber, a gauge distribution of tread rubber, a gauge distribution of tread base rubber, a gauge distribution of inner-surface reinforcing rubber, a gauge distribution of inter-belt rubber, and a gauge distribution of belt end rubber; a variable representing at least one structure of a belt portion selected from an angle of each belt layer, a width thereof, a cord type thereof, and a placing density thereof; and a variable representing at least one configuration of a pattern selected from a configuration of a block, a position of a sipe, a number of sipes, and a length of each of the sipes.

In the present invention, first, a draft design of the tire is incorporated into a model in numerical analysis so as to estimate the performance of a tire to be evaluated (such as the change of the shape, structure, materials, and pattern of the tire). Further, modeling of a fluid and a road surface concerning the targeted performance is performed to construct a fluid model and a road surface model (numerical analysis models), numerical analysis which simultaneously takes into consideration the tire, the fluid, and the road surface is carried out, and the targeted performance is numerically estimated. The acceptability of the draft design of the tire can be determined from the result of this estimation, and if the result is favorable, the draft design is adopted, or a further improvement of the evaluation of the performance of this draft design becomes possible. If these procedures are used, the number of times the tire is manufactured and the performance is evaluated can be minimized, so that the development of the tire can be made efficient.

Accordingly, to undertake the development of the tire based on the estimation of performance, numerical analysis models for the tire performance estimation which is efficient and highly accurate are essential. Accordingly, to estimate the tire performance, in step (11), a tire model which includes at least a cross-sectional shape of the tire including an internal structure and which has a pattern configuration to which deformation can be imparted by at least one of ground contacting and rolling, as well as a fluid model which is filled with a fluid at least partially and comes into contact with at least a portion of the tire model, are determined. Incidentally, a road surface model may be further determined.

In addition, in step (11), the objective function representing the physical quantity for evaluating tire performance, the design variable for determining the cross-sectional shape of the tire or the tire structure, and the constraint for constraining the cross-sectional shape of the tire or the tire structure are determined. In addition to a line representing the outer configuration of the tire, this tire model may include a line representing the configuration of a tire crown, a belt line representing a belt in the interior of the tire, a carcass line representing the carcass of the tire, a turn-up ply line representing a turn-up line of the carcass ply in the interior of the tire, and a reinforcing-material line representing a line of each of various reinforcing materials, the gauge distribution of a tire rubber member, the angle, width, cord type, and placement density of each belt layer representing the structure of the belt portion, as well as the configuration of a block, the block groove-wall angle, the position of a sipe, the number of sipes, and the length of the sipe which represent the configuration of the pattern.

In addition, a technique called the finite element method for dividing the tire model into a plurality of elements or an analytical technique may be used for the tire model. As the objective function representing a physical quantity for evaluating tire performance, it is possible to use a physical quantity for governing the relative excellence of the tire performance, including the lateral spring constant and belt tension in the circumferential direction of the tire when inflated with tire to improve steering stability. As the design variable, it is possible to use, among others, a function representing at least one line selected from the carcass line, the turn-up ply line, the outer configuration of the tire, the line representing the configuration of the tire crown, and the reinforcing-material line representing the line of each reinforcing material. As the design variable for determining the tire structure, it is possible to use a variable representing at least one gauge distribution of a tire rubber member selected from a gauge distribution of a bead filler, a gauge distribution of a rubber chafer, a gauge distribution of side rubber, a gauge distribution of tread rubber, a gauge distribution of tread base rubber, a gauge distribution of inner-surface reinforcing rubber, a gauge distribution of inter-belt rubber, and a gauge distribution of belt end rubber, as well as a variable representing the structure of the belt portion, the bead and side portions, including an angle of a belt layer, the width of the belt layer, the height of the ply, an amount of the ply turned up, and the angle, width, position, material and the like of a bead-portion reinforcing material.

In addition, as the design variable for determining the pattern, it is possible to use a variable representing the configuration of the pattern, including the configuration of a block, the block groove-wall angle, the position of a sipe, the number of sipes, and the length of the sipe. As the constraint for constraining the cross-sectional configuration of the tire and the tire structure, it is possible to cite, for example, a constraint in a periphery value of the carcass line, a constraint in the vertical primary eigenfrequency, a constraint in the angle of the belt layer, a constraint in the width of the belt layer, and constraints such as the tire size, spring constants, the amount of deformation of the tire, tire weight, stress, strain, strain energy, and rolling resistance. It should be noted that the objective function, the design variable, and the constraint are not confined to the aforementioned examples, and various items may be set as such depending on the objective of tire design.

Next, in step (12), the tire performance is estimated on the basis of the physical quantity occurring in at least one of the tire model and the fluid model in at least one of a state of deformation of the tire model and a state of pseudo flow of the fluid model. In this step (12), deformation calculation of the tire model is executed in step (15), and fluid calculation of the fluid model is executed in step (16). In step (17), a boundary surface between the tire model after the deformation calculation in step (15) and the fluid model after the fluid calculation in step (16) is recognized, a boundary condition concerning the recognized boundary surface is imparted to the tire model and the fluid model, and the calculation is performed until the fluid model assumes a state of pseudo flow. In step (18), a physical quantity occurring in at least one of the tire model and the fluid model in step (15) or step (16) is determined and, in step (19), the tire performance can be estimated on the basis of the physical quantity.

In the deformation calculation of the tire model in step (15), deformation calculation at a time when deformation is imparted by at least one of ground contacting and rolling can be executed. In this case, at least one of the ground contacting and rolling may be set as the input.

In addition, when a boundary condition concerning the recognized boundary surface is imparted to the tire model and the fluid model, the fluid model may be determined in such a manner that the fluid is present on the road surface model side relative to the boundary surface.

It should be noted that, in at least one of the deformation calculation of the tire model and fluid calculation, repeated calculation may be performed. In the deformation calculation of the tire model, 10 msec or less may be adopted as the elapsed time of the predetermined time duration during which the repeated calculation is performed. Preferably, it is possible to adopt 1 msec or less, more preferably $1\mu$·sec or less. In addition, in the fluid calculation, 10 msec or less may be adopted as the elapsed time of the fixed time duration during which the repeated calculation is performed. Preferably, it is possible to adopt 1 msec or less, more preferably $1\mu$·sec or less. If this elapsed time is too long, the fluid in the fluid model fails to assume a state of pseudo flow conforming to the behavior of the tire, and the accuracy as a numerical model deteriorates. For this reason, it is necessary to adopt an appropriate value as the elapsed time.

In addition, repeated calculation may be performed also in the calculation until the fluid model assumes the state of pseudo flow. In this calculation, 10 msec or less may be adopted as the elapsed time of the predetermined time duration during which the repeated calculation is performed. Preferably, it is possible to adopt 1 msec or less, more preferably $1\mu$·sec or less.

The aforementioned tire model may have a pattern partially. Further, as for the road surface model, an actual road surface condition can be reproduced by selecting a coefficient of friction $\mu$ representing a road surface condition among the dry, wet, icy, snowy, unpaved and other conditions depending on the road surface condition.

When the boundary condition is imparted, it is important that the fluid model recognize the surface of the tire model as the boundary surface of the fluid. However, if the very fine elements making up the fluid model are always made sufficiently small with respect to the tire (particularly pattern) model, and the number of constituent elements of the fluid model hence increases, an increase in the calculation time results, which entails difficulty. Accordingly, it is preferable to prevent an increase in the calculation time by making the very fine elements making up the fluid model large to a certain measure. At the same time, it is preferable to produce (overlap) an interfering portion between the tire model and the fluid model, recognize the interference portion, and divide the fluid model with the surface of the tire model as a boundary surface, so as to allow the boundary surface between the tire model and the fluid model to be recognized with high accuracy.

In addition, if the fluid model contains at least water, and the ground contact area or ground contact pressure of the tire model is used as the physical quantity, it is possible to estimate the wet performance of the tire. Further, if the fluid model contains at least water, and the pressure, flow volume, or flow velocity of the fluid model is used as the physical quantity, it is possible to estimate the wet performance of the tire.

Further, if the fluid model contains at least one of water and snow, and at least one of the ground contact area, ground contact pressure, and shearing force of the tire model on at least one of an icy road surface and a snowy road surface is used as the physical quantity, it is possible to estimate the on-ice and in-snow performance of the tire. In addition, if the fluid model contains at least one of water and snow, and at least one of the pressure, flow volume, and flow velocity of the fluid model on at least one of an icy road surface and a snowy road surface is used as the physical quantity, it is possible to estimate the on-ice and in-snow performance of the tire.

Further, if the fluid model contains at least water, and at least one of the pressure, flow volume, flow velocity, energy, and energy density of the fluid model is used as the physical quantity, it is possible to estimate the noise performance of the tire.

Next, in step (13), the value of the design variable which gives an optimum value of the objective function while taking the estimated tire performance and the constraint into consideration is determined. In this case, it is effective if an amount of change of the design variable which gives the optimum value of the objective function while taking the constraint into consideration is estimated on the basis of a sensitivity of the objective function, which is a ratio of an amount of change of the objective function to an amount of unit change of the design variable, and a sensitivity of the constraint, which is a ratio of an amount of change of the constraint to an amount of unit change of the design variable, a value of the objective function when the design variable is changed by an amount corresponding to the estimated amount and a value of the constraint when the design variable is changed by the amount corresponding to the estimated amount are calculated, and the value of the design variable which gives the optimum value of the objective function while taking the constraint into consideration is determined on the basis of the estimated value and the calculated values. By so doing, it is possible to obtain the value of the design variable which gives an optimum value of the objective function while taking the constraint into consideration.

In addition, as a result of conducting various studies, the present inventors took note of the fact that the "technique of genetic algorithms" which is being used in different fields is applicable to the special field of tires, and conducted studies from various angles, and specifically established this technique specifically as a method of designing a tire, so as to estimate tire performance in the process of the genetic algorithm, i.e., to estimate the performance of an actually used tire in the presence of a fluid, such as the drainage performance, in-snow performance, and noise performance, to bring the fluid during the ground contacting and rolling of the tire close to a flowing state and enable transient analysis, to make efficient the development of the tire, and to facilitate the provision of the tire having excellent performance.

Specifically, in accordance with the invention according to claim 48, in the method of designing a pneumatic tire according to claim 28, step (11) comprises: determining a group subject to selection, including a plurality of tire models each of which includes at least a cross-sectional shape of the tire including an internal structure and has a pattern configuration to which deformation can be imparted by at least one of ground contacting and rolling; and determining, with respect to each of the tire models of the group subject to selection, the objective function representing the physical quantity for evaluating the tire performance, the design variable for determining the cross-sectional shape of the tire or the tire structure or a pattern configuration, the constraint for constraining at least one of the cross-sectional shape of the tire, the tire structure, the pattern configuration, the physical quantity for evaluating performance, and the tire size, and an adaptive function which can be evaluated from the objective function and the constraint; and step (13) comprises: selecting two tire models from the group subject to selection on the basis of the adaptive function; effecting at least one of generating a new tire model by allowing design variables of the tire models to cross over each other at a predetermined probability and generating a new tire model by changing a portion of the design variable of at least one of the tire models; determining the objective function, the constraint, and the adaptive function of the new tire model with the design variable changed; preserving said new tire model and one of the plurality of tire models with the design variable not changed, the processing being repeated until the tire models preserved reach a predetermined number; determining whether or not a new group including the predetermined number of the preserved tire models satisfies the predetermined convergence criterion; if the convergence criterion is not satisfied, repeating the processing until the group subject to selection satisfies the predetermined convergence criterion by setting the new group as the group subject to selection; and if the predetermined convergence criterion is satisfied, determining a value of the design variable which gives an optimum value of the objective function among the predetermined number of the preserved tire models while satisfying the constraint.

In accordance with the invention according to claim 49, in the method of designing a pneumatic tire according to claim 48, in step (13), with respect to the tire model with the design variable changed, an amount of change of the design variable which gives the optimum value of the objective function is estimated while satisfying the constraint on the basis of the sensitivity of the objective function, which is a ratio of an amount of change of the objective function to an amount of unit change of the design variable, and on the basis of the sensitivity of the constraint, which is a ratio of an amount of change of the constraint to an amount of unit change of the design variable, a value of the objective function when the design variable is changed by an amount corresponding to the estimated amount and a value of the constraint when the design variable is changed by an amount corresponding to the estimated amount are calculated, an adaptive function is determined from the value of the objective function and the value of the constraint, said new tire model and the one of the plurality of tire models with the design variable not changed are preserved, and the processing is repeated until the preserved basic models of the tire reach the predetermined number.

In the invention according to claim 48, it is effective if step (11) comprises: determining a group subject to selection, consisting of a plurality of tire models which each includes at least a cross-sectional shape of the tire including an internal structure and which has a pattern configuration to which deformation can be imparted by at least one of ground contacting and rolling; and determining, with respect to each of the tire models of the group subject to selection, the objective function representing the physical quantity for evaluating tire performance, the design variable for determining the cross-sectional shape of the tire or the tire structure, the constraint for constraining at least one of the cross-sectional shape of the tire, the tire structure, the pattern configuration, the physical quantity for evaluating performance, and the tire size, and an adaptive function which can be evaluated from the objective function and the constraint; and step (13) comprises: selecting two tire models from the group subject to selection on the basis of the adaptive function; effecting at least one of generating a new tire model by allowing design variables of the tire models to cross over each other at a predetermined probability and generating a new tire model by changing a portion of the design variable of at least one of the tire models; determining the objective function, the constraint, and the adaptive function of the tire model with the design variable changed; preserving the tire model and the tire model with the design variable not changed, the processing being repeated until the tire models preserved reaches a predetermined number; determining whether or not a new group consisting of the predetermined number of the preserved tire models satisfies a predetermined convergence criterion; if the convergence criterion is not satisfied, repeating the processing until the group subject to selection satisfies a predetermined convergence criterion by setting the new group as the group subject to selection; and if the predetermined convergence criterion is satisfied, determining the value of the design variable which gives the optimum value of the objective function among the predetermined number of the preserved tire models while taking the constraint into consideration.

In this case, it is effective if, in step (13), with respect to the tire model with the design variable changed, the amount of change of the design variable which gives the optimum value of the objective function is estimated while taking the constraint into consideration on the basis of the sensitivity of the objective function, which is the ratio of the amount of change of the objective function to the amount of unit change of the design variable, and on the basis of the sensitivity of the constraint, which is the ratio of the amount of change of the constraint to the amount of unit change of the design variable, the value of the objective function when the design variable is changed by the amount corresponding to the estimated amount and the value of the constraint when the design variable is changed by the amount corresponding to the estimated amount are calculated, the adaptive function is determined from the value of the objective function and the value of the constraint, the tire model and the tire model with the design variable not changed are preserved, and the processing is repeated until the preserved basic models of the tire reaches the predetermined number. By so doing, it is also possible to obtain the value of the design variable which gives an optimum value of the objective function while taking the constraint into consideration. It should be noted that as for the adaptive function which can be evaluated from the objective function and the constraint, it is possible to use a function for determining the fitness with respect to the tire model from the objective function and the constraint. Further, the objective function, the design variable, the constraint, and the adaptive function are not confined to the aforementioned examples, and various items may be set as such depending on the objective of tire design. Further, in the crossover of the design variables of the basic models of the tire, there is a method wherein a part of the design variable or design variables at or subsequent to a predetermined position are exchanged with respect to the design variables of two tire models selected. Furthermore, in the change of a part of the design variable of the tire model, there is a method wherein the design variable at a position determined at a predetermined probability is changed (mutated).

In addition, as a result of conducting various studies, the present inventors took note of the fact that a "nonlinear prediction technique in which a neuro circuit network of the higher animal is modeled in engineering, e.g., a neural network," and the "optimization design technique" which are being used in different fields are applicable to the special field of tires, and conducted studies, and specifically established these techniques specifically as a method of designing a tire.

Specifically, in accordance with the invention according to claim 50, in the method of designing a pneumatic tire according to claim 28, in step (11), a transformation system is determined in which nonlinear correspondence is correlated between a design parameter of the tire which includes at least the cross-sectional shape of the tire including the internal structure and which has the pattern configuration to which deformation can be imparted by at least one of ground contacting and rolling on the one hand, and the performance of said tire on the other hand, and a constraint for constraining an allowable range of at least one of the tire performance and a manufacturing condition of the tire is determined as the constraint; in step (13), the design parameter of the tire which gives the optimum value of the objective function on the basis of the objective function and the constraint is determined by using the transformation system determined in step (11); and in step (14), the tire is designed on the basis of the design parameter of the tire.

In accordance wit h the invention according to claim 51, in the method of designing a pneumatic tire according to claim 50, in step (13), the design parameter of the tire is set as the design variable, and the value of the design variable which gives the optimum value of the objective function is determined by using the transformation system determined in step (11) while satisfying the constraint; and in step (14), the tire is designed on the basis of the design variable which gives the optimum value of the objective function.

In accordance with the invention according to claim 52, in the method of designing a pneumatic tire according to claim 50 or 51, transformation system is formed by data of a multilayered feedforward-type neural network which has undergone learning so as to transform the design parameter of the tire into the tire performance.

The tire performance, e.g., the values of the steering stability and belt durability and the like, are determined by the design parameters of the tire design, e.g., the cross-sectional configuration of the tire including the internal structure and the tire structure. However, there are many cases where even if the values of the cross-sectional configuration of the tire and the tire structure are varied linearly, the tire performance does not change linearly. Accordingly, in step (11) of the invention, a transformation system is determined in which nonlinear correspondence is correlated between a design parameter of the tire which includes at least a cross-sectional shape of the tire including an internal structure and which has a pattern configuration to which deformation can be imparted by at least one of ground contacting and rolling on the one hand, and the performance of the tire on the other hand. In addition, a constraint for constraining an allowable range of at least one of the tire performance and a manufacturing condition of the tire is determined as the constraint. This transformation system can be determined by using a nonlinear prediction technique in which a neuro circuit network of the higher animal is modeled in engineering, such as a neural network. In addition, as the objective function representing a physical quantity for evaluating tire performance, it is possible to use a physical quantity for governing the relative excellence of the tire performance including the lateral spring constant and belt tension in the circumferential direction of the tire when inflated with tire to improve steering stability, or the ground contacting characteristic within the ground contact plane during straightly advancing or lateral force. As the constraint for constraining an allowable range of at least one of the tire performance and the design parameter of the tire, e.g., as the constraint for constraining the cross-sectional configuration of the tire and the tire structure, it is possible to cite, for example, a constraint in a periphery value of the carcass line, a constraint in the vertical primary eigenfrequency, a constraint in the angle of the belt layer, a constraint in the width of the belt layer, and constraints such as the tire size, spring constants, the amount of deformation of the tire, tire weight, stress, strain, strain energy, and rolling resistance. It should be noted that the objective function and the constraint are not confined to the aforementioned examples, and various ones items may be set as such depending on the objective of tire design.

In step (13), the design parameter of the tire which gives the optimum value of the objective function on the basis of the objective function and the constraint is determined by using the transformation system determined in step (11); and in step (14), the tire is designed on the basis of the design parameter of the tire. As a result, a transformation system is determined in which nonlinear correspondence is correlated between the design parameter of the tire and the tire performance, and it is possible to ascertain a mutual relationship of correspondence in which design parameters of the tire and their performances are correlated. Hence, the design of a high-performance tire becomes possible by designing the tire on the basis of the design parameters by determining the design parameters of the tire which give optimum values of the objective function.

In the case where the tire is designed, the design parameter of the tire can be set as the design variable, and the value of the design variable which gives the optimum value of the objective function can be determined by using the transformation system determined in step (11) while taking the constraint into consideration, making it possible to design the tire on the basis of the design variable which gives the optimum value of the objective function. Thus, by taking the constraint into consideration, it is possible to take into consideration the allowable range of at least one of the tire performance and the design parameter of the tire, and it is possible to specify the design range in advance or set a desired range.

In addition, in a case where the value of the design variable is determined, it is effective if an amount of change of the design variable which gives the optimum value of the objective function while taking the constraint into consideration is estimated on the basis of a sensitivity of the objective function, which is a ratio of an amount of change of the objective function to an amount of unit change of the design variable, and a sensitivity of the constraint, which is a ratio of an amount of change of the constraint to an amount of unit change of the design variable, a value of the objective function when the design variable is changed by an amount corresponding to the estimated amount and a value of the constraint when the design variable is changed by the amount corresponding to the estimated amount are calculated, and the value of the design variable which gives the optimum value of the objective function while taking the constraint into consideration is determined on the basis of the estimated value and the calculated values by using the transformation system determined in Step (11). By so doing, it is possible to obtain the value of the design variable which gives an optimum value of the objective function while taking the constraint into consideration. Then, the tire can be designed by changing the design parameter and the like of the tire on the basis of the design variable which gives the optimum value of the objective function.

Still further, in the present invention, by designing a tire in which the block height within each block which is present in the tread pattern is uniquely optimized in correspondence with ground contact pressure for the input to which the tire is subjected, nonuniformity of the ground contact pressure within the tire pattern or within the block is corrected. Namely, in the case of the tread configuration in which the block height is set to a fixed level, the ground-contact-pressure distribution characteristic becomes nonuniform within the block. In the present invention, by changing the tread configuration, it is possible to obtain a ground-contact-pressure distribution characteristic which becomes substantially uniform within the block.

For this reason, in the present invention, a basic model of the configuration is first constructed, and an input condition is imparted thereto. The value of the objective function is calculated from the ground contact pressure determined at this juncture. Then, the design variable is set as the tread configuration of the block, a change of the configuration is made, an input is imparted again to the model using this new configuration, and the distribution of the ground contact pressure is obtained. This operation is repeated until an optimum value of the objective function is given. It should be noted that the present invention is applicable to a case where the constraint is provided, in which case the value of the objective function and the value of the constraint are obtained after imparting an input to the basic model. The design in this case ends when an optimum value of the objective function is obtained within the constraint. The tire is designed on the basis of this optimum design variable.

Specifically, in accordance with the invention according to claim 53, in the method of designing a pneumatic tire according to claim 28, in step (11), a basic model of a configuration representing one configuration selected from a configuration of a unit body of a block including an internal structure, a partial pattern configuration of a tire crown portion including the internal structure, and a configuration of a land portion continuing in a circumferential direction of the tire and including the internal structure is further determined; at least one input condition is imparted to the basic model of the configuration; a tread configuration representing at least one portion of the configuration of the unit body of the block, the pattern configuration, or the configuration of the land portion is set as the design variable; and a ground contact pressure of the tire under the input condition is calculated and set as the objective function.

In accordance with the invention according to claim 54, in the method of designing a pneumatic tire according to claim 53, at least one of a tire contact area and a range of change of the design variable is further set as the constraint, and, in step (13), the value of the design variable is changed until an optimum value of the objective function is given while satisfying the constraint.

In accordance with the invention according to claim 55, in the method of designing a pneumatic tire according to claim 54, as for the design variable, the design variable for at least one of a location where the ground contact pressure is higher than average ground contact pressure and a location where the ground contact pressure is lower than average ground contact pressure is changed.

The basic model of the configuration represents one configuration selected from the configuration of a unit body of a block including an internal structure, a partial pattern configuration of a tire crown portion including the internal structure, and the configuration of a land portion continuing in the circumferential direction of the tire and including the internal structure.

The basic model of the configuration representing the configuration of a unit body of a block may be constituted by a function representing a line for specifying the outer configuration of the unit body of the block or a variable representing the coordinate values of an inflection point. In addition, the basic model of the configuration representing the partial pattern configuration of the tire crown portion including the internal structure may be constituted by a function which is capable of geometrically analyzing the pattern configuration on the ground-surface contacting side of one land portion among the tire crown portions, e.g., a function for determining a polygon such as a rectangle or a rhombus. In addition, the basic model of the configuration representing the configuration of a land portion continuing in the circumferential direction of the tire and including the internal structure may be constituted by a function representing a line representing the cross-sectional configuration of the tire or a variable representing the coordinate values of an inflection point. As these basic models of the configuration, it is possible to use a model based on the technique called the finite element method for dividing the model into a plurality of elements or a model based on an analytical method.

In addition, at least one input condition is imparted to the basic model of the configuration. The input conditions include a load condition representing the load to be applied and a direction condition representing the shearing direction. Next, the tread configuration representing at least a portion of the shape of the unit body of the block, the pattern configuration, or the configuration of the land portion is set as the design variable, and the ground contact pressure of the tire is calculated under the input condition and is set as the objective function.

In addition, in step (13), it is possible to determine the value of the design variable which gives an optimum value of the objective function, and it is possible to determine the value of the design variable by calculating the value of the design variable while changing the value of the design variable until the optimum value of the objective function is given.

When the tread configuration is set as the design variable, and the ground contact pressure of the tire is calculated under the input condition and is set as the objective function, it is preferable to take the constraint into consideration to alleviate the calculational load and the like. Accordingly, at least one of the tire contact area and a range of change of the design variable is further set as the constraint, and, in step (13), the value of the design variable is changed until an optimum value of the objective function is given while taking the constraint into consideration. This range of change of the design variable can be represented by either the range of the tread or the block height.

When the value of the design variable which gives the optimum value of the objective function is determined, the design variable for at least one of a location where the ground contact pressure is higher than average ground contact pressure of the tire and a location where the ground contact pressure is lower than average ground contact pressure of the tire can be changed. In a case where the design variable for a location where the ground contact pressure is higher than average ground contact pressure of the tire is thus changed, the design variable can be changed in such a manner as to decrease the block height. Meanwhile, in a case where the design variable for a location where the ground contact pressure is lower than average ground contact pressure of the tire is changed, the design variable can be changed in such a manner as to increase the block height. Further, the design variable can be changed by changing the block height in correspondence with each deviation from the average ground contact pressure of the tire.

It should be noted that in a case where there are a plurality of input conditions, the design variable may be changed by placing priority on an input condition whose amount of change of the block height is larger.

In addition, the at least one portion of the tread configuration represented by the design variable can be represented by a mathematical formula of any one of a polynomial, a division polynomial, a spline function, and a rational function. In a case where at least one portion of the tread configuration represented by such a mathematical formula is changed, the change may be effected for each calculation or once for a number of calculations by taking into account the calculation time and the capacity of the computer.

It should be noted that, by forming the tire by the structure and the like using the design parameters of the tire designed by the above-described method of designing a tire, the performance of the tire thus formed is designed with optimum design parameters, so that it is possible to directly determine the details of optimum design parameters depending on the conditions of application such as the manufacturing conditions and cost.

It should be noted that if the tire designed by the above-described method of designing a pneumatic tire is manufactured, it is possible to obtain a tire exhibiting satisfactory tire performance. Accordingly, in the present invention, it is possible to design the vulcanizing mold for a tire and manufacture the tire in the manner described below.

In the method of designing a vulcanizing mold for a tire in accordance with the invention according to claim 56, a vulcanizing mold for a tire is designed on the basis of the tire or the tire model designed by the method of designing a pneumatic tire according to any one of claims 28 to 55.

In the method of make a vulcanizing mold for a tire in accordance with the invention according to claim 57, a vulcanizing mold for a tire designed by the method of designing a vulcanizing mold for a tire according to claim 56 is made.

In the method of manufacturing a pneumatic tire in accordance with the invention according to claim 58, a vulcanizing mold for a tire designed by the method of designing a vulcanizing mold for a tire according to claim 56 is made, and a pneumatic tire is manufactured by using the vulcanizing mold.

In the method of designing a pneumatic tire in accordance with the invention according to claim 59, a pneumatic tire is manufactured on the basis of the tire or the tire model designed by the method of designing a pneumatic tire according to any one of claims 28 to 55.

Namely, in the case where the vulcanizing mold for a tire for manufacturing a tire is designed, the vulcanizing mold for a tire is designed on the basis of the tire or the tire model designed by the method of designing a pneumatic tire according to any one of claims 28 to 55. Since the tire performance is estimated in this manner, and the vulcanizing mold for a tire is designed on the basis of the tire model having that tire performance, it is possible to evaluate the flow of the fluid around the tire to be manufactured, and estimate the smoothness of flow and the occurrence of disturbance, thereby making it possible to contribute to the design of the mold for manufacturing a tire while estimating the tire performance.

If the vulcanizing mold for a tire thus designed is made, the manufacture of the tire to be provided with the estimated tire performance is facilitated. In addition, if this vulcanizing mold for a tire is made, and the tire is manufactured by using the same, its tire performance substantially agrees with the estimated performance, and it is possible to obtain a tire in which the evaluation of the flow of the fluid, the smoothness of the flow, the occurrence of disturbance, and the like have been taken into consideration.

In addition, in the case where the tire is manufactured, the vulcanizing mold for a tire designed by the method of designing a vulcanizing mold for a tire according to claim 56 is made, and the pneumatic tire is manufactured by using that vulcanizing mold. Alternatively, if the pneumatic tire is manufactured on the basis of the tire or the tire model designed by the method of designing a pneumatic tire according to any one of claims 28 to 55, as described in claim 59, its tire performance substantially agrees with the estimated performance, and it is possible to obtain a tire in which the evaluation of the flow of the fluid, the smoothness of the flow, the occurrence of disturbance, and the like have been taken into consideration.

As also described in claim 60, the above-described method of designing a tire can be realized by an optimization analyzer comprising: estimating means for estimating the performance of a tire from a design parameter of the tire; transformation-system computing means for determining a nonlinear relationship of correspondence between the design parameter of the tire and the performance of the tire; input means for determining an objective function representing the tire performance, determining a constraint for constraining an allowable range of at least one of the tire performance and a manufacturing condition of the tire, and inputting them as items of optimization; and optimization calculating means for determining the design parameter of the tire which gives the optimum value of the objective function on the basis of the items of optimization inputted by the input means by using the transformation-system computing means.

As also described in claim 61, this transformation-system computing means is able to determine a nonlinear relationship of correspondence between the design parameter of the tire and an applicable condition for the tire on the one hand, and the performance of the tire on the other hand. The applicable conditions include the constituent members of the tire, their volumes and sizes, the manufacturing conditions, the weight of the tire, and overall cost. In addition, the transformation-system computing means may be constituted by a multilayered feedforward-type neural network which has undergone learning so as to transform the design parameter of the tire into the tire performance.

As also described in claim 62, the above-described method of designing a tire is able to provide a recording medium on which a tire optimization analysis program recorded thereon and which can be easily carried around by virtue of the recording medium containing a program based on the following procedures: Namely, this recording medium is a recording medium with a tire optimization analysis program recorded thereon for designing a tire by a computer, wherein the optimization analysis program is arranged to: estimate the performance of a tire from a design parameter of the tire; determine a nonlinear relationship of correspondence between the design parameter of the tire and the performance of the tire; determine an objective function representing the tire performance, determine a constraint for constraining an allowable range of at least one of the tire performance and a manufacturing condition of the tire; and determine the design parameter of the tire which gives the optimum value of the objective function on the basis of the determined relationship of correspondence, the objective function, and the constraint, and design the tire on the basis of the design parameter of the tire.

As described above, in accordance with the present invention, an advantage is offered in that it is possible to obtain a tire which is capable of estimating tire performance in an environment of actual use in the presence of a fluid, such as the drainage performance, in-snow performance, and noise performance, which is capable of enabling analysis in which the fluid during the ground contacting and rolling of the tire is taken into consideration, and which is capable of improving the efficiency in tire development and has excellent performance.

In addition, an advantage is offered in that it is possible to obtain a tire which is capable of determining a design variable which gives an optimum value of the objective function satisfying the constraint while estimating tire performance in the environment of actual use in the presence of a fluid, such as the drainage performance, in-snow performance, and noise performance, and of designing a tire on the basis of this design variable, which is capable of enabling analysis in which the fluid during the ground contacting and rolling of the tire is taken into consideration, and which makes it possible to improve the efficiency in tire development and has excellent performance.

BRIEF DESCRIPTION OF THE DRAWINGS

FIG. 4 is a perspective view illustrating a radially cross-sectional model of the tire;

FIG. 5 is a perspective view illustrating a three-dimensional model of the tire;

FIG. 9A is a perspective view illustrating a fluid model;

FIG. 9B is a plan view illustrating the fluid model;

FIG. 32 is an image diagram illustrating a state of water displacement at a point of time when the pattern portion comes into contact with the road surface due to the rolling of the tire model;

FIG. 39 is a diagram illustrating the relationship among selected nodes, distances r1 and ascending angles $θ_i$ for the nodes, and the like;

FIG. 43A is a diagram illustrating a continuous trough-shaped function mapping function;

FIG. 43B is a diagram illustrating a linear trough-shaped function mapping function;

FIG. 59 is a flowchart illustrating the flow of processing in which an optimal configuration itself is applied to the tire design without using shape approximation;

FIG. 62 is a flowchart illustrating the flow of processing of a program for designing a pneumatic tire in accordance with a ninth embodiment of the invention;

FIG. 68 is a diagram illustrating changed positions of the shape of the block tip in a pattern model;

FIG. 71 is a diagram illustrating a changed position Ag1 of the shape of the block tip;

DETAILED DESCRIPTION OF THE INVENTION

Figure 1:
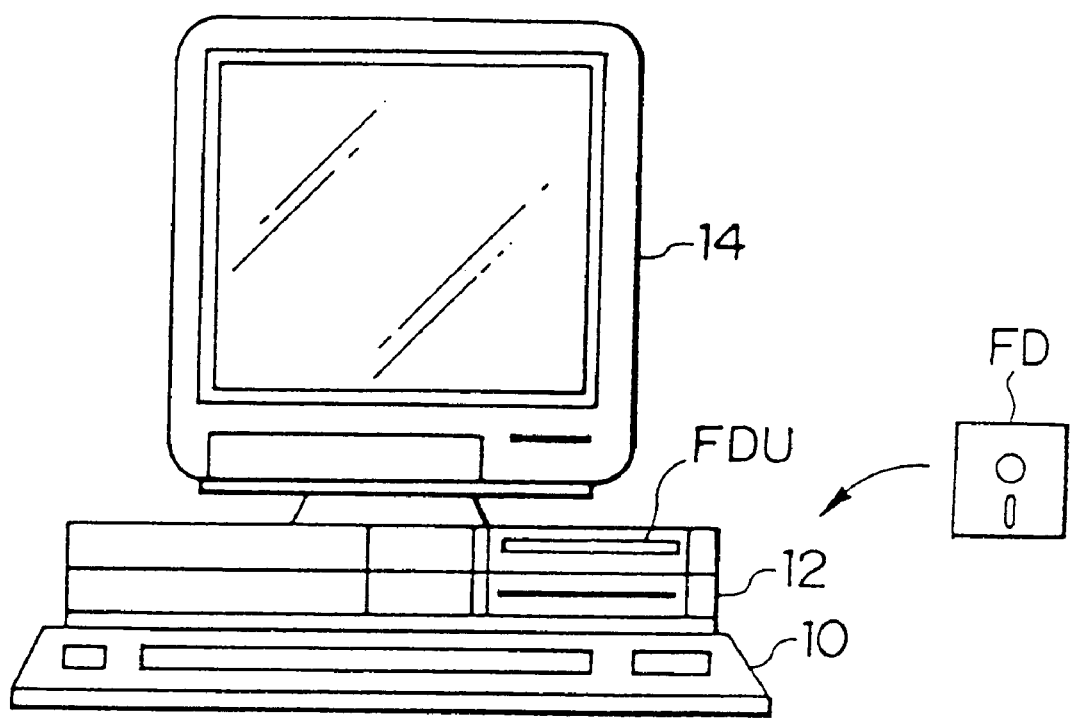
FIG. 1 is a schematic diagram of a personal computer for carrying out a method of estimating tire performance in accordance with an embodiment of the present invention.

Referring now to the drawings, a detailed description will be given of the embodiments of the present invention.
[First Embodiment]

In a first embodiment, the present invention is applied to the estimation of the performance of a pneumatic tire. FIG. 1 shows a schematic of a personal computer for executing the estimation of the performance of a pneumatic tire in accordance with the invention. This personal computer is comprised of a keyboard 10 for entering data and the like, a main unit 12 of a computer for estimating tire performance in accordance with a processing program stored in advance, and a CRT 14 for displaying such as the results of computation by the main unit 12 of the computer.

It should be noted that the main unit 12 of the computer has a floppy disk unit (FDU) with respect to which a floppy disk (FD) serving as a recording medium can be loaded and unloaded. Incidentally, the reading and writing of the processing routines and the like, which will be described later, can be read and written with respect to the floppy disk FD by using the FDU. Accordingly, the processing routines, which will be described later, may be recorded in advance on the FD, and the processing program recorded on the FD may be executed by means of the FDU. In addition, a large-capacity storage device (not shown) such as a hard disk drive may be connected to the main unit 12 of the computer, and the processing program recorded on the FD may be stored (installed) in the large-capacity storage device (not shown) so as to execute the processing program. In addition, optical disks such as a CD-ROM and magneto-optic disks such an MD and an MO are available as recording media, and when they are to be used, it suffices if a CD-ROM drive, an MD drive, an MO derive, and the like are used instead of or in addition to the aforementioned FDU.

Figure 2:
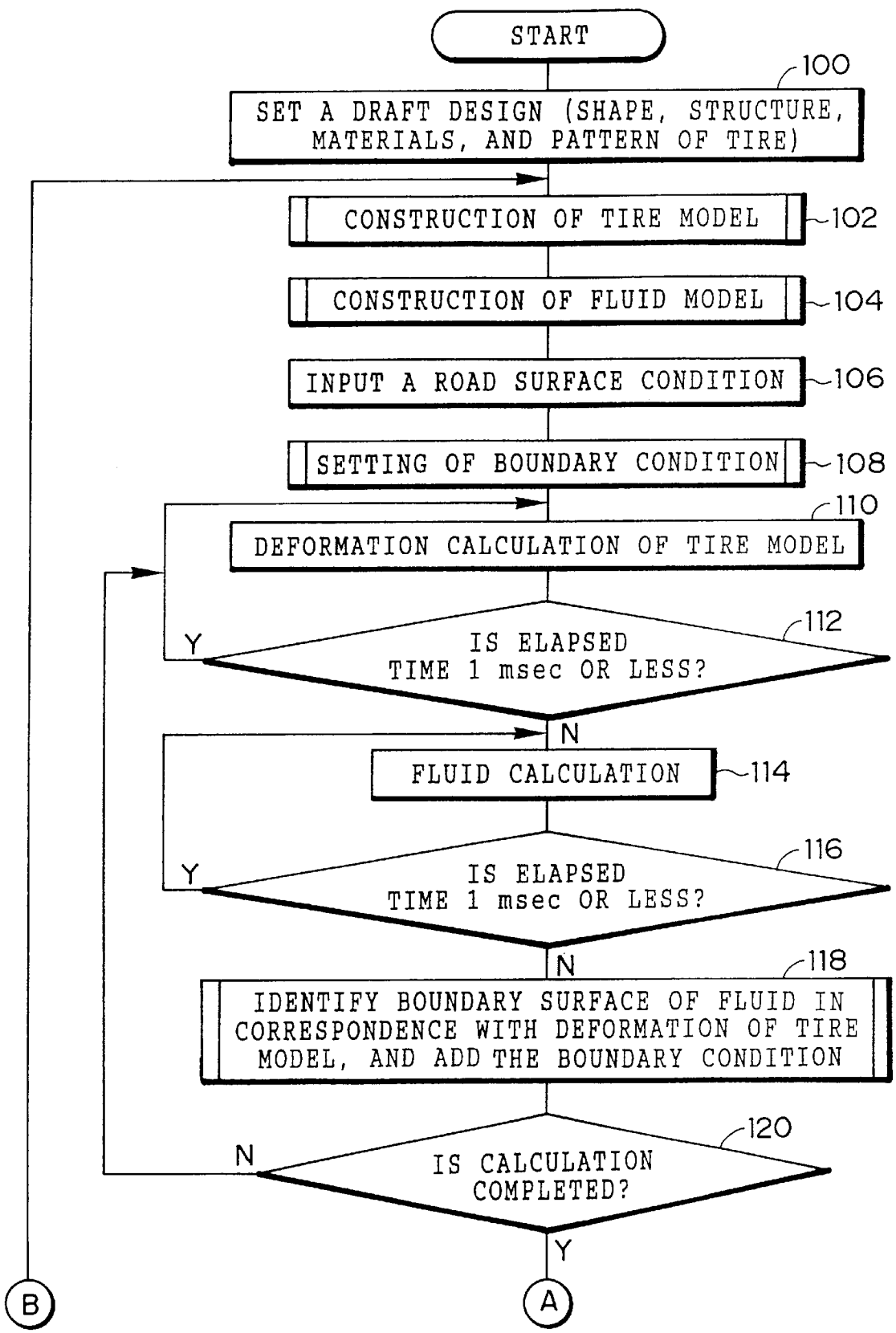
FIG. 2 is a flowchart illustrating the flow of processing a program for evaluating the estimation of the performance of a pneumatic tire in accordance with the embodiment.
Figure 2:
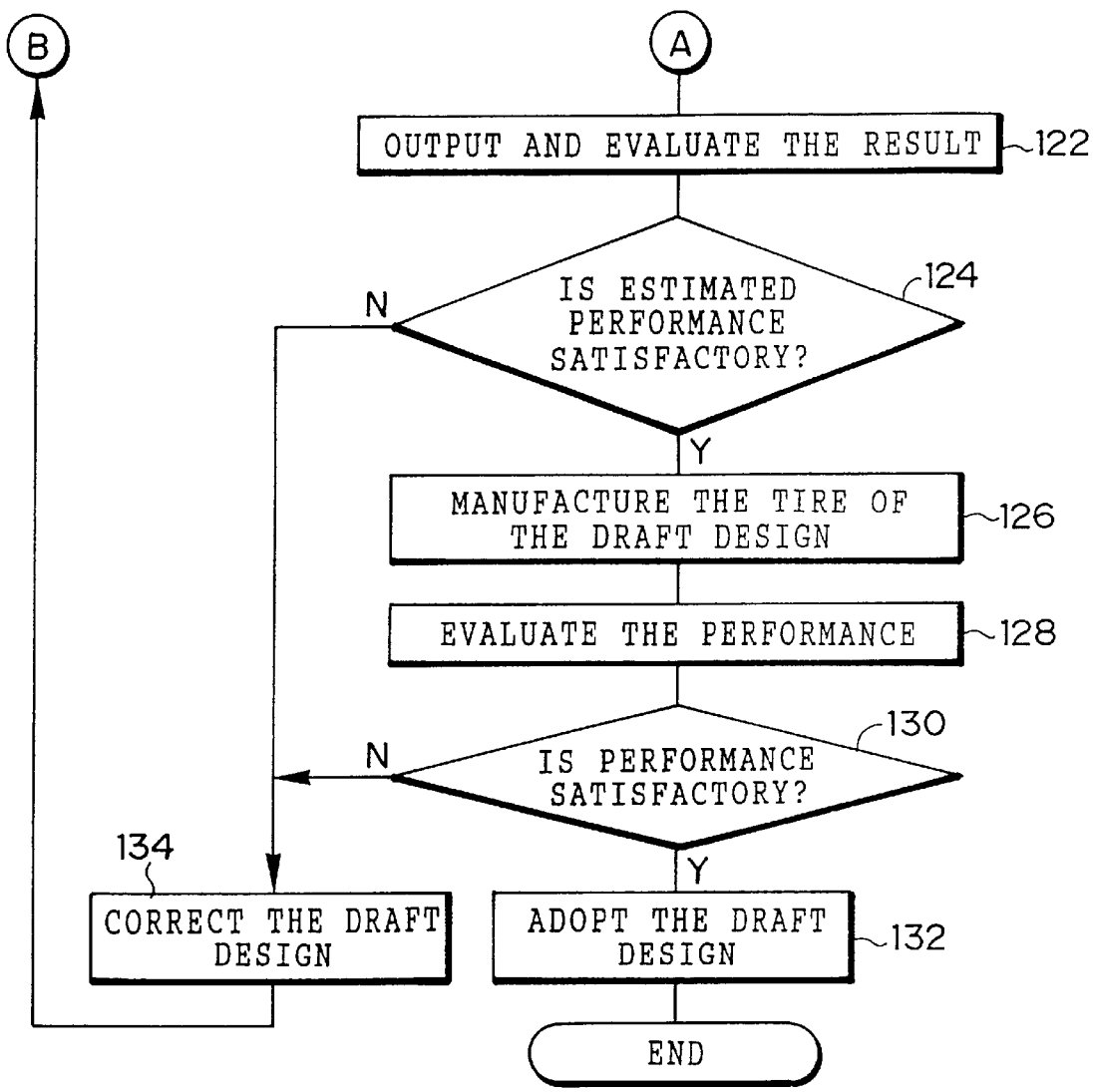

FIG. 2 shows a processing routine of a performance estimation evaluation program in accordance with this embodiment. In Step 100, a draft design of the tire to be evaluated (such as the change of the shape, structure, materials, and pattern of the tire) is set. In an ensuing Step 102, a tire model is constructed to incorporate the draft design of the tire into a model in numerical analysis. This construction of the tire model slightly differs depending on the numerical analysis method used. In this embodiment, it is assumed that the finite element method (FEM) is used as the numerical analysis method. Accordingly, the tire model which is constructed in the aforementioned Step 102 refers to one in which a subject region is divided up into a plurality of elements by a division into elements corresponding to the finite element method (FEM), e.g., by meshing, and the tire is numerically represented in a data format for input into a computer program prepared according to a numerical and analytical technique. This division into elements refers to dividing up an object such as the tire, fluid, road surface, and the like into a number of (a finite number of) small subregions. Calculations are performed for the respective subregions, and after completion of the calculation for all the subregions, all the subregions are summed up, thereby making it possible to obtain a response for the whole. Incidentally, the difference method or the finite volume method may be employed as the numerical analysis method.

Figure 3:
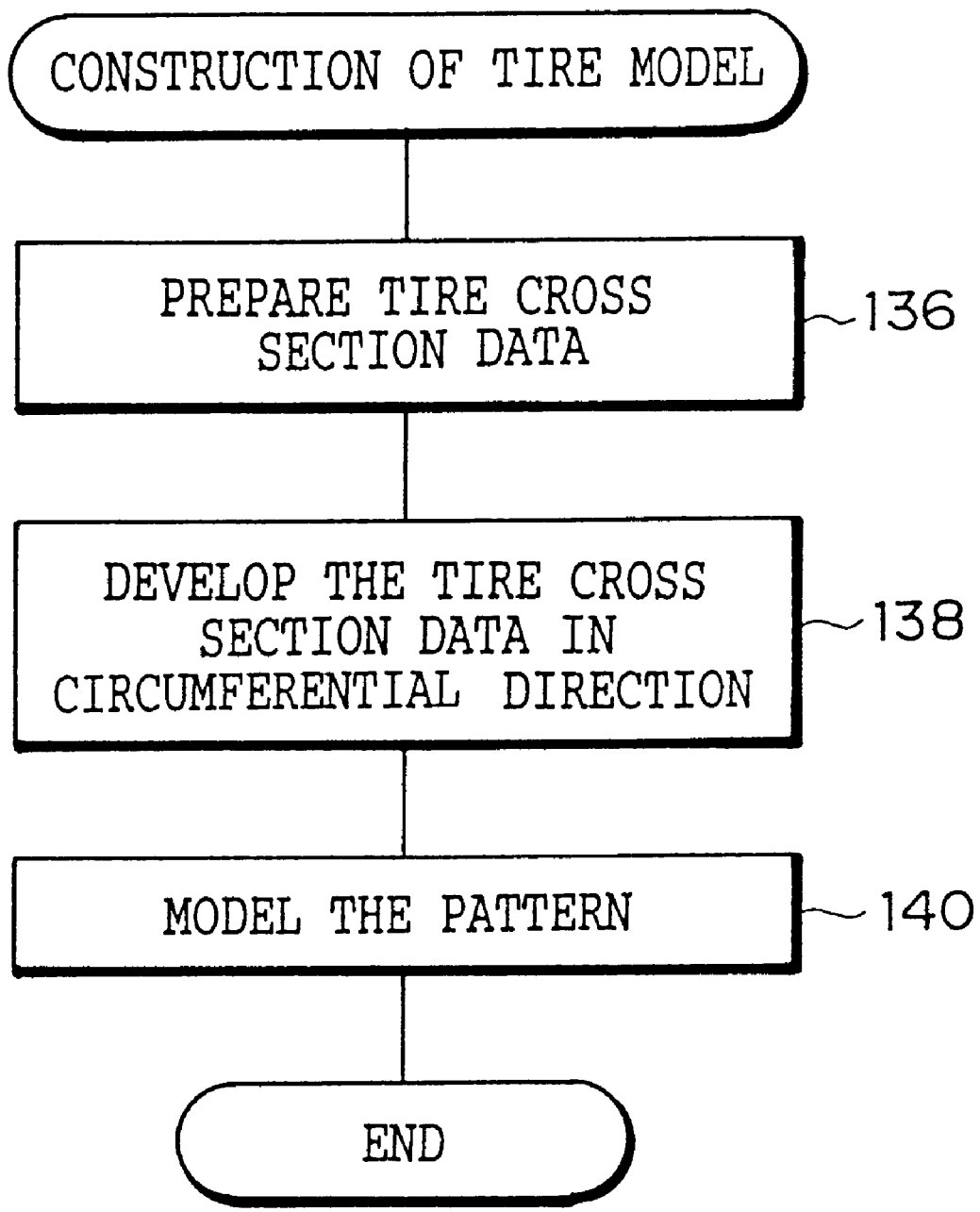
FIG. 3 is a flowchart illustrating the flow of tire-model construction processing.
Figure 6:
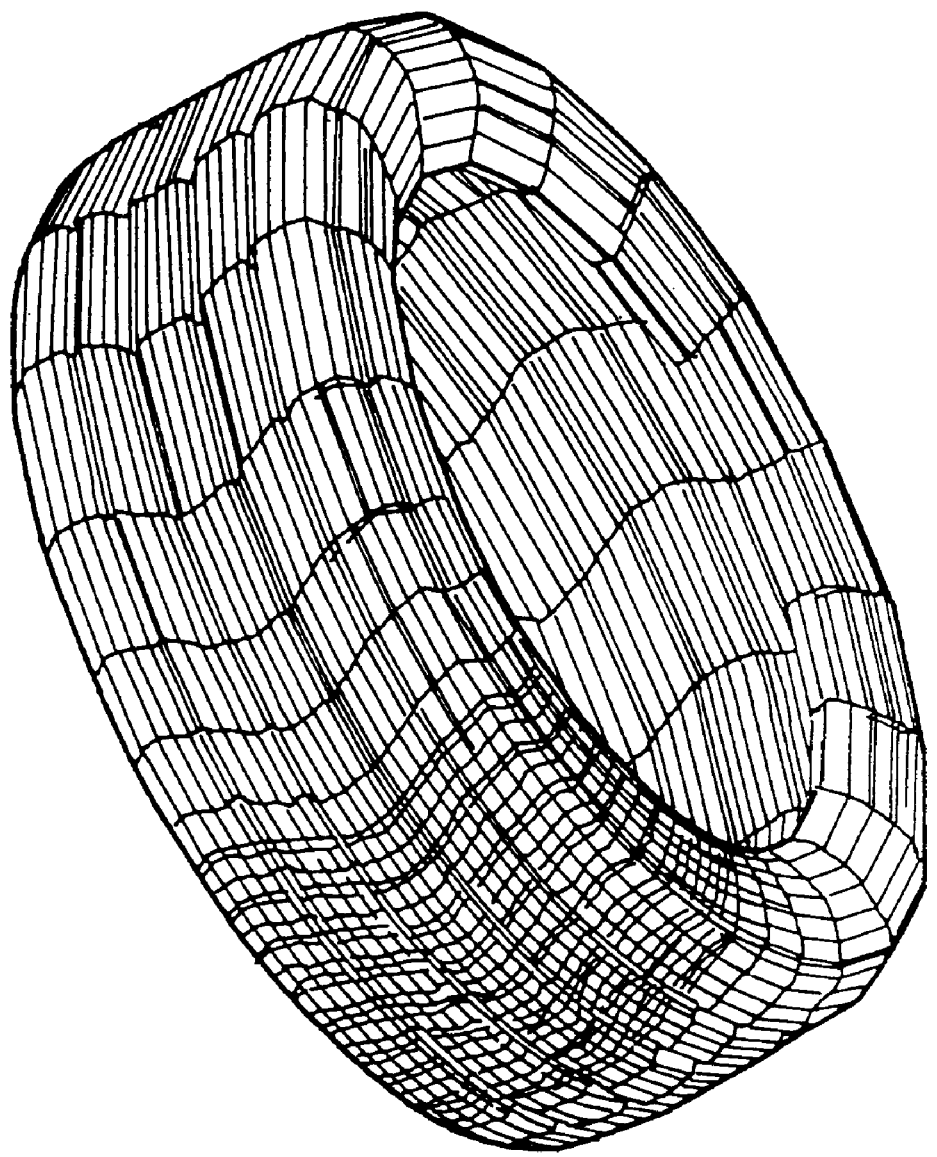
FIG. 6 is a perspective view illustrating an image of a modeled pattern.
Figure 7A:
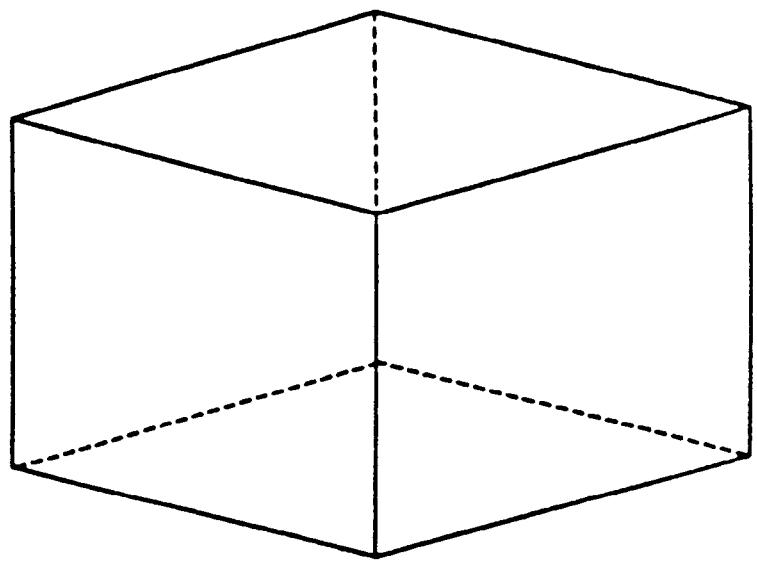
FIG. 7A is an image diagram of an element at the time of modeling and explains the handling of a rubber portion.
Figure 7B:
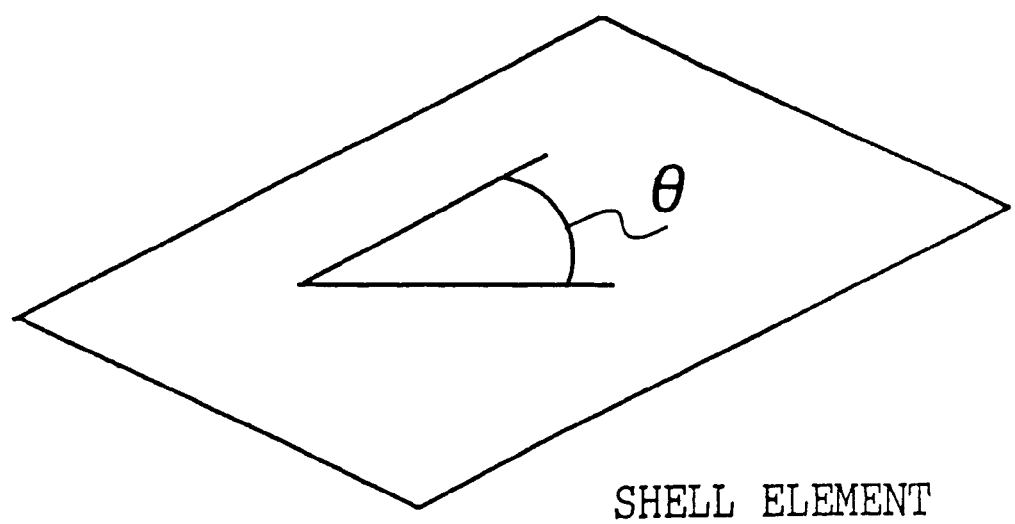
FIG. 7B is an image diagram of an element at the time of modeling and explains the handling of a reinforcing member.

In the construction of the tire model in the aforementioned Step 102, after the model of the cross section of the tire is prepared, a pattern is formed into a model. Specifically, a tire-model construction routine shown in FIG. 3 is executed. First, a model of a radial cross section of the tire is constructed in Step 136. Namely, tire cross section data is prepared. In this tire cross section data, the external shape of the tire is measured by a laser shape measuring instrument or the like, and values are collected. In addition, as for the internal structure of the tire, accurate values are collected from the design drawings and cross-sectional data of an actual tire and the like. The rubber and reinforcing members (those in which reinforcing cords formed of such as iron and organic fibers are bundled in sheets such as belts and plies) in the cross section of the tire are respectively modeled in accordance with a modeling technique of the finite element method. A model of the radial cross section of the tire thus modeled is shown in FIG. 4. In an ensuing Step 138, tire cross section data (a model of the radial cross section of the tire) which is two-dimensional date, is developed by a one-circumference portion in the circumferential direction so as to construct a three-dimensional (3D) model of the tire. In this case, it is preferable to model the rubber portion by 8-node solid elements and to model the reinforcing members by anisotropic shell elements capable of representing angles. For example, as shown in FIG. 7A, the rubber portion can be handled by 8-node solid elements and, as shown in FIG. 7B, the reinforcing members (belts, plies) can be handled by shell elements, making it possible to take into consideration the angle θ of the reinforcing member two-dimensionally. A 3D model in which the tire is thus modeled three-dimensionally is shown in FIG. 5. In an ensuing Step 140, the pattern is modeled. This modeling of the pattern is effected by either one of the procedures (1) and (2) below. A tire model obtained by modeling the pattern in accordance with the procedure (1) or (2) is shown in FIG. 6.

Procedure (1): A portion or the whole of the pattern is modeled separately, and is pasted on the aforementioned tire model as a tread portion.

Procedure (2): The pattern is prepared by taking rib and lug portions into consideration when developing the tire cross section data in the circumferential direction.

Figure 8:
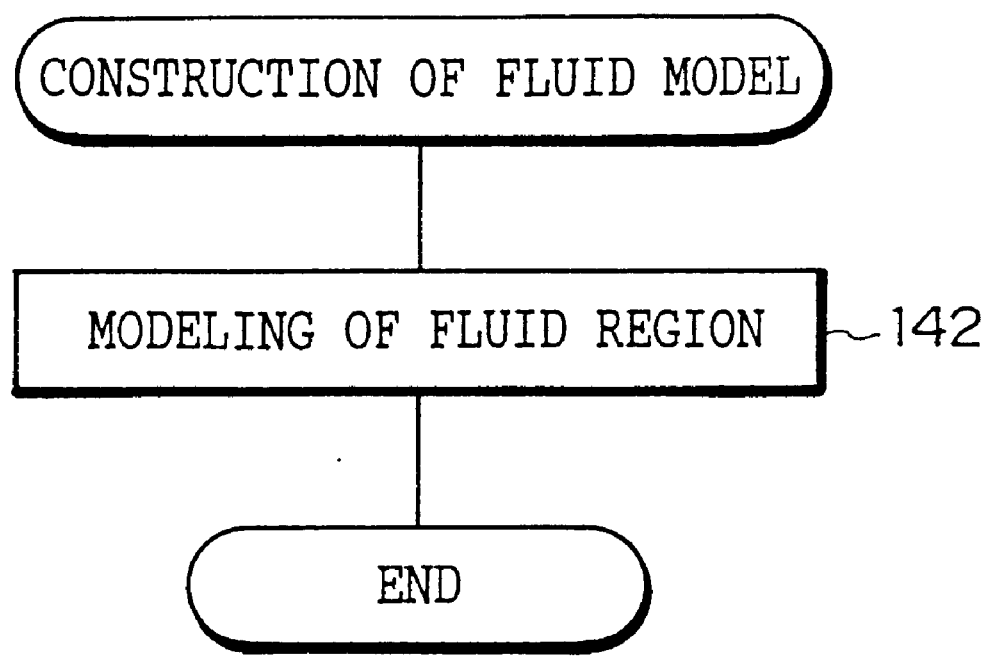
FIG. 8 is a flowchart illustrating the flow of fluid-model construction processing.

After constructing the tire model as described above, the operation proceeds to Step 104 in FIG. 2 to construct a fluid model. In this Step 104, the processing routine shown in FIG. 8 is executed. In Step 142 in FIG. 8, a fluid region including a part (or the whole) of the tire, the ground contact surface, and the region where the tire moves and deforms is divided and modeled. The fluid region should preferably be divided by rectangular parallelepipeds, and fluid elements which are these rectangular parallelepipeds for division should preferably be divided by an 8-node Eulean mesh. In addition, the tire model and the fluid model are defined in a partially overlapping manner. The pattern portion of the tire model has a complex surface geometry, and the fact that it is unnecessary to define the fluid mesh in conformity with the surface geometry makes it possible to substantially reduce the time and trouble required for modeling the fluid model, and is important in effecting the performance estimation efficiently.

It should be noted that since the fluid region used for the fluid model includes the region where the tire moves, in modeling in a state in which the tire model is not rolled (hereafter referred to as tire nonrolling), a region is modeled which is five times or more as long as the ground contact length in the advancing direction, three times or more as wide as the ground contact width in the widthwise direction, and, for instance, 30 mm or more in the depthwise direction. In modeling in a state in which the tire model is rolled (hereafter referred to as tire rolling), a fluid region is modeled which is, for instance, 2 m or more (a one-revolution portion of the tire or more) in the advancing direction. A fluid model thus modeled is shown in FIG. 9A and 9B.

When the construction of the fluid model is completed as described above, the operation proceeds to Step 106 in FIG. 2 to construct a road surface model and input the condition of the road surface. In this Step 106, the road surface is modeled, and an input is made to set the modeled road surface in the actual condition of the road surface. In the modeling of the road surface, the geometry of the road surface is modeled by being divided up into elements, and the road surface condition is inputted by selecting and setting the coefficient of friction $\mu$ of the road surface. Namely, since there are coefficients of friction $\mu$ of the road surface corresponding to the dry, wet, icy, snowy, unpaved, and other conditions depending on the road surface condition, an actual condition of the road surface can be reproduced by selecting an appropriate value for the coefficient of friction $\mu$. In addition, it suffices if the road surface model is in contact with at least one portion of the aforementioned fluid model, and may be disposed inside the fluid model.

After the road surface condition is thus inputted, boundary conditions are set in an ensuing Step 108. Namely, since a portion of the tire model is present in a portion of the fluid model, it is necessary to simulate the behavior of the tire and the fluid by imparting analytical boundary conditions to the fluid model and the tire model. This procedure differs between the case of tire rolling and the case of tire nonrolling. This selection between the case of tire rolling and the case of tire nonrolling may be inputted in advance, or may be selected at the outset of execution of this processing, or both cases may be executed, and one may be selected after determining both cases.

Figure 10:
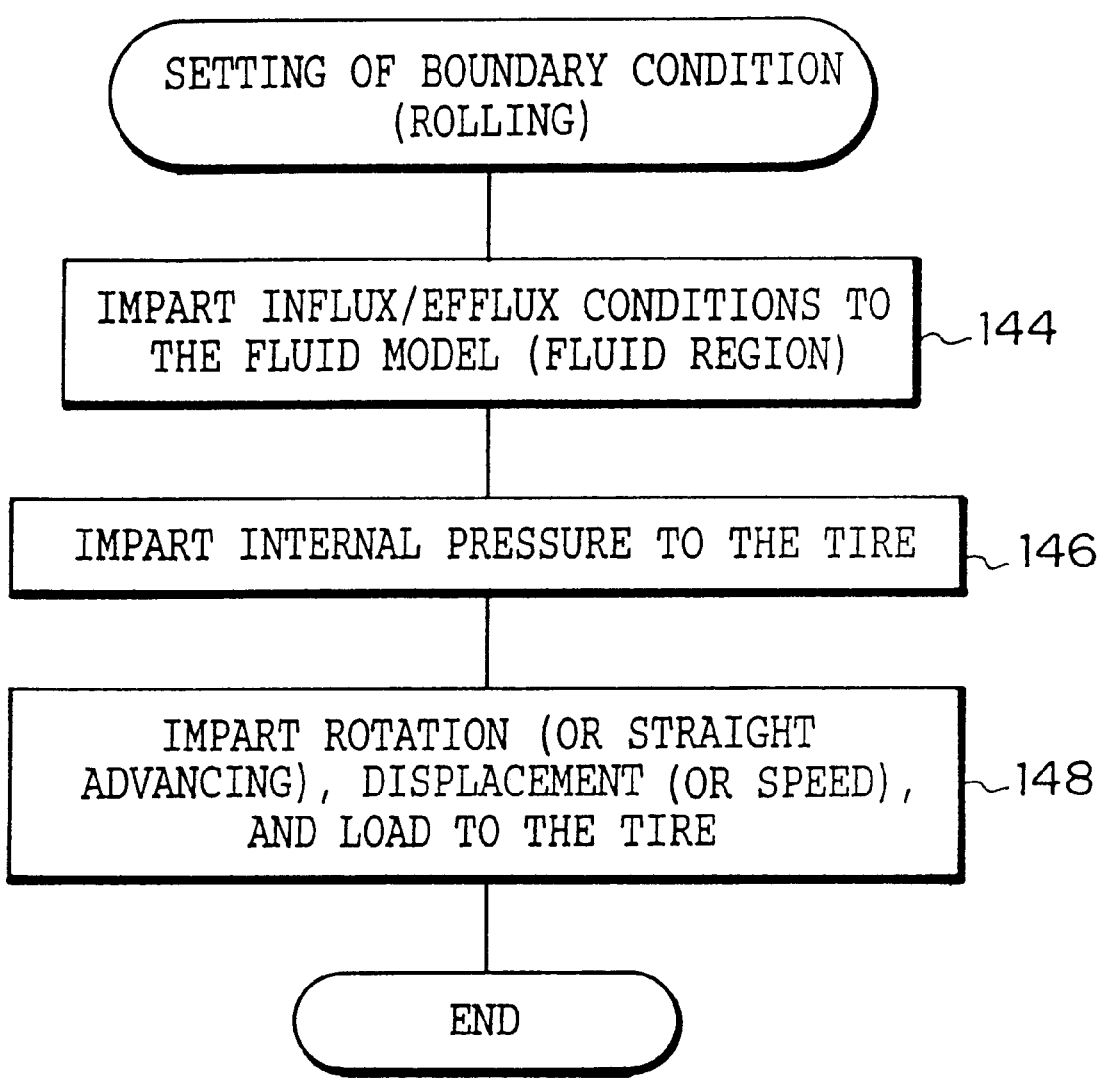
FIG. 10 is a flowchart illustrating the flow of boundary-condition setting processing during rolling.
Figure 12:
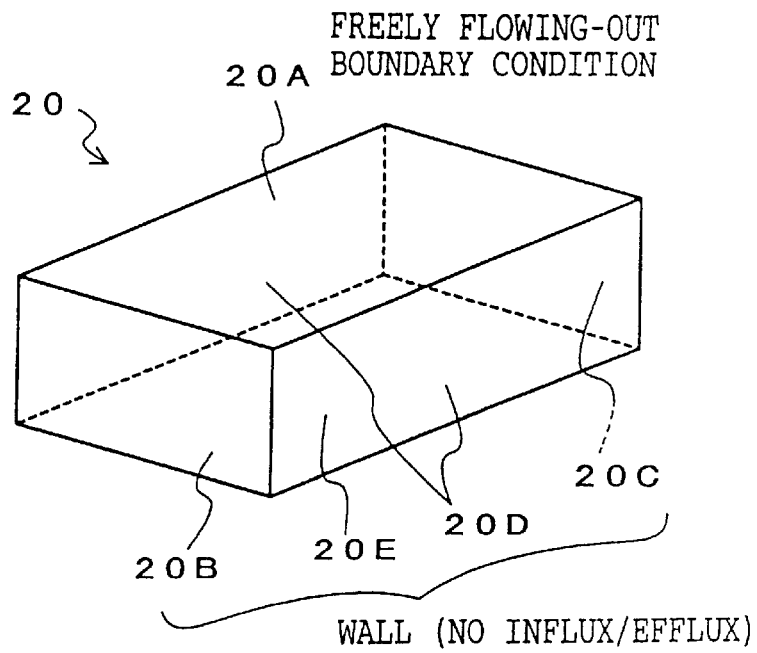
FIG. 12 is an explanatory diagram for explaining the setting of a boundary condition during rolling.

In the setting of boundary conditions in the case of tire rolling in Step 108, the processing routine shown in FIG. 10 is executed. First, the operation proceeds to Step 144 to impart boundary conditions concerning influx and efflux to a fluid model (fluid region) 20. As shown in FIG. 12, these boundary conditions concerning influx and efflux are handled under the assumption that the fluid flows out freely from a top surface 20A of the fluid model (fluid region) 20, and that the other surfaces including a front surface 20B, a rear surface 20C, side surfaces 20D, and a bottom surface 20E are walls (no influx nor efflux). In an ensuing Step 146, internal pressure is imparted to the tire model. In an ensuing Step 148, at least one of a rotational displacement and a straightly advancing displacement (the displacement may be force or velocity) as well as a predetermined load are imparted to the tire model. Incidentally, in a case where the friction with the road surface is taken into consideration, only either one of the rotational displacement (or may be force or velocity) and the straightly advancing displacement (or may be force or velocity) may be imparted.

Figure 11:
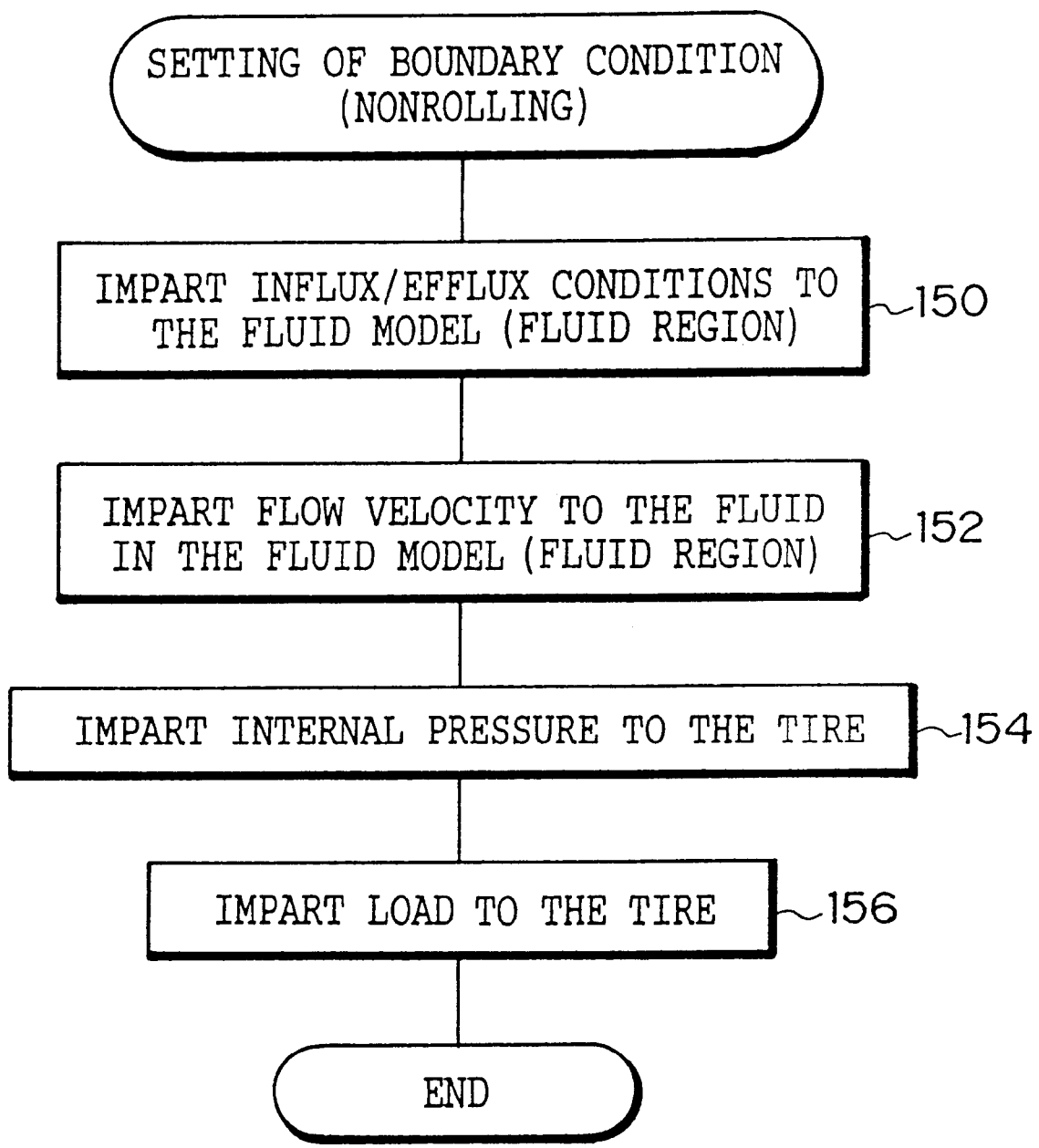
FIG. 11 is a flowchart illustrating the flow of boundary-condition setting processing during nonrolling.
Figure 13:
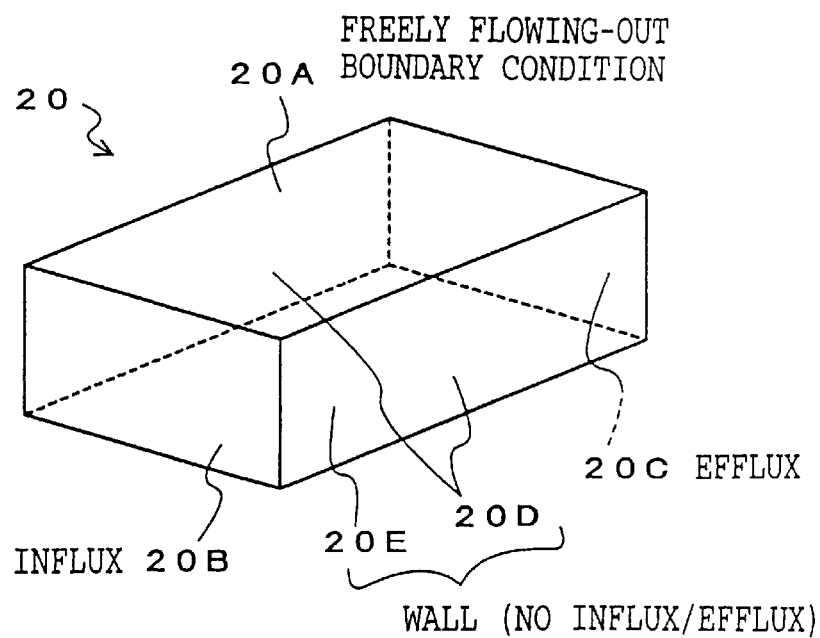
FIG. 13 is an explanatory diagram for explaining the setting of the boundary condition during nonrolling.

In addition, in the setting of boundary conditions in the case of tire nonrolling in Step 108, the processing routine shown in FIG. 11 is executed. First, in Step 150, boundary conditions concerning influx and efflux are imparted to the fluid model. Here, to perform the analysis in the steady state, the tire model is assumed to be stationary in the advancing direction, and a fluid model is considered in which the fluid flows toward the tire model at an advancing velocity. Namely, in Step 152, the flow velocity is imparted to the fluid in the fluid model (fluid region). As shown in FIG. 13, as for the boundary conditions concerning influx and efflux, it is assumed that the fluid flows in through the front surface of the fluid model (fluid region) 20 at the advancing velocity and flows out from the rear surface, and that the top surface, side surfaces, and lower surface are similar to those in the case of nonrolling. Then, in Step 154, internal pressure is imparted to the tire model and, in an ensuing Step 156, a predetermined load is imparted to the tire model.

Next, the calculation of deformation of the tire model as analysis A and the calculation of the fluid (flow calculation) as analysis B, which will be described below, are performed on the basis of the numerical models which have been constructed or set through steps including Step 108. To obtain a transient state, the calculation of deformation of the tire model and the calculation of the fluid of the fluid model are respectively performed independently within 1 msec, and boundary conditions between them are updated for each 1 msec.

Namely, when the setting of the boundary conditions is completed in the aforementioned Step 108, the operation proceeds to Step 110 to perform the calculation of the deformation of the tire model. In an ensuing Step 112, a determination is made as to whether or not the elapsed time is 1 msec or less. If YES is the answer in Step 112, the operation returns to Step 110 to perform the calculation of the deformation of the tire model again. If NO is the answer in Step 112, the operation proceeds to Step 114 to perform the calculation of the fluid. In an ensuing Step 116, a determination is made as to whether or not the elapsed time is 1 msec or less. If YES is the answer, the operation returns to Step 114 to perform the calculation of the fluid again. If NO is the answer in Step 116, the operation proceeds to Step 118.

(Analysis A) Calculation of Deformation of Tire Model

The calculation of deformation of the tire model is performed on the basis of the finite element method using the tire model and the given boundary conditions. To obtain a transient state, the calculation of deformation of the tire model is repeated while the elapsed time (independent elapsed time) is 1 msec or less, and after the lapse of 1 msec the operation proceeds to the ensuing calculation (fluid).

(Analysis B) Calculation of Fluid

The calculation of the fluid is performed on the basis of the finite element method using the fluid model and the given boundary conditions. To obtain a transient state, the calculation of the fluid is repeated while the elapsed time (independent elapsed time) is 1 msec or less, and after the lapse of 1 msec the operation proceeds to the ensuing calculation (deformation of the tire model).

It should be noted that the calculation may be first started with either analysis A or analysis B, or the calculations may be effected in parallel. Namely, Steps 110 and 112 on the one hand, and Steps 114 and 116 on the other hand, may be shifted in order.

In addition, although in the aforementioned calculations (analysis A and analysis B) a description has been given of the case in which the calculation is repeatedly performed during a preferred elapsed time, i.e., the elapsed time (independent elapsed time) of 1 msec or less, the elapsed time in the present invention is not limited to 1 msec, and it is possible to adopt an elapsed time of 10 msec or less. The preferred elapsed time is 1 msec or less, and more preferably it is possible to adopt an elapsed time of $1\mu$·sec or less. Further, as this elapsed time, different time durations may be set for analysis A and analysis B.

In an ensuing Step 118, after independent calculations are respectively performed for 1 msec each with respect to the calculation of deformation of the tire model and the calculation of the fluid, in order to establish a linkage between them, the boundary surface of the fluid model is recognized in correspondence with the deformation of the tire model, and the boundary conditions are updated (details of which will be described later). In this Step 118, after the updating of the boundary conditions, the pressure calculated in the calculation of the fluid is applied to the tire model as a boundary condition (surface force) of the tire model, so that the deformation of the tire model will be calculated in an ensuing calculation of deformation of the tire model (analysis A). Namely, on the fluid side, the surface geometry of the tire model after deformation is incorporated into the boundary conditions as a new wall, while, on the tire model side, the pressure of the fluid is incorporated into the boundary conditions as the surface force applied to the tire model. By repeating this step for every 1 msec, it is possible to artificially create transient flow concerning the estimation of tire performance. Here, 1 msec is the time within which it is possible to sufficiently represent the process in which the pattern within the ground contact plane undergoes deformation due to the tire rolling.

It should be noted that although in the above description the repeated time (independent elapsed time) for incorporation into the boundary conditions is set to 1 msec or less, the present invention is not limited to 1 msec, and it is possible to adopt a time duration of 10 msec or less. The preferred elapsed time is 1 msec or less, and more preferably it is possible to adopt a time duration of $1\mu$·sec or less.

In an ensuing Step 120, a determination is made as to whether or not the calculations have been completed. If YES is the answer in Step 120, the operation proceeds to Step 122, while if NO is the answer in Step 120, the operation returns to Step 110 to perform the independent calculations of deformation of the tire model and of the fluid again for 1 msec each. Incidentally, it is possible to cite the following examples as specific methods of determination.

(1) In a case where the tire model is a nonrolled model or a rolled model with a full-circumference pattern, the calculation is repeated until the object physical quantities (fluid reaction force, pressure, flow velocity, etc.) can be regarded as being in steady states (states in which the physical quantities can be regarded as being the same as those calculated before). When the calculation is completed, YES is given as the answer in the determination. Alternatively, the calculation is repeated until the deformation of the tire model can be regarded as being in the steady state. Further, the calculation may be finished when a predetermined time has elapsed. The predetermined time in this case is preferably 100 msec or more, more preferably 300 msec or more.

(2) In a case where the tire model is a rolled model or a model in which only a portion of the pattern is modeled, the calculation is repeated until the deformation of the pattern portion which is subject to analysis is finished, and when the calculation is completed, YES is given as the answer in the determination. The deformation of the pattern portion means refers to the deformation persisting from the time the pattern portion is brought into contact with the road surface model due to rolling until it moves away from the road surface model, or from the time the pattern portion is brought into contact with the fluid model due to rolling until it comes into contact with the road surface model. This deformation of the pattern portion may be from the time the tire portion is brought into contact with each of the models after the tire has rolled by one revolution or more. Further, the calculation may be finished when a predetermined time has elapsed. The predetermined time in this case is preferably 100 msec or more, more preferably 300 msec or more.

Figure 14:
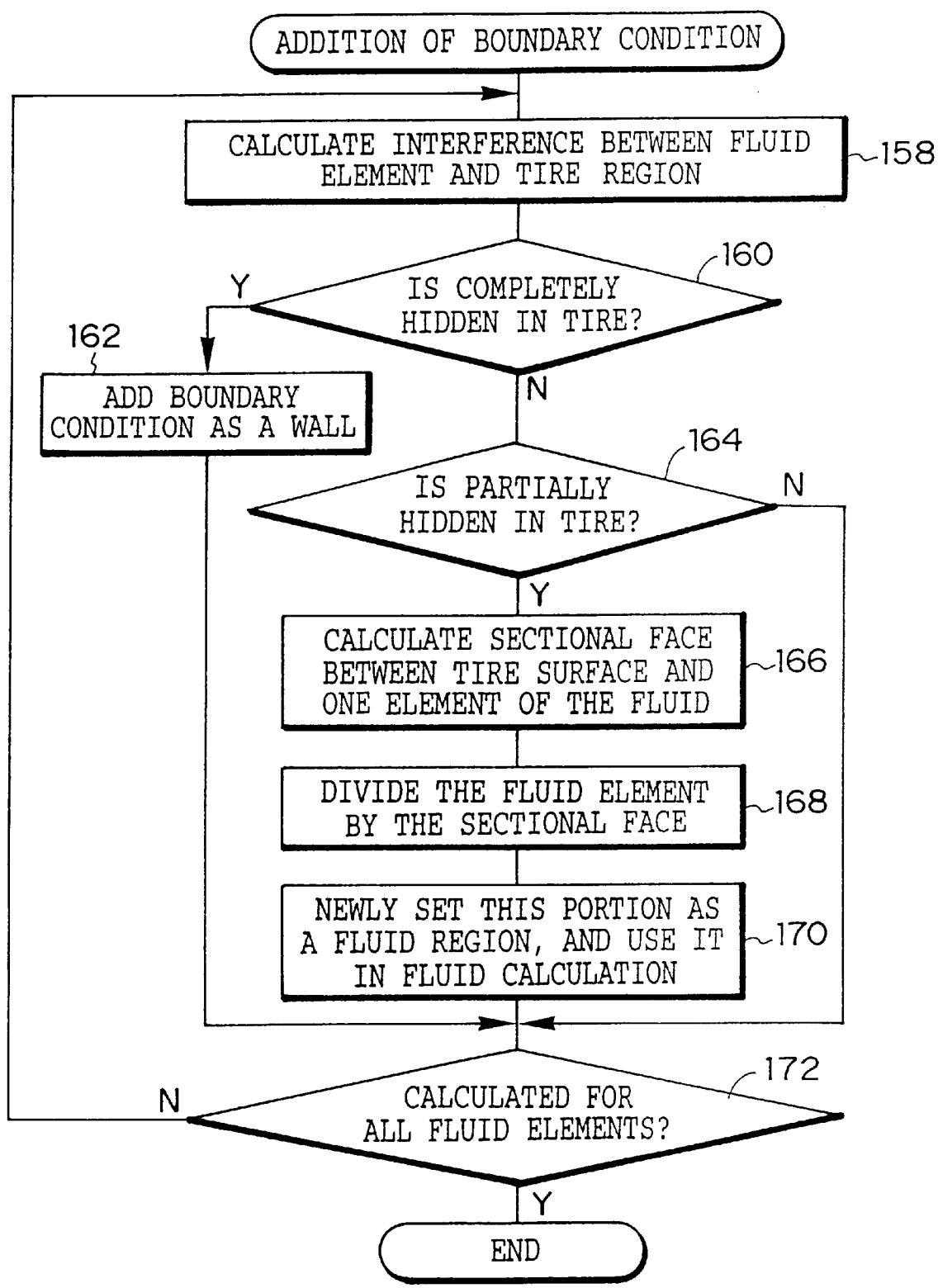
FIG. 14 is a flowchart illustrating the flow of boundary-condition addition processing.
Figure 15:
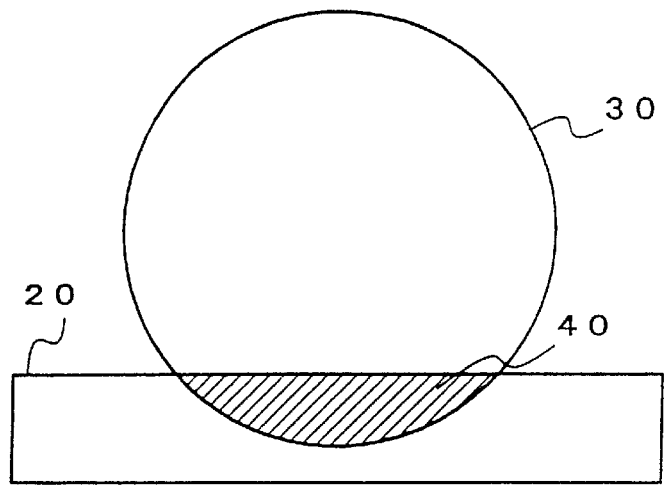
FIG. 15 is a diagram illustrating an interference region between the tire model and the fluid model.

Here, a detailed description will be given of Step 118. In the processing in which the boundary surface of the fluid is recognized in correspondence with the deformation of the tire model, and the boundary conditions are added, the processing routine shown in FIG. 14 is executed. First, in Step 158, to determine which portion of the fluid model (fluid region) 20 is hidden in a tire model 30, an interfering portion 40 between the fluid model 20 and the tire model 30 is calculated. This calculation is performed with respect to all the elements (fluid elements) obtained by dividing up the fluid model 20, i.e., the fluid region, into subregions (see FIG. 15).

In an ensuing Step 160, a determination is made as to whether or not the fluid element is completely hidden in the tire model. If the fluid element is completely hidden in the tire model, YES is given as the answer in the determination in Step 160, and the operation proceeds to Step 162 in which since this element is inside the tire model and the influx and efflux of the fluid does not take place, a boundary condition is added thereto as a wall.

Figure 16A:
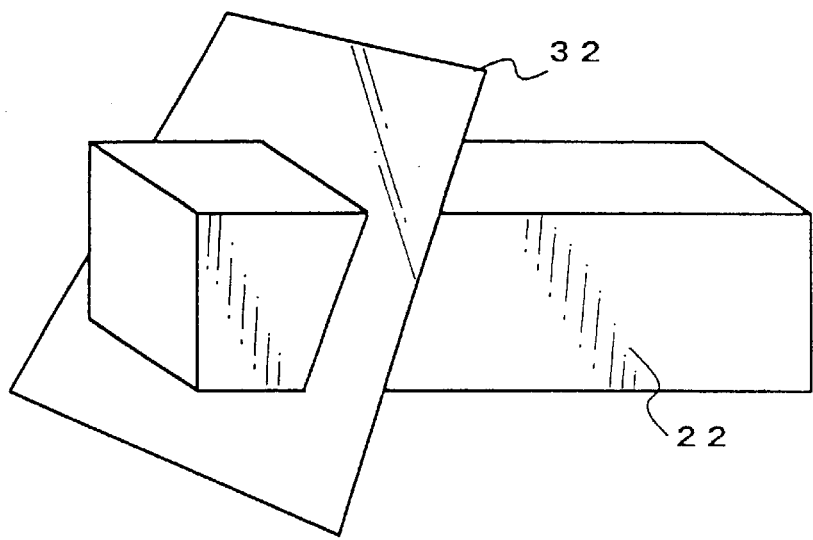
FIG. 16A is an explanatory diagram for explaining a fluid element before its division.
Figure 16B:
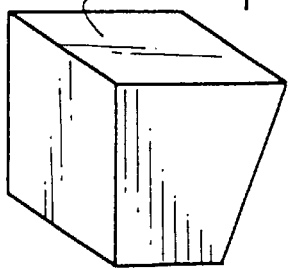
FIG. 16B illustrates the fluid side of the fluid element after division.

On the other hand, if NO is the answer in Step 160, the operation proceeds to step 164 to determine whether or not a portion of the fluid element is hidden in the tire model. If a portion of the fluid element is hidden in the tire model, YES is given as the answer in the determination in Step 164, and in an ensuing Step 166 a sectional face, i.e., a plane which bisects the fluid element by a surface 32 of the tire model 30, is calculated (see FIGS. 16A and 16B). In an ensuing Step 168, a fluid element 22 is further divided by this sectional face. In an ensuing Step 170, a region 22a which is not hidden in the tire model among the divided fluid elements is defined newly as a fluid model (fluid region), and this portion is used in the calculation of the fluid. In addition, the plane which corresponds to the sectional face of the new fluid element is in contact with the tire model, a boundary condition as a wall is added thereto.

It should be noted that the division of the divided fluid elements into further smaller portions leads to an increase in the calculation time and is therefore not desirable. Hence, it is preferable to set a limit to the division of the fluid elements (in this case, a limit that a once-divided element is not subdivided).

In an ensuing Step 172, a determination is made as to whether or not the above-described processing has been carried out for all the fluid elements. If an unprocessed fluid element remains, NO is given as the answer in Step 172, and the operation returns to Step 158. On the other hand, if the above-described processing has been completed for all the fluid elements, this routine ends. In consequence, it is possible to incorporate the surface geometry of the tire model into the calculation of the fluid as boundary conditions.

Thus the technique whereby the tire model and the fluid model can be defined in a partially overlapping manner is able to substantially reduce the time and trouble required in the construction of a computed model. Furthermore, by bisecting the fluid element which is partially hidden in the tire model, it is possible to obtain a large initial fluid mesh, with the result that it is possible to prevent an increase in the calculation time due to an increase in the number of fluid elements, thereby making it possible to perform the performance estimation efficiently.

After thus performing analysis A, analysis B, and the change in the boundary conditions for their linkage, the operation returns to analysis A, and the calculation is performed under the changed boundary conditions. This step is repeated until the calculation is completed, and when the calculation is completed, YES is given as the answer in Step 120, and the operation proceeds to Step 122 to output the results of calculation as the results of estimation and evaluate the results of estimation.

Although a description has been given above of the case in which analysis A, analysis B, and the change in the boundary conditions are repeated, and when the calculation is completed, the results of calculation are outputted and the results of estimation are evaluated, while the repeated calculation is being made, the results of calculation at that point of time may be outputted, and its output may be evaluated, or its outputs may be evaluated consecutively. In other words, outputs and evaluations may be made during the calculation.

As the output of the results of estimation, it is possible to adopt values or distributions of the flow force, the flow velocity, the volume of flow, pressure, energy, and the like. Specific examples of the output of the results of estimation include the output of fluid reaction force, the output and visualization of the fluid flow, and the output and visualization of the distribution of water pressure. The fluid reaction force is the force with which the fluid (e.g., water) pushes the tire upward. The fluid flow can be calculated from the velocity vector of the fluid, and if its flow, the tire model and its vicinities, and the pattern and its vicinities are altogether represented in a diagram or the like, the fluid flow can be visualized. As for the visualization of the distribution of water pressure of the fluid, it suffices if the tire model and its vicinities and the pattern and its vicinities are plotted in a diagram, and values of water pressure are represented on the diagram in corresponding colors and patterns.

In addition, as the evaluation, it is possible to adopt, among others, a subjective evaluation (determination as to whether the fluid is flowing smoothly on the whole, the presence of disturbance in the direction of flow, etc.), as well as such criteria as whether pressure and energy have not increased locally, whether a necessary volume of flow has been obtained, whether hydrodynamic force has not increased, whether the flow has not stagnated, and so on. Further, in the case of the pattern, it is possible to adopt whether the fluid is flowing along the grooves. In addition, in the case of the tire model, it is possible to adopt whether the amount of forward spray is large in which case, as the tire rotates, the tire at its ground contact surface and in its vicinity nips the fluid such as water and pushes it forward, and whether the fluid is flowing laterally on the road surface.

It should be noted that, as for the evaluation of the results of estimation, an evaluation value can be determined by numerically expressing to what extent the output values and the distribution of the output values agree with predetermined allowable values and allowable characteristics by using the distribution of the output values and the output values of the results of estimation.

Next, in Step 124, from the above-described evaluation of the results of estimation, a determination is made as to whether or not the estimated performance is satisfactory. This determination in Step 124 may be made by entry from a keyboard, or after setting an allowable range in advance with respect to the aforementioned evaluation value, a determination may be made that the estimated performance is satisfactory if the value of evaluation of the results of estimation falls within the allowable range.

If the estimated performance is unsatisfactory relative to the targeted performance as a result of the evaluation of the estimated performance, NO is given as the answer in Step 124 and, in an ensuing Step 134, the draft design is changed (modified), and the operation returns to Step 102 to carry out the foregoing processing over again. On the other hand, if the performance is satisfactory, YES is given as the answer in Step 124. In an ensuing Step 126, the tire of the draft design set in Step 100 is made and, in an ensuing Step 128, performance evaluation is made with respect to the made tire. If the result of the performance evaluation in Step 128 is a satisfactory performance (satisfactory performance), YES is given as the answer in Step 130 and, in an ensuing Step 132, the draft design set in Step 100 or corrected in Step 134 is adopted as one having satisfactory performance, and this routine ends. In adopting the draft design in Step 132, the fact that the draft design has satisfactory performance is outputted (displayed or printed out), and the data on the draft design is stored.

Although, in the above-described embodiment, a description has been given of the case in which the estimation of the tire performance and evaluation thereof are repeated with respect to one draft design while correcting the draft design so as to obtain a draft design to be adopted, the present invention is not limited to the same, and the draft design to be adopted may be obtained from among a plurality of draft designs. For example, the estimation of the tire performance and evaluation thereof may be made with respect to a plurality of draft designs, respectively, and the best draft design may be selected from among the respective results of evaluation. In addition, by carrying out the above-described embodiment with respect to the selected best draft design, it is possible to obtain an even better draft design.

[Second Embodiment]

Next, a description will be given of a second embodiment. It should be noted that since the arrangement of this embodiment is substantially similar to that of the above-described embodiment, identical portions will be denoted by the same reference numerals, and a detailed description thereof will be omitted. In addition, water is adopted as the fluid in this embodiment.

If analysis is performed by providing the tire model with a pattern around its entire circumference, the amount of computation becomes enormously large, so that the results cannot be obtained easily. Accordingly, in this embodiment, the tire performance is estimated by providing only a portion of the tire model with the pattern in order to easily obtain the results of estimation of tire performance while taking the drainage performance of the tire into consideration.

In estimating the tire performance, the present inventors took note of the water displacement of the pattern at its leading edge. The leading edge refers to the area where the tire approaches or contacts the road surface when the tire rolls.

Figure 27:
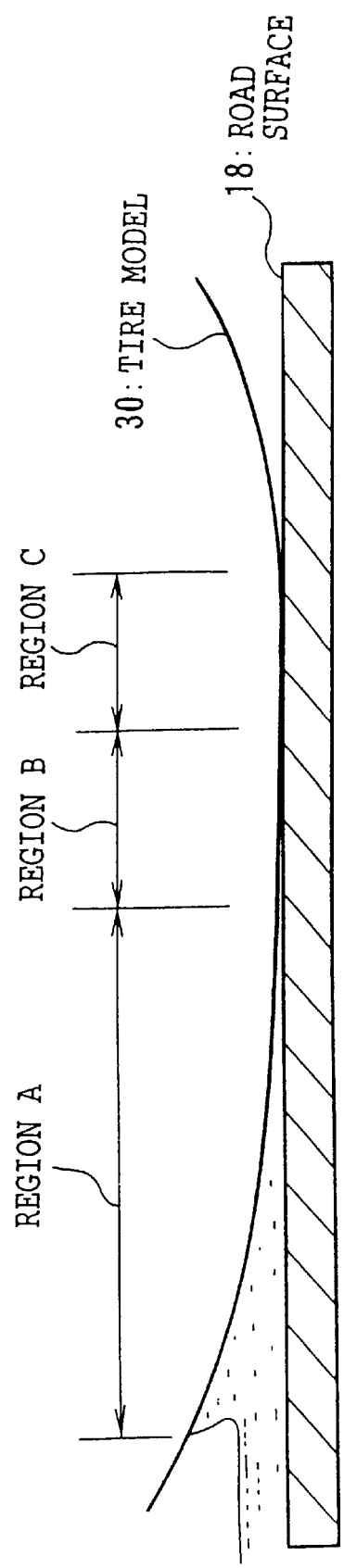
FIG. 27 is an explanatory diagram for explaining a surrounding portion of the tire model in the vicinity of the ground contact surface.

As shown in FIG. 27, concerning the drainage performance, particularly hydroplaning, of the tire, the peripheral portion of the tire can be classified into the following three regions including regions A to C in the vicinity of the ground contact surface:

Region A: located on a thick water film (principally characterized by the inertia effect of water and dynamic water pressure; dynamic hydroplaning)

Region B: located on a thin water film (principally characterized by the viscous effect; viscous hydroplaning)

Region C: completely dry ground-contacting

It should be noted that in a case where the water depth is large (10 mm or thereabouts), or in a case where the road surface has irregularities and the viscous effect is negligible, dynamic hydroplaning in region A is important.

As causes of the occurrence of the aforementioned dynamic hydroplaning (region A), the following two causes are conceivable:

1: The tire and the fluid (water in this embodiment) impinge upon each other at a high velocity, and dynamic water pressure which is proportional to the square of the velocity acts.

2: When the dynamic water pressure at the treading-into portion exceeds the ground contact pressure, the tire is lifted up. Incidentally, if the water at the treading-into portion is displaced by the pattern, dynamic water pressure declines, making it possible to suppress hydroplaning.

Figure 28A:
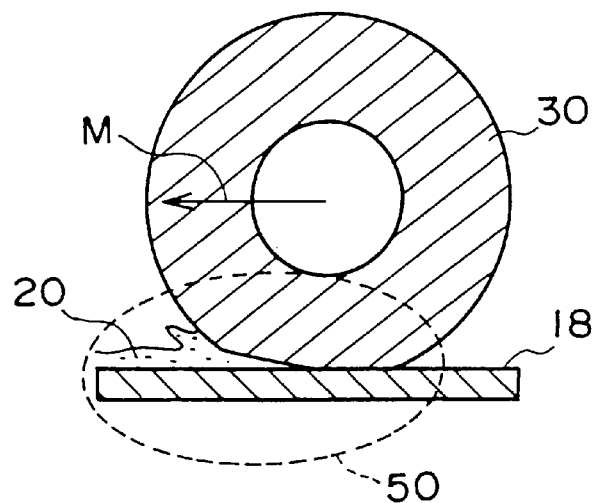
FIG. 28A is an explanatory diagram for explaining the relationship of pressure in the vicinity of the ground contact surface, and is a diagram illustrating the positional relationship among the road surface, the tire model, and the fluid.
Figure 28B:
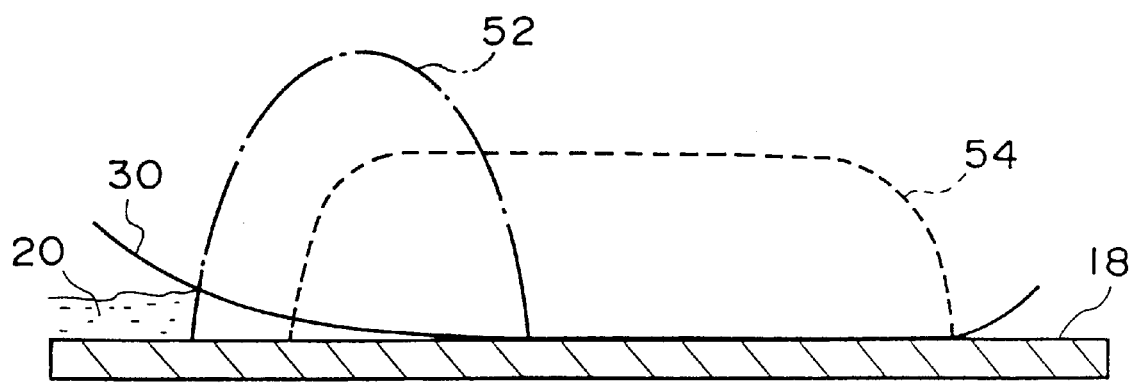
FIG. 28B is an explanatory diagram for explaining the relationship of pressure in the vicinity of the ground contact surface, and is a diagram illustrating the relationship of pressure corresponding to the position.

As shown in FIG. 28A, in a case where the tire (tire model 30) rolls on a road surface 18 in the rolling direction (in the direction of arrow M in FIG. 28A), in a leading edge vicinity 50 the fluid 20 mainly accumulates on the tire-rolling side between the tire model 30 and the road surface 18. If the pressure relationship in this case is considered, one shown in FIG. 28B is obtained. The tire model 30 and the fluid (water in this embodiment) impinge upon each other, and pressure 52 (indicated by the dashed line in FIG. 28B) which is proportional to the square of the velocity occurs there. In the area where the tire model 30 and the road surface 18 are in contact with each other, substantially constant pressure 54 (indicated by the dotted line in FIG. 28B) occurs. In this way, pressure in dynamic hydroplaning (region A) is dominant.

Accordingly, in this embodiment, in order to easily obtain the results of estimation of tire performance while taking the drainage performance of the tire into consideration, as the tire model 30, a smooth tire model having a flat entire periphery, is set as a basis, and analysis is performed by providing the smooth tire model with a partial pattern necessary for facilitating the analysis of the leading edge. Incidentally, in the description that follows, this analysis will be referred to as global-local (GL) analysis.

Next, a description will be given of GL analysis in this embodiment. In general, this GL analysis can be implemented by the following procedures 1 to 4.

<Procedures of GL Analysis>

Figure 29:
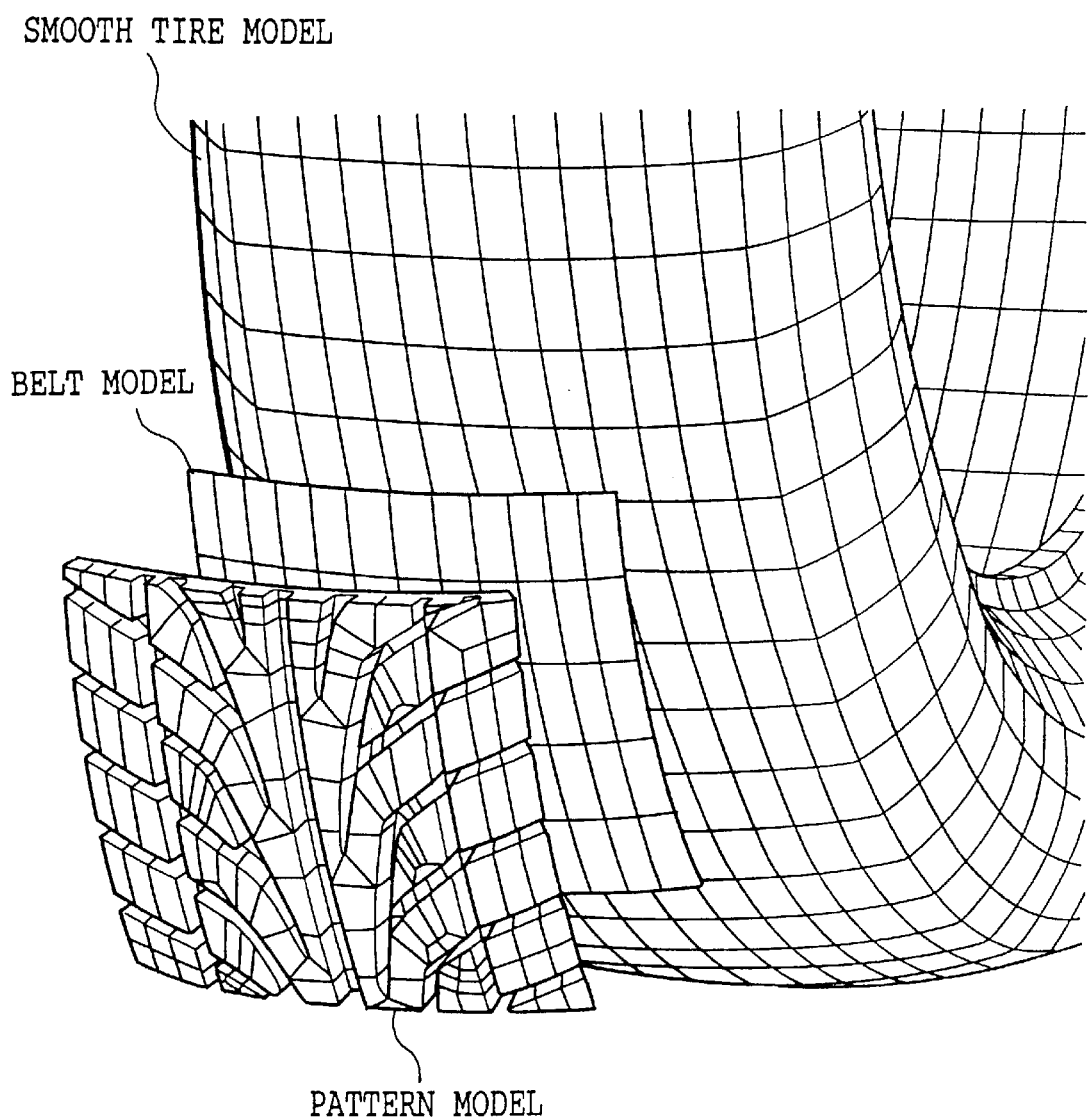
FIG. 29 is a perspective view illustrating a smooth tire model, a pattern model (one portion), and a portion of a belt model to be pasted on the pattern.

Procedure 1: A smooth tire model, a pattern model (one portion), and a portion of a belt model to be pasted on the pattern are prepared (see FIG. 29).

Figure 30:
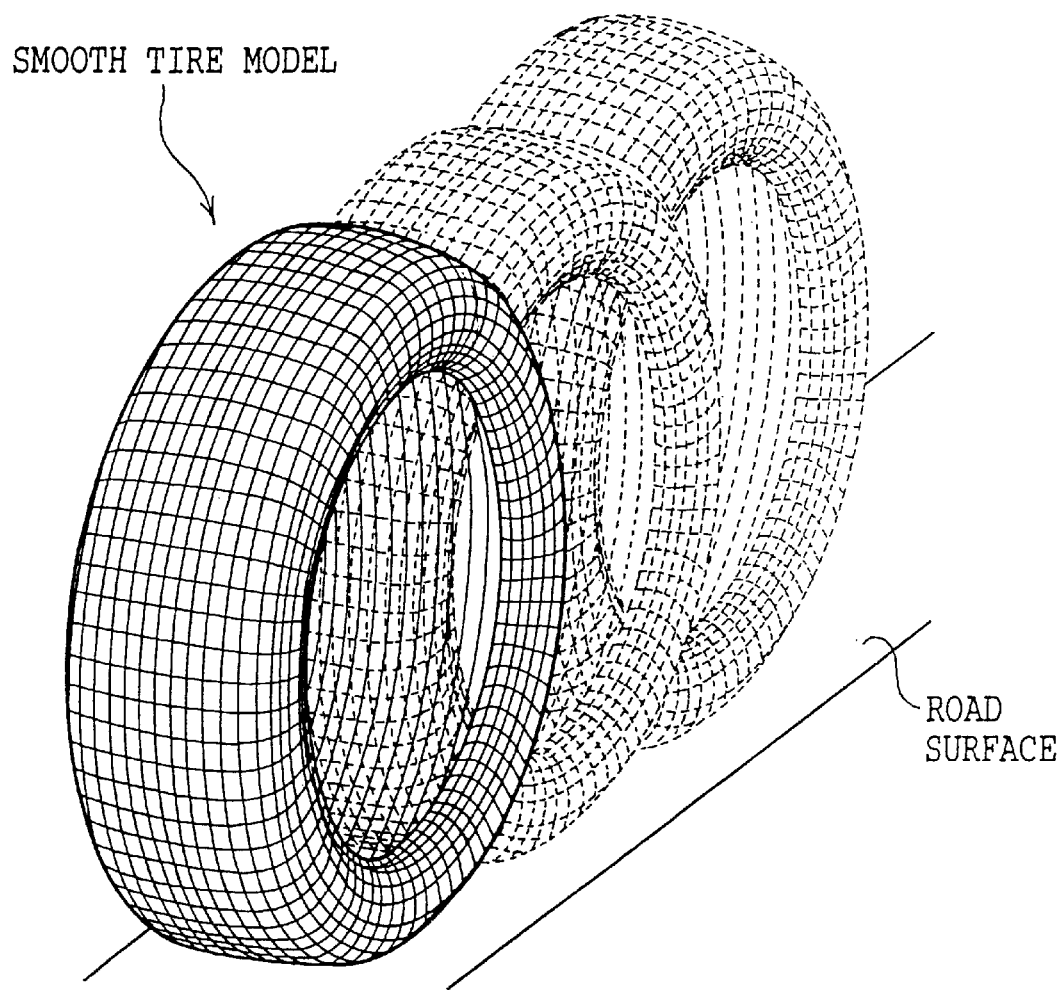
FIG. 30 is an image diagram illustrating the rolling of the smooth tire.

Procedure 2: Rolling of the smooth tire model and hydroplaning analysis (global analysis: G analysis; see FIG. 30)

Procedure 3: The locus of rolling of the belt model (the same as the portion of the pattern model) to be pasted on the pattern portion (one portion) is calculated by the results for the smooth tire model. Specifically, displacements of all the nodes of the belt model (shells) during rolling are outputted (the displacements may be converted to velocities and may be outputted; incidentally, if there are constraints in FEM software, and if the displacements can be obtained in the form of displacements, it is possible to do so), the pattern model (one portion) is pasted on the belt model, and forced velocities (which may be displacements) are imparted to the nodes of the belt model.

Procedure 4: Since only the pattern portion (one portion) can be rolled through the procedures up to procedure 3, a fluid mesh corresponding to the pattern portion is prepared, and analysis of the water displacing characteristic is made for the pattern portion alone.

(local anaysis: L analysis; see FIG. 30)

It should be noted that evaluations are performed in the analysis of the fluid reaction force, water pressure distribution, and flow.

The details are substantially similar to those of the above-described embodiment. First, a tire model and a fluid model are constructed, and then a road surface model is constructed, and the road surface condition is inputted by selecting the coefficient of friction $\mu$ (Steps 100 to 106 in FIG. 2). In this case, the tire model is a smooth tire model. In addition, a pattern model (one portion) and a portion of the belt model to be pasted on the pattern are constructed.

Next, the boundary conditions during the tire rolling or tire nonrolling are set (Step 108 in FIG. 2), and the deformation calculation and fluid calculation of the tire model and the like are carried out (Steps 110 to 120 in FIG. 2). This involves the rolling of the smooth tire model and hydroplaning analysis (global analysis: G analysis; see FIG. 30).

Figure 31:
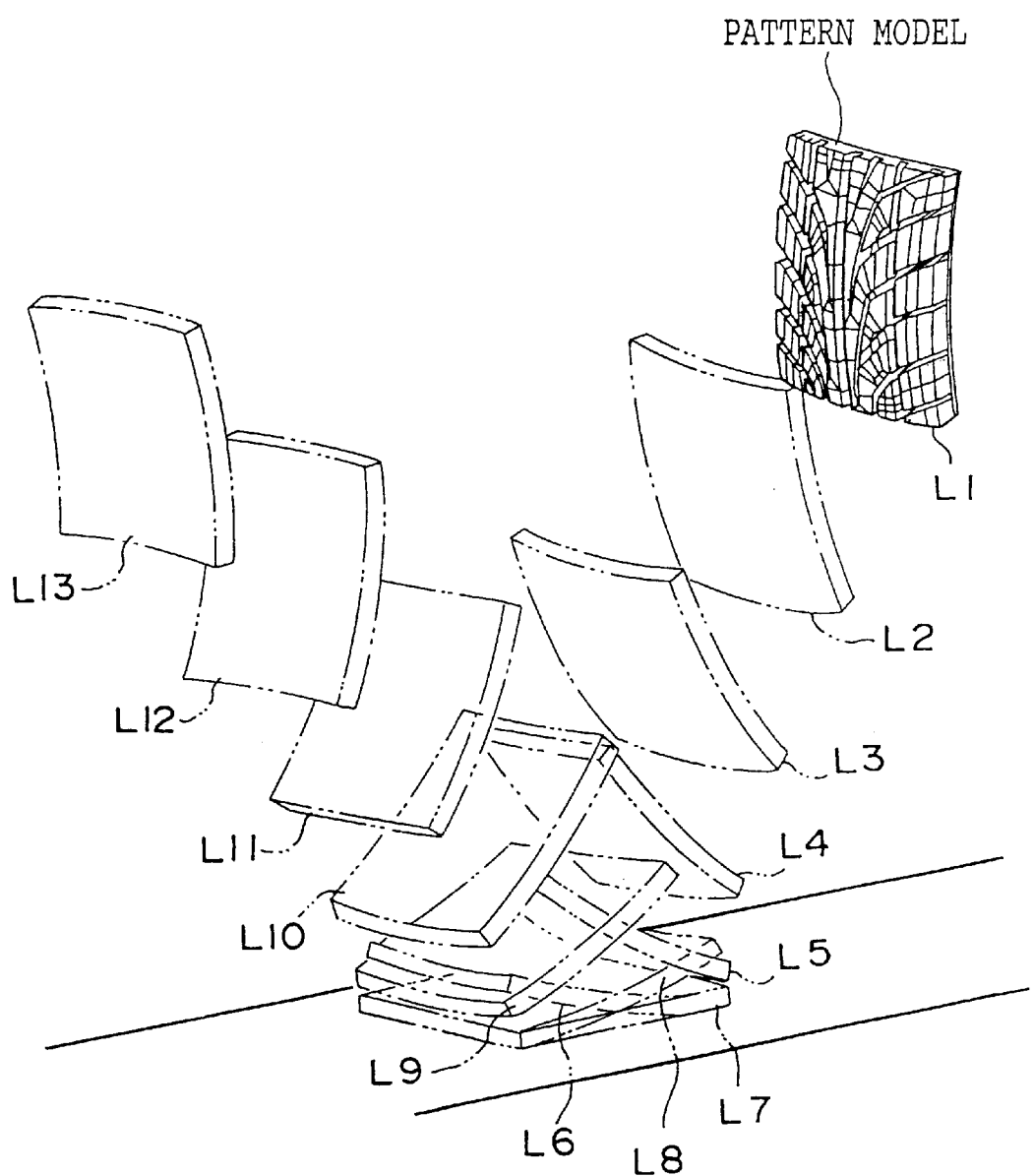
FIG. 31 an image diagram illustrating that a portion of the pattern model pasted on the smooth tire model shifts due to the rolling of the tire.

Then, from the results of the smooth tire model, the locus of rolling of the belt model (the same as one portion of the pattern model) to be pasted on the pattern portion (one portion) is calculated. Consequently, since only the pattern portion (one portion) is rolled (FIG. 31), a fluid mesh corresponding to the pattern portion is prepared, and analysis of the drainage performance is performed with respect to the pattern portion alone. This is the analysis (local analysis: L analysis) of only the pattern portion which is one portion of the pattern model. Here, as shown in FIG. 31, as the pattern portion (one portion) rolls, the pattern portion shifts through a positional state L1 to a positional state L13.

Thus, in this embodiment, since the smooth tire model is set as a basis, and global-local (GL) analysis for analyzing by using one portion of the pattern is performed, it is possible to obtain the following three advantages:

1: Reduction of the calculation time. The present inventors confirmed that the calculation time which took about one month in performing the analysis by using a full-circumference pattern model with a fine mesh can be reduced to about two days.

2: The construction of various models can be simplified. In particular, it is unnecessary to prepare a full-circumference pattern in the tire model.

3: It is possible to easily analyze only the water displacing characteristic during the entry into water of the pattern of the leading edge which is important in (dynamic) hydroplaning.

Figure 33:
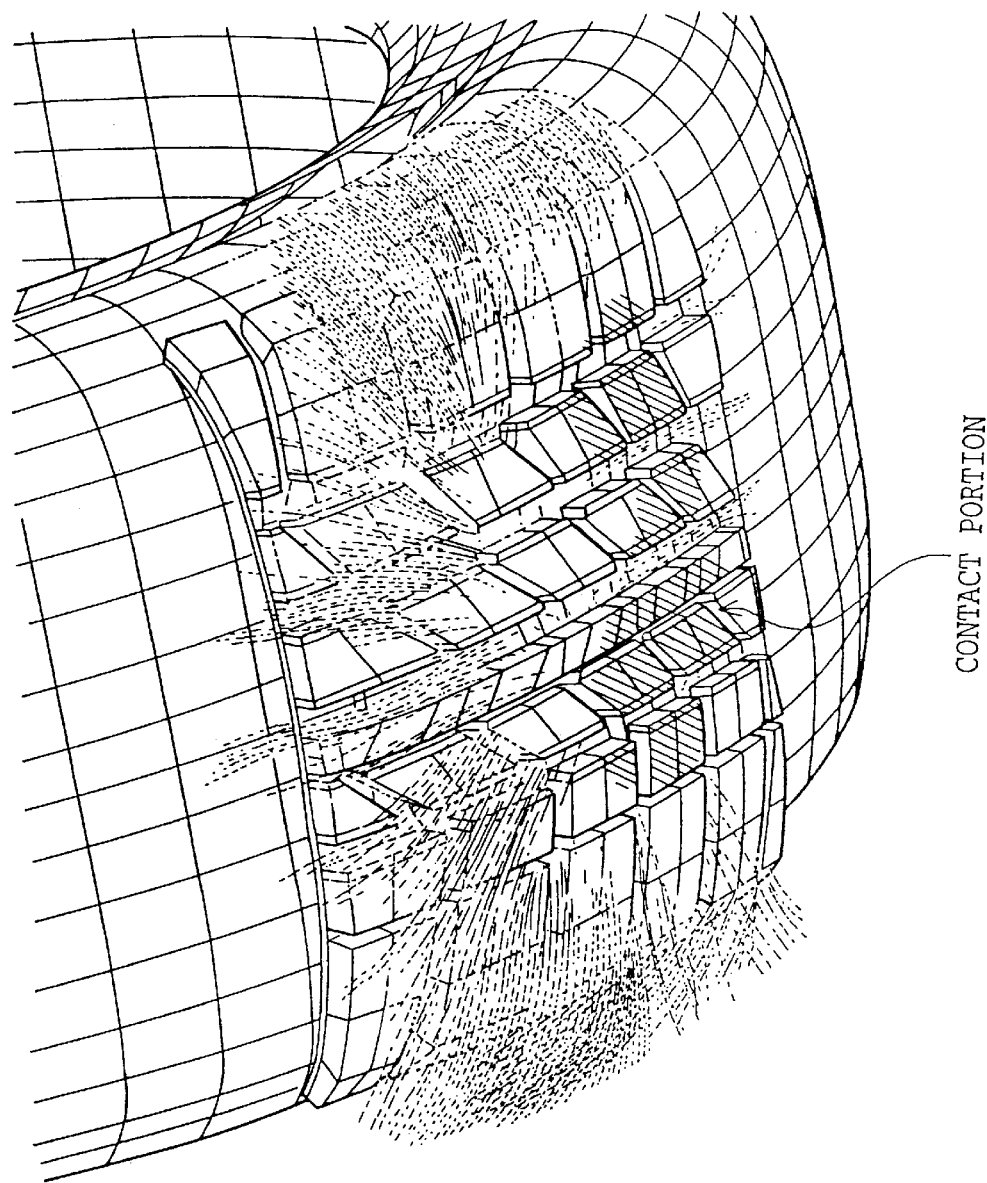
FIG. 33 is an image diagram illustrating a state of water displacement at a point of time when the pattern portion, after starting to contact the road surface, has slightly trodden on the road surface.
Figure 34:
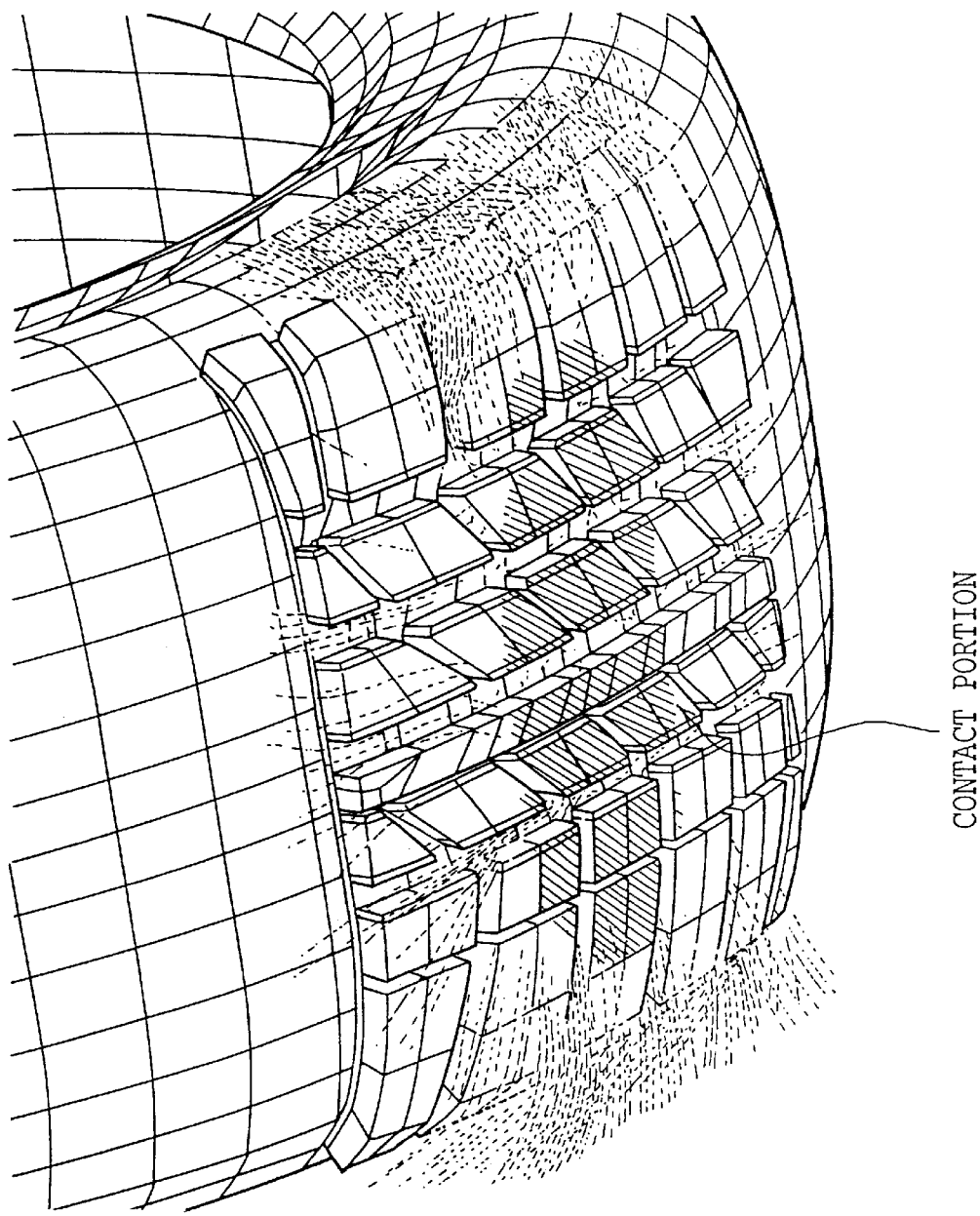
FIG. 34 an image diagram illustrating a state of water displacement at a point of time when a middle portion of the pattern portion is in contact with the road surface.

FIGS. 32, 33, and 34 show examples of the results of analysis of the drainage performance when the pattern portion (one portion) was rolled. FIGS. 32 to 34 show time-series states of the pattern portion, wherein FIG. 32 shows the state at the point of time when the pattern portion, after rolling, comes into contact with the road surface. FIG. 33 shows the state at the point of time when the pattern portion, after starting to contact the road surface, has slightly trodden on the road surface. FIG. 34 shows the state at the point of time when a middle portion of the pattern portion is in contact with the road surface. As can be seen from the drawings, at the outset when the pattern portion comes into contact with the road surface, the fluid (water) is scattered in such a manner as to be sprayed in the rolling direction of the tire model (FIG. 32). As the pattern portion slightly treads on the road surface, the fluid (water) which is guided along the grooves in the tire model increases, and the fluid (water) in spray form decreases (FIG. 33). When the middle portion of the pattern portion is in contact, i.e., when a substantially entire portion of the pattern portion is in contact with the road surface, most of the fluid (water) is guided along the grooves in the tire model (FIG. 34).

[Third Embodiment]

Next, a description will be given of a third embodiment. It should be noted that since the arrangement of this embodiment is substantially similar to those of the above-described embodiments, identical portions will be denoted by the same reference numerals, and a detailed description thereof will be omitted. In addition, water is adopted as the fluid in this embodiment. This embodiment shows a specific example in which the estimation of tire performance in the above-described embodiments is applied to the estimation of the performance of a radial tire.

Figure 17:
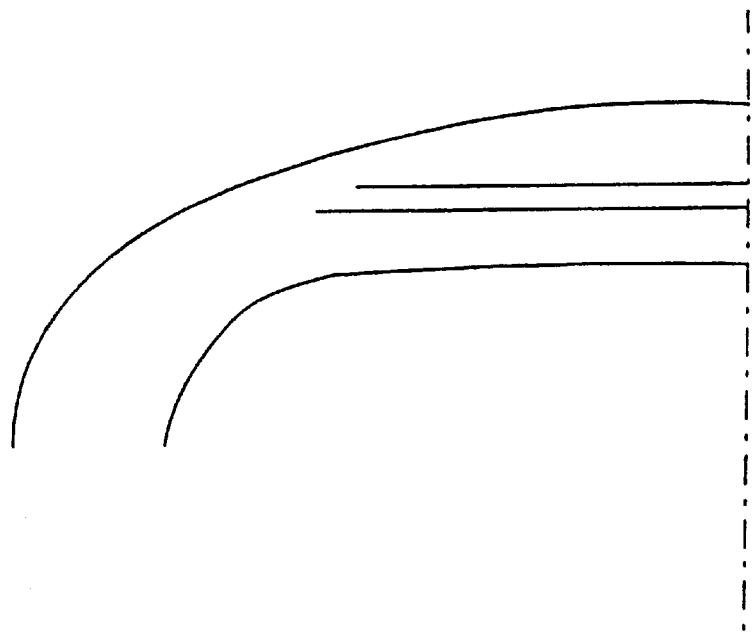
FIG. 17 is a diagram illustrating in simplified form a right-hand half section of the section in a plane including the rotational axis of the pneumatic radial tire.

FIG. 17 is a diagram representing a sample tire illustrating in simplified form a left-hand half section of the section in a plane including the rotational axis of a pneumatic radial tire. The right-hand half section is similar to the left-hand half section including asymmetrical portions.

The load used herein is a standard load, which means a maximum load of a single wheel (maximum load capacity) of an applicable size described in the standards mentioned below. The internal pressure in this case is the air pressure corresponding to the maximum load of a single wheel (maximum load capacity) of an applicable size described in the standards mentioned below. In addition, the rim is a standard rim (or "approved rim" or "recommended rim") of an applicable size described in the standards mentioned below. In addition, the standards are determined by the industrial standards which are effective in a district where the tires are produced or used. For example, in the case of the United States of America, the standards are defined in the Year Book of The Tire and Rim Association Inc.; in the case of Europe, in the Standards Manual of The European Tire and Rim Technical Organization; and in the case of Japan, in the JATMA Year Book of The Japan Automobile Tire Manufacturers' Association, Inc.

Modeling for performance estimation was effected on the basis of this tire. In particular, the performance of two kinds of tire models including pattern A and pattern B was estimated, and both the results of estimation and the results of actual measurement are shown.

As for the modeled and trial-manufactured tires in this embodiment, the tire size was 205/55R16, and the targeted performance was hydroplaning performance. The outer configuration of the tire was measured by a laser shape measuring instrument, a tire cross section model was constructed on the basis of the cross section data from design drawings and an actual tire and was developed in the circumferential direction, thereby constructing a 3D model of the tire (numerical model). As for the pattern, a 3D model was constructed on the basis of design drawings, and was pasted on the 3D model of the tire as a tread portion. As for the fluid model, the depth of water was set to 10 mm, and a region covering 30 mm in the depthwise direction, 20,00 mm in the advancing direction, and 300 mm in the widthwise direction was modeled. A rotating speed corresponding to 80 km per hour was imparted to the tire, while a coefficient of friction $\mu$=0.3 was imparted to the road surface model.

In the hydroplaning-performance evaluation test of the trial-manufactured tires, the aforementioned tires were fitted to rims of 7J-16 with an internal pressure 2.2 kg/cm$^2$, were mounted in a passenger car, and were made to enter a pool of water with a depth of 10 mm with varied speeds, and the hydroplaning occurrence speed was evaluated by a test driver. The results were expressed by indices of the hydroplaning occurrence speed, and the smaller the index, the better.

Figure 19A:
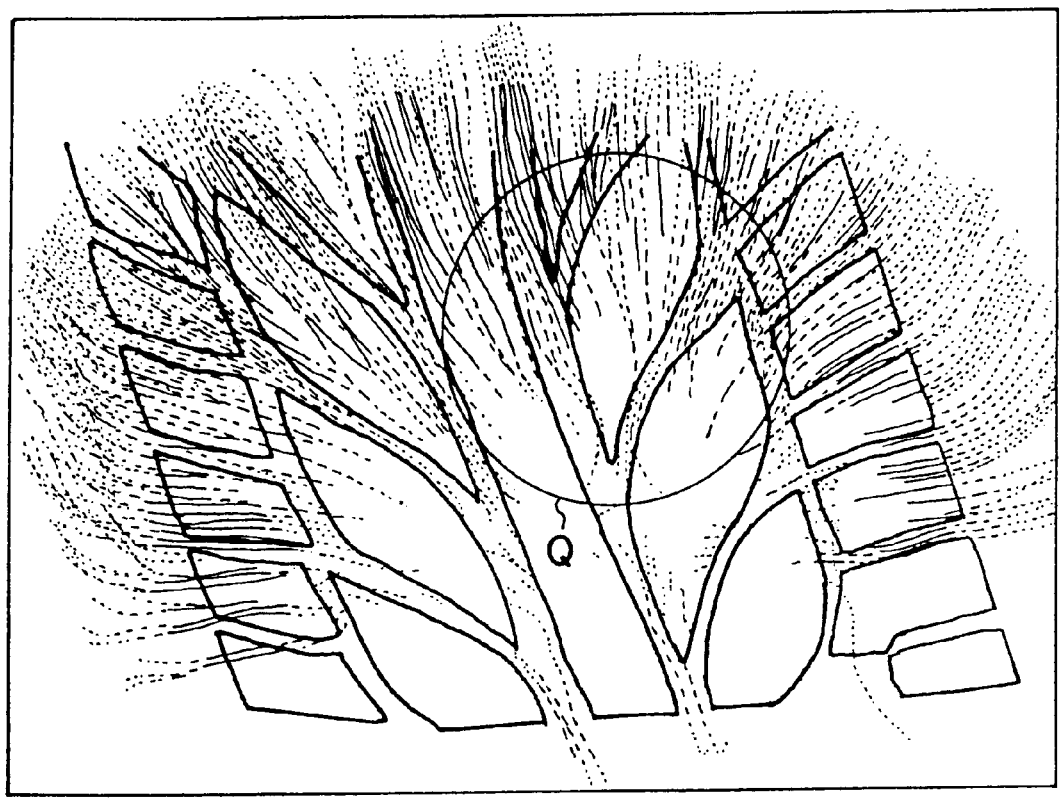
FIG. 19A is a diagram illustrating the flow of a substantially entire portion in the vicinity of the tread pattern of the tire.
Figure 19B:
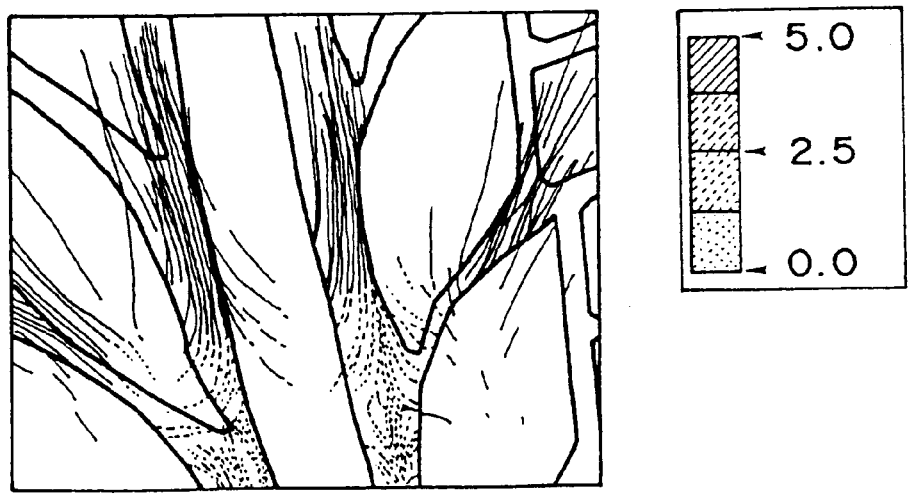
FIG. 19B is an enlarged view illustrating the flow of an area marked Q and its vicinity of the tread pattern shown in FIG. 19A.
Figure 20A:
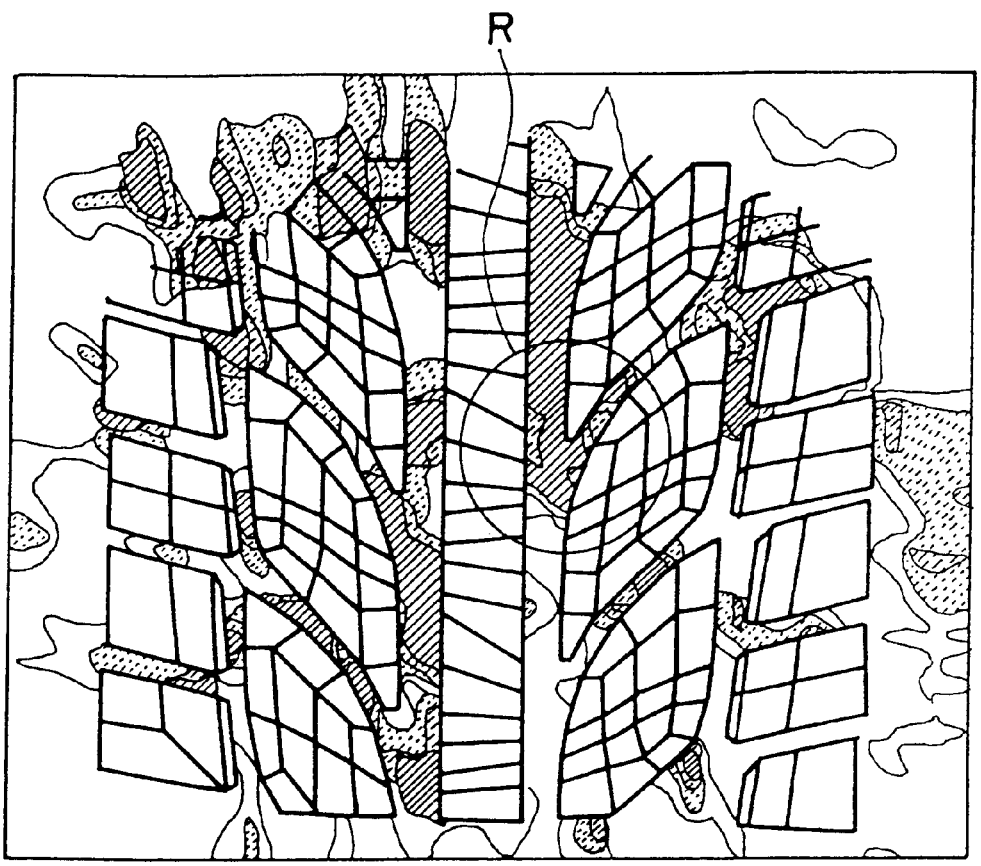
FIG. 20A is a diagram illustrating the distribution of water pressure in the substantially entire portion of the tread pattern of the tire.
Figure 20B:
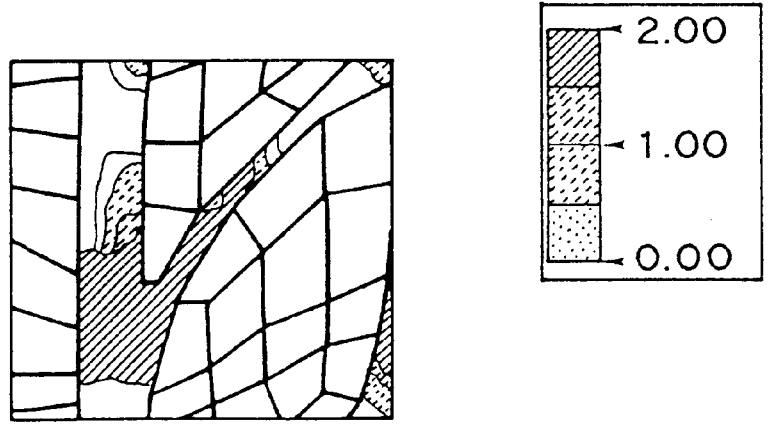
FIG. 20B is an enlarged view illustrating the distribution of water pressure in an area marked Q and its vicinity of the tread pattern shown in FIG. 20A.

FIGS. 19A and 19B show the flow (velocity, direction) of the fluid in the vicinity of the tread pattern of the tire based on the evaluation of the estimation of tire performance in accordance with this embodiment, and FIGS. 20A and 20B show distributions of water pressure. In FIG. 19A, the flow (velocity) of the fluid in the vicinity of the tread pattern is classified into four stages, and the flow velocity in each range is shown by the same pattern (the kind of line segment). The slowest flow velocity (e.g., 0; see the right-hand side in FIG. 19B) is plotted by a dotted line, the plotting is made such that the faster the flow velocity, the narrower the interval between adjacent ones of the dots, and the fastest flow velocity (e.g., 5; see the right-hand side in FIG. 19B) is plotted by a solid line. Namely, as for the streamline which represents the same flow, the dotted line becomes closer to the solid line as the flow velocity becomes faster from the slow flow velocity to the fast flow velocity, whereas the line changes from the solid line to the dotted line as the flow velocity becomes slower from the fast flow velocity. The left-hand side of FIG. 19B shows an enlarged view of the area marked Q and its vicinity in FIG. 19A, and it can be understood that the flow of the fluid is particularly strong in the flow in the direction of the rib, and that the hydroplaning performance can be improved if the water displacement effect of the rib grooves is increased.

Figure 18:
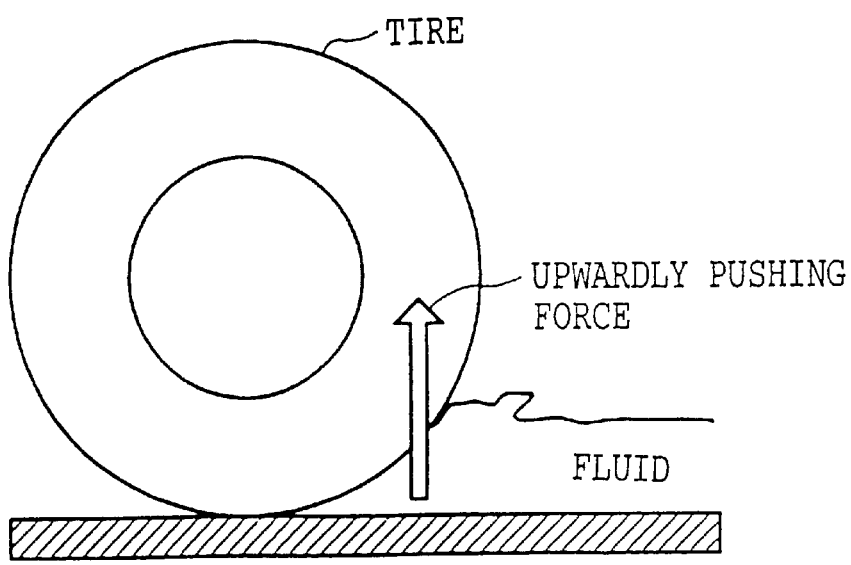
FIG. 18 is an explanatory diagram for explaining an upwardly-oriented hydrodynamic force for pushing the tire upward.

In FIG. 20A, water pressure in the neighborhood of the tread pattern is classified into four stages, an area representing water pressure in each range is shown by the same pattern as the distribution. The area of the lowest water pressure (e.g., 0; see the right-hand side in FIG. 20B) is plotted by dotted lines, the plotting is made such that the higher the water pressure, the narrower the interval between adjacent ones of the dots, and the area of the highest water pressure (e.g., 2; see the right-hand side in FIG. 20B) is plotted by solid lines. The left-hand side of FIG. 20B shows an enlarged view of the area marked R and its vicinity in FIG. 20A, and this is an area where the flow of the fluid is strong and water pressure rises. Accordingly, it can be understood that if the rise in water pressure is suppressed by improving the drainage performance of the area where the water pressure increases, the water pressure applied to the overall pattern decreases, and the upwardly-oriented hydrodynamic force (see FIG. 18) which pushes the tire upward decreases, thereby improving the hydroplaning performance.

Figure 21:
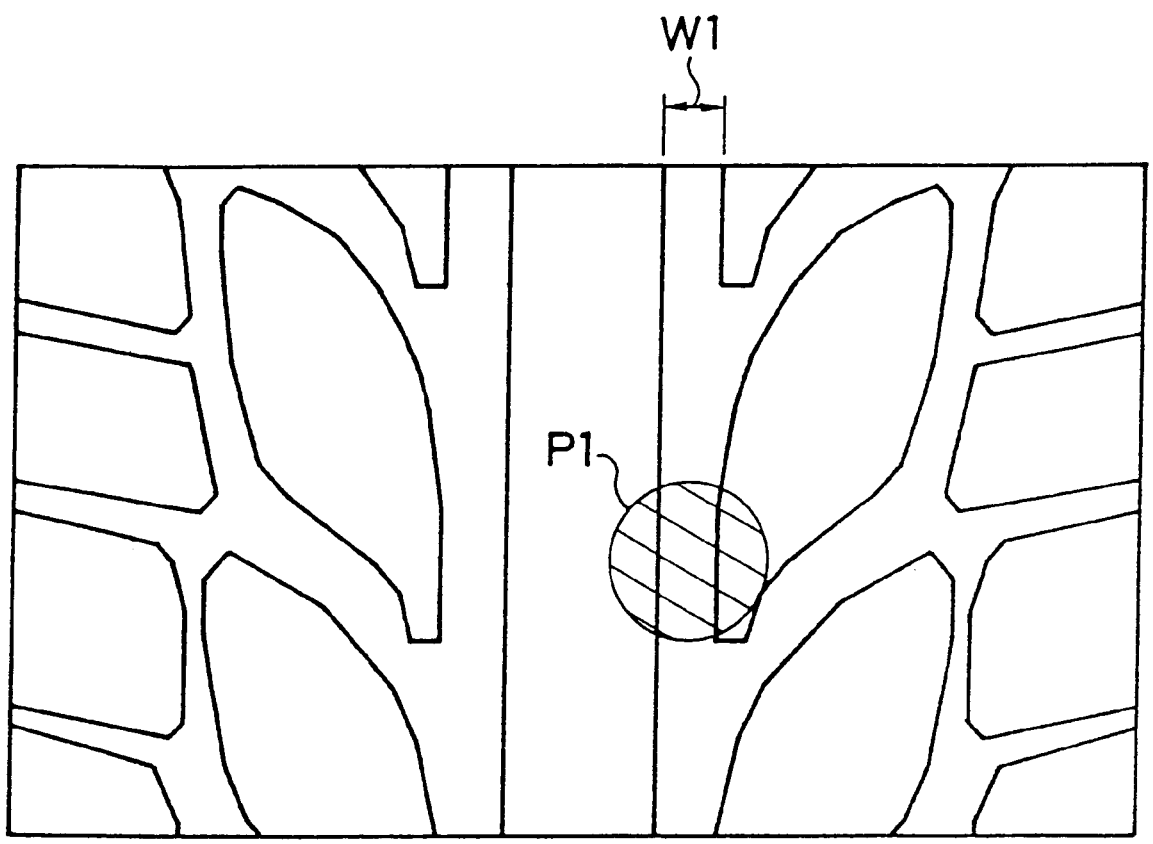
FIG. 21 is a diagram illustrating the tread pattern of a pattern A in which the size of a rib groove portion has been changed.
Figure 22:
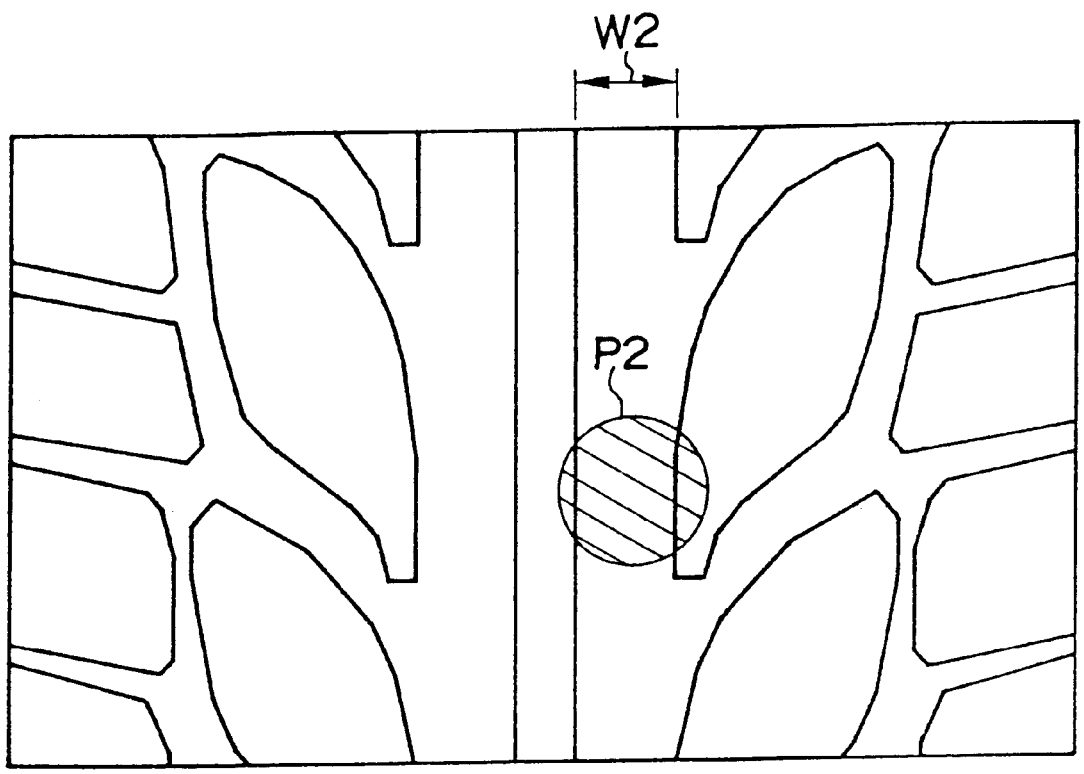
FIG. 22 is a diagram illustrating the tread pattern of a pattern B in which the size of the rib groove portion has been changed.

By taking the above-described aspects into consideration, two types (pattern A and pattern B) were prepared as tread patterns in which dimensions of the rib groove portions were altered, and a comparison was made of the water pressure, the volume of flow, and flow velocity of the rib groove portions on which particular attention was focused. FIG. 21 shows the pattern A, and FIG. 22 shows the pattern B. The patterns A and B had the same configurations other than the center rib groove widths. Specifically, the center rib groove width W1 of the pattern A was 10 mm, and the center rib groove width W2 of the pattern B was 15 mm. In the case of the pattern A, the water pressure, the volume of flow, and flow velocity were measured for the area marked P1 and its vicinity, as shown in FIG. 21. In the case of the pattern B, the water pressure, the volume of flow, and flow velocity were measured for the area marked P2 and its vicinity, as shown in FIG. 22. Further, a comparison was also made of the upwardly-oriented hydrodynamic force applied to the overall tire, and a comparison was made with the hydroplaning performance evaluated by actually fabricating the tires. With respect to these measurements, the results in which values concerning the tire with the pattern B were obtained by setting values concerning the tire with the pattern A to 100 are shown in Table 1 below.

TABLE 1

|  | Item | Pattern A | Pattern B |
| --- | --- | --- | --- |
| Estimated performance (index) | water pressure | 100 | 80 |
|  | volume of flow | 100 | 165 |
|  | flow velocity | 100 | 110 |
|  | upwardly-oriented hydrodynamic force | 100 | 94 |
| Actually measured performance (performance) | hydroplaning occurrence speed | 100 | 103 |

Figure 23:
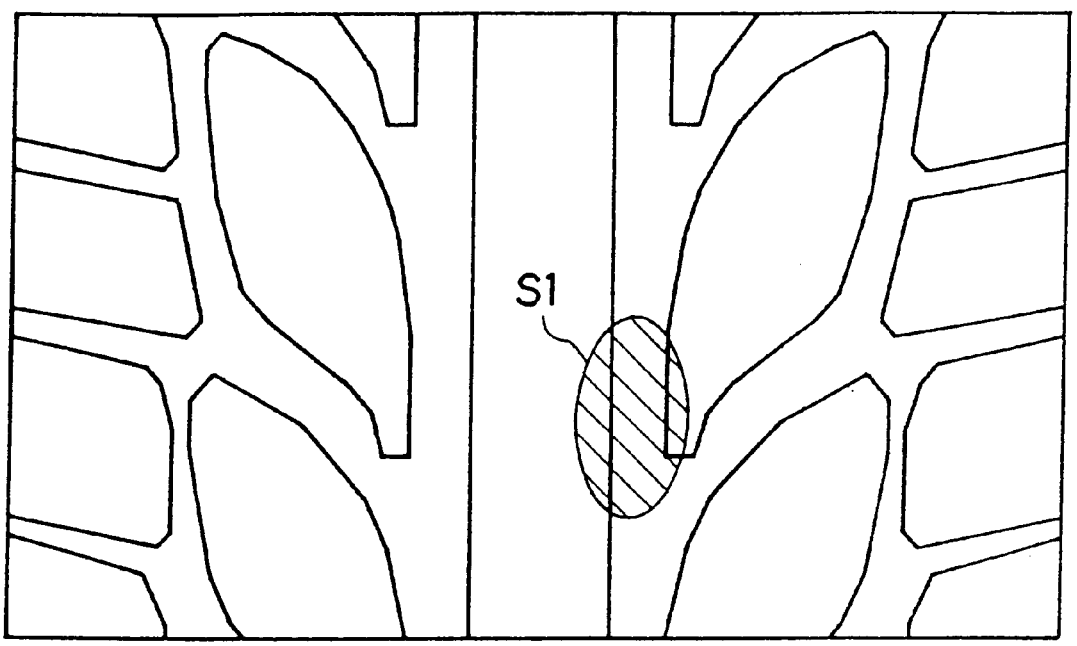
FIG. 23 is a diagram illustrating the distribution of water pressure in the tread pattern of the pattern A.
Figure 24:
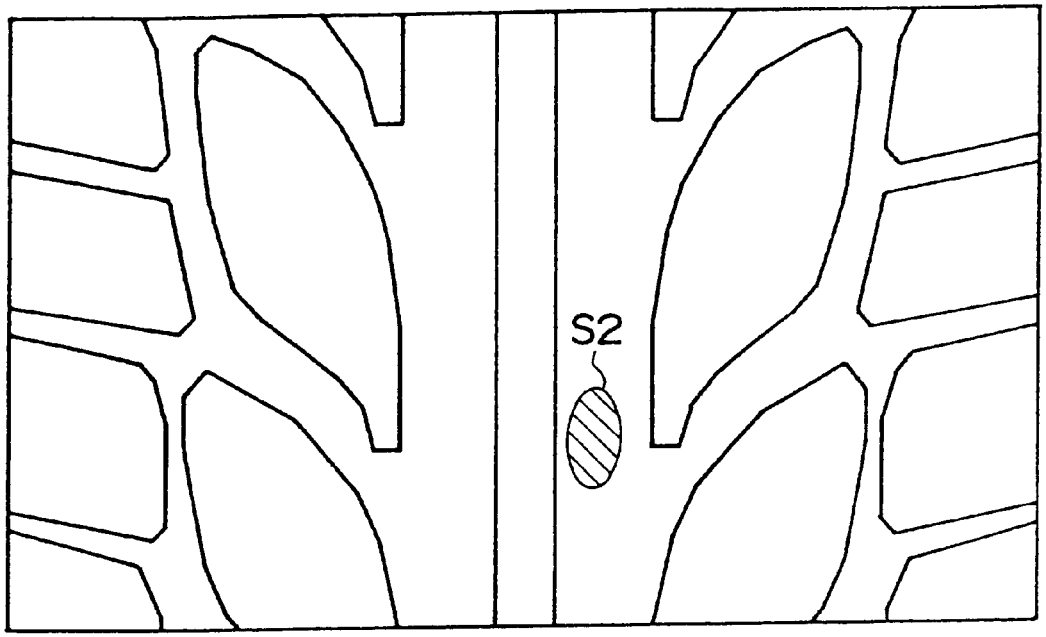
FIG. 24 is a diagram illustrating the distribution of water pressure in the tread pattern of the pattern B.
Figure 25:
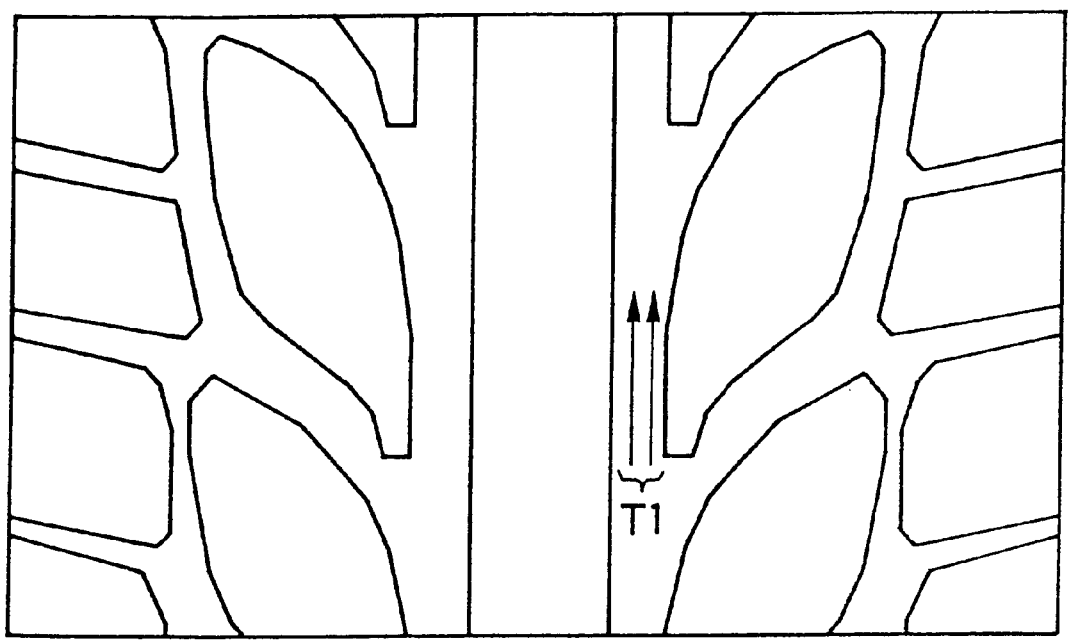
FIG. 25 is a diagram illustrating the flow of the fluid in the tread pattern of the pattern A.
Figure 26:
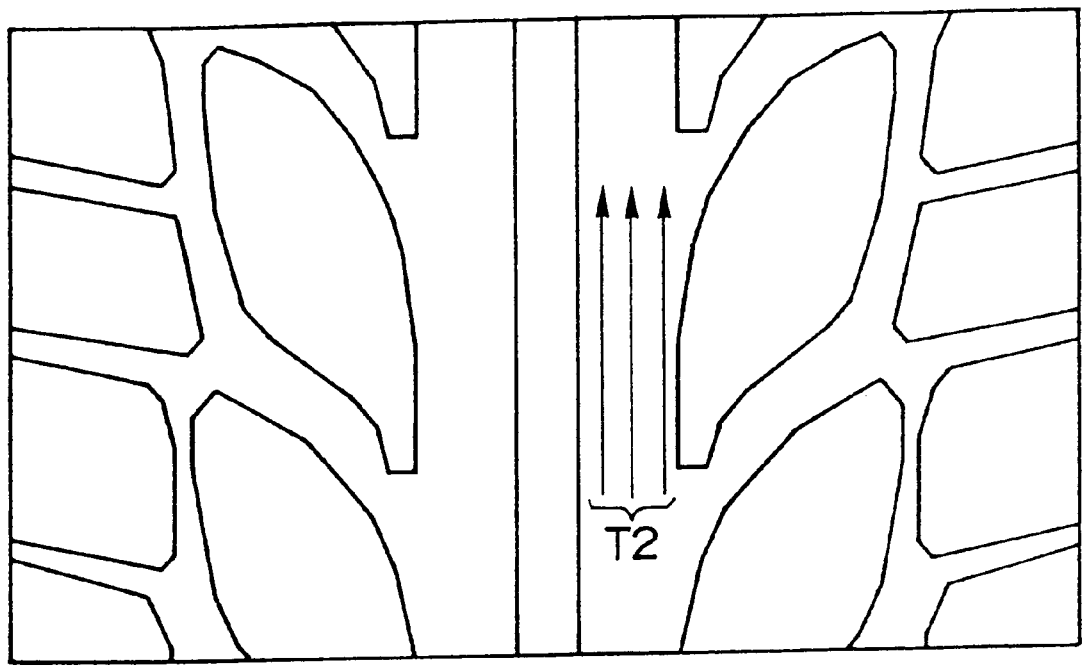
FIG. 26 is a diagram illustrating the flow of the fluid in the tread pattern of the pattern B.

As can be appreciated from Table 1, the water pressure was lower and the volume of flow and the flow velocity were greater for the tire with the pattern B than the tire with the pattern A, and the upwardly-oriented hydrodynamic force was lower. FIG. 23 shows the water pressure distribution S1 (the shaded area in FIG. 23) in the tire with the pattern A, while FIG. 24 shows the water pressure distribution S2 (the shaded area in FIG. 24) in the tire with the pattern B exhibiting the same water pressure as that in the water pressure distribution in the pattern A. FIG. 25 shows the flow T1 (arrows in FIG. 25) of the fluid on the tire with the pattern A, while FIG. 26 shows the flow T2 (arrows in FIG. 26) of the fluid on the tire with the pattern B. As can be seen from FIGS. 23 to 26, the tire with the pattern B excels in the drainage performance. Further, it can be understood that, in the hydroplaning performance in the actually measured performance as well, the tire with the pattern B is superior.

Thus, a difference arises in the estimated performance between the tire with the pattern A and the tire with the pattern B, and it can be appreciated that the relative superiority or inferiority of the estimated performance between the patterns is in agreement with the relative superiority or inferiority of the actually measured hydroplaning performance. Accordingly, the estimation of tire performance in accordance with this embodiment of the invention is effective in the estimation of performance of a draft design of a tire, and by utilizing it the efficiency of tire development can be improved.

[Fourth Embodiment]

Next, a description will be given of a fourth embodiment. It should be noted that since the arrangement of this embodiment is substantially similar to those of the above-described embodiments, identical portions will be denoted by the same reference numerals, and a detailed description thereof will be omitted. In this embodiment, the present invention is applied to the designing of the configuration of a carcass line for setting the belt tension in the circumferential direction of the tire to a maximum value, i.e., an optimum value, while estimating the tire performance, in order to improve steering stability.

Figure 35:
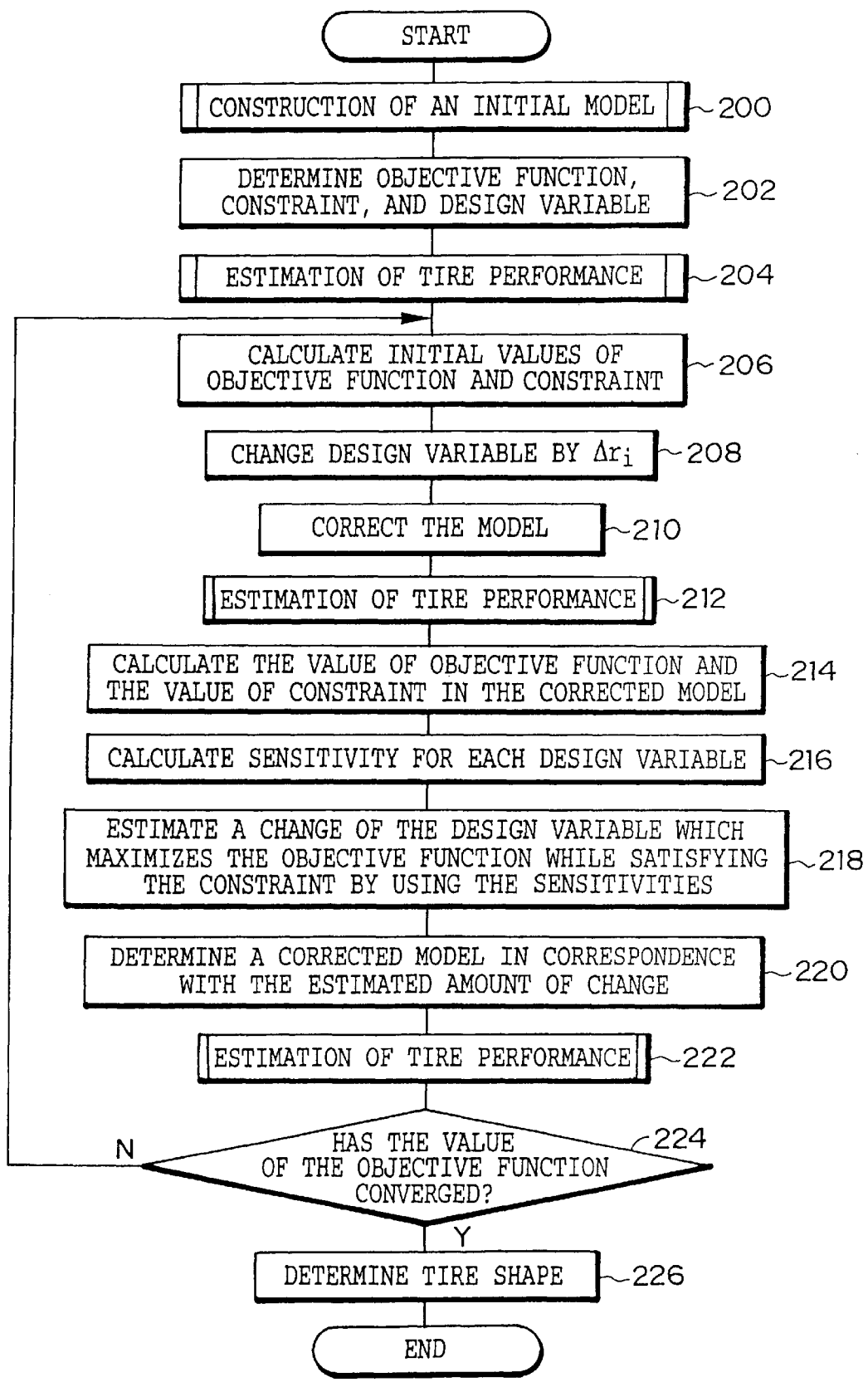
FIG. 35 is a flowchart illustrating the flow of processing in accordance with a fourth embodiment of the invention.

FIG. 35 shows a processing routine of the program in accordance with this embodiment. In Step 200, initial-model construction processing is executed, including the construction of a tire model to incorporate the draft design (such as the change of the shape, structure, materials, and pattern of the tire) of the tire to be designed into a model in numerical analysis, as well as a fluid model and a road surface model for evaluating tire performance, and so on.

In Step 200, processing similar to portions of the processing routine shown in FIG. 2 (Steps 100 to 108 in FIG. 2) is executed. First, a draft design of the tire to be evaluated (such as the change of the shape, structure, materials, and pattern of the tire) is set (Step 100 in FIG. 2); a tire model is constructed to incorporate the draft design of the tire into a model in numerical analysis (Step 102 in FIG. 2); a fluid model is constructed (Step 104 in FIG. 2); a road surface model is constructed, and the road surface condition is inputted (Step 106 in FIG. 2); and boundary conditions are set (Step 108 in FIG. 2).

To give a detailed description, in Step 100 in FIG. 2, an initial draft design of the tire (such as the change of the shape, structure, materials, and pattern of the tire) is set. In an ensuing Step 102, a tire model is constructed to incorporate the draft design of the tire into a model in numerical analysis.

This construction of the tire model slightly differs depending on the numerical analysis method used. In this embodiment, it is assumed that the finite element method (FEM) is used as the numerical analysis method. Accordingly, the tire model which is constructed in the aforementioned Step 102 refers to one in which a subject region is divided up into a plurality of elements by a division into elements corresponding to the finite element method (FEM), e.g., by meshing, and the tire is numerically represented in a data format for input into a computer program prepared according to a numerical and analytical technique. This division into elements refers to dividing up an object such as the tire, fluid, road surface, and the like into a number of (a finite number of) small subregions. Calculations are performed for the respective subregions, and after completion of the calculation for all the subregions, all the subregions are summed up, thereby making it possible to obtain a response for the whole. Incidentally, the difference method or the finite volume method may be employed as the numerical analysis method.

In the construction of the tire model in the aforementioned Step 102, after the model of the cross section of the tire is prepared, a pattern is formed into a model. Specifically, a tire-model construction routine shown in FIG. 3 is executed. First, a model of a radial cross section of the tire is constructed in Step 136. Namely, tire cross section data is prepared. In this tire cross section data, the external shape of the tire is measured by a laser shape measuring instrument or the like, and values can be collected. In addition, as for the internal structure of the tire, accurate values are collected from the design drawings and cross-sectional data of an actual tire and the like. The rubber and reinforcing members (those in which reinforcing cords formed of such as iron and organic fibers are bundled in sheets such as belts and plies) in the cross section of the tire are respectively modeled in accordance with a modeling technique of the finite element method. A model of the radial cross section of the tire thus modeled is shown in FIG. 4. In an ensuing Step 138, tire section data (a model of the radial cross section of the tire) which is two-dimensional data is developed by a one-circumference portion in the circumferential direction so as to construct a three-dimensional (3D) model of the tire. In this case, it is preferable to model the rubber portion by 8-node solid elements and model the reinforcing members by anisotropic shell elements capable of representing angles. For example, as shown in FIG. 7A, the rubber portion can be handled by 8-node solid elements and, as shown in FIG. 7B, the reinforcing members (belts, plies) can be handled by shell elements, making it possible to take into consideration the angle θ of the reinforcing member two-dimensionally. A 3D model in which the tire is thus modeled three-dimensionally is shown in FIG. 5. In an ensuing Step 144, the pattern is modeled. This modeling of the pattern is effected by either one of the procedures (1) and (2) below. A tire model obtained by modeling the pattern in accordance with the procedure (1) or (2) is shown in FIG. 6.

Procedure (1): A portion or the whole of the pattern is modeled separately, and is pasted on the aforementioned tire model as a tread portion.

Procedure (2): The pattern is prepared by taking rib and lug portions into consideration when developing the tire cross section data in the circumferential direction.

Figure 37:
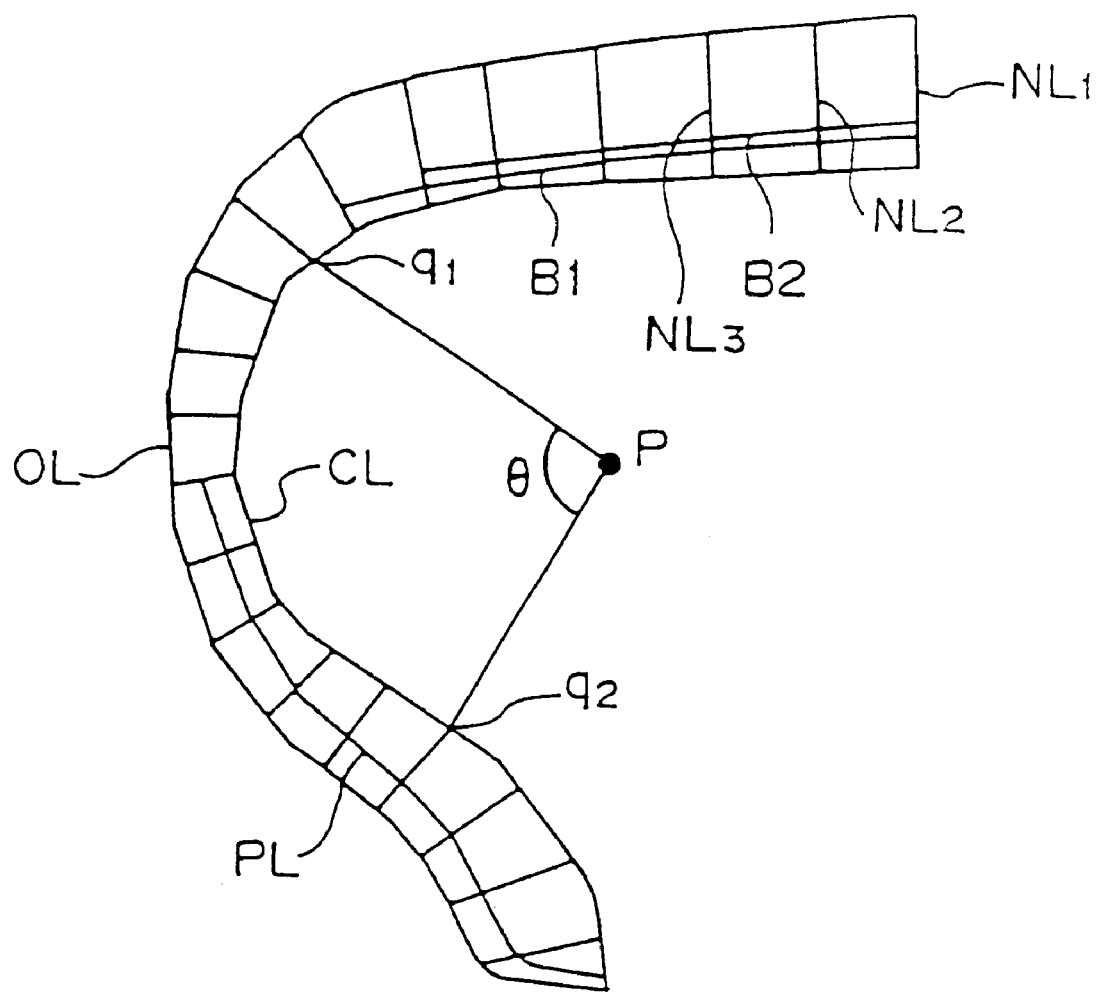
FIG. 37 is a diagram illustrating a basic model of the tire.

In this embodiment, as one example of the construction of a tire model in Step 102 in FIG. 2, the cross-sectional shape of the tire in a state of natural equilibrium is set as a reference shape. This reference shape is subjected to modeling by a technique, such as a finite element method, which makes it possible to numerically or analytically determine the belt tension in the circumferential direction of the tire when inflated with air, so as to determine a basic model of the tire which represents a cross-sectional shape of the tire including its internal structure, and in which the cross-sectional shape is divided into a plurality of elements by meshing. It should be noted that the basic shape is not confined to the cross-sectional shape of the tire in a state of natural equilibrium, but may be an arbitrary shape. The term modeling referred to herein means the numerical representation of the shape, structure, materials, and pattern of the tire into a data format for input into a computer program prepared according to a numerical and analytical technique. FIG. 37 shows such a basic model of the tire, in which CL denotes a carcass line; OL, a line representing an outer configuration of the tire; PL, a turn-up ply line; and B1 and B2 denote lines indicating belts. In addition, this basic model of the tire is divided into a plurality of elements by a plurality of lines $NL_1$, $NL_2$, $NL_3$, . . . normal to the carcass line CL. It should be noted that although, in the above, a description has been given of the example in which the basic model of the tire is divided into a plurality of elements by a plurality of lines normal to the carcass line, the basic model of the tire may be divided into a plurality of elements by a plurality of lines normal to a line representing an outer configuration of the tire or by a plurality of lines normal to a turn-up ply line, or may be divided into arbitrary shapes such as triangles depending on a design objective.

After constructing the tire model as described above, a fluid model is constructed in the same way as in the above-described embodiment (Step 104 in FIG. 2). Upon completion of the construction of the fluid model, a road surface model is constructed, and the road surface condition is inputted (Step 106 in FIG. 2). After the road surface condition is thus inputted, boundary conditions are set (Step 108 in FIG. 2). In the setting of the boundary conditions, in the same way as in the above-described embodiment, in the setting of the boundary conditions during the rolling of the tire in Step 108 in FIG. 2, the processing routine in FIG. 10 is executed, and in the setting of the boundary conditions during the nonrolling of the tire, the processing routine in FIG. 11 is executed.

Namely, after constructing the tire model, a fluid model is constructed in Step 104 in FIG. 2. In this Step 104, a fluid region including a part (or the whole) of the tire, the ground contact surface, and the region where the tire moves and deforms is divided and modeled. The fluid region should preferably be divided by rectangular parallelepipeds, and fluid elements which are these rectangular parallelepipeds for division should preferably be divided by an 8-node Eulean mesh. In addition, the tire model and the fluid model are defined in a partially overlapping manner. The pattern portion of the tire model has a complex surface geometry, and the fact that it is unnecessary to define the fluid mesh in conformity with the surface geometry makes it possible to substantially reduce the time and trouble required for modeling the fluid model, and is important in effecting the performance estimation efficiently.

It should be noted that since the fluid region used for the fluid model includes the region where the tire moves, in modeling in a state in which the tire model is not rolled (hereafter referred to as tire nonrolling), a region is modeled which is five times or more as long as the ground contact length in the advancing direction, three times or more as wide as the ground contact width in the widthwise direction, and, for instance, 30 mm or more in the depthwise direction. In modeling in a state in which the tire model is rolled (hereafter referred to as tire rolling), a fluid region is modeled which is, for instance, 2 m or more (a one-revolution portion of the tire or more) in the advancing direction. A fluid model thus modeled is shown in FIG. 9A and 9B. FIG. 9A is a perspective view of the fluid model, and FIG. 9B is a plan view of the fluid model.

When the construction of the fluid model is completed as described above, the operation proceeds to Step 106 in FIG. 3 to construct a road surface model and input the condition of the road surface. In this Step 106, the road surface is modeled, and an input is made to set the modeled road surface in the actual condition of the road surface. In the modeling of the road surface, the geometry of the road surface is modeled by being divided up into elements, and the road surface condition is inputted by selecting and setting the coefficient of friction μ of the road surface. Namely, since there are coefficients of friction μ of the road surface corresponding to the dry, wet, icy, snowy, unpaved, and other conditions depending on the road surface condition, an actual condition of the road surface can be reproduced by selecting an appropriate value for the coefficient of friction μ. In addition, it suffices if the road surface model is in contact with at least one portion of the aforementioned fluid model, and may be disposed inside the fluid model.

After the road surface condition is thus inputted, boundary conditions are set in Step 108 in FIG. 2. Since a portion of the tire model is present in a portion of the fluid model, it is necessary to simulate the behavior of the tire and the fluid by imparting analytical boundary conditions to the fluid model and the tire model. This procedure differs between the case of tire rolling and the case of tire nonrolling. This selection between the case of tire rolling and the case of tire nonrolling may be inputted in advance, or may be selected at the outset of execution of this processing, or both cases may be executed, and one may be selected after determining both cases. In the setting of boundary conditions in the case of tire rolling in Step 108 in FIG. 2, the processing routine shown in FIG. 10 is executed. First, the operation proceeds to Step 144 to impart boundary conditions concerning influx and efflux to the fluid model (fluid region) 20. As shown in FIG. 12, these boundary conditions concerning influx and efflux are handled under the assumption that the fluid flows out freely from the top surface 20A of the fluid model (fluid region) 20, and that the other surfaces including the front surface 20B, the rear surface 20C, the side surfaces 20D, and the bottom surface 20E are walls (no influx nor efflux). In an ensuing Step 146, internal pressure is imparted to the tire model. In an ensuing Step 148, at least one of a rotational displacement and a straightly advancing displacement (the displacement may be force or velocity) as well as a predetermined load are imparted to the tire model. Incidentally, in a case where the friction with the road surface is taken into consideration, only either one of the rotational displacement (or may be force or velocity) and the straightly advancing displacement (or may be force or velocity) may be imparted.

In addition, in the setting of boundary conditions in the case of tire nonrolling in Step 108 in FIG. 2, the processing routine shown in FIG. 11 is executed. First, in Step 150, boundary conditions concerning influx and efflux are imparted to the fluid model. Here, to perform the analysis in the steady state, the tire model is assumed to be stationary in the advancing direction, and a fluid model is considered in which the fluid flows toward the tire model at an advancing velocity. Namely, in Step 152, the flow velocity is imparted to the fluid in the fluid model (fluid region). As shown in FIG. 13, as for the boundary conditions concerning influx and efflux, it is assumed that the fluid flows in through the front surface of the fluid model (fluid region) 20 at the advancing velocity and flows out from the rear surface, and that the top surface, side surfaces, and lower surface are similar to those in the case of nonrolling. Then, in Step 154, internal pressure is imparted to the tire model and, in an ensuing Step 156, a predetermined load is imparted to the tire model.

When the processing of the initial-model construction processing (Step 200) is completed, the operation proceeds to Step 202 in FIG. 35, in which an objective function representing a physical quantity for evaluating tire performance, a constraint for constraining the cross-sectional shape of the tire, and a design variable determining the cross-sectional shape of the tire are determined.

In this embodiment, the objective function OBJ and the constraint G are defined as follows in order to design the configuration of the carcass line for maximizing the belt tension in the circumferential direction of the tire when inflated with air, so as to improve the steering stability:

Objective function OBJ: the sum total, in the widthwise direction of the tire, of components of the belt tension acting in the circumferential direction of the tire Constraint G: A periphery value of the carcass line is within ±5% of the periphery value of the carcass line of the basic model of the tire.

It should be noted that the aforementioned periphery value of the carcass line can be calculated as the sum total of distances between nodes (points of intersection between the carcass line and the respective normal line) in the carcass line which are located in a domain that changes the tire shape.

Figure 36:
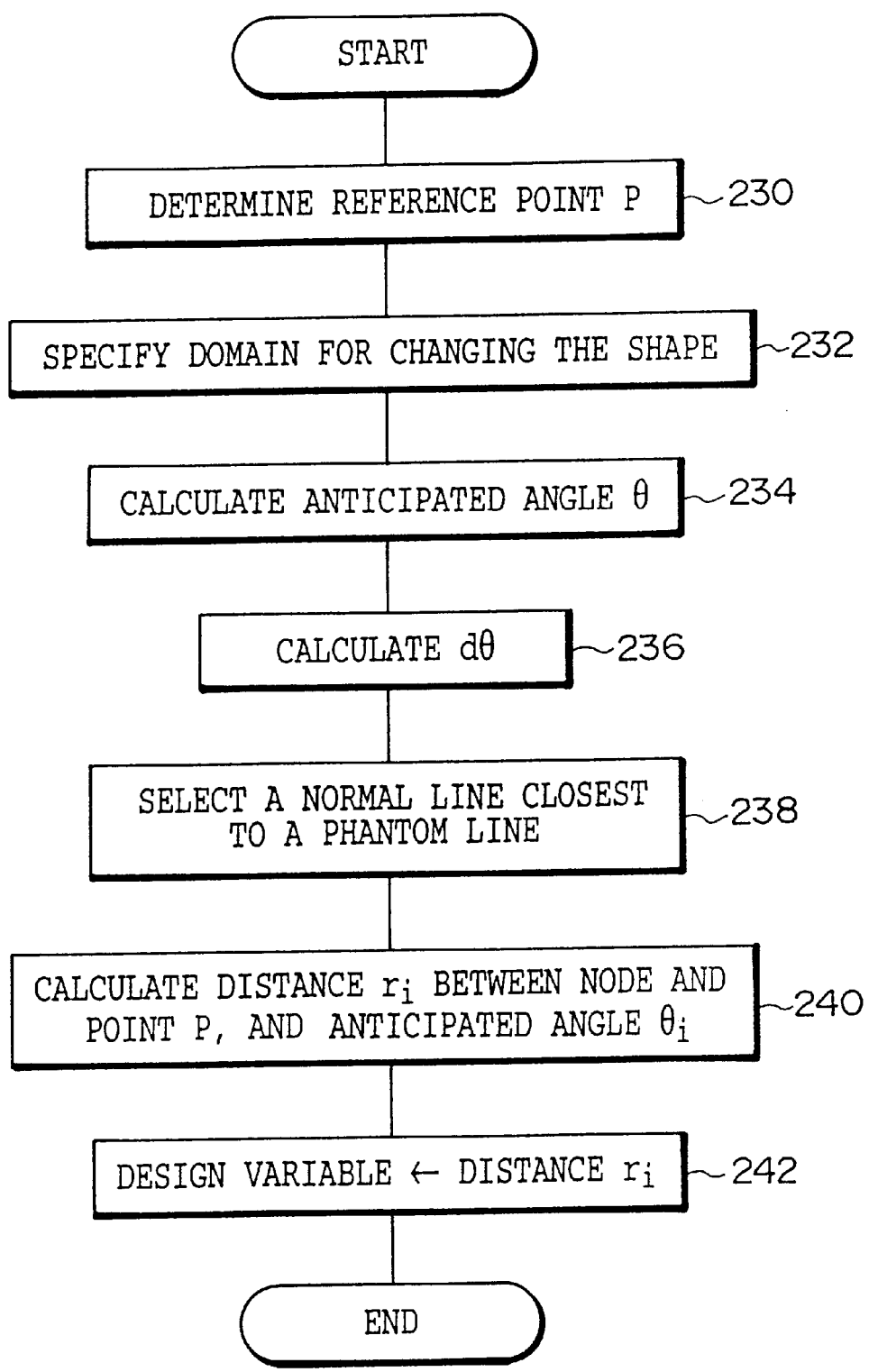
FIG. 36 is a flowchart illustrating the flow of processing for determining a design variable.

In addition, the configuration of the carcass line, which is a design variable, is determined by a Lagrange interpolation routine, shown in FIG. 36, for approximating a curve. In Step 230 in this Lagrange interpolation routine, a reference point P is set in the interior of the tire, as shown in FIG. 37. In an ensuing Step 232, the domain from a node $q_1$ in the vicinity of a belt end to a node $q_2$ in a vicinity of the portion constrained by the rim is specified as the domain for changing the shape of the tire. In Step 234, by using as a reference line a straight line connecting the node $q_1$ and the reference point P, an ascending angle θ, which is an angle formed by this reference line and the straight line connecting the node $q_2$ and the reference point P, is calculated. In Step 236, an angular increment dθ is calculated in accordance with the following formula:

$$d\theta = \theta/\text{the order of Lagrange interpolation} \quad (1)$$

It should be noted that the order of Lagrange interpolation is inputted in advance by the user.

Figure 38:
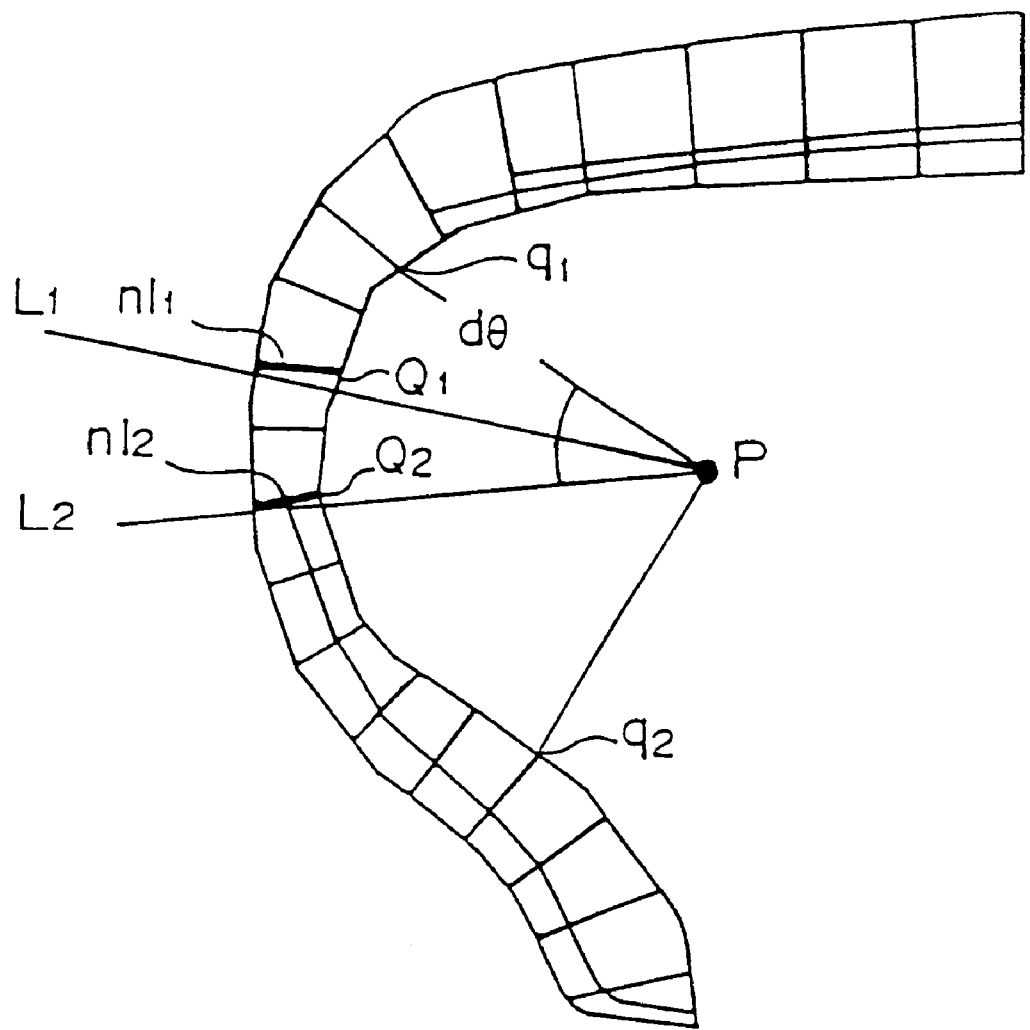
FIG. 38 is a diagram illustrating a state in which phantom lines passing a reference point P at dθ each are drawn on the basic model of the tire.
Figure 39:
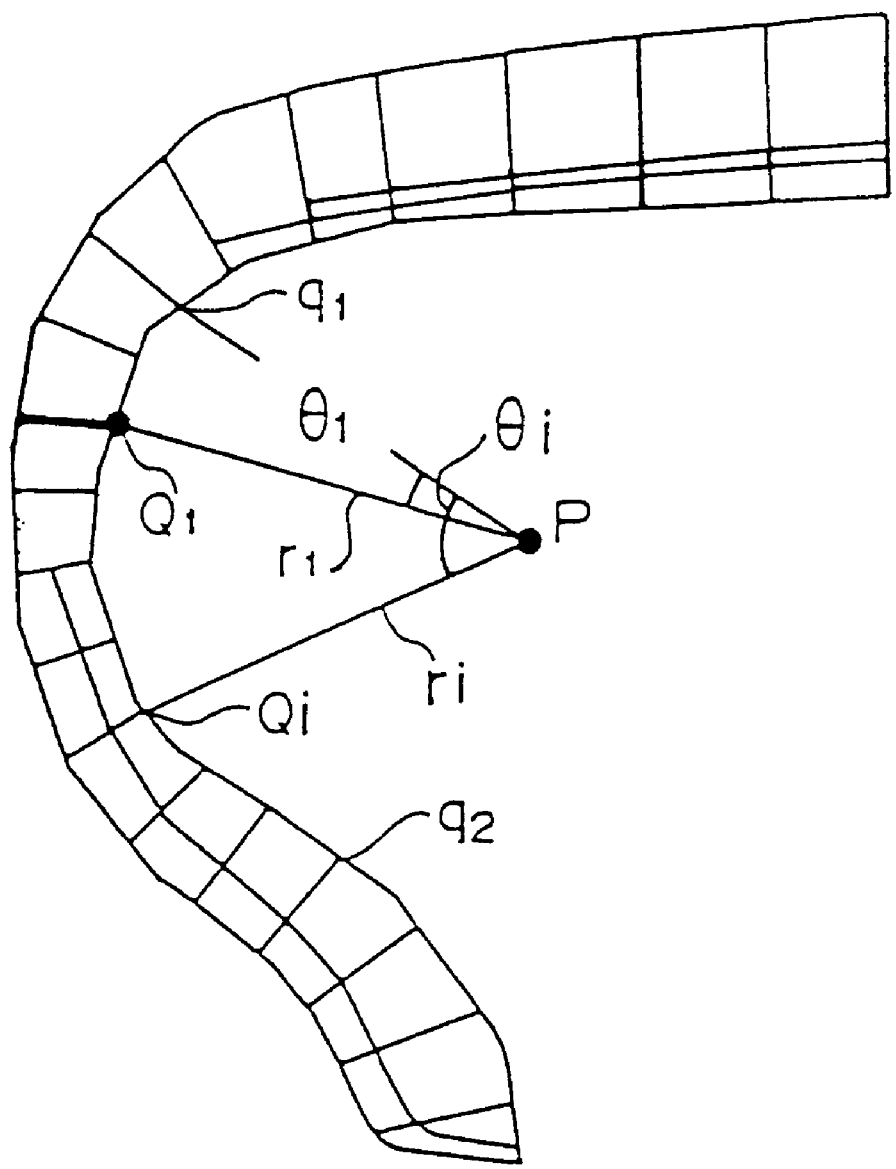

In Step 238, as shown in FIG. 38, phantom lines $L_1$, $L_2$, $L_3$, ... are assumed for respective angular increments dθ with the reference line set as a reference, and normal lines $nl_1$, $nl_2$, $nl_3$, ... which are closest to the respective phantom lines are selected. In an ensuing Step 240, as shown in FIG. 39, distances $r_1$, $r_2$, $r_3$, ... (hereafter expressed as $r_i$ in a general formula, where i=1, 2, 3, ... ; the order of Lagrange interpolation-1) between the reference point P and innermost nodes $Q_1$, $Q_2$, $Q_3$, ... on the selected normal lines $nl_1$, $nl_2$, $nl_3$, as well as ascending angles $\theta_1$, $\theta_2$, $\theta_3$, ... (hereafter expressed as $\theta_i$ in a general formula, where i=1, 2, 3, ...; the order of Lagrange interpolation-1) at the nodes $Q_1$, $Q_2$, $Q_3$, ... are calculated. Then, in Step 242, the distance $r_i$ is set as a design variable.

After the objective function OBJ, the constraint G, and the design variable $r_i$ are thus determined, in Step 204 in FIG. 35, initial tire-performance estimation processing is executed. In this tire-performance estimation processing, the processing of portions of the processing routine shown in FIG. 2 (Steps 110 to 122 in FIG. 2) is executed, and the calculation of deformation of the tire model as analysis A and the calculation of the fluid (flow calculation) as analysis B are performed on the basis of the numerical models which have been constructed or set. In this embodiment, to obtain a transient state, the calculation of deformation of the tire model and the calculation of the fluid of the fluid model are respectively performed independently within 1 msec, and boundary conditions between them are updated for each 1 msec.

Next, in Step 110 in FIG. 2, the calculation of deformation of the tire model (analysis A) is performed. In an ensuing Step 112, a determination is made as to whether or not the elapsed time is 1 msec or less. If YES is the answer in Step 112, the operation returns to Step 110 to perform the calculation of the deformation of the tire model again. If NO is the answer in Step 112, the operation proceeds to Step 114 to perform the calculation of the fluid (analysis B). In an ensuing Step 116, a determination is made as to whether or not the elapsed time is 1 msec or less. If YES is the answer, the operation returns to Step 114 to perform the calculation of the fluid again. If NO is the answer in Step 116, the operation proceeds to Step 118.

(Analysis A) Calculation of Deformation of Tire Model

The calculation of deformation of the tire model is performed on the basis of the finite element method using the tire model and the given boundary conditions. To obtain a transient state, the calculation of deformation of the tire model is repeated while the elapsed time (independent elapsed time) is 1 msec or less, and after the lapse of 1 msec the operation proceeds to the ensuing calculation (fluid).

(Analysis B) Calculation of Fluid

The calculation of the fluid is performed on the basis of the finite element method using the fluid model and the given boundary conditions. To obtain a transient state, the calculation of the fluid is repeated while the elapsed time (independent elapsed time) is 1 msec or less, and after the lapse of 1 msec the operation proceeds to the ensuing calculation (deformation of the tire model).

It should be noted that the calculation may be first started with either analysis A or analysis B, or the calculations may be effected in parallel. Namely, Steps 110 and 112 on the one hand, and Steps 114 and 116 on the other hand, may be shifted in order.

In addition, although in the aforementioned calculations (analysis A and analysis B) a description has been given of the case in which the calculation is repeatedly performed during a preferred elapsed time, i.e., the elapsed time (independent elapsed time) of 1 msec or less, the elapsed time in the present invention is not limited to 1 msec, and it is possible to adopt an elapsed time of 10 msec or less. The preferred elapsed time is 1 msec or less, and more preferably it is possible to adopt an elapsed time of $1\mu$ sec or less. Further, as this elapsed time, different time durations may be set for analysis A and analysis B.

In an ensuing Step 118, after independent calculations are respectively performed for 1 msec each with respect to the calculation of deformation of the tire model and the calculation of the fluid, in order to establish a linkage between them, the boundary surface of the fluid model is recognized in correspondence with the deformation of the tire model, and the boundary conditions are updated (details of which will be described later). In this Step 118, after the updating of the boundary conditions, the pressure calculated in the calculation of the fluid is added to the tire model as a boundary condition (surface force) of the tire model, so that the deformation of the tire model will be calculated in an ensuing calculation of deformation of the tire model (analysis A). Namely, on the fluid side, the surface geometry of the tire model after deformation is incorporated into the boundary conditions as a new wall, while, on the tire model side, the pressure of the fluid is incorporated into the boundary conditions as the surface force applied to the tire model. By repeating this step for every 1 msec, it is possible to artificially create transient flow concerning the estimation of tire performance. Here, 1 msec is the time within which it is possible to sufficiently represent the process in which the pattern within the ground contact plane undergoes deformation due to the tire rolling.

It should be noted that although in the above description the repeated time (independent elapsed time) for incorporation into the boundary conditions is set to 1 msec or less, the present invention is not limited to 1 msec, and it is possible to adopt a time duration of 10 msec or less. The preferred elapsed time is 1 msec or less, and more preferably it is possible to adopt a time duration of $1\mu$·sec or less.

In an ensuing Step 120, a determination is made to whether or not the calculations have been completed. If YES is the answer in Step 120, the operation proceeds to Step 122, while if NO is the answer in Step 120, the operation returns to Step 110 to perform the independent calculations of deformation of the tire model and of the fluid again for 1 msec each. Incidentally, it is possible to cite the following examples as specific methods of determination.

In a case where the tire model is a nonrolled model or a rolled model with a full-circumference pattern, the calculation is repeated until the object physical quantities (fluid reaction force, pressure, flow velocity, etc.) can be regarded as being in steady states (states in which the physical quantities can be regarded as being the same as those calculated before). When the calculation is completed, YES is given as the answer in the determination. Alternatively, the calculation is repeated until the deformation of the tire model can be regarded as being in the steady state. Further, the calculation may be finished when a predetermined time has elapsed. The predetermined time in this case is preferably 100 msec or more, more preferably 300 msec or more.

In a case where the tire model is a rolled model or a model in which only a portion of the pattern is modeled, the calculation is repeated until the deformation of the pattern portion which is subject to analysis is finished, and when the calculation is completed, YES is given as the answer in the determination. The deformation of the pattern portion means refers to the deformation persisting from the time the pattern portion is brought into contact with the road surface model due to rolling until it moves away from the road surface model, or from the time the pattern portion is brought into contact with the fluid model due to rolling until it comes into contact with the road surface model. This deformation of the pattern portion may be from the time the tire portion is brought into contact with each of the models after the tire has rolled by one revolution or more. Further, the calculation may be finished when a predetermined time has elapsed. The predetermined time in this case is preferably 100 msec or more, more preferably 300 msec or more.

Next, a detailed description will be given of Step 118 in FIG. 2. In the processing in which the boundary surface of the fluid is recognized in correspondence with the deformation of the tire model, and the boundary conditions are added, the processing routine shown in FIG. 14 is executed. First, in Step 158, to determine which portion of the fluid model (fluid region) 20 is hidden in a tire model 30, the interfering portion 40 between the fluid model 20 and the tire model 30 is calculated (see FIG. 15). This calculation is performed with respect to all the elements (fluid elements) obtained by dividing up the fluid model 20, i.e., the fluid region, into subregions.

In an ensuing Step 160, a determination is made as to whether or not the fluid element is completely hidden in the tire model. If the fluid element is completely hidden in the tire model, YES is given as the answer in the determination in Step 160, and the operation proceeds to Step 162 in which since this element is inside the tire model and the influx and efflux of the fluid doe not take place, a boundary condition is added thereto as a wall.

On the other hand, if NO is the answer in Step 160, the operation proceeds to step 164 to determine whether or not a portion of the fluid element is hidden in the tire model. If a portion of the fluid element is hidden in the tire model, YES is given as the answer in the determination in Step 164, and in an ensuing Step 166 a sectional face, i.e., a plane which bisects the fluid element by a surface 32 of the tire model 30, is calculated (see FIGS. 16A and 16B). In an ensuing Step 168, a fluid element 22 is further divided by this sectional face. In an ensuing Step 170, the region 22a which is not hidden in the tire model among the divided fluid elements is defined newly as a fluid model (fluid region), and this portion is used in the calculation of the fluid. In addition, the plane which corresponds to the sectional face of the new fluid element is in contact with the tire model, a boundary condition as a wall is added thereto.

It should be noted that since the division of the divided fluid elements into further smaller portions leads to an increase in the calculation time and is therefore not desirable. Hence, it is preferable to set a limit to the division of the fluid elements (in this case, a limit that a once-divided element is not subdivided).

In an ensuing Step 172, a determination is made as to whether or not the above-described processing has been carried out for all the fluid elements. If an unprocessed fluid element remains, NO is given as the answer in Step 172, and the operation returns to Step 158. On the other hand, if the above-described processing has been completed for all the fluid elements, this routine ends. In consequence, it is possible to incorporate the surface geometry of the tire model into the calculation of the fluid as boundary conditions.

Thus the technique whereby the tire model and the fluid model can be defined in a partially overlapping manner is able to substantially reduce the time and trouble required in the construction of a computed model. Furthermore, by bisecting the fluid element which is partially hidden in the tire model, it is possible to obtain a large initial fluid mesh, with the result that it is possible to prevent an increase in the calculation time due to an increase in the number of fluid elements, thereby making it possible to perform the performance estimation efficiently.

After thus performing analysis A, analysis B, and the change in the boundary conditions for their linkage, the operation returns to analysis A, and the calculation is performed under the changed boundary conditions. This step is repeated until the completion of the calculation, and when the calculation is completed, YES is given as the answer in Step 120 in FIG. 2, and the operation proceeds to Step 122 to output the results of calculation as the results of estimation and evaluate the results of estimation.

Although a description has been given above of the case in which analysis A, analysis B, and the change in the boundary conditions are repeated, and when the calculation is completed, the results of calculation are outputted (evaluated), while the repeated calculation is being made, the results of calculation at that point of time may be outputted, and its output may be evaluated, or its outputs may be evaluated consecutively. In other words, outputs and evaluations may be made during the calculation.

As the output of the results of estimation, it is possible to adopt values or distributions of the flow velocity, the volume of flow, pressure, energy, and the like. Specific examples of the output of the results of estimation include the output of fluid reaction force, the output and visualization of the fluid flow, and the output and visualization of the distribution of water pressure. The fluid reaction force is the force with which the fluid (e.g., water) pushes the tire upward (see FIG. 22). The fluid flow can be calculated from the velocity vector of the fluid, and if its flow, the tire model and its vicinities, and the pattern and its vicinities are altogether represented in a diagram or the like, the fluid flow can be visualized. As for the visualization of the distribution of water pressure of the fluid, it suffices if the tire model and its vicinities and the pattern and its vicinities are plotted in a diagram, and values of water pressure are represented on the diagram in corresponding colors and patterns.

In addition, as the evaluation, it is possible to adopt, among others, a subjective evaluation (determination as to whether the fluid is flowing smoothly on the whole, the presence of disturbance in the direction of flow, etc.), as well as such criteria as whether pressure and energy have not increased locally, whether a necessary volume of flow has been obtained, whether hydrodynamic force has not increased, whether the flow has not stagnated, and so on. Further, in the case of the pattern, it is possible to adopt whether the fluid is flowing along the grooves. In addition, in the case of the tire model, it is possible to adopt whether the amount of forward spray is large in which case, as the tire rotates, the tire at its ground contact surface and in its vicinity nips the fluid such as water and pushes it forward, and whether the fluid is flowing laterally on the road surface.

It should be noted that, as for the evaluation of the results of estimation, an evaluation value can be determined by numerically expressing to what extent the output values and the distribution of the output values agree with predetermined allowable values and allowable characteristics by using the output values of the results of estimation and the distribution of the output values.

Accordingly, from the evaluation of the results of estimation, it is possible to determine whether or not the estimated performance is satisfactory. This determination may be made by entry from a keyboard, or after setting an allowable range in advance with respect to the aforementioned evaluation value, a determination may be made that the estimated performance is satisfactory if the value of evaluation of the results of estimation falls within the allowable range.

If the estimated performance is unsatisfactory relative to the targeted performance as a result of the evaluation of the estimated performance, the processing may be stopped at this point of time, and the design of the tire may be started over again (the foregoing processing is carried out again) after altering (correcting) the draft design. Still alternatively, the results of evaluation of the estimated performance may be stored, and may be referred to at the time of optimization.

After the initial tire-performance estimation processing is thus completed, the operation proceeds to Step 206 in FIG. 35, in which an initial value OBJo of the objective function OBJ and an initial value Go of the constraint G when the design variable $r_i$ is at an initial value ro are calculated.

In an ensuing Step 208, the design variable $r_i$ is changed by $\Delta r_i$ each so as to change the basic model of the tire. In an ensuing Step 210, a distance $r_m$ between the reference point P and an innermost node other than an innermost node $Q_i$ corresponding to the design variable is calculated in accordance with the following formulae:

$$r_m = \sum_{i=1}^{n} N_i \cdot r_i \qquad (2)$$

$$N_i = \prod_{\substack{j=1 \\ j \neq i}}^{n} (\theta_m - \theta_j) \bigg/ \prod_{\substack{j=1 \\ j \neq i}}^{n} (\theta_m - \theta_j)$$

where $\theta_m$ is an ascending angle formed between the reference line and a straight line connecting that node and the reference point P.

In addition, in Step 210, a distance between the innermost node $Q_i$ and an node on the normal line other than the innermost node (a node on the carcass line), i.e., each node on the line OL representing the outer configuration of the tire, on the turn-up ply line PL, and on the lines B1, B2 representing the belts, is determined. The distance thus determined is added to the coordinates at the innermost node Qi so as to determine the coordinates of the node other than the innermost node on the normal line. Thus, the cross-sectional shape of the tire after the design variable is changed by $\Delta r_i$, i.e., a corrected model of the tire, is determined.

When the corrected model of the tire is thus determined, in an ensuing Step 212, tire-performance estimation processing of the corrected tire model is executed in the same way as in the above-mentioned Step 204 (i.e., the processing in Steps 110 to 122 in FIG. 2). Incidentally, in Step 212, if the tire-performance estimation processing is executed, in the same way as described above, from the evaluation of the results of estimation, it is possible to determine whether or not the estimated performance is satisfactory. This determination may be made by entry from a keyboard, or after setting an allowable range in advance with respect to the aforementioned evaluation value, a determination may be made that the estimated performance is satisfactory if the value of evaluation of the results of estimation falls within the allowable range. On the other hand, if the estimated performance is unsatisfactory relative to the targeted performance as a result of the evaluation of the estimated performance, the processing may be stopped at this point of time, and the design of the tire may be started over again (the foregoing processing is carried out again) after altering (correcting) the draft design. Still alternatively, the results of evaluation of the estimated performance may be stored, and may be referred to, as required.

In Step 214, a value $OBJ_i$ of the objective function and a value $G_i$ of the constraint after the design variable is changed by $\Delta r_i$ are calculated with respect to the corrected model of the tire determined in Step 210. In Step 116, a sensitivity $dOBJ/dr_i$ of the objective function, which is a ratio of an amount of change of the objective function to an amount of unit change of the design variable, as well as a sensitivity $dG/dr_i$ of the constraint, which is a ratio of an amount of change of the constraint to an amount of unit change of the design variable, are calculated for each design variable in accordance with the following formulae:

$$\frac{dOBJ}{dr_i} = \frac{OBJ_i - OBJo}{\Delta r_i} \quad (3)$$

$$\frac{dG}{dr_i} = \frac{G_i - Go}{\Delta r_i}$$

By means of these sensitivities, it is possible to estimate to what extent the value of the objective function and the value of the constraint change when the design variable is changed by $\Delta r_i$. It should be noted that these sensitivities are sometimes determined analytically depending on the technique used in modeling the tire and the nature of the design variable, in which case the calculation of Step 214 becomes unnecessary.

In an ensuing Step 218, an amount of change of the design variable which maximizes the objective function while satisfying the constraint is estimated by means of mathematical programming by using the initial value OBJo of the objective function, the initial value Go of the constraint, the initial value ro of the design variable, and the sensitivities. In Step 220, by using this estimated value of the design variable, a corrected model of the tire is determined in a method similar to that of Step 210, and a value of the objective function is calculated.

After the corrected model of the tire is determined in this Step 220, in an ensuing Step 222, tire-performance estimation processing of the corrected tire model is executed in the same way as in the above-mentioned Step 204 (i.e., the processing in Steps 110 to 122 in FIG. 2). Incidentally, in Step 222, if the tire-performance estimation processing is executed, in the same way as described above, from the evaluation of the results of estimation, it is possible to determine whether or not the estimated performance is satisfactory. This determination may be made by entry from a keyboard, or after setting an allowable range in advance with respect to the aforementioned evaluation value, a determination may be made that the estimated performance is satisfactory if the value of evaluation of the results of estimation falls within the allowable range. On the other hand, if the estimated performance is unsatisfactory relative to the targeted performance as a result of the evaluation of the estimated performance, the processing may be stopped at this point of time, and the design of the tire may be started over again (the foregoing processing is carried out again) after altering (correcting) the draft design. Still alternatively, the results of evaluation of the estimated performance may be stored, and may be referred to, as required.

In an ensuing Step 224, a determination is made as to whether or not the value of the objective function has converged by comparing a threshold value inputted in advance with the difference between the value OBJ of the objective function calculated in Step 220 and the initial value OBJo of the objective function calculated in Step 206. If the value of the objective function has not converged, Steps 206 through 224 are executed repeatedly by setting as the initial value the value of the design variable determined in Step 218. If it is determined that the value of the objective function has converged, the value of the design variable at this juncture is set as the value of the design variable which maximizes the objective function while satisfying the constraint, and the shape of the tire is determined in Step 226 by using this value of the design variable.

Thus, in this embodiment, a design variable which imparts an optimum value of the objective function satisfying the constraint is determined while simulating the tire model, the fluid model, and the road surface condition, and the tire is designed on the basis of this design variable. Therefore, unlike the conventional design and development based on trial and error, the process ranging from the design of a best mode to the performance evaluation of the designed tire becomes possible based principally on computer calculation. Hence, it is possible to attain remarkably high efficiency, thereby permitting a reduction in the cost required in development.

Although, in the above-described embodiment, the Lagrange interpolation method and the like are used as methods of representing the shapes of lines, in addition to these methods interpolation may be effected by using the circular-arc interpolation method or spline curves, B-spline curves, Bezier curves, NURBS (non-uniform rational B-splines), or the like which are shown in Mathematical Elements for Computer Graphics (by David F. Rogers and J. Alan Adams).

Although, in the above-described embodiment, a description has been given of the case in which the tire is designed by using the configuration of the carcass line as the design variable, the present invention is not limited to the same, and the configuration of the carcass line may be changed by using the nodes on the carcass line. Furthermore, in addition to the configuration of the carcass line as the design variable, the shape of the turn-up ply line, the line representing the outer configuration of the tire, the lines of reinforcing members, and the like may be adopted as the design variables.

In addition, this embodiment can be applied to the determination of the shapes of a plurality of lines. Namely, it is possible to determine the shape of the carcass line, the shape of the turn-up ply line, and the outer configuration of the tire which improve steering stability without impairing the riding comfort of the occupant in the vehicle. In this case, as the objective function, it is preferable to use the lateral stiffness which is a physical quantity for improving the steering stability, while, as the constraint, it is preferable to adopt the condition that a vertical 1st order natural frequency, i.e., a physical quantity for governing the riding comfort, is fixed. It suffices to determine the shape of the carcass line, the shape of the turn-up ply line, and the outer configuration of the tire which maximizes the lateral stiffness under the condition of the vertical 1st order natural frequency being fixed. As the design variables, it suffices to adopt the turn-up ply line and the line representing the outer configuration of the tire. Incidentally, as for the number of lines to be adopted as the design variables, a plurality of, i.e., two or more, lines may be adopted as the design variables.

The determination of the shapes of a plurality of lines can be applied to the determination of the shapes of a bead filler of the tire and its surrounding members. Namely, it is possible to determine the shape of the bead filler and the shape of a rubber chafer for alleviating the rolling resistance without impairing the durability of the bead portion. In this case, it is preferable to set the rolling resistance value as the objective function and adopt as the constraint the condition that the principal strain occurring at a turn-up ply end under a load is within +3% of the initial structure. In addition, as the design variables, it is preferable to use lines defining an outer configuration (gauge distribution) of the bead filler and a boundary line between the rubber chafer and side rubber.

In addition, the determination of the shapes of a plurality of lines can be applied to the determination of the thickness of belt layers in a belt portion, and it is possible to determine the gauge distribution of the belt layers for alleviating the rolling resistance without impairing the durability of the belt portion. In this case, it is preferable to use the rolling resistance value as the objective function and use as the constraint the condition that main strains occurring at a belt end and a ply end under a load are within +3% of the initial structure. In addition, as the design variables, lines representing the respective belt layers are used, and as one or a plurality of lines are changed, it is possible to determine the gauge distribution of the belt layers for optimizing the objective function.

In addition, the present invention can be applied to a belt structure. In this case, it is possible to improve the durability by minimizing strain concentrations occurring in the belt portion without increasing the weight of the belt portion. In this case, it is preferable to set as the objective function a maximum value of a main strain occurring between the respective belt layers under a load, and to adopt as the constraint the condition that the total weight of the belt is within +1% of the total weight of the initial structure. Further, as the design variables, it is possible to use the angle, placement (e.g., the number of placements and placing strength), and width of each belt layer.

In addition, the present invention can be applied to the determination of the shape of the crown portion of the tire. In this case, it is possible to make uniform the pressure distribution of a contact area and improve the wear resistance performance without changing the configuration of the area of contact between the tire and the ground. In this case, it is preferable to set as the objective function a standard deviation of a pressure distribution in the contact area, and adopt as the constraint the condition that the contact length in the circumferential direction of the tire at the center of the crown portion and the belt end is within ±5% of the contact length in the initial configuration. Further, as the design variable, it is preferable to use the configuration of the crown portion, which is determined by a Lagrange interpolation routine or the like.

In another application of the determination of the shape of the crown portion of the tire, it is preferable to set as the objective function a standard deviation of a pressure distribution in the contact area, and adopt as the constraint the condition that the contact length in the circumferential direction of the tire at the center of the crown portion and the belt end is within ±5% of the contact length in the initial configuration. As for the shape of the crown portion which is the design variable, a predesignated range of the crown portion should preferably be approximated by a plurality of circular arcs.

In addition, the present invention can be applied to the determination of the configuration of the pattern surface of a tire. In this case, it is possible to make uniform the pressure distribution at a time when the pattern is in contact with the ground, and improve the wear resistance performance. It is preferable to set as the objective function a standard deviation of a pressure distribution in the contact area, and adopt as the constraint the condition that the total volume of the pattern is within ±5% of the initial volume. Further, as for the configuration of the pattern surface which is the design variable, it is preferable to divide the pattern surface into the form of a lattice in accordance with the order of Lagrange interpolation inputted in advance, and to set as the design variable a coordinate in the thickness-side direction of the pattern at each point thus obtained.

The aforementioned determinations need not be carried out independently, and various combinations are possible such as by simultaneously carrying out the determination of the ply lines and the determination of the belt structure, or by carrying out the determination of the configuration of the crown portion by using the ply lines.

[Fifth Embodiment]

Next, a description will be given of a fifth embodiment. Although in the foregoing embodiments a description has been given of the case in which a draft design to be adopted is determined by repeating the estimation and evaluation of tire performance with respect to one draft design while correcting the draft design, in this embodiment a draft design to be adopted is determined from among a plurality of draft designs. Specifically, the configuration of a carcass line is designed genetically by means of an algorithm so as to render the belt tension in the circumferential direction of the tire when inflated with air a maximum value, i.e., an optimum value, in order to improve steering stability. It should be noted that since the arrangement of this embodiment is substantially similar to that of the above-described embodiments, identical portions will be denoted by the same reference numerals, and a detailed description thereof will be omitted.

Figure 40:
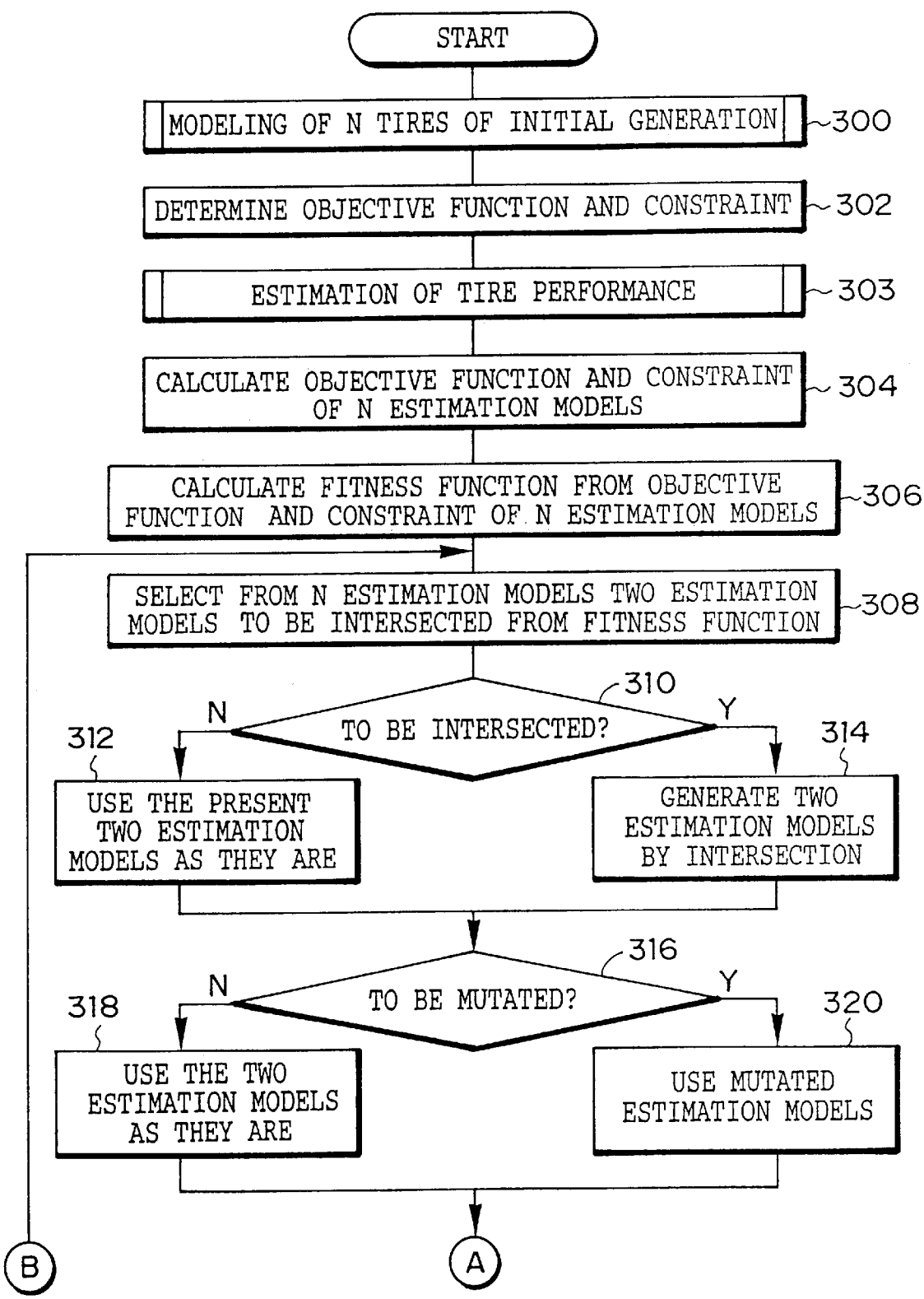
FIG. 40 is a flowchart illustrating the flow of processing in accordance with a fifth embodiment of the invention.
Figure 40:
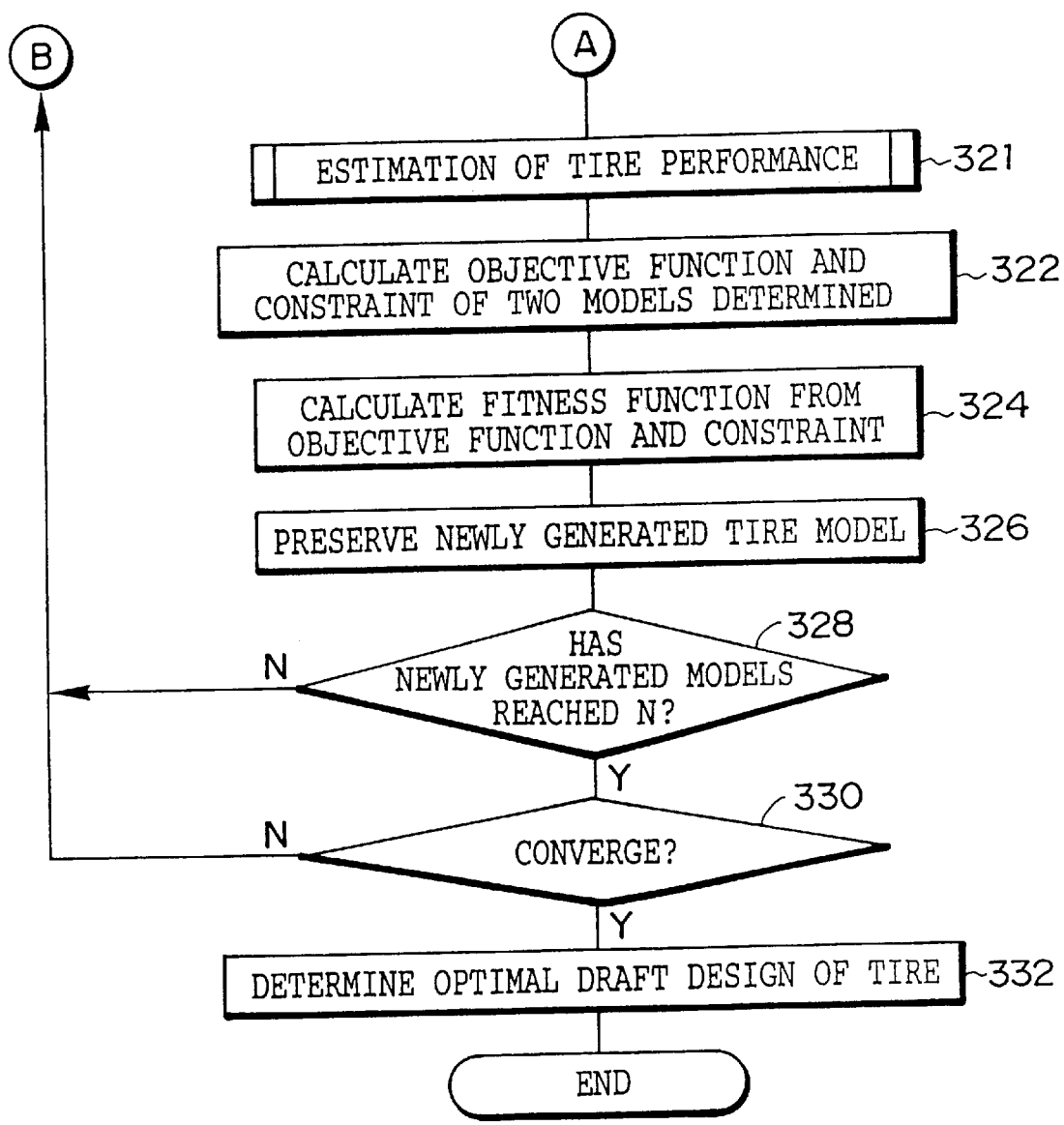

FIG. 40 shows a processing routine of the program in accordance with the second embodiment. In Step 300, cross-sectional configurations of N tires are subjected to modeling by a technique which is capable of numerically and analytically determining the belt tension in the circumferential direction of the tire when inflated with air such as by the finite element method, and a basic model of the tire including its internal structure is determined. It should be noted that N is inputted in advance by the user. The basic model of the tire used in this embodiment is similar to the one shown in FIG. 37. In addition, in the same way as in the embodiment, the basic model of the tire may be divided into a plurality of elements by a plurality of lines normal to a line representing an outer configuration of the tire or by a plurality of lines normal to a turn-up ply line, or may be divided into arbitrary shapes such as triangles depending on a design objective.

In an ensuing Step 302, an objective function representing a physical quantity for evaluating tire performance, a constraint for constraining the cross-sectional shape of the tire, and design variables for determining the cross-sectional shapes of N tire models are determined. In this embodiment, the objective function OBJ and the constraint G are defined as follows in order to design the configuration of the carcass line for maximizing the belt tension in the circumferential direction of the tire when inflated with air, so as to improve the steering stability:

Objective function OBJ: the sum total, in the widthwise direction of the tire, of components of the belt tension acting in the circumferential direction of the tire Constraint G: A periphery value of the carcass line is within ±5% of a set value.

It should be noted that the aforementioned periphery value of the carcass line can be calculated as the sum total of distances between nodes (points of intersection between the carcass line and the respective normal line) in the carcass line which are located in a domain that changes the tire shape.

In addition, the configuration of the carcass line, which is a design variable, is determined by the above-described Lagrange interpolation routine, shown in FIG. 36, for approximating a curve with respect to the N tire models, respectively. Since this Lagrange interpolation routine is similar to that of the fourth embodiment, a description thereof will be omitted.

By repeating the Lagrange interpolation routine N times, the objective function OBJ, the constraint G, and respective design variables $r_{iJ}$ (J=1, 2, . . . , N) of the N tire models are determined. Subsequently, in Step 303, in the same way as in Step 204 in FIG. 35 referred to above (i.e., the processing of Steps 110 to 122 in FIG. 2), tire-performance estimation processing is executed with respect to each of the N tire models of the initial generation. It should be noted that, in Step 303, when the tire-performance estimation processing is executed, from the evaluation of the results of estimation it is possible to determine whether or not the estimated performance is satisfactory. In this step, an arrangement is provided such that the output of the results of estimation and the results of evaluation of the estimated performance can be stored and can be referred to, as required.

Upon completion of the tire-performance estimation processing, in Step 304 in FIG. 40, objective functions $OBJ_J$ and constraints $G_J$ are calculated for the respective design variables $r_{iJ}$ of the N tire models. In an ensuing Step 306, by using the objective functions $OBJ_J$ and constraints $G_J$ of the N tire models determined in Step 304, adaptive functions $F_J$ of the N tire models are calculated in accordance with the following Formulae (4). In this embodiment, the value of the adaptive function (degree of fitness) becomes larger as the belt tension becomes larger so as to maximize the belt tension.

$$\Phi_J = -OBJ_J + \gamma \cdot \max(G_J, O)$$
$$F_J = -\Phi_J \quad (4)$$

or $$F_J = 1/\Phi_J$$

or $$F_J = -a \cdot \Phi_J + b$$

where, $$a = \frac{\Phi_{avg}(c-1)}{(\Phi_{avg} - \Phi_{min})}$$

$$b = \frac{\Phi_{avg}(c - \Phi_{min})}{(\Phi_{avg} - \Phi_{min})}$$

$$\Phi_{avg} = \frac{\sum_{j=1}^{N} \Phi_j}{N}$$

c: constant
γ: penalty coefficient
$\Phi_{min}$: $\min(\Phi_1, \Phi_2, \ldots \Phi_N)$
$\Phi_j$: penalty function of a J-th tire model among the N tire models (J=1, 2, 3, . . . , N)

It should be noted that c and g are inputted in advance by the user.

In an ensuing Step 308, two models to be crossed over each other are selected from among the N models. As the method of selection, a fitness proportion strategy, which is generally known, is used. A probability $P_1$ with which certain individuals 1 among the N tire models are each selected in the selection is expressed by the following formula:

$$P_1 = \frac{F_1}{\sum_{j=1}^{N} F_j}$$

where, $F_1$: adaptive function of a certain individual 1 among the N tire models $F_J$: J-th adaptive function among the N tire models (J=1, 2, 3, . . . , N)

Although, in the above-described embodiment, the fitness proportion strategy is used as the method of selection, it is possible to alternatively use an expectation value strategy, a rank strategy, an elite preservation strategy, a tournament selection strategy, a GENITOR algorithm, or the like, as shown in "Genetic Algorithms" (edited by Hiroaki Kitano).

In an ensuing Step 310, a determination is made as to whether or not the two selected tire models are to be crossed over each other by a probability T inputted in advance by the user. The term crossover used herein means the exchange of certain elements of two tire models, as will be described later. If NO is the answer in the determination and crossover is not be carried out, in Step 312, the present two tire models are kept intact, and the operation proceeds to Step 316. Meanwhile, if YES in the answer in the determination and crossover is to be carried out, in Step 314, the two tire models are crossed over each other, as will be described later.

Figure 41:
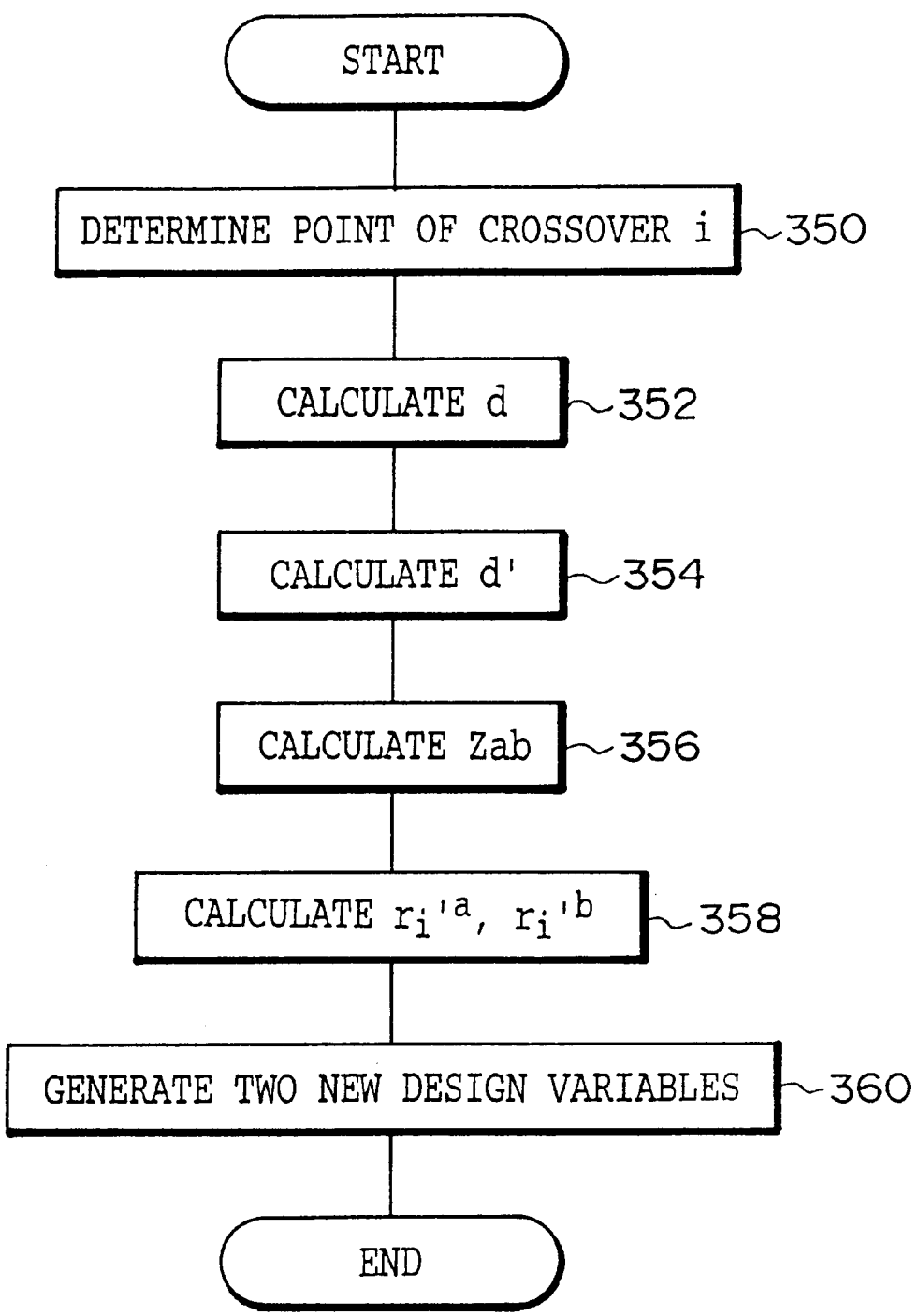
FIG. 41 is a flowchart illustrating the flow of intersection processing.

The crossover of the two tire models is carried out in accordance with an intersection routine shown in FIG. 41. First, the two tire models selected in Step 308 in FIG. 40 are set as a tire model a and a tire model b, and the design variables of the tire models a and b are expressed by design variable vectors including lists. The design variable vectors of the tire model a are set as $Vr^a = (r_1^a, r_2^a, \ldots, r_i^a, \ldots, r_{n-1a})$, while the design variable vectors of the tire model b are set as $Vr^b = (r_1^b, r_2^b, \ldots, r_i^b, \ldots r_{n-1}^b)$.

In Step 350 in FIG. 41, predetermined random numbers are generated, and a point of crossover i concerning the design variable vectors of the tire models a, b is determined in accordance with the random numbers. In an ensuing Step 352, a distance d is determined in accordance with the following formula with respect to the design variables $r_1^a$, $r_1^b$ of the tire models a, b which are determined to cross over each other:

$$d = |r_i^a - r_i^b|$$

In an ensuing Step 354, a normalized distance d' is determined in accordance with the following formula by using a minimum value $B_L$ and a maximum value BU which fall in ranges that can be assumed by $r_1^a$, $r_1^b$.

$$d' = \frac{d}{B_u - B_L}$$

Figure 42A:
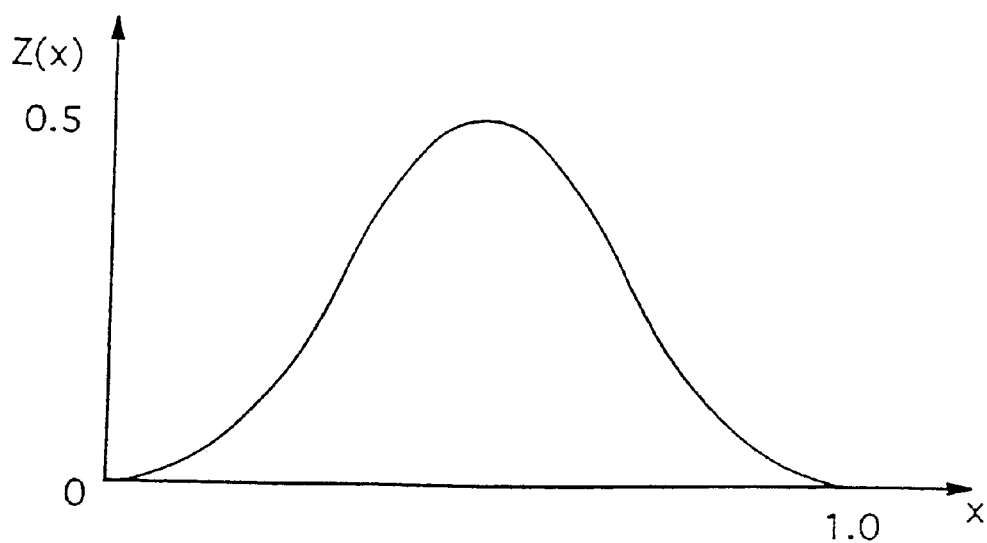
FIG. 42A is a diagram illustrating a continuous chevron-shaped mapping function.
Figure 42B:
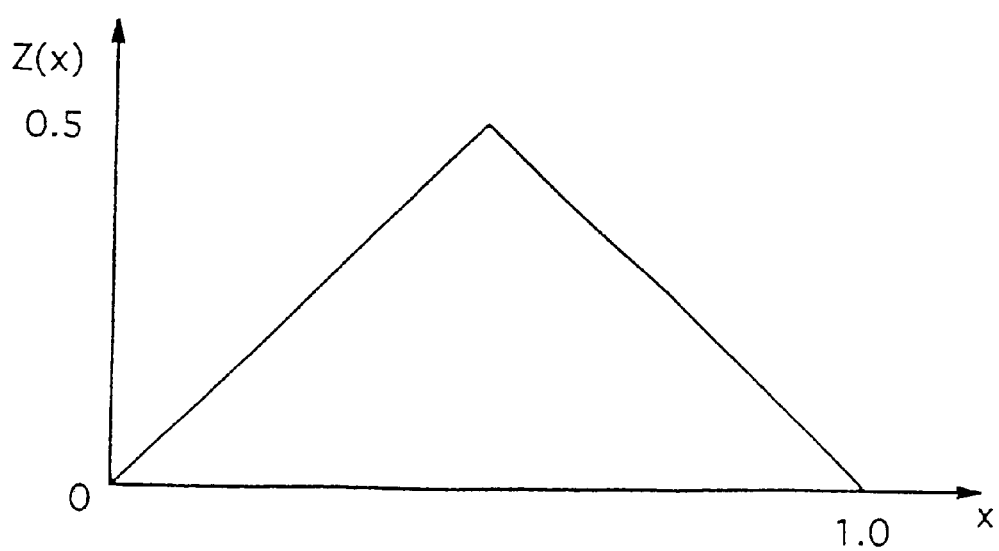
FIG. 42B is a diagram illustrating a linear chevron-shaped mapping function.

In Step 356, to disperse the values of the normalized distance d' appropriately, a function $Z_{ab}$ is determined in accordance with the following formula by using a chevron-shaped mapping function Z(x) ($0 \leq x \leq 1$, $0 \leq Z(x) \leq 0.5$) such as the one shown in FIG. 42A or FIG. 42B:

$$Z_{ab}=Z(d')$$

After the function Zab is thus determined, new design variables $r_i'^a$, $r_i'^b$ are determined in accordance with the following formulae in Step 358.

$$r_i'^a = r_i^a - \frac{\min(|r_i^a - B_L|, |r_i^a - B_u|)}{0.5} \cdot Z_{ab}$$

$$r_i'^b = r_i^b + \frac{\min(|r_i^b - B_L|, |r_i^a - B_u|)}{0.5} \cdot Z_{ab}$$

or $$r_i'^a = r_i^a + \frac{\min(|r_i^a - B_L|, |r_i^a - B_u|)}{0.5} \cdot Z_{ab}$$

$$r_i'^b = r_i^b - \frac{\min(|r_i^b - B_L|, |r_i^a - B_u|)}{0.5} \cdot Z_{ab}$$

After $r_i'^a$ and $r_i'^b$ are thus determined, in Step 360, design variable vectors $V_r'^a$ and $V_r'^b$ which are lists of new design variables are determined as follows:

$$Vr'^a = (r_1^a, r_2^a, \ldots, r_i'^a, r_{i+1}^b, \ldots, r_{n-1}^b)$$

$$Vr'^b = (r_1^b, r_2^b, \ldots, r_i'^b, r_{i+1}^a, \ldots, r_{n-1}^a)$$

It should be noted that the minimum value $B_L$ and the maximum value $B_U$ which fall in ranges that can be assumed by $r_1^a$, $r_1^b$ are inputted in advance by the user. In addition, the mapping functions Z(x) may be trough-shaped functions such as those shown in FIGS. 43A and 43B. Although there is only one point of crossover i in the above-described example, it is possible to alternatively use a multipoint crossover or uniform crossover such as those shown in "Genetic Algorithms" (edited by Hiroaki Kitano).

After two new tire models are generated by such a crossover, in Step 316 in FIG. 40, a determination is made as to whether or not a mutation is to take place at a probability S inputted in advance by the user. The term mutation referred to herein means changing a portion of the design variable by an infinitesimal degree, and is aimed at enhancing the probability of including a population capable of assuming optimum design variables. If NO is the answer in the determination in Step 316 and a mutation is not to take place, in Step 318, the present two tire models are kept intact, and the operation proceeds to an ensuing Step 321. If YES is the answer in the determination and a mutation is to take place, mutation processing is carried out as follows in an ensuing Step 320.

Figure 44:
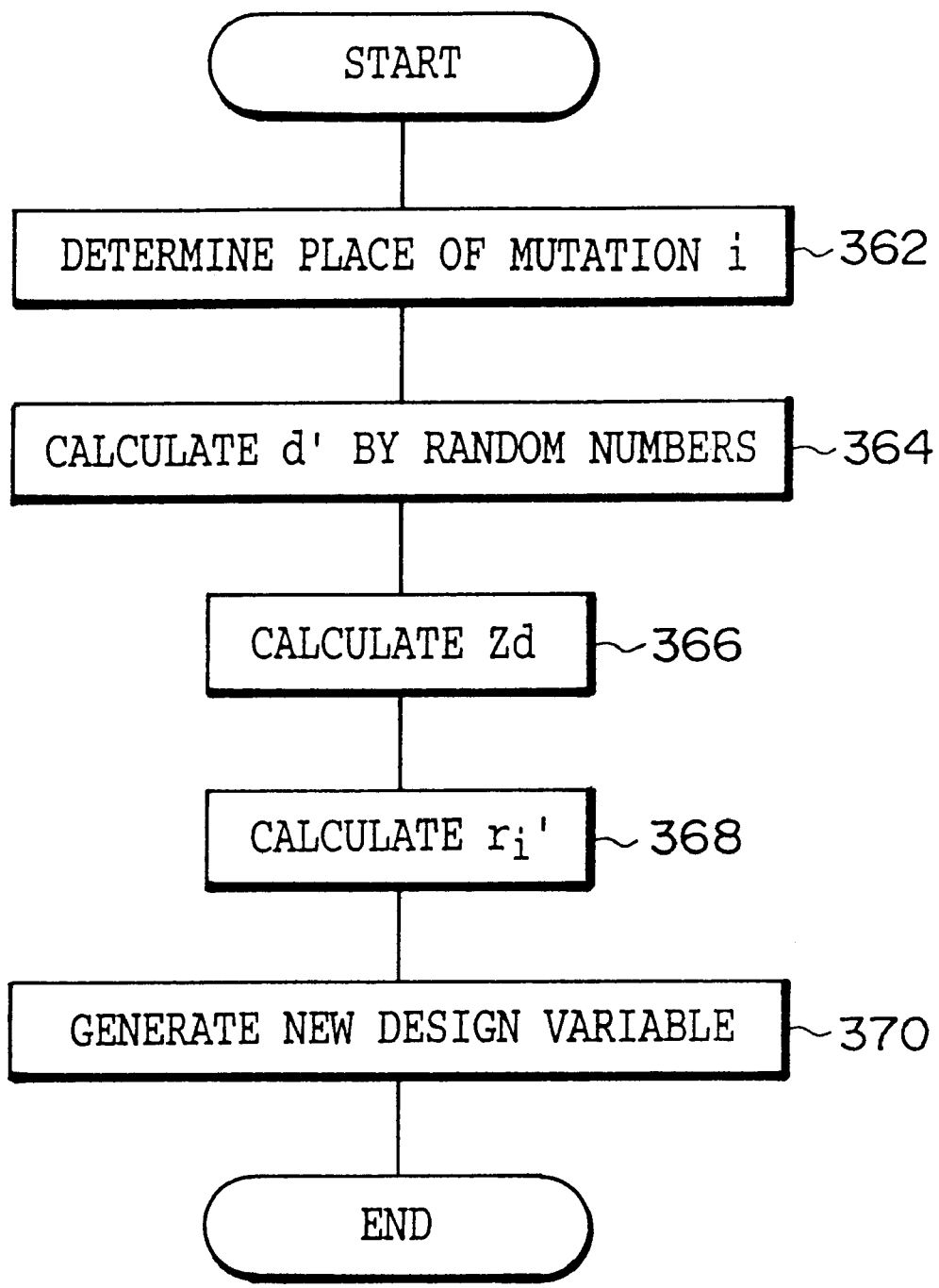
FIG. 44 is a flowchart illustrating the flow of mutation processing.

This mutation is carried out by a mutation routine shown in FIG. 44. First, in Step 362, random numbers are generated, and the place of mutation i is determined by the random numbers. In an ensuing Step 364, the distance d' is determined by the random numbers in the following range:

$$0 \leq d' \leq 1$$

In an ensuing Step 366, the function Zd is determined in accordance with the following formula by using the chevron-shaped mapping function Z(x) ($0 \leq x \leq 1$, and $0 \leq Z(x) \leq 0.5$) such as the one shown in FIG. 42A or 42B or the trough-shaped function such as the one shown in FIG. 43A or 43B:

$$Zd = Z(d')$$

After the function Zd is thus determined, in Step 368, a new design variable $r_i'$ is determined in accordance with the following formula:

$$r_i' = r_i - \frac{\min(|r_i - B_L|, |r_i - B_u|)}{0.5} \cdot Zd$$

$$r_i' = r_i + \frac{\min(|r_i - B_L|, |r_i - B_u|)}{0.5} \cdot Zd$$

After the design variable $r_i'$ is thus determined, a design variable vector Vr', i.e., a list of new design variables which is determined in Step 370, becomes as follows:

$$Vr' = (r_1, r_2, \ldots, r_i', r_{i+1}, \ldots, r_{n-1})$$

In an ensuing Step 321, in the same way as Step 303 (Step 204 in FIG. 35), tire-performance estimation processing is executed for each tire model with respect to the two tire models newly generated in the above-described manner. It should be noted that, in Step 321, when the tire-performance estimation processing is executed, from the evaluation of the results of estimation it is possible to determine whether or not the estimated performance is satisfactory. In this step, an arrangement is provided such that the output of the results of estimation and the results of evaluation of the estimated performance can be stored and can be referred to, as required.

In an ensuing Step 322, with respect to the newly generated two tire models, the value of the objective function and the value of the constraint are calculated. In an ensuing Step 324, an adaptive function is calculated from the resultant values of the objective function and the constraint by using Formula (4) in the same way as in the preceding embodiment.

In an ensuing Step 326, the aforementioned two tire models are preserved. In an ensuing Step 328, a determination is made as to whether or not the number of tire models preserved in Step 326 has reached N, and if it has not reached N, Steps 308 through 328 are executed repeatedly until it reaches N. Meanwhile, if the number of tire models has reached N, a determination is made with respect to convergence in Step 330. If a convergence has not been attained, the N tire models are updated to the tire models preserved in Step 326, and Steps 308 through 330 are executed repeatedly. Meanwhile, if it is determined in Step 330 that a convergence has been attained, the values of the design variables of a tire model which give a maximum value of the objective function while substantially satisfying the constraint among the N tire models are set as values of the design variables which maximize the objective function while substantially satisfying the constraint. In Step 332, the configuration of the tire is determined by using the values of these design variables.

It should be noted that, as for the determination with respect to convergence in Step 330, it is assumed that a convergence has been attained if any one of the following conditions is met:

1) The number of generations has reached M.
2) The number of line rows in which the value of the objective function is the largest has accounted for q% or more of the total.
3) The maximum value of the objective function is not updated in subsequent p generations.

It should be noted that M, q, and P are inputted in advance by the user. In addition, as the determination on the convergence, the output of the tire performance can be used. Thus, in this embodiment, since the amount of calculation increases as compared to the fourth embodiment, the time required for design and development increases slightly. However, there is an advantage in that tires of a better performance can be designed.

It should be noted that, by applying this embodiment to the belt structure, it is possible to determine a belt structure for optimizing mutually incompatible performances for improving steering stability without impairing the riding comfort of the occupant in the vehicle. In this case, this determination can be realized by making different the selection of the objective function, the constraint, and the design variables, as well as the method of crossover and the method of mutation. For example, by using as the objective function the lateral stiffness, i.e., a physical quantity for improving the steering stability, and by using as the constraint the condition that vertical stiffness, i.e., a physical quantity for governing the riding comfort, is fixed, it is possible to determine a belt structure such that the lateral stiffness become maximum under the condition of the vertical stiffness being fixed. In addition, although the belt structure is adopted as the design variable, other reinforcing members and the like may be set as design variables. Further, this embodiment is applicable in a determination as to whether a reinforcing member and the like are to be placed in the bead portion. Further, this embodiment may be applied to the determination of the configuration of blocks of the tire having blocks. In this case, it is possible to reduce the difference in rigidity among blocks having different sizes and arranged in the circumferential direction of the tire, and to improve the irregular wear performance by a pattern which makes uniform the block rigidity in various directions in one block.

In this case, as the objective function representing a physical quantity for evaluating the performance of the block, it is preferable to use the block rigidity in various directions being made uniform. As constraints, there are those which constrain the area of the block, the sipe length, the sipe length×the sipe depth, the number of sipes and the like, and it is preferable to adopt as the constraints the conditions that the amount of change in the sipe length is within ±5% of the sipe length in an initial model, that the coordinates of the node of the sipe are within a figure enclosed by the coordinates of the nodes of the block, and that the distance between the coordinates of a node of the sipe and a straight line representing an outer portion of the block is 2 mm or more. In addition, as the design variables, there are those which concern the coordinates of the nodes of the block, the coordinates of the nodes of the sipe, the groove angle at each side of the block, the groove depth at each side of the block, the sipe width, the angle at which the sipe is embedded, and the sipe depth. As the design variable, it is preferable to use the coordinates of the nodes of the sipe (coordinates of the nodes of the block are fixed).

It should be noted that the fourth embodiment and the fifth embodiment may be combined. Namely, in a case where the objective function and the constraint are calculated on the basis of a draft design obtained through a crossover and/or a mutation, this may not lapse into a local optimal solution as described in Goldberg, D. E., "Genetic Algorithms in Search, Optimization and Machine Learning," Addison-Wesley (1989), and yet there is a problem in that it is difficult to obtain a true optimal solution. Accordingly, if the respective methods are combined, the aforementioned problem can be overcome. As the method for obtaining a true optimal solution without lapsing into a local optimal solution, apart from the technique described herein, it is possible to combine the method of this embodiment with a method called simulated annealing which is described in the aforementioned reference.

[Sixth Embodiment]

In this embodiment, the invention is applied to an optimization analyzer for determining optimum design parameters of a tire. In the optimization analyzer of this embodiment, design parameters are determined by optimization computation by using as a transformation system a post-learning neural network which is a nonlinear prediction technique in which a neuro circuit network of the higher animal is modeled in engineering. It should be noted that since the arrangement of this embodiment is substantially similar to those of the above-described embodiments, identical portions will be denoted by the same reference numerals, and a detailed description thereof will be omitted.

An optimizer 60 for carrying out the optimization in accordance with this embodiment can be implemented by a similar configuration as that of the personal computer for carrying out the method of designing a pneumatic tire shown in FIG. 1. By using a neural network based on a nonlinear prediction technique in accordance with a program stored in advance, the main unit 12 of the computer estimates tire performance on the basis of design parameters of the shape, structure, pattern, and the like of the tire, and computes a design variable for satisfying a constraint and optimizing (e.g., maximizing or minimizing) an objective function. The CRT 14 displays such as the results of computation by the main unit 12 of the computer.

Figure 45:
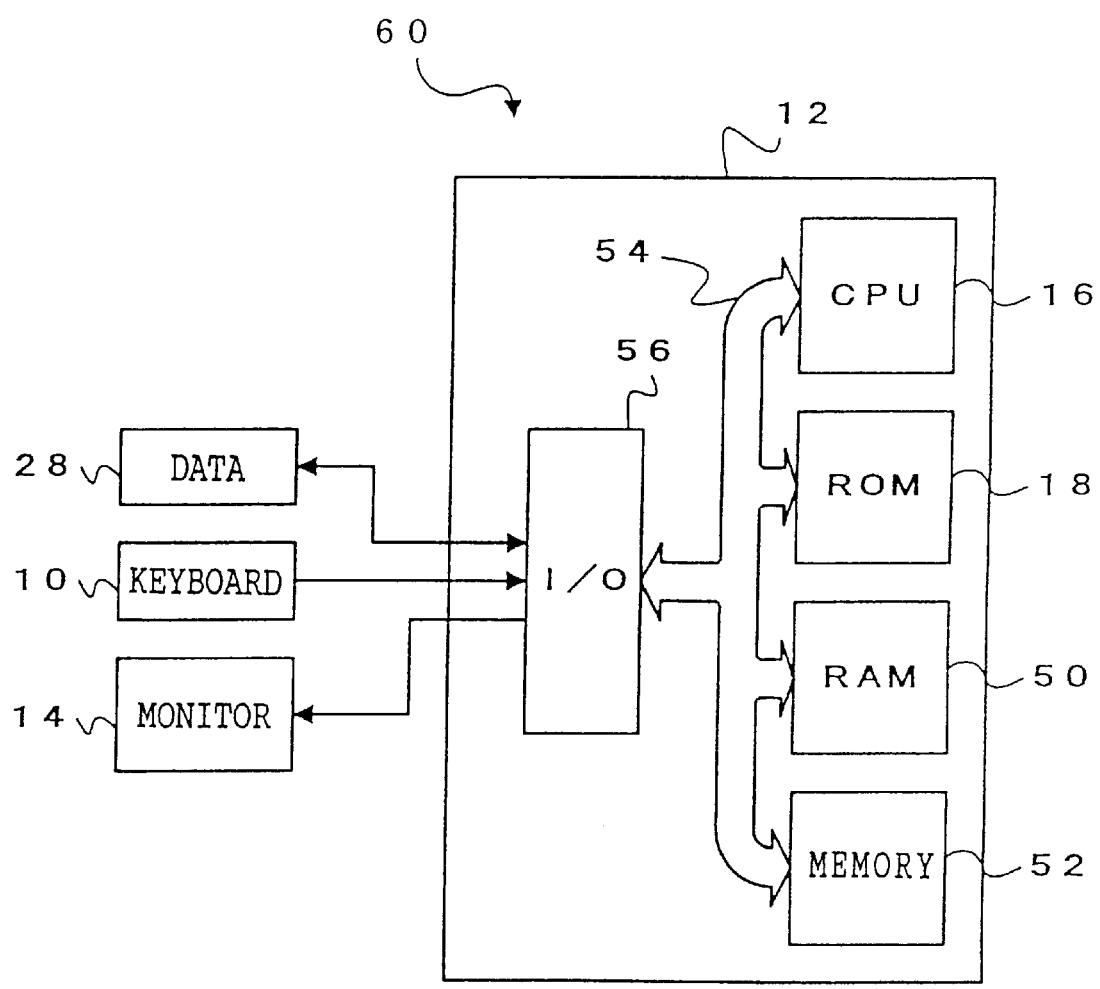
FIG. 45 is a schematic diagram of an optimizer in accordance with a sixth embodiment of the invention.

Specifically, as shown in FIG. 45, the optimizer 60 is comprised of the main body 12 of the computer including a microcomputer, a data input/output unit 28, the keyboard 10 for entering data and commands, and the monitor 14. The main body 12 of the computer is comprised of a CPU 16, the ROM 18, the RAM 50, the memory 52 for storing a transformation system (details of which will be described later) and the like, an input/output unit (hereafter referred to as the I/O unit) 56 for transmitting ad receiving data between the main unit and other devices, and a bus 54 connecting them in such a manner as to be capable of inputting and outputting and these data and commands. It should be noted that a processing program which will be described later is stored in the ROM 18. In a case where design parameters of the shape, structure, and pattern of the tire which are numerically represented, as well as the manufacturing conditions and the tire performance (in this embodiment, the shape, structure, pattern, and the like of the tire) are stored in an external storage means, the data input/output unit 28 is a device for reading such data from the external storage means. The data input/output unit 28 is unnecessary if the keyboard 10 is used as an input device.

Figure 46:
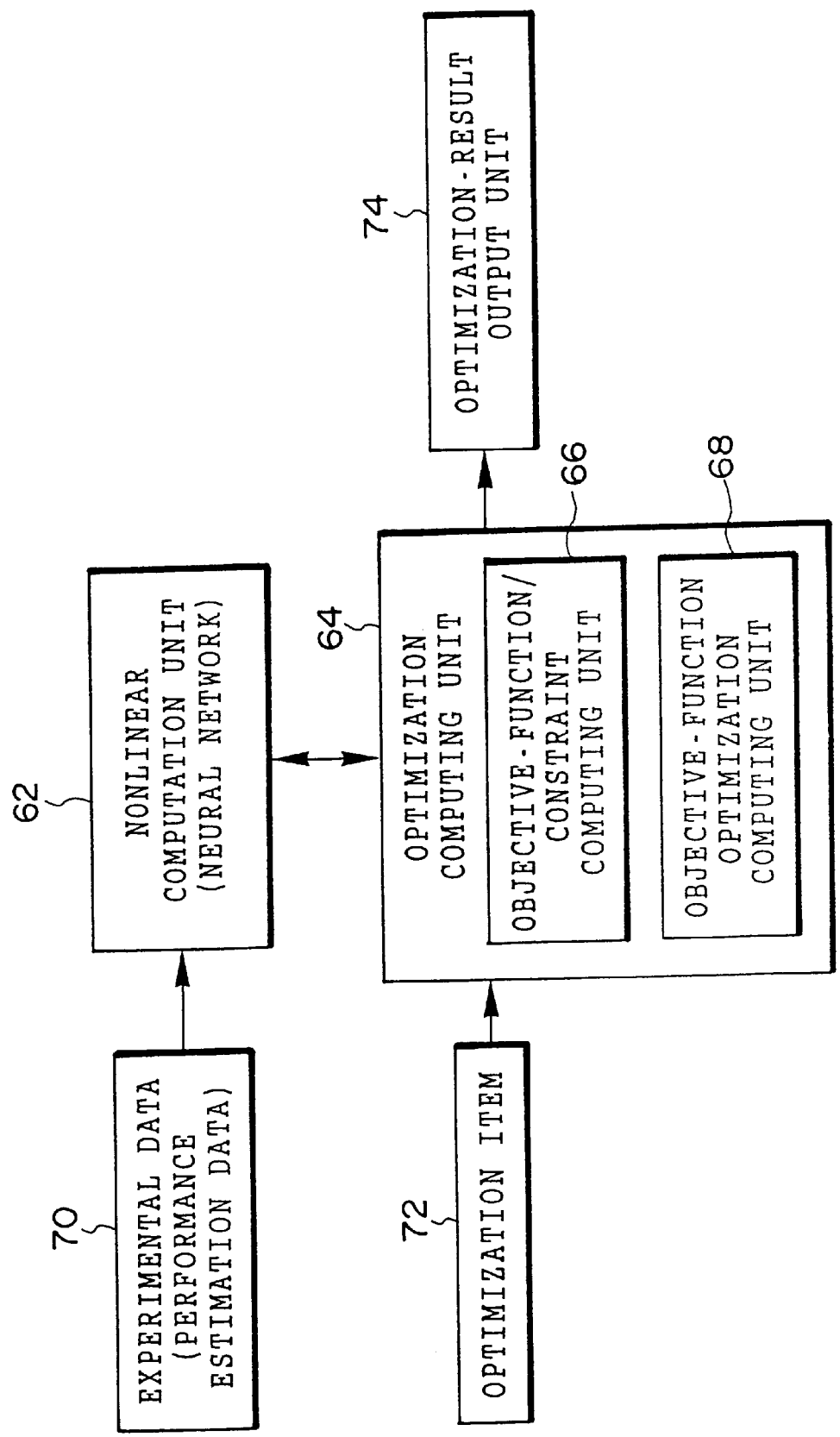
FIG. 46 is a schematic block diagram of the optimizer by type of functions.

FIG. 46 is a block diagram illustrating a schematic configuration by type of functions of the optimizer 60 in this embodiment. The optimizer 60 in this embodiment optimizes the tire performance to be maximized or minimized (which is referred to as the objective function), and outputs design parameters for the optimized tire performance.

By type of functions, this optimizer 60 is classified into a nonlinear computation unit 62, an optimization computing unit 64, a performance-estimation-data input unit 70, an optimization-item input unit 72, and an optimization-result output unit 74. The nonlinear computation unit 62 functions as a calculating unit of a transformation system formed by a neural network (details of which will be described later), and is used for determining a transformation system in which the shape, structure, and pattern of the tire and the manufacturing conditions on the one hand, and tire performance on the other hand, are correlated to each other, on the basis of the data inputted from the performance-estimation-data input unit 70. The transformation system referred to herein means a transformation system per se which permits a transformation and an inverse transformation such that the design parameters of the shape, structure, and pattern of the tire as well as the manufacturing conditions and the like on the one hand, and the tire performance on the other hand, correspond to each other on a one-to-one correspondence basis. In a case where a neural network after learning is expressed by mathematical formulae, the transformation system refers to one which includes the mathematical formulae and their coefficients. The performance-estimation-data input unit 70 is for inputting various data including the design parameters of the shape, structure, and pattern of the tire and the manufacturing conditions and the like as well as the performance corresponding thereto. The performance in this case is determined by the tire-performance estimation processing.

The optimization-item input unit 72 is for inputting (1) the tire performance to be maximized or minimized (the objective function which will be described later) such as an estimated or measured physical quantity of the tire, (2) the estimated or measured physical quantity of the tire, design parameters of the shape, structure, and pattern of the tire, as well as the manufacturing conditions including the vulcanization temperature and the like, for which a constraint is provided during maximization or minimization, (3) ranges which can be assumed by the design parameters of the shape, structure, and pattern of the tire and the manufacturing conditions, and (4) a selection of the method concerning the optimization and parameters and the like at that juncture.

It should be noted that although methods concerning the optimizer mentioned above include optimization techniques such as mathematical programming and a genetic algorithm, it is assumed that an optimization method based on mathematical programming is selected in this embodiment.

The optimization computing unit 64 is for optimizing the objective function until it converges, and is comprised of an objective-function/constraint computing unit 66 and an objective-function optimization computing unit 68. The objective-function/constraint computing unit 66 is for estimating tire performance on the basis of the design parameters of the shape, structure, and pattern of the tire and the manufacturing conditions by using the transformation system of the nonlinear computation unit 62. The objective-function optimization computing unit 68 is for optimizing the objective function inputted in optimization-item input unit 72 until it converges while satisfying the constraint.

The optimization-result output unit 74 is for outputting as the result of optimization by the optimization computing unit 64 the design parameters of the shape, structure, and pattern of the tire and the manufacturing conditions which have been optimized so as to satisfy the inputted optimization items.

It should be noted that, in this embodiment, the nonlinear computation unit 62 is configured by using the hardware resource shown in FIG. 45 and a software resource, which will be described later, and has a transformation function formed by a conceptual neural network, as will be described later, and has a learning function for learning it. In addition, the nonlinear computation unit 62 may be configured to be provided with only the transformation function not having the learning function. Namely, as will be described later, the nonlinear computation unit 62 determines a transformation system in which design parameters of the shape, structure, and pattern of the tire and the manufacturing conditions on the one hand, and tire performances on the other hand, are correlated to each other, but it suffices if a transformation can be effected between the design parameters of the shape, structure, and pattern of the tire and the manufacturing conditions on the one hand, and tire performances on the other hand. Accordingly, correspondences between the design parameters of the shape, structure, and pattern of the tire and the manufacturing conditions on the one hand, and tire performances on the other hand, may be learned in advance from another neural network, and the learned coefficients of transformation of the other neural network may be inputted, so as to determine a transformation system in which the design parameters of the shape, structure, and pattern of the tire and the manufacturing conditions on the one hand, and tire performance on the other hand, are correlated to each other. In other words, insofar as the arrangement provided is such that coefficients of transformation are inputted, only a transformation function may be provided for effecting a transformation between the design parameters of the shape, structure, and pattern of the tire and the manufacturing conditions on the one hand, and tire performances on the other hand, by using the coefficients of transformation. In addition, these correspondences may be stored as a lookup table, and a transformation may be effected by referring to the stored lookup table.

The nonlinear computation unit 62 constitutes a neural network which has as an input layer neurones corresponding to the number of the design parameters of the shape, structure, and pattern of the tire and the manufacturing conditions to enable the input for each value of the design parameters of the shape, structure, and pattern of the tire and the manufacturing conditions, and has as an output layer neurones corresponding to the number of items of the tire performance to be estimated and concerning the objective function and the constraint, wherein the respective neurones are connected to each other by synapses. When the respective values of the design parameters of the shape, structure, and pattern of the tire and the manufacturing conditions are inputted to the nonlinear computation unit 62 after the learning which will be described later, the nonlinear computation unit 62 outputs performances corresponding thereto. The setting provided is such that, during learning, known performances corresponding to the design parameters of the shape, structure, and pattern of the tire and the manufacturing conditions are inputted as the teacher, and the respective values of the design parameters of the shape, structure, and pattern of the tire and the manufacturing conditions on the one hand, and their tire performances on the other hand, are made to correspond to each other on the basis of the relative magnitude of the error difference or the like between the output performance and the known performance.

Figure 47:
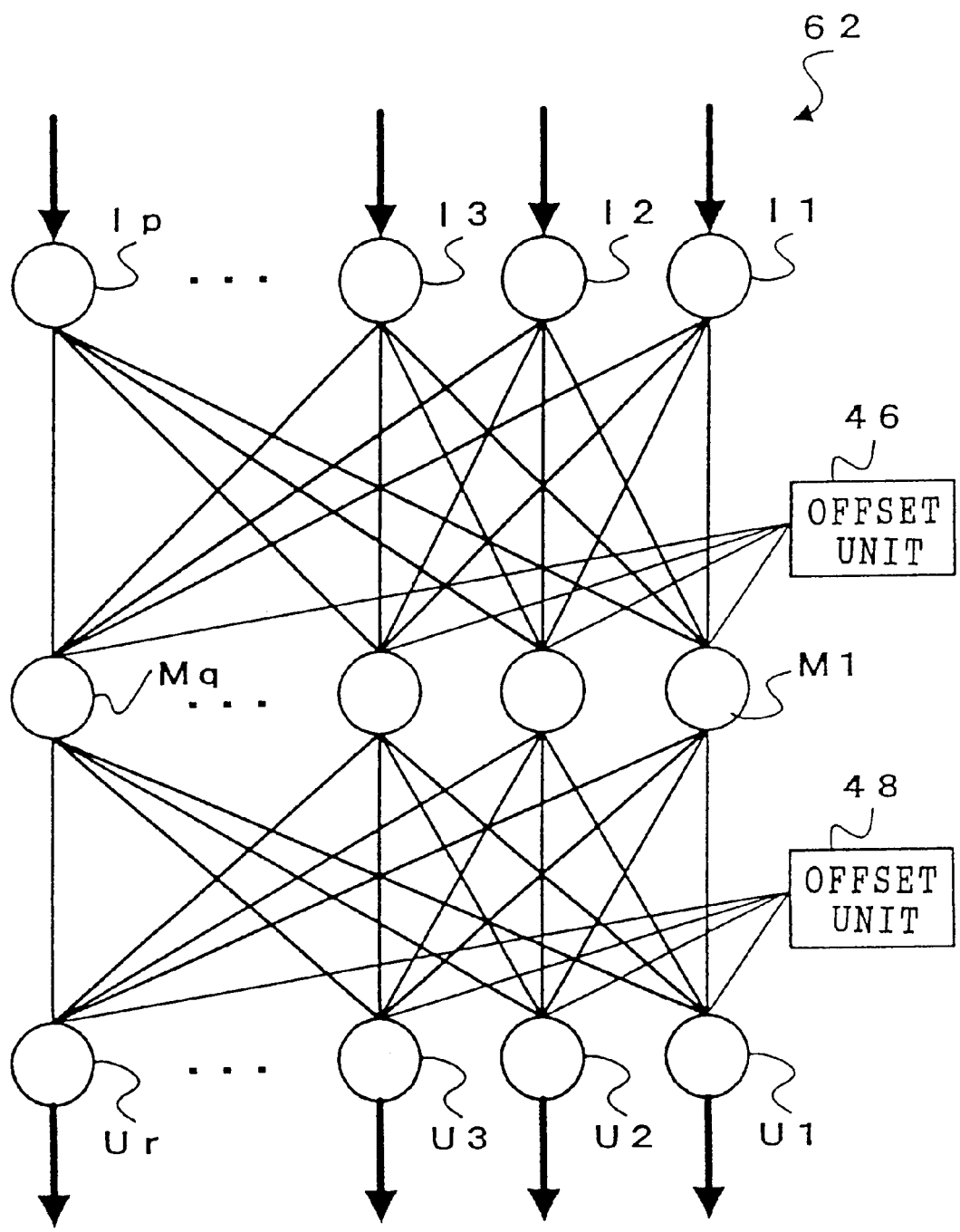
FIG. 47 is a conceptual diagram of a neural network.

As one example of the neural network used in the nonlinear computation unit 62, a shown in FIG. 47, the neural network is comprised of the input layer including a predetermined number of units $I1, I2, \ldots, Ip$ ($p>1$) corresponding to the neurones, an intermediate layer including a multiplicity of units $M1, M2, \ldots, Mq$ ($q>1$), and an output layer including a predetermined number of output units $U1, U2, \ldots, Ur$ ($r>1$). Incidentally, the number of units of the input layer and the number of units of the output layer may be set in accordance with the number of the design parameters of the shape, structure, and pattern of the tire and the manufacturing conditions and the number of performances. In addition, the respective units of the intermediate layer and the respective units of the output layer are connected to offset units 46 and 48 for offsetting the output values by predetermined values. With respect to the units of the input layer, for example, parameters representing the width of the belt of the tire, the angle of the belt, the material of the belt, and the tire configuration as well as the cost can be used as their input values. With respect to the units of the output layer, for example, the rolling resistance, stress and strain, spring characteristics of the tire, ground contacting characteristics of the tire, and the like may be used as their output values.

It should be noted that, in this embodiment, the units of the intermediate layer and the units of the output layer are constituted by neuro circuit elements having a sigmoid characteristic in which the input/output relationship is represented by a sigmoid function, while the units of the input layer are constituted by neuro circuit elements whose input/output relationship is linear. By configuring the neural network so as to be provided with this sigmoid characteristic, the output values become real values (positive numbers).

The respective outputs of the units of the intermediate layer and the units of the output layer in the nonlinear computation unit 62 can be expressed by Formulae (5) and (6) below. Namely, if it is assumed that, with respect to a certain unit, the number of synapses on the input side is p, a weight (a coefficient of connection of the unit) corresponding to the strength of each synaptic connection is $w_{ji}$ ($1 \leq j \leq N$, $1 \leq i \leq p$), and each input signal is $x_j$, an internal-state variable u corresponding to an average value of the membrane potential of neurons can be expressed by Formula (5) below, while an output y can be expressed by Formula (6) below by a nonlinear function f representing the characteristic of the neuron.

$$u_j = \sum_{i=1}^{p} w_{ij} \cdot x_i + b_j = 1 \qquad (5)$$

where $b_j$ represents an offset value supplied from the offset unit, an $W_j i$ represents the weight between i-th and j-th units in different layers.

Accordingly, as the values of the design parameters of the shape, structure, and pattern of the tire and the manufacturing conditions are inputted to the units of the input layer, values corresponding to the number of tire performances are outputted from the units of the output layer.

It should be noted that the characteristic of each unit of the aforementioned input layer may be a characteristic in which the input is outputted as it is. In addition, the weight (coefficient of connection) of each unit of the nonlinear computation unit 62 is learned and corrected by learning processing, which will be described later, such that the error becomes minimum with respect to estimation data which is known.

Next, referring to FIG. 49, a description will be given of the details of the learning processing of the neural network in the nonlinear computation unit 62. In this embodiment, data on tire performance is obtained by trial-manufacturing and evaluating tires using values of the design parameters of the shape, structure, and pattern of the tire and the manufacturing conditions, or by modeling tires and estimating the tire performance by a computer. Further, correspondences between the values of the design parameters of the shape, structure, and pattern of the tire and the manufacturing conditions on the one hand, and values representing their performances on the other hand, are used as data in learning.

Incidentally, of a plurality of pieces of data, a predetermined number of (e.g., 90% of the total) data are used as learning data, and the remaining data (e.g., the remaining 10%) are used as test data. This is to use the estimation data as data used at the time of learning the neural network and as data for confirming whether the neural network for which learning has been completed has been optimally learned. In addition, the values of the design parameters of the shape, structure, and pattern of the tire and the manufacturing conditions are set as input data, and the values representing the tire performances are set as output teacher data.

Figure 49:
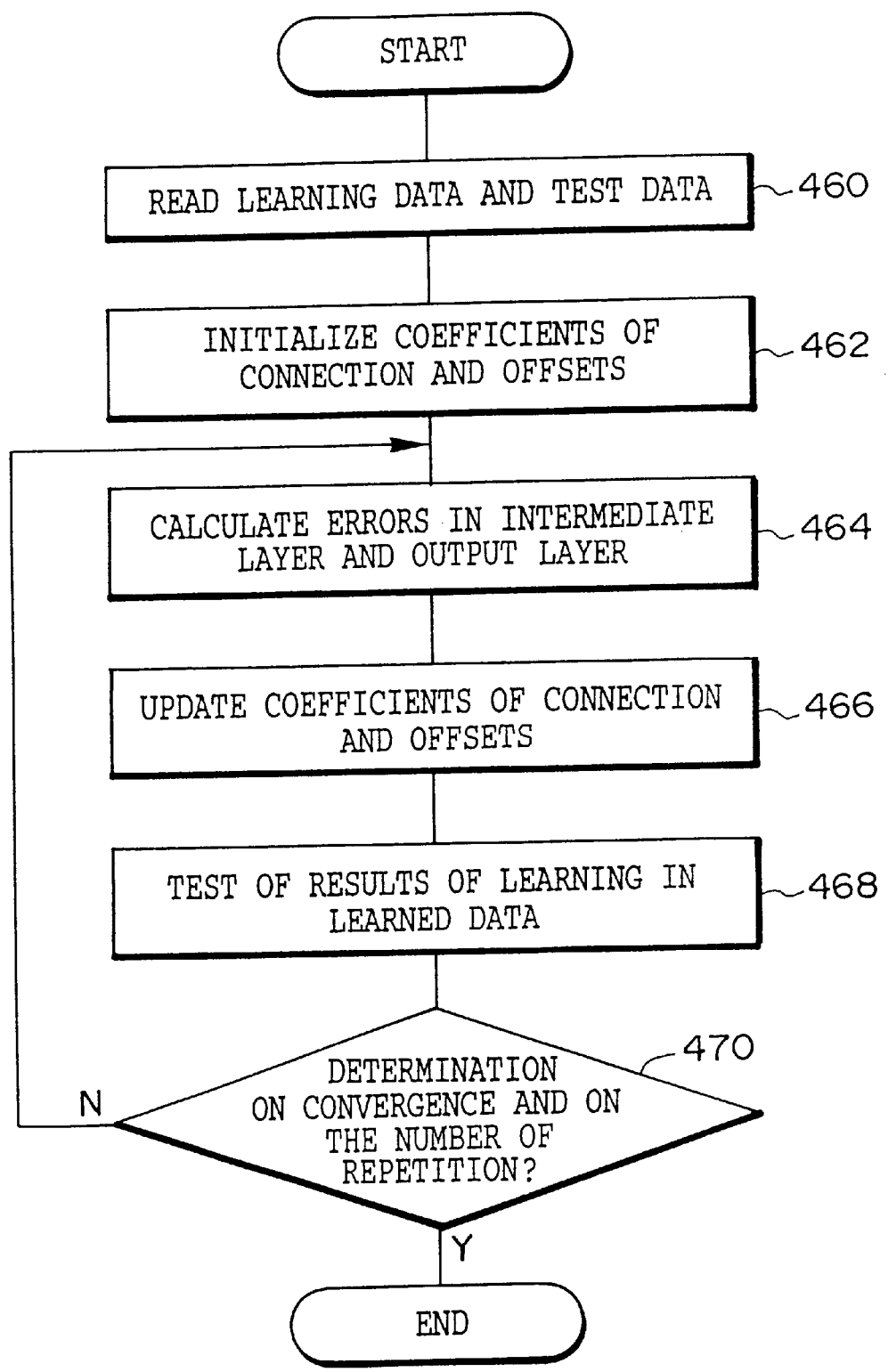
FIG. 49 is a flowchart illustrating the flow of the learning process of the neural network.

First, in Step 460 in FIG. 49, learning data and test data determined in advance are read. In an ensuing Step 462, coefficients of connection (weights) of the units and offset values in the neural network are set to predetermined values, thereby effecting initialization. In an ensuing Step 464, errors of the units of the intermediate layer and the output layer are determined in order to learn the neural network by using a plurality of learning data for which design parameters of the shape, structure, and pattern of the tire and the manufacturing conditions are already known.

As for the error of the output layer, a difference with respect to the tire performance of the learning data can be set as the error. The error of the output layer, i.e., the error of the units, can be minimized by changing at least one of the coefficients of connection and the offset values by small degrees. Meanwhile, the error of the intermediate layer can be determined by inverse calculation such as the error back-propagation method by using the error of the output layer.

In an ensuing Step 466, the coefficients of connection and the offset values determined above are updated (rewritten), and in an ensuing Step 468 each of the test data is tested by the neural network based on the updated coefficients of connection and offset values so as to obtain data representing the tire performance as the value of the test result. In an ensuing Step 470, a determination is made as to whether or not a convergence has been obtained by determining whether or not the value of the test result obtained in Step 468 above is a value falling within a predetermined range which is the criterion of the determination on the convergence, or a determination is made as to whether or not the aforementioned processing has been repeated a predetermined number of times. If YES is the answer in the determination, this routine ends. On the other hand, if NO is the answer in the determination, the operation returns to Step 464 to repeat the foregoing processing. Consequently, the coefficients of connection and the offset values are determined such that the errors of the units of the intermediate layer and the output layer become minimum when the learning data are inputted.

The neural network is thus learned by using a plurality of estimation data for which design parameters of the shape, structure, and pattern of the tire and the manufacturing conditions are already known. Namely, learning is effected in such a way that the error of output values from the output layer of the neural network with respect to the teacher signal becomes minimum. Thus, when the values of the design parameters of the shape, structure, and pattern of the tire and the manufacturing conditions are inputted, the nonlinear computation unit 32 outputs values representing the tire performance through learning.

It should be noted that after the foregoing processing is completed and the learning of the neural network has been carried out sufficiently, the structure of the neural network, i.e., the coefficients of connection and the offset values, may be stored in the memory 52 to structure the transformation system.

Although a description has been given above of the case in which the neural network is used as the nonlinear computation unit 62, it is possible to use a transformation system utilizing a response surface method based on a polynomial, as shown in the following Formula (7):

$$y = a_o + \sum_{i=1}^{p} a_i x_i + \sum_{i=1}^{p} \sum_{j=1}^{p} b_{ij} x_i x_j \quad (7)$$

Next, referring to the flowchart shown in FIG. 48, a description will be given further of the operation of the optimizer 60 in accordance with this embodiment. When the power source of the optimizer 60 is turned on, or an instruction for starting the execution is given from the keyboard, the operation proceeds to Step 400 in FIG. 48 to set design parameters $x_i$ (i=1 to p) of the shape, structure, and pattern of the tire, an objective function, and a maximum number of experiments. Namely, a setting is provided as to which of the performances is to be improved and, in that case, the approximate number of experiments by the time of which optimal design parameters of the shape, structure, and pattern of the tire are to be determined.

In an ensuing Step 402, allowable ranges of the design parameters $x_i$ of the shape, structure, and pattern of the tire which have been set in Step 400 ($x_i^L \leq x_i \leq x_i^U$; $x_i^L$ is a lower limit and $x_i^U$ is an upper limit). In an ensuing Step 404, the number of analyses M based on experiments or numerical calculations, as well as variables e representing positions of the design parameters of the shape, structure, and pattern of the tire, are initialized (M=0, i=1).

In an ensuing Step 406, a determination is made as to whether or not past experimental data can be utilized as the design parameters $x_i$ of the shape, structure, and pattern of the tire as well as the tire performance which have been set in Step 400. If YES is the answer in the determination and the past experimental data can be utilized, the operation proceeds to Step 408, whereas if NO is the answer in the determination and the data must be newly determined, the operation proceeds to Step 420.

In Step 420, by using an orthogonal table, optimal design of experiment, and the like, a determination is made as to which of the design parameters $x_i$ of the shape, structure, and pattern of the tire is to be changed to conduct the experiment, thereby determining the design parameters of the shape, structure, and pattern of the tire. In the determination of the design parameters of the shape, structure, and pattern of the tire, it is possible to make use of a method described in "Box and Draper: 'Empirical Model Building and Response Surfaces,' John Wiley & Sons, New York."

In an ensuing Step 422, a tire model is constructed in which the design variables are changed using the design parameters of the shape, structure, and pattern of the tire according to the design of experiment determined in Step 420. Namely, by setting the total n umber of experiments or the number of numerical analyses as ni, cross-sectional configurations of n1 tires are subjected to modeling by a technique which is capable of numerically and analytically determining the belt tension in the circumferential direction of the tire when inflated with air such as by the finite element method, and a basic model of the tire including its internal structure is determined.

In addition, an objective function representing a physical quantity for evaluating tire performance, a constraint for constraining the cross-sectional shape of the tire, and design variables for determining the cross-sectional shapes of $n_i$ tire models are determined. Subsequently, in Step 424, tire-performance estimation processing is executed for each of the $n_i$ tire models in the same way as in Step 204 in FIG. 35 referred to above (i.e., processing in Steps 110 to 122 in FIG. 2). Consequently, the result of estimation of tire performance can be obtained.

Figure 48:
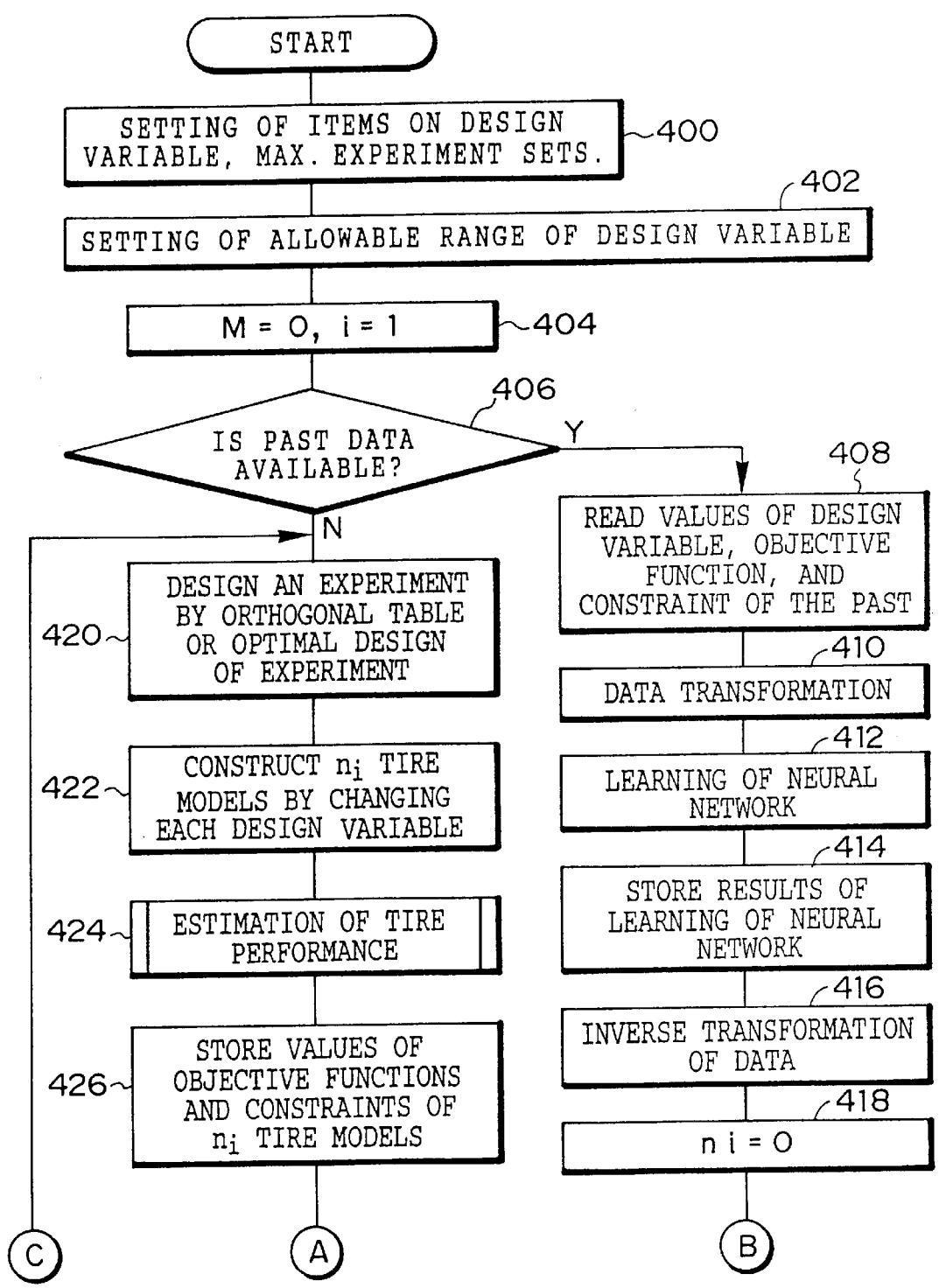
FIG. 48 is a flowchart illustrating the flow of operation of the optimizer in accordance with the sixth embodiment.
Figure 48:
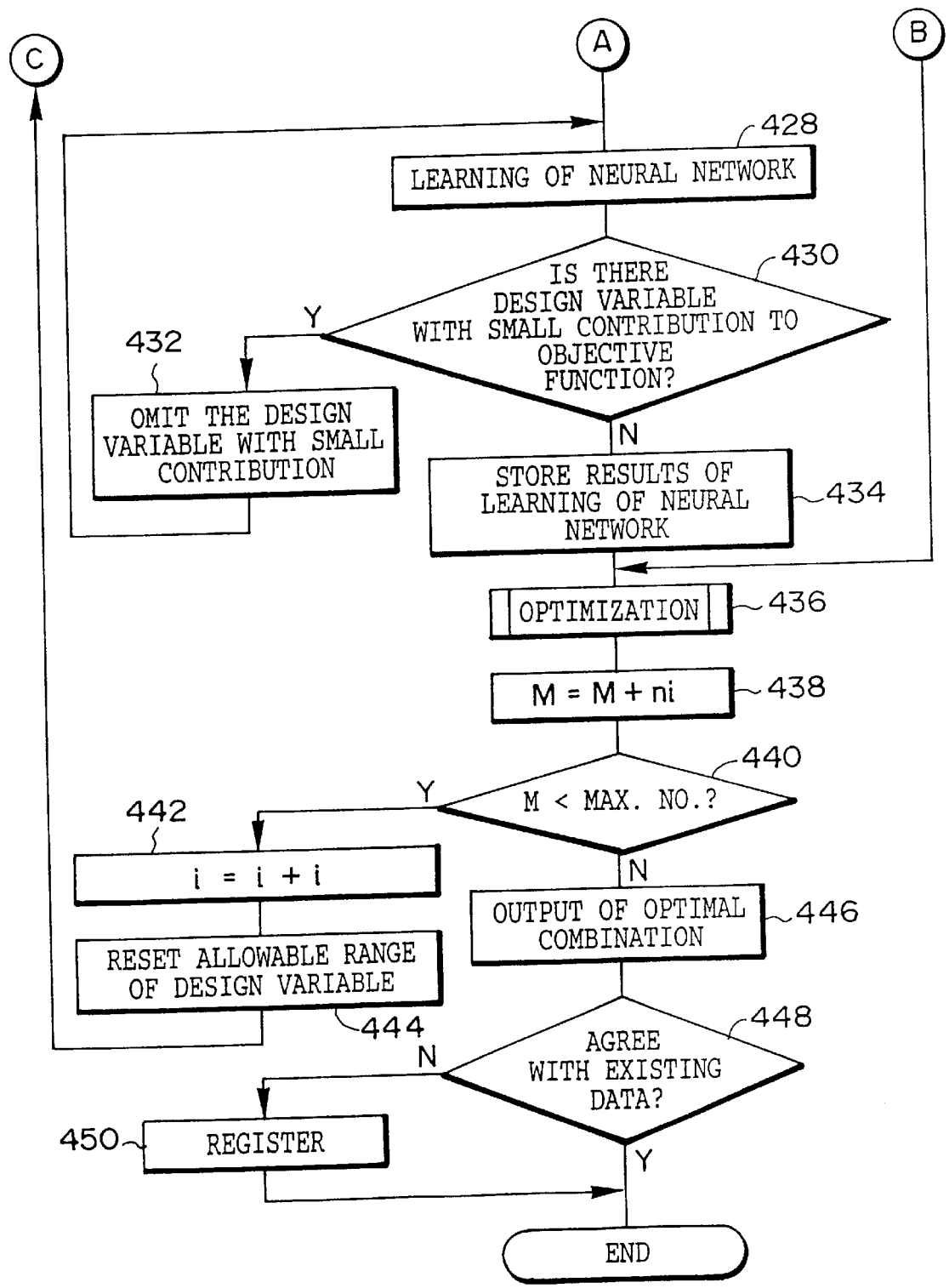

In Step 426 in FIG. 48 after completion of the tire-performance estimation processing, the respective objective functions $OBJ_j$ and constraints $G_j$ of the design variables of the ni tire models are computed and are stored.

In an ensuing Step 428, the neural network is learned in the above-described fashion. Namely, the neural network is learned by using as the values to be inputted to the input layer the values of the design parameters of the shape, structure, and pattern of the tire, and by using as the values of the tire performance the values outputted from the output layer.

In an ensuing Step 430, a determination is made on the presence or absence of design parameters of the shape, structure, and pattern of the tire whose contribution to the targeted physical property and characteristic is small. For instance, the design parameters of the shape, structure, and pattern of the tire whose contribution is small are determined by calculating the sensitivity of the output layer indicating a tendency of change of the tire performance when the design parameters $x_i$ of the shape, structure, and pattern of the tire inputted to at least one of the units of the input layer are slightly changed, as well as the degree of a decline in the estimation accuracy of the tire performance of the output layer when the output from at least one unit of the input layer is set to zero. This is because those design parameters of the shape, structure, and pattern of the tire whose sensitivities are small and for which the estimation accuracy does not decline even if their inputs are ignored, are considered to have a small contribution.

When there are design parameters of the shape, structure, and pattern of the tire whose contribution is small, YES is given as the answer in the determination in Step 430. In an ensuing Step 432, the design parameters $x_i$ of the shape, structure, and pattern of the tire whose contribution is small are deleted, and learning is performed again by using the design parameters of the shape, structure, and pattern of the tire after the deletion (Step 428). On the other hand, if there are no design parameters of the shape, structure, and pattern of the tire whose contribution is small, NO is given as the answer in the determination in Step 430. In an ensuing Step 434, the relationship between the input layer (design parameters of the shape, structure, and pattern of the tire) and the output layer (tire performance) of the neural network learned as described above is stored. Namely, the respective coefficients of connection and offset values are stored.

Figure 50:
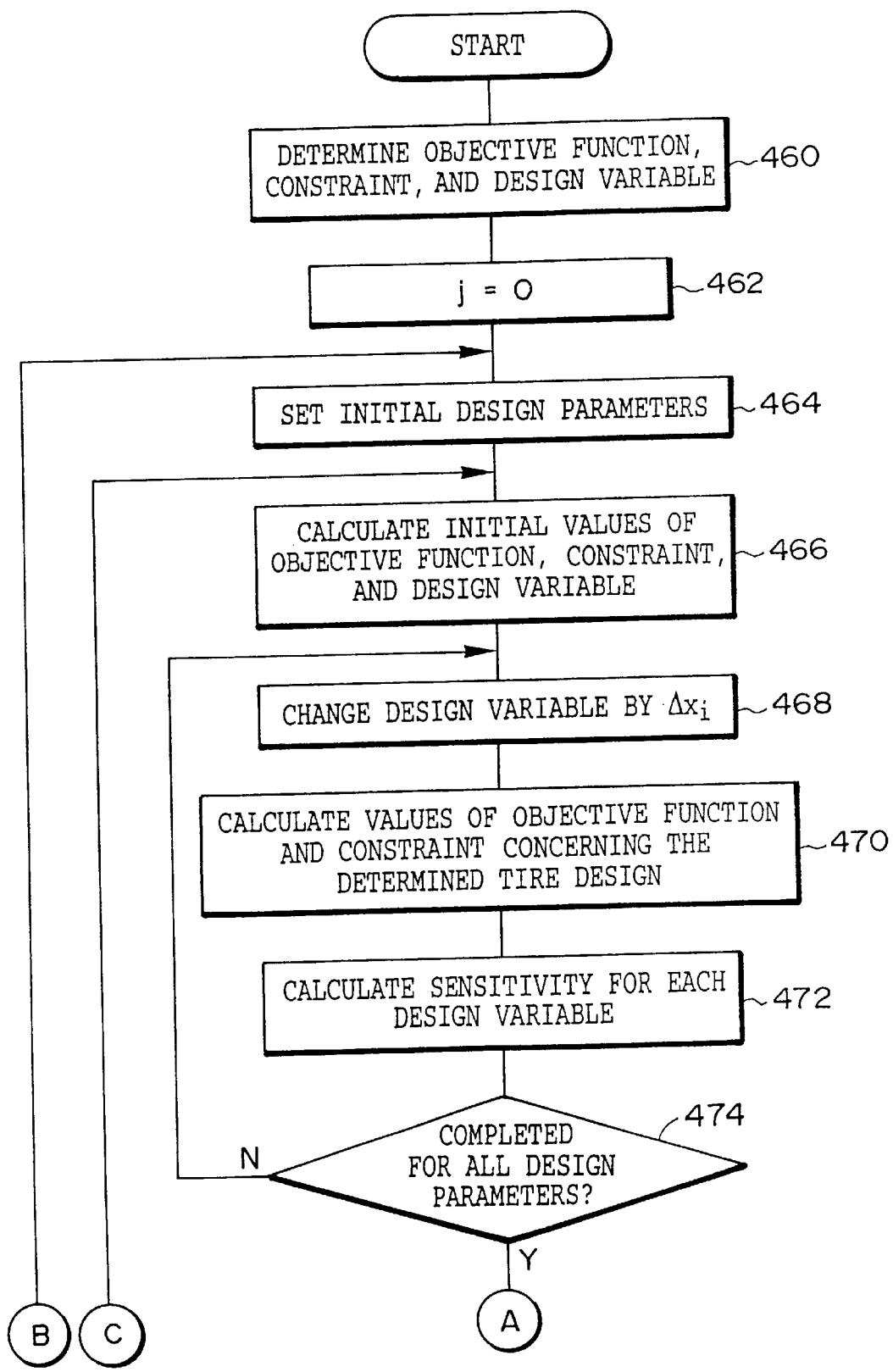
FIG. 50 is a flowchart illustrating the flow of optimization processing in accordance with the sixth embodiment.
Figure 50:
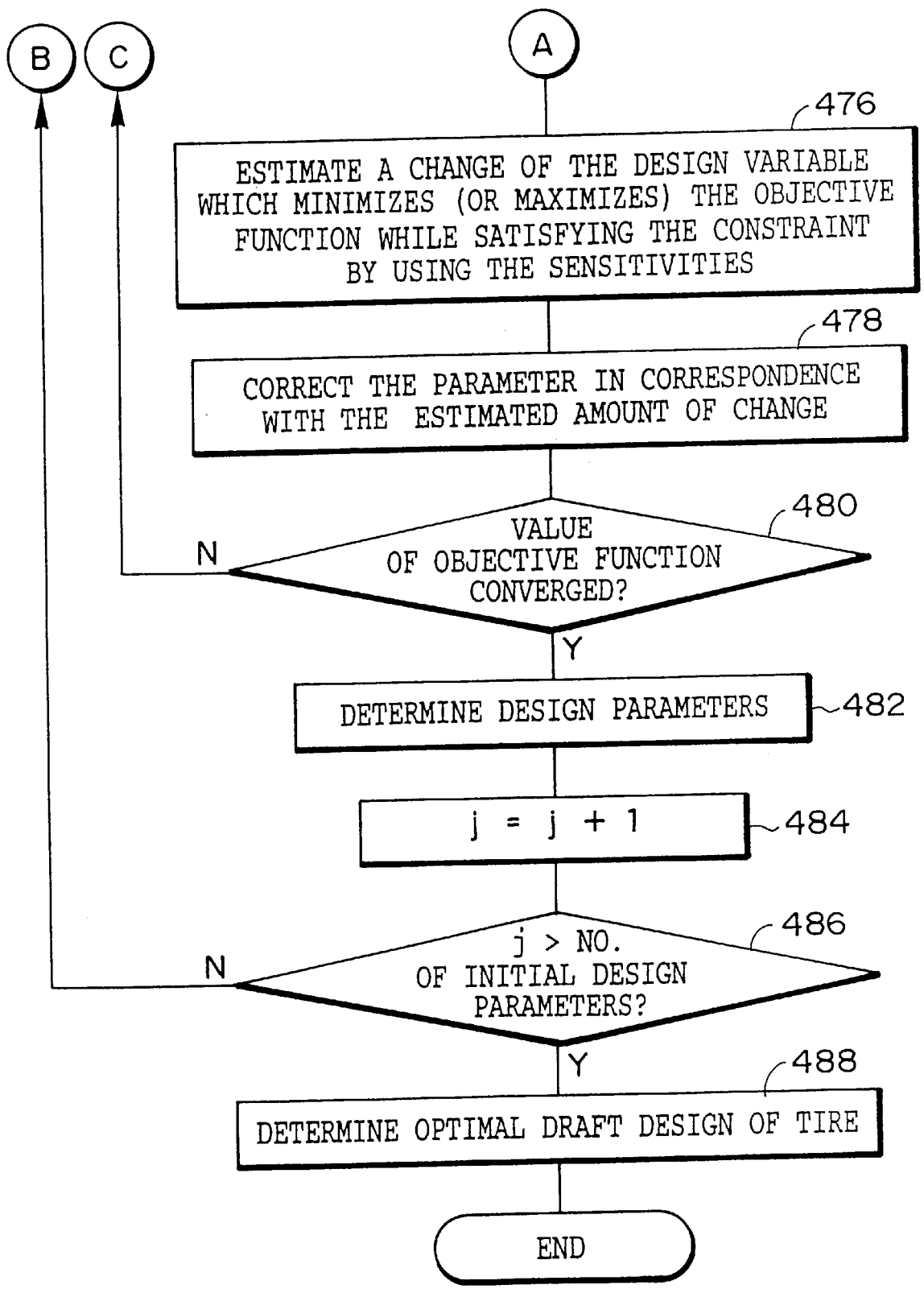

In an ensuing Step 436, by using the stored relationship between the input layer (design parameters of the shape, structure, and pattern of the tire) and the output layer (tire performance), the objective function is optimized as will be described later, so as to determine optimum parameters $x_i$ of the shape, structure, and pattern of the tire (FIG. 50, the details will be described later).

Upon completion of optimization, the number of experiments or the number of analyses M is incremented (M=M= $n_i$) in an ensuing Step 438. In an ensuing Step 440, a determination is made as to whether or not M<(a set maximum number of experiments or analyses), and if the number of experiments or the number of analyses M is smaller, the operation proceeds to Step 442.

In Step 442, the variable i is incremented and, in an ensuing Step 444, the allowable ranges of the design parameters of the shape, structure, and pattern of the tire are reset as shown in Formulae (8) to (10) below, and the operation returns to Step 420. By repeating this processing, it is possible to improve the accuracy of optimum design parameters $x_i^{OPT}$ of the shape, structure, and pattern of the tire. It should be noted that, in the resetting of the allowable ranges in Step 444, a setting is provided to narrow the allowable ranges of the design parameters of the shape, structure, and pattern of the tire set in Step 402. In Step 420, points of a reexperiment are designed with respect to these narrowed regions.

$$x_i^{Lnew} = \text{Min}\left[x_i^L, x_i^{OPT} - \frac{x_i^U - x_i^L}{NN}\right] \quad (9)$$

$$x_i^{Unew} = \text{Max}\left[x_i^U, x_i^{OPT} - \frac{x_i^U - x_i^L}{NN}\right] \quad (10)$$

Here, NN is a coefficient for determining the degree of narrowing the allowable range of each of the design parameters of the shape, structure, and pattern of the tire, and should preferably be set to a value of from 1.5 to 5 or thereabouts.

On the other hand, if NO is the answer in the determination in Step 440, i.e., if the number of experiments or numerical analyses conducted is greater than a predetermined maximum number of experiments or numerical analyses, the design parameters of the shape, structure, and pattern of the tire obtained last are outputted as an optimal tire design in Step 446. In an ensuing Step 448, a determination is made as to whether or not there are similar experiments or numerical analyses in the past experimental data. If NO is the answer in the determination, in an ensuing Step 450, the performance of the optimal tire design is registered in the memory 22 or a database of an external storage device through the data input/output device 28. Incidentally, the performance of the tire may be determined by conducting an experiment or numerical analysis again.

It should be noted that the maximum number of experiments or analyses is a constant which is determined by the cost required for the experiments or numerical analysis, the time required for determining an optimal tire design, and so on. Next, if YES is the answer in the determination in Step 406, in Step 408, the design parameters of the shape, structure, and pattern of the tire and tire performance of the past which are related to the items set in Step 400 are read from a database prepared in advance. In an ensuing Step 410, the read data are transformed so that the coefficient of sharpness and the coefficient of skewness become small by using the following Formulae (11) to (14):

$$\text{coefficient of sharpness} = \frac{1}{p}\sum_{i=1}^{p}\left(\frac{c_i - \mu}{\sigma}\right)^4 - 3 \quad (11)$$

$$\text{coefficient of skewness} = \frac{1}{p}\sum_{i=1}^{p}\left(\frac{c_i - \mu}{\sigma}\right)^3 \quad (12)$$

$$\mu = \frac{1}{p}\sum_{i=1}^{p}c_i \quad (13)$$

$$\sigma = \frac{1}{p}\sum_{i=1}^{p}(c_i - \mu)^2 \quad (14)$$

In an ensuing Step 412, the neural network is learned in the same way as Step 428 above. In an ensuing Step 414, the results of learning are stored in the same way as Step 434 above. In an ensuing Step 416, to return the data to experimental data (estimation data), an inverse transformation of the transformation is effected in Step 410, the total number of experiments ni is reset (=0) in an ensuing Step 418, and the operation proceeds to Step 436.

Next, a description will be given of the details of optimization processing in Step 436 in FIG. 48. In this optimization processing, the processing routine shown in FIG. 50 is executed. First, in Step 460 in FIG. 50, an objective function representing the tire performance to be improved, a constraint for constraining the tire performance which should not deteriorate when improving a certain tire performance, and design variables for determining the design parameters of the shape, structure, and pattern of the tire are determined. In an ensuing Step 462, the variable j representing the number of the design parameters of the shape, structure, and pattern of the tire is reset (=0).

In an ensuing Step 464, the design parameters of the shape, structure, and pattern of the tire to be used as initial values at the time of optimization are set. As for the optimization problem in designing the shape, structure, and pattern of the tire, if the input values (e.g., the belt width and angle) are plotted in a two-dimensional plane and are grasped three-dimensionally by an image in which the value of the objective function is plotted in the heightwise direction, the design space concerning the tire performance has multi-peaks; therefore, it is necessary to ascertain the solution space of an optimal solution by effecting optimization starting with different initial values. As the initial values, it is possible to use, for instance, the following Formula (15):

$$x_i^{start} = x_i^L + \frac{x_i^U - x_i^L}{Munit} \cdot k \quad (15)$$

where, $x_i$ (i=1 to p): design parameters of the shape, structure, pattern of the tire $x_i^L \leq x_i \leq x_i^U$: ranges which can be assumed by the design parameters of the shape, structure, pattern of the tire k=0 to Munit Munit: number of division of the allowable ranges of the design parameters of the shape, structure, pattern of the tire In an ensuing Step 466, an output by the neural network is executed by using as an input the initial design parameters of the shape, structure, pattern of the tire set in Step 304, and tire performances corresponding to the inputted design parameters of the shape, structure, pattern of the tire are estimated. By using these results, initial values of the objective function and the constraint are calculated.

In an ensuing Step 468, to change the design parameters of the shape, structure, pattern of the tire, the design parameters $x_i$ of the shape, structure, pattern of the tire set in Step 464 are changed by $\Delta x_i$ each. In an ensuing Step 470, the value $OBJ_i$ of the objective function and the value $G_i$ of the constraint after changing the design variable by $\Delta x_i$ are calculated. In Step 472, a sensitivity $dOBJ/dx_i$ of the objective function, which is a ratio of an amount of change of the objective function to an amount of unit change of the design variable, as well as a sensitivity $dG/dx_i$ of the constraint, which is a ratio of an amount of change of the constraint to an amount of unit change of the design variable, are calculated for each design variable in accordance with the following Formulae (16) and (17):

$$\frac{dOBJ}{dx_i} = \frac{OBJ_i - OBJo}{\Delta x_i} = \frac{OBJ(x_i + \Delta x_i) - OBJ(x_i)}{(x_i + \Delta x_i) - (x_i)} \quad (16)$$

$$\frac{dG}{dx_i} = \frac{G_i - Go}{\Delta x_i} \quad (17)$$

By means of this sensitivity, it is possible to estimate to what extent the value of the objective function changes when the design variable is changed by $\Delta r_i$. This estimation, i.e., the process of optimization, can be compared to mountain-climbing, and the estimation of the change of the value of the objective function corresponds to designating the direction of mountain-climbing.

In an ensuing Step 474, a determination is made as to whether or not computations have been completed for all the design parameters of the shape, structure, and pattern of the tire, and if computations have not been completed for all the design parameters of the shape, structure, and pattern of the tire, Steps 468 through 474 are repeatedly executed.

In an ensuing Step 476, an amount of change of the design variable which minimizes or maximizes the objective function while satisfying the constraint is estimated by means of mathematical programming by using the sensitivities of the objective function and the constraint with respect to the design variable. In Step 478, by using this estimated value of the design variable, the design parameters of the shape, structure, and pattern of the tire are corrected, and the value of the objective function based on the corrected design parameters of the shape, structure, and pattern of the tire is calculated. In an ensuing Step 480, a determination is made as to whether or not the value of the objective function has converged by comparing a threshold value inputted in advance with the difference between the value OBJ of the objective function calculated in Step 488 and the initial value OBJo of the objective function calculated in Step 466. If the value of the objective function has not converged, the value of the design variable determined in Step 476 is set as the initial value, and Steps 466 through 480 are repeatedly executed. If it is determined that the value of the objective function has converged, the value of the design variable at this juncture is set as the value of the design variable which optimizes the objective function while satisfying the constraint, and the design parameters of the shape, structure, and pattern of the tire are determined in Step 482 by using this value of the design variable. In an ensuing Step 484, the variable j is incremented, and the operation proceeds to Step 486.

In Step 486, a determination is made as to whether or not j exceeds the allowable number of the initial design parameters of the shape, structure, and pattern of the tire: $(1+Munit)^P$, and if j does not exceed it, the operation returns to Step 464 to change the values of the initial design parameters of the shape, structure, and pattern of the tire. Then, Steps 464 through 486 are repeatedly executed.

On the other hand, if YES is the answer in the determination in Step 486, in an ensuing Step 488 an optimal tire design is determined, and this routine ends. The determination of the optimal tire design in Step 488 in this embodiment is made by taking the following two conditions into account, and the one having the greatest fitness to the conditions is selected as the optimal tire design.

[Conditions]

(1) The objective function OBJ has a small value. (A setting is provided such that the smaller the tire performance selected as the objective function, the better. In a case where the larger, the better, a minus sign is imparted to cope with it.)

(2) Even if the design parameters of the shape, structure, and pattern of the tire are slightly changed in the neighborhood of the optimal solution obtained, the objective function and the constraint do not change much.

As described above, in this embodiment, to determine a transformation system, the relationship of correspondence between the design parameters of the shape, structure, and pattern of the tire and the manufacturing conditions on the one hand, and tire performances on the other hand, are learned in the nonlinear computation unit of the neural network by data based on experiments or numerical analysis. Therefore, it is unnecessary to assume function types as a means for calculating the transformation system, and a transformation system capable of finding mutual relationships in which the design parameters of the shape, structure, and pattern of the tire and the manufacturing conditions on the one hand, and tire performances on the other hand, are correlated to each other can be formed with high accuracy and reduced arbitrariness. In addition, by combining that transformation system and the optimization computing unit, it is possible to output effective optimal draft designs of the shape, structure, and pattern of the tire.

It should be noted that, in the above-described embodiment, optimization may be effected by the technique of a genetic algorithm instead of the sensitivity analysis (see FIG. 50). Incidentally, in the technique of a genetic algorithm, it suffices if the processing in which the tire-performance estimation processing in Steps 303 and 321 is excluded from the processing shown in FIG. 40 is executed.

[Seventh Embodiment]

Next, a description will be given of a seventh embodiment. In this embodiment, in order to improve the partial-wear suppressing performance and steering stability, a tire is designed by designing the tread configuration of a rectangular parallelepiped for uniformalizing the ground contact pressure without reducing the ground contact area.

Figure 51:
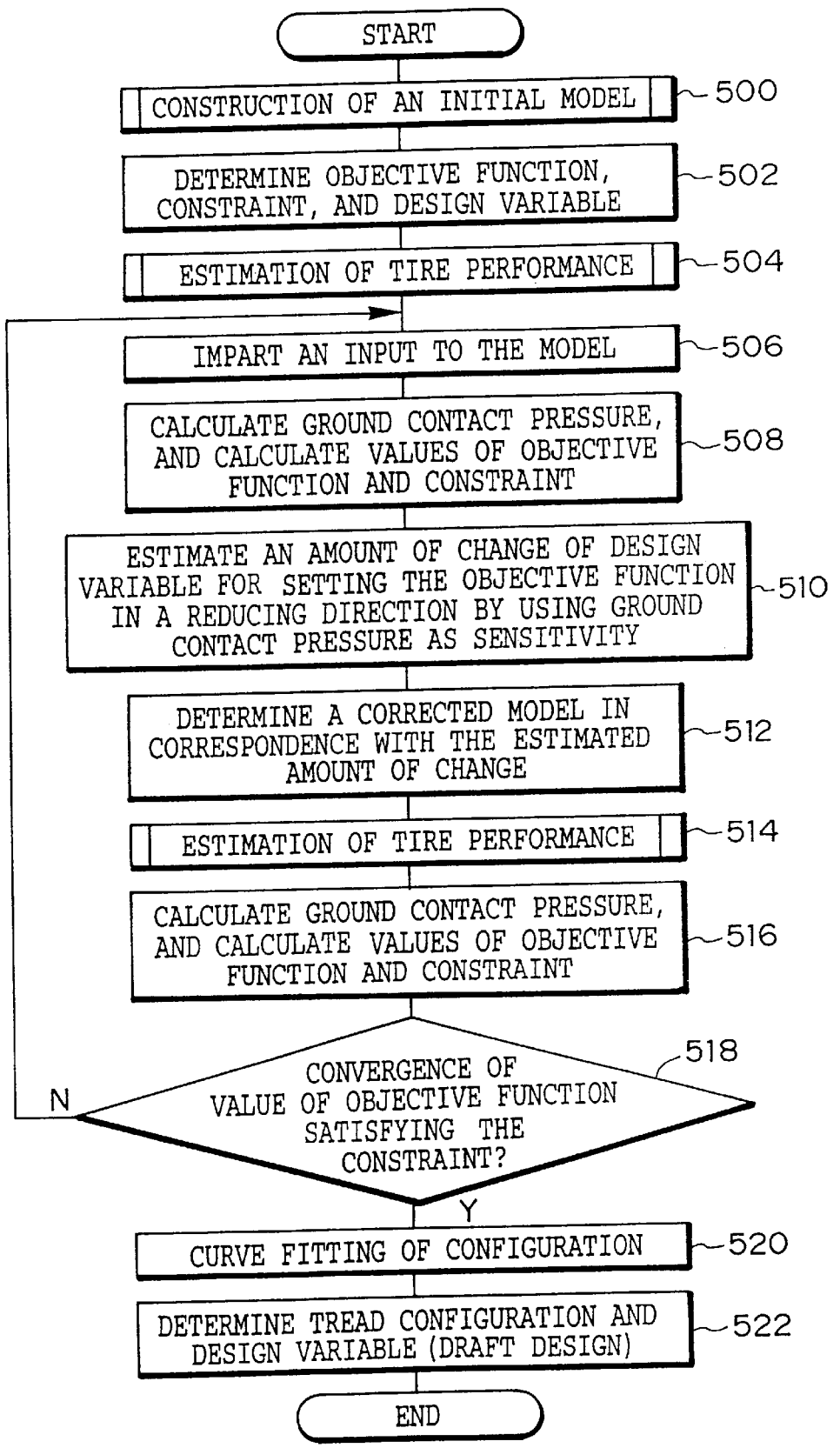
FIG. 51 is a flowchart illustrating the flow of the processing of a program for designing a pneumatic tire in accordance with a seventh embodiment of the invention.

FIG. 51 shows a processing routine for the program in accordance with this embodiment. In Step 500, in the same way as Step 200 of FIG. 35, initial-model construction processing is executed, including the construction of a tire model to incorporate the draft design (such as the change of the shape, structure, materials, and pattern of the tire) of the tire to be designed into a model in numerical analysis, as well as a fluid model and a road surface model for evaluating tire performance, and so on.

In this embodiment, to design a tire by designing the tread configuration of a rectangular parallelepiped for uniformalizing the ground contact pressure without reducing the ground contact area, in Step 500, modeling is advanced further with respect to one block constituting a portion of the tire, and the configuration of a block with a planar tread is used as a reference shape. This reference shape is subjected to modeling by a technique, such as the finite element method, which makes it possible to numerically or analytically determine the response at the time of input of the road surface, so as to determine a basic model of the tire which represents the configuration of the block, and which is divided into a plurality of elements by meshing. It should be noted that the basic shape is not confined to the one having a planar tread, but may be an arbitrary shape. The term modeling referred to herein means the numerical representation of the shape of the pattern, the shape of the block, the structure, materials, and the like into a data format for input into a computer program prepared according to a numerical and analytical technique.

Figure 52:
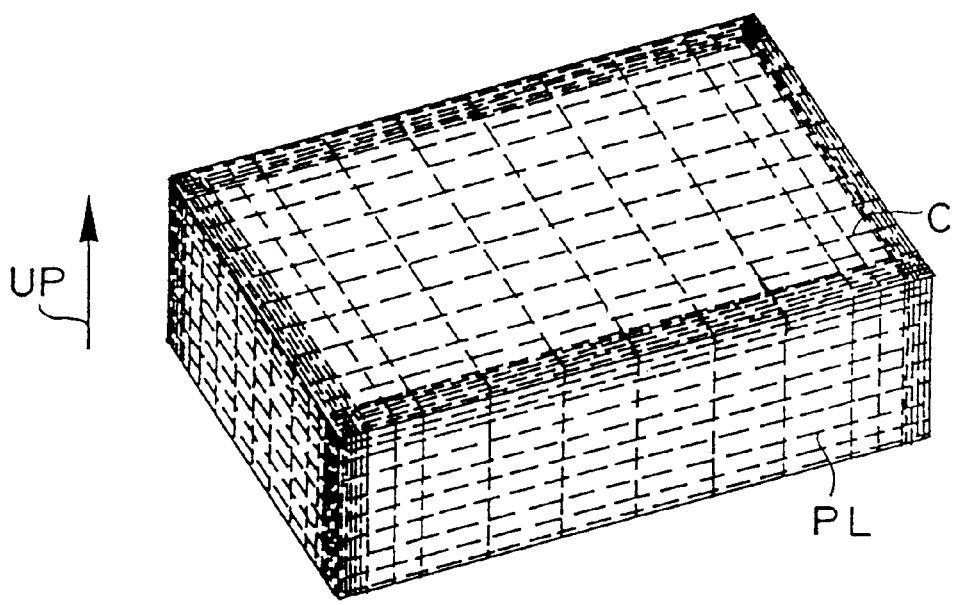
FIG. 52 is a perspective view illustrating a basic model of the configuration.

FIG. 52 shows one example of the basic model of the block. In addition, this basic model of the block is divided into a plurality of elements by meshing, i.e., into a plurality of elements by a plurality of line segments PL in the drawing. It should be noted that although, in the above, a description has been given of the example in which the basic model of the block is divided into a plurality of elements as shown in FIG. 52, this dividing method is arbitrarily, and the width of division may be varied depending on the objective, or the block may be divided into arbitrary shapes such as triangles. In the case of this embodiment, the coordinates, in the heightwise direction of the block (in the direction of arrow UP in FIG. 52), of nodes $D_i$ (i: number of the node; $i \geq 1$) for determining the tread configuration of the block are set as the design variable $r_i$.

Next, in Step 502, in the same way as Steps 202 and 204 in FIG. 35, an objective function representing a physical quantity for evaluating tire performance, a constraint for constraining the cross-sectional shape of the tire, and a design variable determining the cross-sectional shape of the tire are determined. In an ensuing Step 504, initial tire performance is estimated.

Figure 53A:
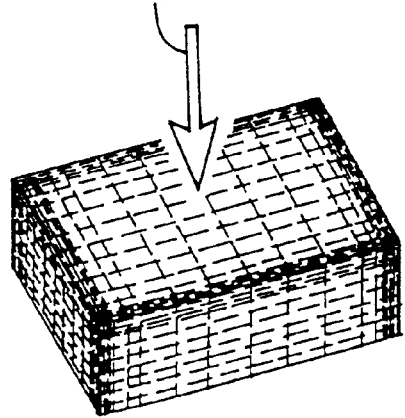
FIG. 53A is a conceptual perspective view illustrating an input imparted to the basic model of the configuration.
Figure 53B:
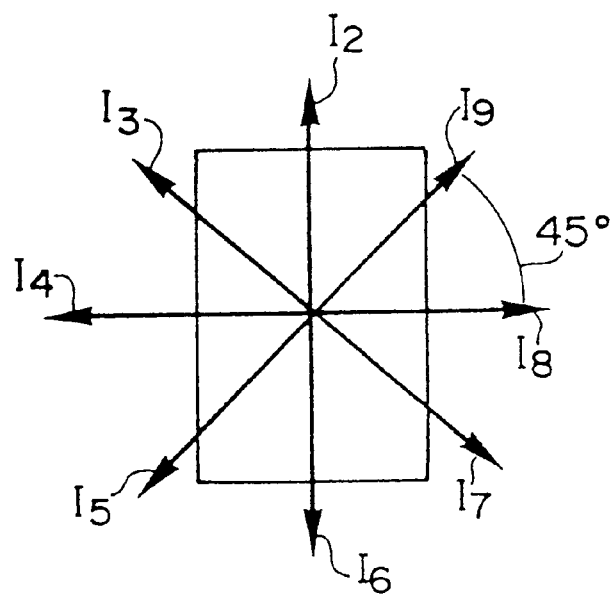
FIG. 53B is a diagram illustrating the direction of the input imparted to the basic model of the configuration.

In an ensuing Step 506, at least one input $I_j$ (j: the number of input; $j \geq 1$) is imparted to the basic model of the block modeled in Step 500 above. In this embodiment, a total of nine inputs $I_j$ are imparted. As shown in FIG. 53A, a flatly pushing load (e.g., a surface pressure of 4 kgf/cm$^2$) at a time when the load is applied substantially perpendicularly to the basic model of the block, as shown in FIG. 53A, is set as the input $I_1$. Under this flatly pressing load, as shown in FIG. 53B, inputs in eight directions at equal angles, i.e., in directions (directions along the tread C) perpendicular to the heightwise direction UP of the block from a central portion of the basic model of the block, i.e., inputs in shearing directions at pitches of about 45 degrees (in eight directions), are imparted by 1 mm each, and these inputs are set as inputs $I_2$ to $I_9$. This 1 mm corresponds to the fact that the road surface is moved 1 mm with respect to the bottom of the block serving as a reference. These inputs $I_2$ to $I_9$ correspond to the input conditions. The input conditions are conditions for defining inputs to be imparted, and refer to the force of input (load), direction, and a combination of a plurality of inputs.

It should be noted that although, in this embodiment, a description is given of the case in which the plurality of inputs $I_2$ to $I_9$ are imparted, the invention is not limited to the number of inputs just mentioned, and two or more conditions of load may be used as the condition of the load. Further, the inputs in the shearing directions are not limited to five, and it is sufficient if one or more inputs are provided, and a load setting may be provided for each of the inputs in the shearing directions.

In an ensuing Step 508, the ground contact pressure $p_{i,j}$ with respect to the input $I_j$ given in Step 506 above is calculated, and the objective function OBJ representing a physical quantity for evaluating pattern performance or a physical quantity for evaluating block performance (hereafter referred to as a physical quantity for evaluating pattern/block performance), as well as the constraint G for constraining the tread configuration of the pattern/block, are determined. In this embodiment, to aim at the effects of improving the steering stability and the suppression of partial wear, the objective function (OBJ) and the constraints (G1 and G2) are set as follows:

Objective function OBJ: a standard deviation of the distribution of ground contact pressure in a contact area Constraint G1: the contact area being greater than or equal to that of a basic model of the block of the same input Constraint G2: the maximum height of the block being greater than or equal to that of the basic model of the block It should be noted that, in this embodiment, the ground contact area is set as the constraint G from the viewpoint of placing emphasis on the ground contacting characteristics, and the maximum height of the block is vade invariable for the purpose of not changing the tire radius. However, another physical quantity may be used as the aforementioned constraint depending on the objective, and this designing method is valid even if a single or a plurality of constraints G are used or the constraint G is not used.

In addition, although, in the above, the ground contact pressure with respect to an input is determined in Step 508, the distribution of ground contact pressure may be determined at the point of time when the input is given in Step 506.

In an ensuing Step 510, the amount of change of the design variable $r_i$ is estimated (the amount of change of the shape of the block tread is estimated) by using the deviation of ground contact pressure at each node as sensitivity information. Namely, from the ground contact pressure at each node, the amount of change of the direction of improvement of the design variable is estimated in the direction in which the block height is decreased (increased) if the ground contact pressure higher (lower) than the average. In Step 510 in this embodiment, the amount of change of the design variable $r_i$ is estimated in accordance with the following Formula (18);

$$dr_i = \alpha \cdot \text{MAX} \, \frac{\overline{p_j} - p_{i,j}}{\overline{p_j}} \qquad (18)$$

where, i: number of the node $dr_i$: amount of change of the shape in the heightwise direction of the node i $\alpha$: parameter (constant of proportion)

$\overline{P_j}$: average ground contact pressure at the input $p_{i,j}$: ground contact pressure at the node $D_i$ with respect to the input $I_j$ Formula (18) above represents that "when a plurality of input conditions are considered, in conformity with an input condition whose ratio with the average ground contact pressure is the largest, each node changes by a distance obtained by multiplying that ratio by a constant of proportion $\alpha$." It should be noted that this Formula (18) is used to permit a change of the design variable $r_i$ in which, if the ground contact pressure is assumed to be uniformalized, the shape of the tread (block height) at a portion with low ground contact pressure is made high, whereas the shape of the tread (block height) at a portion with high ground contact pressure is made low.

In an ensuing Step 512, a corrected model of the tire is constructed which corresponds to the estimated value of the amount of change of the design variable $r_i$. In this Step 512, a tire model is formed from the corrected model, i.e., block, making it possible to generate a corrected tire model. In an ensuing Step 514, in the same way as Step 204 in FIG. 35, tire-performance estimation processing is executed for the corrected tire model. Incidentally, in Step 514, if the tire-performance estimation processing is executed, in the same way as described above, from the evaluation of the results of estimation, it is possible to determine whether or not the estimated performance is satisfactory. This determination may be made by entry from the keyboard, or after setting an allowable range in advance with respect to the aforementioned evaluation value, a determination may be made that the estimated performance is satisfactory if the value of evaluation of the results of estimation falls within the allowable range. On the other hand, if the estimated performance is unsatisfactory relative to the targeted performance as a result of the evaluation of the estimated performance, the processing may be stopped at this point of time, and the design of the tire may be started over again (the foregoing processing is carried out again) after altering (correcting) the draft design. Still alternatively, the results of evaluation of the estimated performance may be stored, and may be referred to, as required.

Upon completion of the tire-performance estimation processing, in Step 516, the ground contact pressure, the objective function, and the constraint are determined. In an ensuing Step 518, a determination is made as to whether or not the value of the objective function has converged by making a comparison between the value of the objective function OBJ determined in Step 516 above and the value of the objective function determined in the previous repeated processing (the value of the objective function determined in Step 516 in the previous repeated processing). If a convergence value of the objective function satisfying the constraint has been obtained, YES is given in Step 518, and the operation proceeds to Step 520. On the other hand, if a convergence value of the objective function satisfying the constraint has not been obtained, NO is given in Step 518, and the operation returns to Step 506 to repeatedly execute the foregoing processing.

In this embodiment, since it is estimated that the smaller the standard deviation of the distribution of ground contact pressure in the contact area, which is the objective function, the more the partial-wear suppressing performance and the steering stability performance improve, the value of the objective function OBJ converges in the direction in which it becomes small. Accordingly, in this embodiment, the processing of Steps 506 to 518 is repeatedly executed until a minimum value of the objective function OBJ is obtained.

It should be noted that, in this embodiment, since the constraints G are provided, when a minimum value of the objective function OBJ is obtained while satisfying the constraints G, the repeated processing (Steps 506 to 518) ends. As the mathematical formula defining the change of the shape, one other than Formula (18) above may be used, and various methods are possible. For example, it is possible to use, among others, a formula in which after a particular input among the plurality of inputs is multiplied by a weight w to allow emphasis to be placed thereon, responses from the respective inputs are mixed. One example is shown in the following Formula (19):

$$dr_i = \alpha \cdot \sum_j w_j \cdot \frac{\overline{p_j} - p_{i,j}}{\overline{p_j}} \quad (19)$$

where, $w_j$: weight with respect to the input $I_j$

It should be noted that since a setting that the smaller the objective function, the better, is adopted in this embodiment, a minimum value is determined; however, depending on the objective it is possible to select an objective function in which the larger the value, the better, or an objective function in which a particular value is regarded as being best.

Figure 54B:
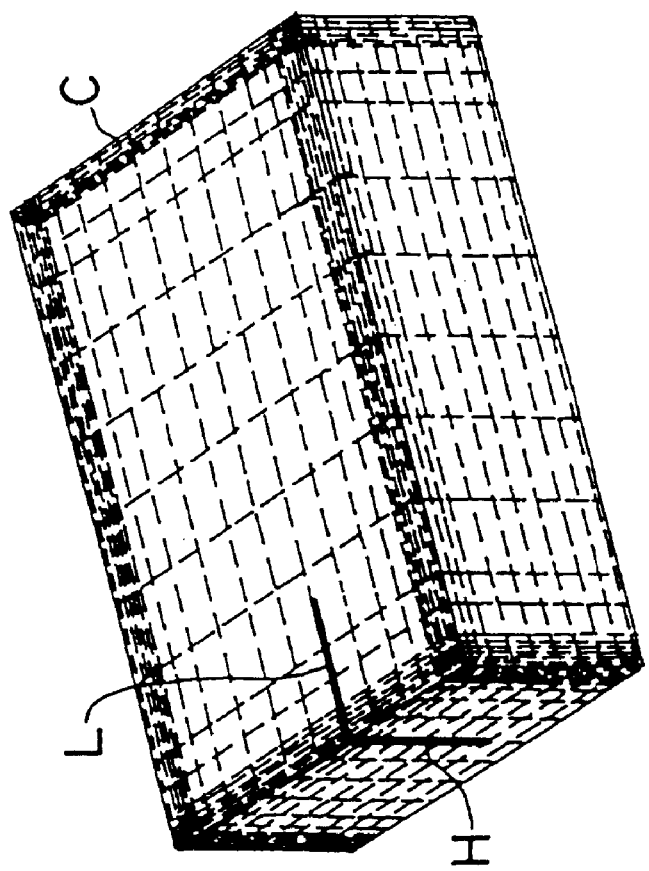
FIG. 54B is a perspective view of the ground contacting edge of the block and its vicinity for explaining curve fitting processing.
Figure 54A:
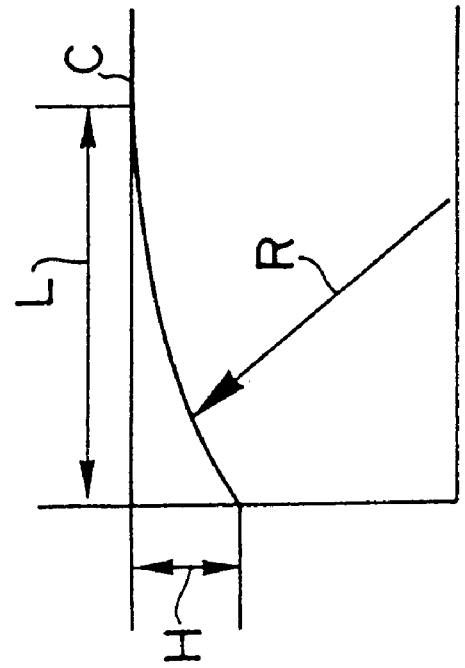
FIG. 54A is a cross-sectional view illustrating the configuration of a ground contacting edge of the block and its vicinity for explaining curve fitting processing.

In an ensuing Step 520, curve fitting processing is provided for the tread shape of the block. This curve fitting processing is processing in which the shape of the ground contacting edge of the block and its vicinity is trimmed to the shape of a predetermined radius of curvature R. Specifically, as shown in FIGS. 54A and 54B, as for the ground contacting edge of the block and its vicinity, the shape of the block is trimmed such that a curve connecting the position of a predetermined length H in a direction perpendicular to the block (in a direction along the direction UP and in an opposite direction thereto) from a block end on the one hand, and the position of a predetermined length L in a horizontal direction of the block (in a direction perpendicular to the direction UP) on the other hand, assumes a predetermined radius of curvature R. The reason for this is to obtain a more simplified shape in view of the time and trouble in the manufacture and the cost since the overall tread constitutes the design variable $r_i$, and the shape of the ground contacting edge of the block and its vicinity or the overall tread become complex due to the processing up to and including Step 518 above.

Figure 55:
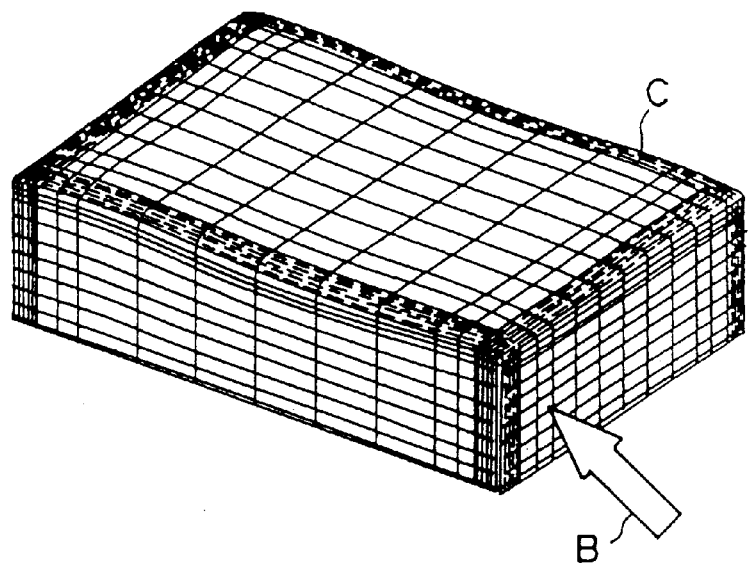
FIG. 55 is a diagram illustrating a block configuration as a result of calculation.
Figure 56:
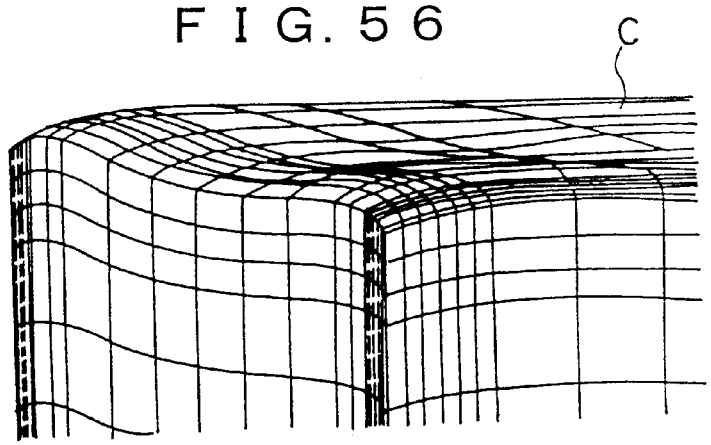
FIG. 56 is a perspective view taken from the direction of arrow B.
Figure 57:
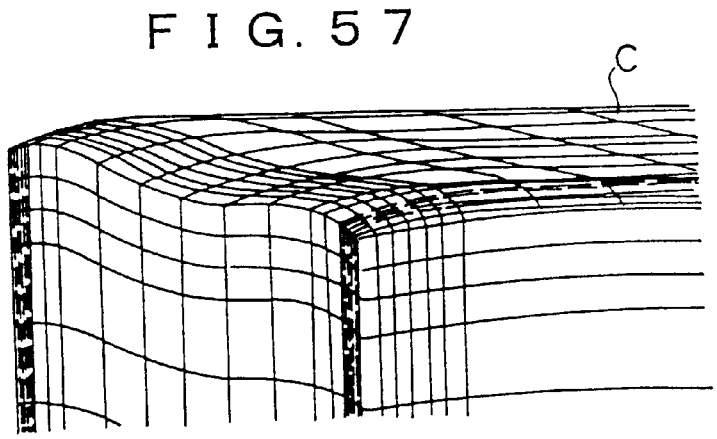
FIG. 57 is a diagram illustrating the block configuration which is the result of subjecting the block configuration to curve fitting processing.

FIG. 55 shows one example of the shape of the block calculated up to and including Step 518 above. FIG. 56 shows a perspective view taken from the direction of arrow B in FIG. 55. The result of curve fitting processing in Step 520 is shown in FIG. 40. Accordingly, the shape of the block shown in FIG. 56 can be replaced by the shape of the block shown in FIG. 57. As the radius of curvature R disposed at each block end, it is possible to obtain a shape close to a most suitable design variable ri by the least square approximation. This approximation is effected at a number of locations in the cross section of the block, and the shape of the other portions can be determined by performing interpolation between the number of points by the Lagrange's polynomial.

It should be noted that although, in this embodiment, the radius of curvature R is used in the approximation, instead of the radius of curvature R it is possible to use polynomials, division polynomials, splines, NURBS (non-uniform rational B-splines), rational functions, or the like. Further, although the portions intermediate the designated cross sections are interpolated by the Lagrange's polynomial, in the same way as the radius of curvature R, it is possible to use other polynomials, division polynomials, spline functions, NURBS, rational functions, or the like. In addition, instead of designating the cross section, the configuration of the tread itself may be represented by a polynomial interpolation surface, a division polynomial surface, a spline surface, an NURBS surface, or the like. In the approximation as well, a method of approximation other than the least square approximation may be used. Thus, in this embodiment, the approximation of the shape is performed by taking the manufacture into consideration after the design variables which give an optimum value of the objective function have been obtained.

Upon completion of the foregoing processing, the shape of the tread is determined in an ensuing Step 522. In this Step 522, the tire is designed on the basis of the design variables which give an optimum value of the objective function obtained from the above-described computation, i.e., the tire is designed in which blocks having the tread shape determined as described above are arranged. Incidentally, in this Step 522, the design of a mold for vulcanization of the tire may be performed instead of the design of the tire.

Figure 58:
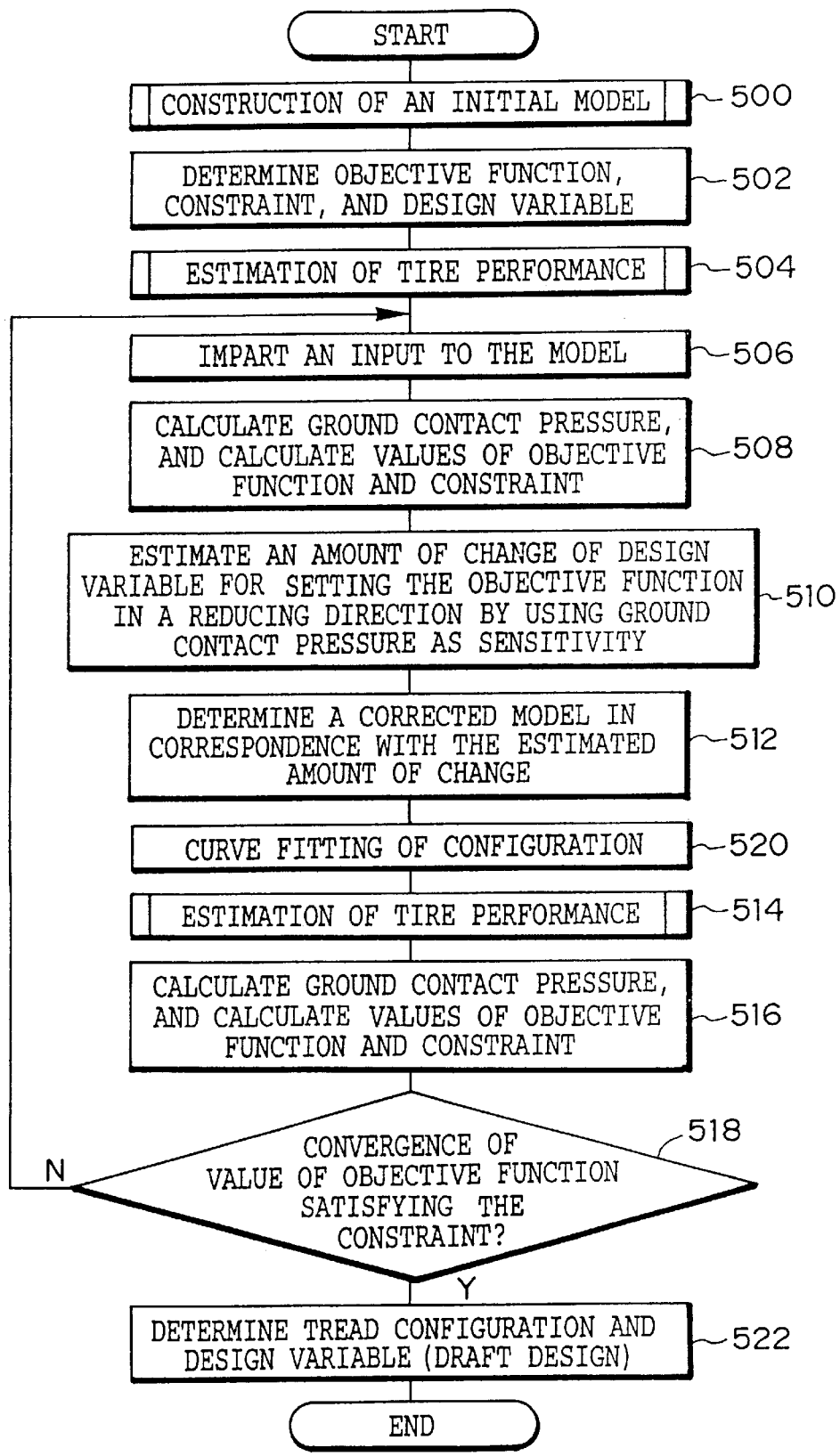
FIG. 58 is a flowchart illustrating the flow of processing in a case where the configuration is approximated for each computation.

Although, in the above, a description has been given of the case in which the approximation of the shape is performed by taking the manufacture into consideration after the design variables which give an optimum value of the objective function have been obtained, the processing for changing the shape in accordance with the aforementioned function or mathematical formula may be performed for each computation or once in a number of computations. One example of the flow of processing in a case where the shape is approximated for each computation is shown in FIG. 58. In the processing in FIG. 58, the processing of Step 520 in FIG. 51, i.e., the processing for approximating the shape by taking the manufacture into consideration after the design variables which give an optimum value of the objective function have been obtained, is performed between Steps 512 and 514.

In the processing of FIG. 58, in Step 512, a corrected model corresponding to the estimated value of the amount of change of the design variable ri is constructed. In an ensuing Step 520, the tread configuration of the block is subjected to curve fitting processing. Then, the tire performance estimation is executed in Step 514.

Accordingly, by approximating the shape for each computation, it is possible to determine the convergence of the objective function by the approximate shape. It should be noted that in a case where one approximation is performed for a number of computations, it suffices if, in FIG. 58, the condition of judgment is loaded so as to perform the processing of Step 520 once for a number of computations.

Incidentally, in the case where the approximation of the shape is performed for each computation, it functions as a constraint which is given to the design variable.

Meanwhile, the optimal shape itself may be applied to the design of the tire without using the approximation of the shape. A flowchart in the case where the approximation of the shape is not carried out is shown in FIG. 59. In the processing of FIG. 59, the processing of Step 520 in FIG. 51, i.e., the processing in which the shape is approximated by taking the manufacture into consideration after the design variables which give an optimum value of the objective function have been obtained, is omitted.

As described above, in this embodiment, since the tread shape of the pattern or the block is optimized, it is possible to provide a tire whose steering stability and partial-wear resistance performance are improved.

Figure 60:
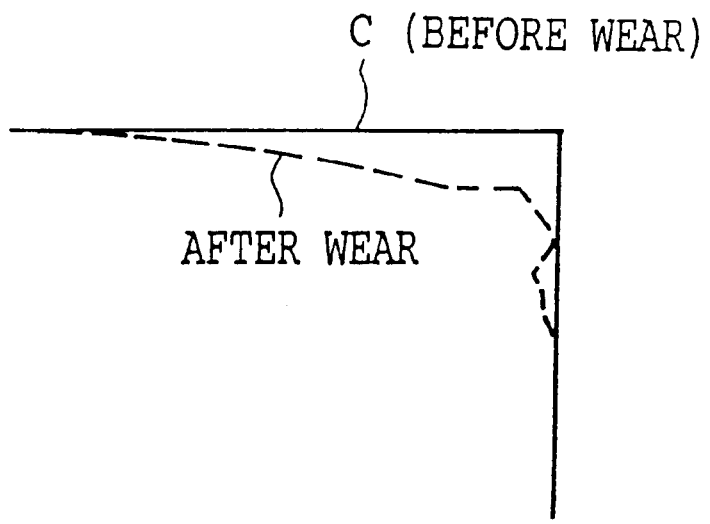
FIG. 60 is a conceptual diagram for explaining the state of wear with respect to a conventional tire configuration.
Figure 61:
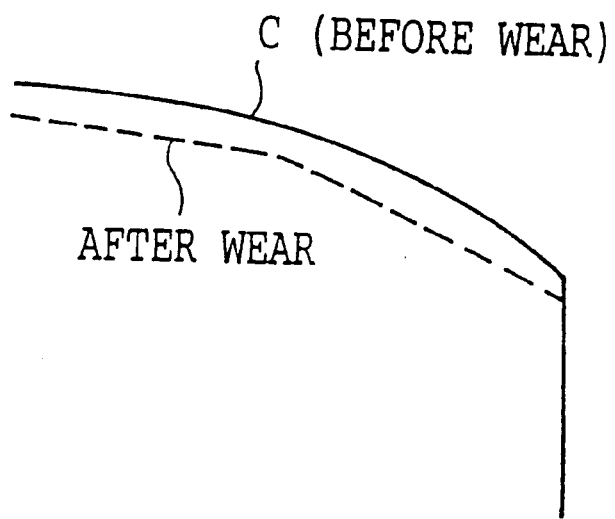
FIG. 61 is a conceptual diagram for explaining the state of wear with respect to the tire configuration in accordance with the invention.

The states of wear of these tires are shown in FIGS. 60 and 61 as conceptual diagrams. The solid line shows a cross-sectional view of the ground contacting end and its vicinity prior to the wear, while the broken line shows a cross-sectional view of the ground contacting end and its vicinity after the wear. As shown in FIG. 60, with the tire of the conventional shape, the ground contacting end is locally worn intensely. On the other hand, as shown in FIG. 61, the tire in accordance with this embodiment assumes a state of being worn substantially uniformly. From this, it will be appreciated that the local partial wear can be suppressed by the appropriate shape of the tread.

As described above, in accordance with this embodiment, since the tread shape of the pattern/block is optimized, it is possible to provide a tire whose steering stability and partial-wear resistance performance are improved.

[Eighth Embodiment]

Next, a description will be given of an eighth embodiment. It should be noted that since the arrangement of this embodiment is substantially similar to that of the above-described embodiments, identical portions will be denoted by the same reference numerals, and a detailed description thereof will be omitted. In addition, water is adopted as the fluid in this embodiment.

If analysis is performed by providing the tire model with a pattern around its entire circumference, the amount of computation becomes enormously large, so that the results cannot be obtained easily. Accordingly, in this embodiment, in the same way as the second embodiment, the tire is designed by providing only a portion of the tire model with the pattern in order to facilitate the design of the tire while taking the drainage performance of the tire into consideration.

As described before, concerning the drainage performance, particularly hydroplaning, of the tire, the peripheral portion of the tire can be classified into the following three regions including regions A to C in the vicinity of the ground contact surface (see FIG. 27). In addition, if consideration is given to the pressure relationship (see FIG. 28B) in a case where the tire (tire model 30) rolls on the road surface 18 in the rolling direction (in the direction of arrow M in FIG. 28A), pressure in dynamic hydroplaning (region A) is dominant.

Accordingly, in this embodiment, in order to facilitate the design of the tire while taking the drainage performance of the tire into consideration, as the tire model 30 a smooth tire model having a flat entire periphery is set as a basis, and GL analysis is performed by providing the smooth tire model with a partial pattern necessary for facilitating the analysis of the leading edge. Incidentally, since the outline of the GL analysis is similar to the procedures 1 to 4 described before, a description thereof will be omitted.

The details are substantially similar to those of the above-described embodiments. First, a tire model and a fluid model are constructed on the basis of the draft design of the tire; the road surface condition is inputted by selecting the coefficient of friction $\mu$ in conjunction with the construction of a road surface model; the boundary conditions during the tire rolling or tire nonrolling are set; and the design variable and the constraint are set (Steps 200 to 204 in FIG. 35). In this case, the tire model is a smooth tire model, and a pattern model (one portion) and a portion of the belt model to be pasted on the pattern are constructed. Then, the boundary conditions during the tire rolling or tire nonrolling are set, and the deformation calculation and fluid calculation of the tire model and the like are carried out. This involves the rolling of the smooth tire model and hydroplaning analysis (global analysis: G analysis; see FIG. 48).

Next, a model in which the design variable is changed by a unit amount $\Delta r_i$ is determined (Steps 206 to 210), the deformation calculation and fluid calculation of the tire model are performed, the boundary conditions are determined, and the tire performance is estimated (Step 212 in FIG. 35). Namely, from the results of the smooth tire model, the locus of rolling of the belt model (the same as one portion of the pattern model) to be pasted on the pattern portion (one portion) is calculated. Consequently, since only the pattern portion (one portion) is rolled (FIG. 31), a fluid mesh corresponding to the pattern portion is prepared, and analysis of the drainage performance is performed with respect to the pattern portion alone. This is the analysis (local analysis: L analysis) of only the pattern portion which is one portion of the pattern model. Here, as shown in FIG. 31, as the pattern portion (one portion) rolls, the pattern portion shifts through the positional state L1 to the positional state L13.

Then, the values of the objective function and the constraint and the sensitivities for each design variable are computed, an estimated value of the amount of change of the design variable which maximizes the value of the objective function is determined while taking the constraint into account and estimating the tire performance, and this processing is repeated until the value of the objective function converges (Steps 214 to 224 in FIG. 35). The tire configuration is determined on the basis of the design variable when the value of the objective function has converged to the estimated value.

Thus, in this embodiment, since the smooth tire model is set as a basis, and GL (global-local) analysis is performed for estimating the tire performance by using a portion of the pattern, it is possible to obtain three advantages in the same way as described before.

It should be noted that, in this embodiment, it is possible to obtain results similar to those of examples of the results of analysis of the drainage performance when the pattern portion (one portion) was rolled, which are shown in FIGS. 32 to 34. Namely, FIGS. 32 to 34 show time-series states of the pattern portion, and as can be seen from the drawings, at the outset when the pattern portion comes into contact with the road surface, the fluid (water) is scattered in such a manner as to be sprayed in the rolling direction of the tire model (FIG. 32). As the pattern portion slightly treads on the road surface, the fluid (water) which is guided along the grooves in the tire model increases, and the fluid (water) in spray form decreases (FIG. 33). When the middle portion of the pattern portion is in contact, i.e., when a substantially entire portion of the pattern portion is in contact with the road surface, most of the fluid (water) is guided along the grooves in the tire model (FIG. 34).

[Ninth Embodiment]

Next, a description will be given of a ninth embodiment. It should be noted that since the arrangement of this embodiment is substantially similar to that of the above-described embodiments, identical portions will be denoted by the same reference numerals, and a detailed description thereof will be omitted. This embodiment optimizes the block shape for reducing the resistance of the fluid by removing a portion of a tip of the block constituting a portion of the tire.

FIG. 62 shows a processing routine for the program in accordance with this embodiment. In Step 600, in the same way as Step 200 of FIG. 35, initial-model construction processing is executed, including the construction of a tire model to incorporate the draft design (such as the change of the shape, structure, materials, and pattern of the tire) of the tire to be designed into a model in numerical analysis, as well as a fluid model and a road surface model for evaluating tire performance, and so on. It should be noted that, in this embodiment, in the same way as the second and eighth embodiments, optimization is effected by providing only a portion of the tire model to be provided with the pattern so as to facilitate the design of the tire while taking the drainage performance of the tire into consideration and to suppress the load of computation. For this reason, in Step 600, processing for construction of various models, including the smooth tire model, a model of a portion of the pattern, a belt model, and a fluid model of the ground contacting portion of the pattern, is carried out.

In addition, in this embodiment, to design the tire by designing a block shape for reducing the resistance of the fluid by removing a portion of the tip of the block constituting a portion of the tire, in Step 600, modeling is advanced further with respect to one block constituting a portion of the tire, and the configuration of a block with a planar tread is used as a reference shape, as shown in FIG. 52. This reference shape is subjected to modeling by a technique, such as the finite element method, which makes it possible to numerically or analytically determine the response at the time of input of the road surface, so as to include a basic model of the tire which represents the configuration of the block, and which is divided into a plurality of elements by meshing. It should be noted that the basic shape is not confined to the one having a planar tread, but may be an arbitrary shape. The term modeling referred to herein means the numerical representation of the shape of the pattern, the shape of the block, the structure, materials, and the like into a data format for input into a computer program prepared according to a numerical and analytical technique.

Figure 64:
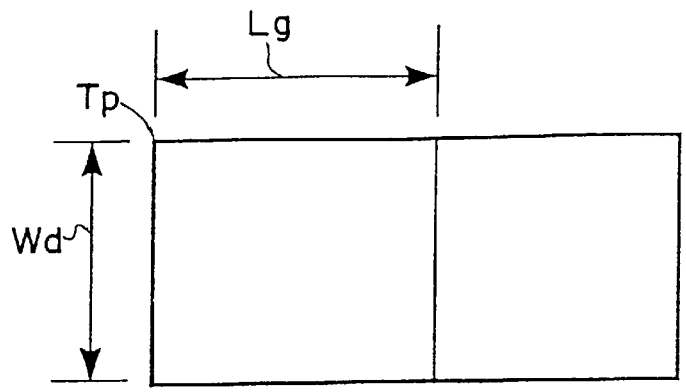
FIG. 64 is a side elevational view of a caramel block before optimization.
Figure 65:
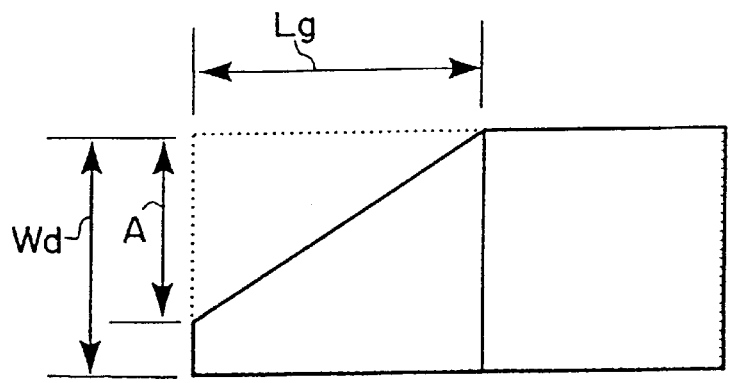
FIG. 65 is a side elevational view of the caramel block after optimization.
Figure 66:
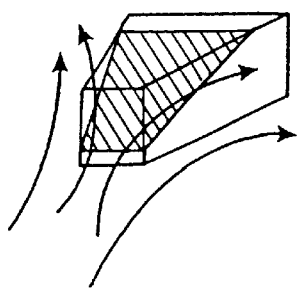
FIG. 66 is an image diagram illustrating the manner in which the resistance of the fluid is reduced by removing a block tip by optimization.

FIGS. 64 and 65 show examples of outer configurations of basic models of the block. As shown in FIG. 64, in the basic model of the block prior to optimization, a tip portion Tp on the treading side is provided with a height Wd, and the position of a length Lg from the tip portion Tp in the downstream direction is set as the position for removing the tip of the block. After optimization, as shown in FIG. 65, the tip of the block is removed by using as an origin the position of the length Lg from the tip portion Tp in the downstream direction, and the length from this tread in the heightwise direction of the block is set as an amount of removal A of the tip of the block. In the case of this embodiment, the amount of removal A of the tip of the block (length from the tread in the heightwise direction of the block) is set as the design variable ri. Incidentally, the basic model of the block is made divisible into a plurality of elements, though not shown, by meshing. This dividing method is arbitrarily, and the width of division may be varied depending on the objective, or the block may be divided into arbitrary shapes such as triangles. Thus, by removing the tip of the block, it is estimated that the resistance of the fluid is reduced, as shown in FIG. 66.

Next, in Step 602, in the same way as Step 202 in FIG. 35, an objective function representing a physical quantity for evaluating tire performance, a constraint for constraining the cross-sectional shape of the tire, and a design variable determining the cross-sectional shape of the tire are determined. In an ensuing Step 604, initial values of the tire model, which is the tire shape using the models constructed as described above, are determined.

In this embodiment, the objective function and the constraint are set as follows:

Objective function: fluid reaction force (minimization)
Constraint: The volume of the block is within 60% to 100% of the initial shape.

The design variable is the amount of removal A of the tip of the block on the treading side (FIG. 65).

The fluid reaction force of the objective function needs to be determined in the analysis of the drainage performance during rolling of the tire with a pattern. However, in the case of handling effects in a small region such as the shape of the block tip, it is necessary to sufficiently finely effect the meshing of the fluid region (at least the area where the block tip comes into contact with the ground and its vicinity) so as to ensure accuracy. And yet, in the analysis of the drainage performance during rolling of the tire in which the pattern of the entire tread is modeled, it is necessary to finely divide the fluid mesh over practically the entire region so as to ensure accuracy, and the computing time becomes enormously large, so that such a method is not suitable for an optimization technique which requires repeated calculations.

Accordingly, in this embodiment, in an ensuing Step 606, the drainage performance calculation is performed on the basis of GL analysis. In this Step 606, on the basis of the results obtained by the analysis of the drainage performance during rolling of the tire using a coarse fluid mesh, an evaluation is made of the effect of the shape of the block tip on the fluid reaction force by GL analysis (global/local analysis; global analysis: analysis of the drainage performance during rolling of a smooth tire; local analysis: analysis of the drainage performance during rolling of only a portion of the pattern) which is the analysis of the drainage performance in which only a portion of the pattern is rolled. This GL analysis is performed in procedures similar to procedures 1 to 4 in accordance with the above-described eighth embodiment.

Figure 63:
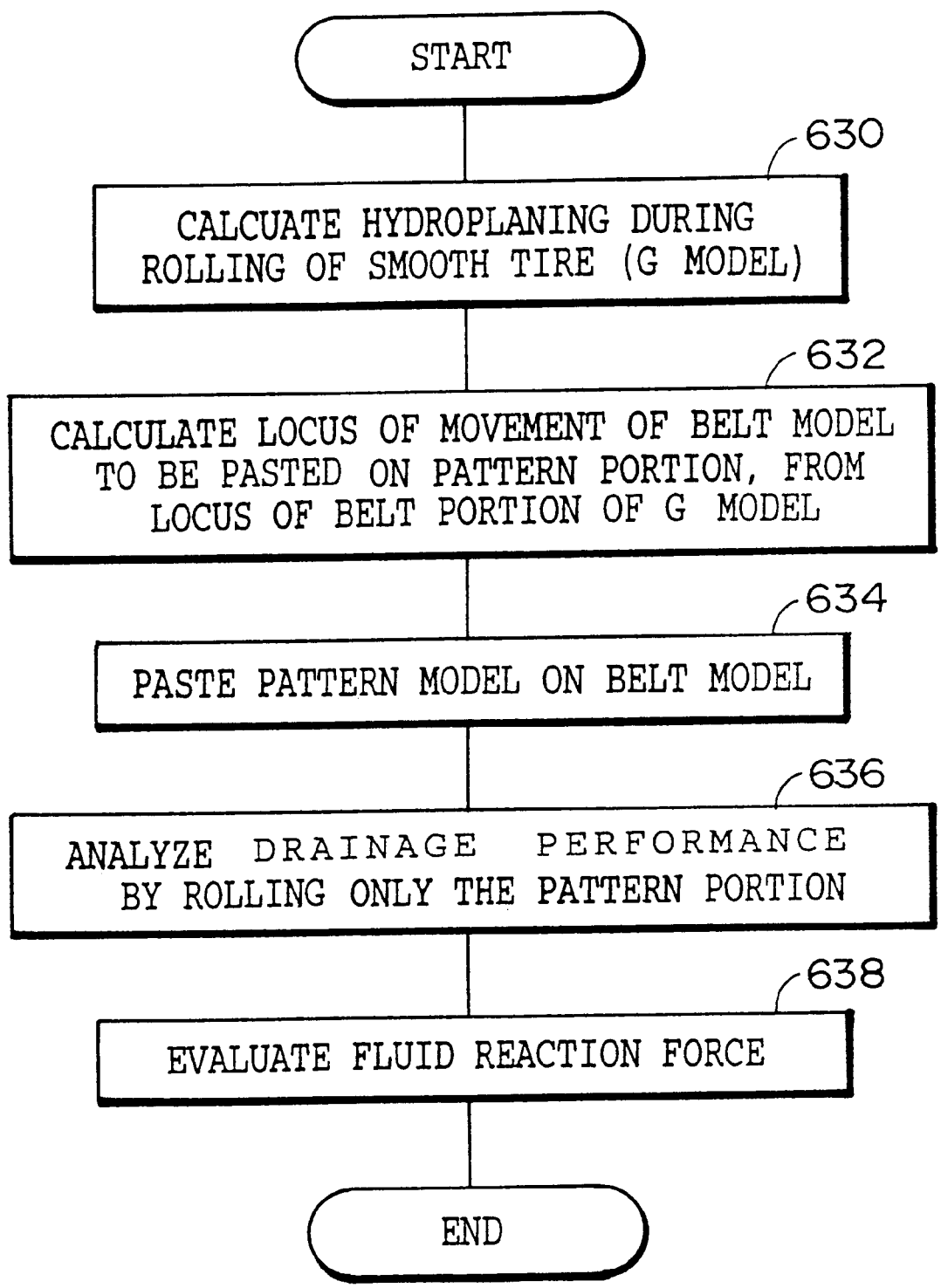
FIG. 63 is a flowchart illustrating the flow of processing of the calculation of drainage performance by GL analysis.

Specifically, in the processing of the calculation of the drainage performance based on the GL analysis in Step 606, the processing routine shown in FIG. 63 is executed. In Step 630 in FIG. 63, a smooth tire model, a pattern model (one portion), and a portion of a belt model to be pasted on the pattern are prepared as the procedure 1 (see FIGS. 29 and 30). In addition, a fluid mesh corresponding to the region where the pattern portion comes into contact with the ground is prepared. Then, the rolling-hydroplaning analysis of the smooth tire is performed as the procedure 2 (global analysis).

In an ensuing Step 632, as the procedure 3, the locus of rolling of the belt model to be pasted on the pattern portion is calculated from the result of the smooth tire. Specifically, displacements of all the nodes of the belt model during rolling are outputted, and the pattern model is pasted on the belt model (Step 634), and forced velocities (which may be displacements) are imparted to the nodes of the belt model. Incidentally, at the time of pasting the pattern model on the belt model, meshings of the two models may be made identical to share the nodes, or the two models may be joined by a constraint by varying the meshing density (the pattern side being made finer).

In an ensuing Step 636, as the procedure 4, analysis of the drainage performance is made by rolling only the pattern portion. That is, since only the pattern portion is rolled, analysis of the drainage performance is made for the pattern portion alone. Consequently, since the fluid region is located only in the ground contacting area of the pattern portion and its vicinity, the fluid mesh region can be made small, and even if the fluid mesh is finely divided, the number of elements does not become excessively large, so that an increase in the computing time can be avoided.

In an ensuing Step 638, the fluid reaction force is evaluated. Namely, the evaluation is made by determining a time history of the fluid reaction force in one stroke in which the pattern portion splashes on the water and comes into contact with the ground, by integrating the fluid reaction force by a certain time interval from the water splashing time to the ground contacting time, and by comparing the integrated values.

Figure 67:
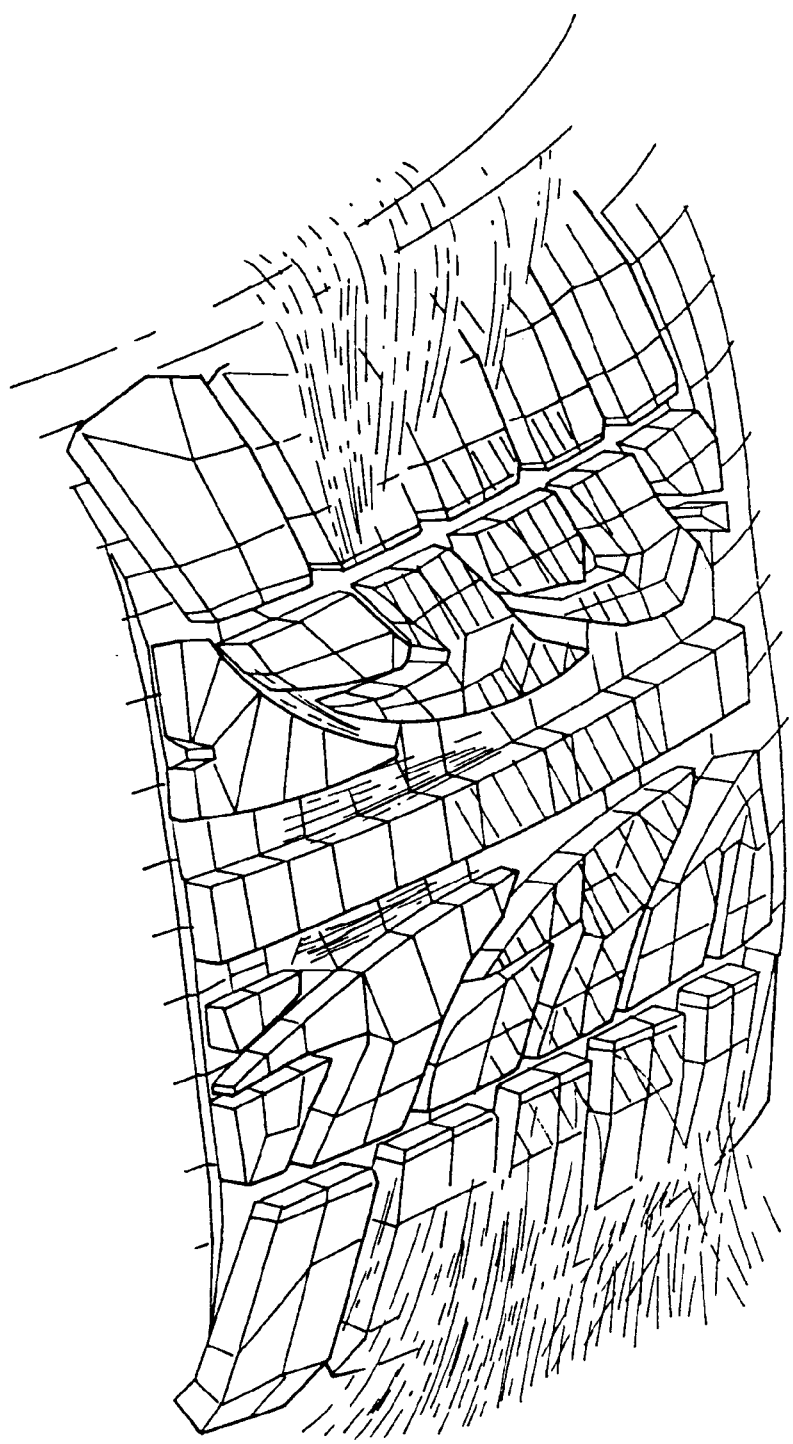
FIG. 67 is a perspective view illustrating a state in which the pattern is modeled partially.
Figure 69:
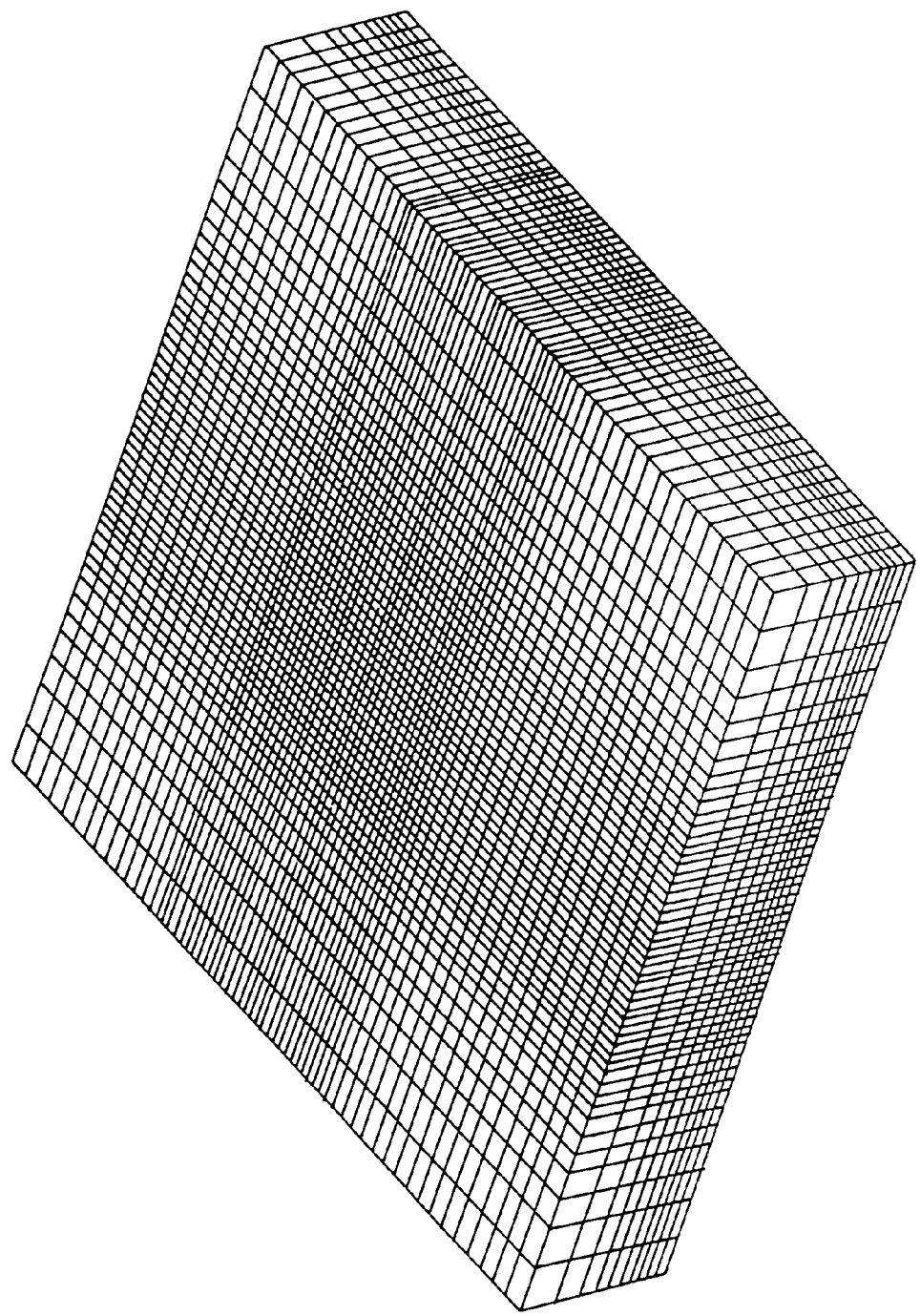
FIG. 69 is a diagram illustrating a fluid mesh.
Figure 70:
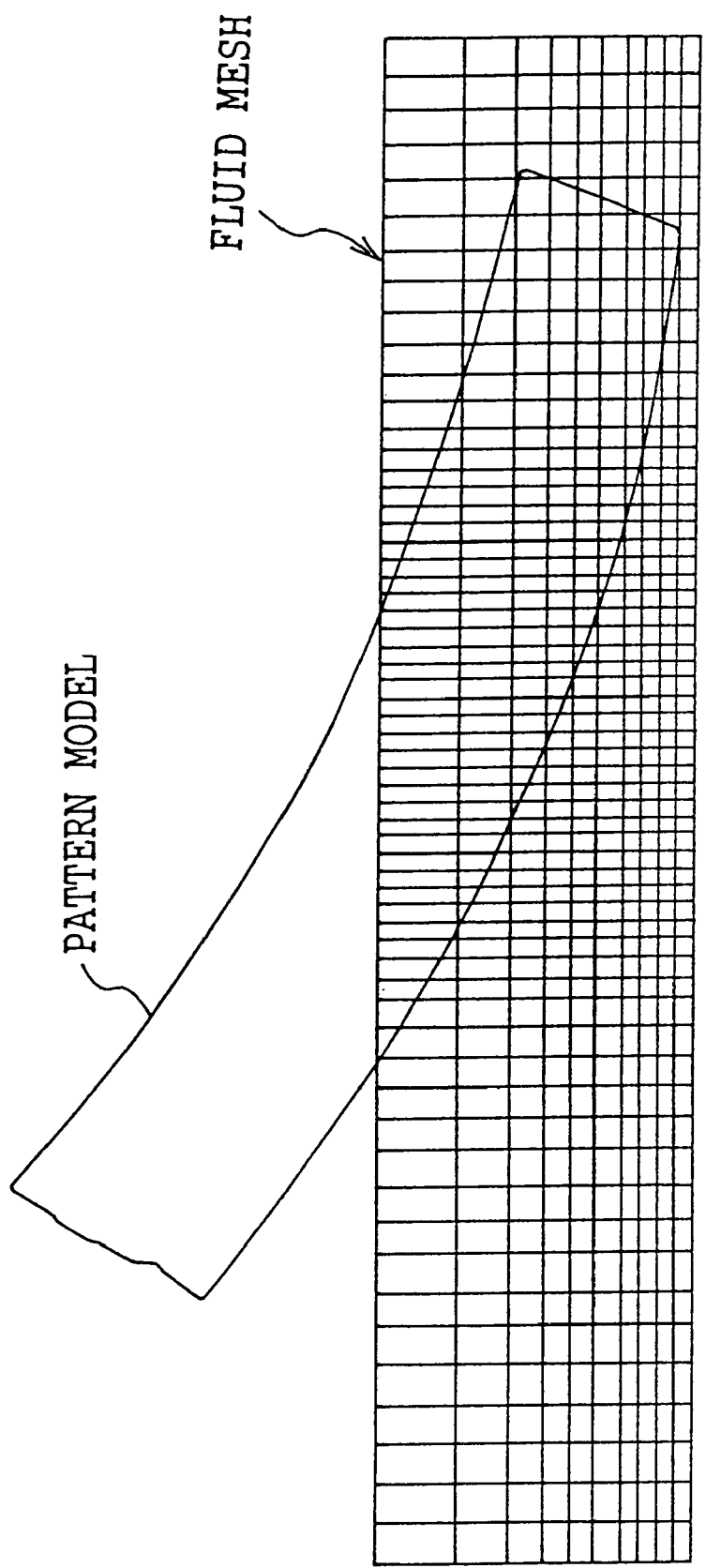
FIG. 70 is a diagram illustrating a state in which the fluid mesh and the pattern model overlap.

It should be noted that, at the time of the repeated calculation in the optimization process which will be described below, the preparation of the model in the procedure 1 may be effected for only the correction of the shape of the block tip of the pattern model, and there is no need to calculate the global analysis in the procedure 2 (an approximation is made such that even if the shape of the block tip has changed, no effect is exerted on the locus of rolling of the belt). FIG. 67 shows a state in which the pattern is partially modeled, and FIG. 68 shows changed positions Ag1, Ag2, Ag3, and Ag4 of the shape of the block tip in the pattern model. Further, FIG. 69 shows a fluid mesh used in this embodiment, and FIG. 70 shows a state in which the fluid mesh and the pattern model overlap.

After the calculation of the drainage performance by the GL analysis in Step 606 is thus completed, the operation proceeds to Step 608, in which, in the same way as Step 206 in FIG. 35, an initial value OBJo of the objective function OBJ and an initial value Go of the constraint G when the design variable $r_i$ is at an initial value ro are calculated. In an ensuing Step 610, in the same way as Step 208 in FIG. 35, the design variable $r_i$, which is the amount of removal of the block tip, is changed by $\Delta r_i$ each so as to change the basic model of the tire. In an ensuing Step 612, the tire model is corrected. Namely, the block tip is removed by an amount of removal corresponding to the design variable, and the tire model is corrected to the block with its tip removed, i.e., a corrected tire model is determined.

When the corrected model of the tire is thus determined, in an ensuing Step 614, in the same way as Step 214 in FIG. 35, a value $OBJ_i$ of the objective function and a value $G_i$ of the constraint after the design variable is changed by $\Delta r_i$ are calculated with respect to the corrected model of the tire. In an ensuing Step 616, in the same way as Step 216 in FIG. 35, a sensitivity $dOBJ/dr_i$ of the objective function, which is a ratio of an amount of change of the objective function to an amount of unit change of the design variable, as well as a sensitivity $dG/dr_i$ of the constraint, which is a ratio of an amount of change of the constraint to an amount of unit change of the design variable, are calculated for each design variable.

By means of these sensitivities, it is possible to estimate to what extent the value of the objective function and the value of the constraint change when the design variable is changed by $\Delta r_i$. It should be noted that these sensitivities are sometimes determined analytically depending on the technique used in modeling the tire and the nature of the design variable, in which case the calculation of Step 214 becomes unnecessary.

In an ensuing Step 618, in the same way as Step 218 in FIG. 35, an amount of change of the design variable which maximizes the objective function while satisfying the constraint is estimated by means of mathematical programming by using the initial value OBJo of the objective function, the initial value Go of the constraint, the initial value ro of the design variable, and the sensitivities. In Step 620, by using this estimated value of the design variable, a corrected model of the tire is determined in a method similar to that of Step 220 in FIG. 35, and a value of the objective function is calculated.

After the corrected model of the tire is determined, in an ensuing Step 622, a determination is made as to whether or not the value of the objective function has converged by comparing a threshold value inputted in advance with the difference between the value OBJ of the calculated objective function and the initial value OBJo of the objective function calculated in Step 206. If the value of the objective function has not converged, Steps 608 through 622 are executed repeatedly by setting as the initial value the value of the design variable determined in Step 618. If it is determined that the value of the objective function has converged, the value of the design variable at this juncture is set as the value of the design variable which maximizes the objective function while satisfying the constraint, and the shape of the tire is determined in Step 624 by using this value of the design variable.

Thus, in this embodiment, the tire is designed which reduces the resistance of the fluid, such as water, by removing the shape of the block tip. Therefore, if design and development are made, unlike the conventional design and development based on trial and error, the process ranging from the design of a best mode to the performance evaluation of the designed tire becomes possible based principally on computer calculation. Hence, it is possible to attain remarkably high efficiency, thereby permitting a reduction in the cost required in development.

In this embodiment, the tire size was set to 205/55R16, the internal pressure was set to 220 kPa, the load was set to 4,500 N, the tire speed was set to 60 km/h, and the water depth was set to 10 mm for use in optimization. Various results are shown below.

The results obtained by optimization are shown in Table 2. The amount of removal of the block tip was 6.4 mm, the fluid reaction force (integrated values for a time history of 6 ms from water splashing till ground contacting) expressed in an index indication was reduced from 100 to 96. It can thus be seen that the resistance of water at the block tip was reduced, and the fluid reaction force decreased.

TABLE 2

Results of Optimization

|  | Before Optimization | After Optimization |
|---|---|---|
| Amount of removal A of block tip | 0 | 6.4 |
| Fluid reaction force | 100 | 96 |

Figure 72A:
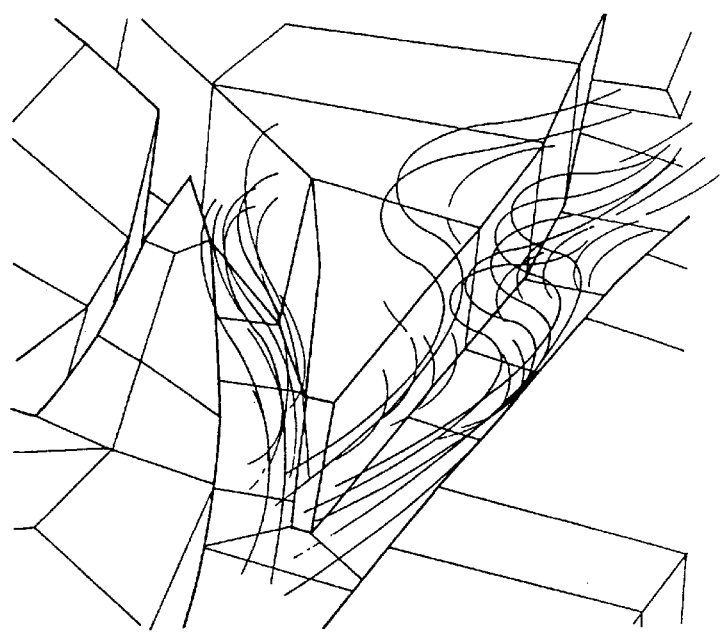
FIG. 72A is a diagram illustrating the flow of water at the changed position Ag1 before optimization.
Figure 72B:
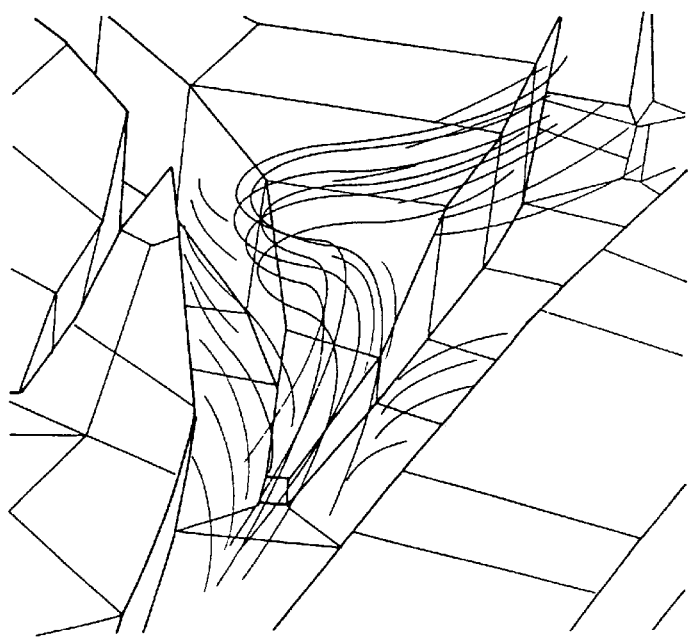
FIG. 72B is a diagram illustrating the flow of water at the changed position Ag1 after optimization.

FIG. 71 shows the changed position Ag1 of the shape of the block tip; FIG. 72A shows the flow of water at the changed position Ag1 before optimization; and FIG. 72B shows the flow of water at the changed position Ag1 after optimization. It can be appreciated that, in the state in which the block tip was not removed before optimization, the flow of water was disturbed at the block tip, whereas, after optimization, the flow of water downstream of the block tip was smooth.

In addition, Table 3 shows a comparison of the computing time (per analysis) of the analysis of the drainage performance during rolling between the case in which the analysis of the drainage performance during rolling was performed with respect to only the pattern portion by the local analysis using the GL analysis.

TABLE 3

Comparison of the Computing Time (per Analysis) of the Analysis of the Water Displacing Characteristic During Rolling

| Analysis of Drainage performance During Rolling of the Full Pattern | GL Analysis (Portion of Local analysis) |
|---|---|
| 100 | 15 |

From this table, it can be appreciated that the time per analysis of the drainage performance during rolling by the GL analysis was reduced substantially, and that the reduction of the computing time by the use of the GL analysis is effective in the optimization technique for which repeated calculations are required.

Table 4 shows the result of confirmation by an actual vehicle of the advantages of the optimized shape of the block tip determined by calculation. Conditions for measurement of hydroplaning were the same as those at the time of calculation, and the optimized shape of the block tip was represented by cutting off the original shape. Consequently, it was learned that, in the optimized shape, the hydroplaning occurrence speed improved by 1.0 km/h, and that the optimized shape based on calculation is effective with the actual car as well.

TABLE 4

Actual-Vehicle Evaluation

|  | Before Optimization | After Optimization |
|---|---|---|
| Hydroplaning occurrence speed | 83.4 | 84.4 (+1.0 km/h) |

What is claimed is:

1. A method of estimating a tire performance, comprising the steps of:

(a) determining a tire model having a pattern configuration to which deformation can be imparted by at least one of ground contacting and rolling, and determining a fluid model which is partially or wholly filled with a fluid and which comes into contact with at least a portion of the tire model;

(b) executing a deformation calculation of the tire model;

(c) executing a fluid calculation of the fluid model;

(d) identifying a boundary surface between the tire model after the deformation calculation in step (b) and the fluid model after the fluid calculation in step (c), imparting a boundary condition concerning the identified boundary surface to the tire model and the fluid model, and performing the deformation calculation and the fluid calculation until the fluid model assumes a state of pseudo flow;

(e) determining a physical quantity occurring in at least one of the tire model and the fluid model in step (c) or step (d); and (f) estimating the tire performance in accordance with the physical quantity.

2. The method of estimating a tire performance according to claim 1, said step (a) further comprising determining a road surface model in contact with the fluid model.

3. The method of estimating a tire performance according to claim 1, wherein, in step (b), the deformation calculation is performed repeatedly for a predetermined time duration.

4. The method of estimating a tire performance according to claim 3, wherein the predetermined time duration is 10 msec or less.

5. The method of estimating a tire performance according to claim 1, wherein, in step (c), the fluid calculation is performed repeatedly for only a fixed time duration.

6. The method of estimating a tire performance according to claim 5, wherein the fixed time duration is 10 msec or less.

7. The method of estimating a tire performance according to claim 1, wherein, in step (d), the deformation calculation and the fluid calculation are performed repeatedly for a predetermined time duration.

8. The method of estimating a tire performance according to claim 7, wherein the predetermined time duration is 10 msec or less.

9. The method of estimating a tire performance according to claim 1, wherein if the tire model is rolled, in step (a), the tire model is determined for which the deformation calculation for charging with internal pressure and load calculation is performed, and to which one of a rotational displacement, a speed and a straightly advancing displacement is imparted.

10. The method of estimating a tire performance according to claim 1, wherein if the tire model is rolled, in step (a), influx and efflux conditions representing that the fluid flows out freely from a top surface of the fluid model and that the fluid does not flow into or flow out of surfaces other than the top surface of the fluid model are imparted to the fluid model.

11. The method of estimating a tire performance according to claim 1, wherein if the tire model is not rolled, in step (a), the tire model is determined for which the deformation calculation for a time of charging with internal pressure is performed, and for which load calculation is performed after the deformation calculation.

12. The method of estimating a tire performance according to claim 1, wherein if the tire model is not rolled, in step (a), influx and efflux conditions representing that the fluid flows into a front surface of the fluid model at an advancing velocity, that the fluid flows out freely from a rear surface of the fluid model and a top surface of the fluid model, and that the fluid does not flow into or flow out of side surfaces of the fluid model and a lower surface of the fluid model are imparted to the fluid model.

13. The method of estimating a tire performance according to claim 1, wherein the tire model has a partial pattern.

14. The method of estimating a tire performance according to claim 1, wherein, for a road surface model, a road surface condition is set by selecting a coefficient of friction $\mu$ representing at least one of road surface conditions including dry, wet, icy, snowy, and unpaved conditions.

15. The method of estimating a tire performance according to claim 1, wherein, in step (d), an interfering portion between the tire model and the fluid model is generated, the interfering portion is identified, and the fluid model is divided by fluid elements with a surface of the tire model as a boundary surface.

16. The method of estimating a tire performance according to claim 1, wherein:
the fluid model comprises water;
at least one of a ground contact area and a ground contact pressure of the tire model is used as the physical quantity; and
a wet performance of the tire is estimated as the tire performance.

17. The method of estimating a tire performance according to claim 1, wherein:
the fluid model comprises water;
at least one of a pressure, flow volume, and flow velocity of the fluid model is used as the physical quantity; and
a wet performance of the tire is estimated as the tire performance.

18. The method of estimating a tire performance according to claim 1, wherein:
the fluid model comprises at least one of water and snow;
at least one of a ground contact area, ground contact pressure, and shearing force of the tire model on at least one of an icy road surface and a snowy road surface is used as the physical quantity; and
an on-ice and in-snow performance of the tire is estimated as the tire performance.

19. The method of estimating a tire performance according to claim 1, wherein:
the fluid model comprises at least one of water and snow;
at least one of a pressure, flow volume, and flow velocity of the fluid model on at least one of an icy road surface and a snowy road surface is used as the physical quantity; and
an on-ice and in-snow performance of the tire is estimated as the tire performance.

20. The method of estimating a tire performance according to claim 1, wherein:

the fluid model comprises air; at least one of pressure, flow volume, flow velocity, energy, and energy density of the fluid model is used as the physical quantity; and
a noise performance of the tire is estimated as the tire performance.

21. A fluid simulation comprising the steps of:
(a) determining a tire model having a pattern configuration to which deformation can be imparted by at least one of ground contacting and rolling, and determining a fluid model which is partially or wholly filled with a fluid and which comes into contact with at least a portion of the tire model;
(b) executing a deformation calculation of the tire model;
(c) executing a fluid calculation of the fluid model; and
(d) identifying a boundary surface between the tire model after the deformation calculation in step (b) and the fluid model after the fluid calculation in step (c), imparting a boundary condition concerning the identified boundary surface to the tire model and the fluid model, and performing the deformation calculation and the fluid calculation until the fluid model assumes a state of pseudo flow.

22. A method of designing a pneumatic tire, comprising the steps of:
(1) determining a plurality of tire models each having a pattern configuration to which deformation can be imparted by at least one of ground contacting and rolling, and determining a fluid model which is partially or wholly filled with a fluid and which comes into contact with at least a portion of a tire model;
(2) executing a deformation calculation of each of the tire models;
(3) executing a fluid calculation of the fluid model;
(4) identifying a boundary surface between the tire models after the deformation calculation in step (2) and the fluid model after the fluid calculation in step (3), imparting a boundary condition concerning the identified boundary surface to the tire models and the fluid model, and performing the deformation calculation and the fluid calculation until the fluid model assumes a state of pseudo flow;
(5) determining a physical quantity occurring in at least one of the tire models and the fluid model in step (3) or step (4);
(6) estimating a plurality of tire performances on the basis of the physical quantity; and
(7) designing a tire on the basis of a tire model having a tire performance selected from the plurality of tire performances.

23. A method of designing a vulcanizing mold for a tire, comprising the steps of:
($\alpha$) determining a plurality of tire models having a pattern configuration to which deformation can be imparted by at least one of ground contacting and rolling, and determining a fluid model which is partially or wholly filled with a fluid and which comes into contact with at least a portion of the tire models;
($\beta$) executing a deformation calculation of each of the tire models;
($\gamma$) executing a fluid calculation of the fluid model;
($\delta$) identifying a boundary surface between the tire models after the deformation calculation in step ($\beta$) and the fluid model after the fluid calculation in step ($\gamma$), imparting a boundary condition concerning the identified boundary surface to the tire models and the fluid model, and performing the deformation calculation and the fluid calculation until the fluid model assumes a state of pseudo flow;

(ε) determining a physical quantity occurring in at least one of the tire model and the fluid models in step (γ) or step (δ);

(ζ) estimating a plurality of tire performances of each of the tire models on the basis of the physical quantity; and (η) designing the vulcanizing mold for the tire on the basis of one of the tire models having a tire performance selected from the plurality of tire performances.

24. A method of claim 23, further comprising making a vulcanizing mold for a pneumatic tire.

25. A method of claim 23, further comprising making a vulcanizing mold for a pneumatic tire, and manufacturing the pneumatic tire by using the vulcanizing mold.

26. A method of manufacturing a pneumatic tire, comprising the steps of:

(I) determining a plurality of tire models each having a pattern configuration to which deformation can be imparted by at least one of ground contacting and rolling, and determining a fluid model which is partially or wholly filled with a fluid and contacts at least a portion of the tire models;

(II) executing a deformation calculation of each of the tire models;

(III) executing a fluid calculation of the fluid model;

(IV) identifying a boundary surface between each of the tire models after the deformation calculation in step (II) and the fluid model after the fluid calculation in step (III), imparting a boundary condition concerning the identified boundary surface to each of the tire models and the fluid model, and performing the deformation calculation and the fluid calculation until the fluid model assumes a state of pseudo flow;

(V) determining a physical quantity occurring in at least one of the respective tire models and the fluid model for each of the tire models in step (III) or step (IV);

(VI) estimating a plurality of tire performances, each tire performance being estimated for each of the tire models on the basis of the physical quantity; and (VII) manufacturing the tire on the basis of a tire model having a tire performance selected from the plurality of tire performances.

27. A recording medium with a tire-performance estimation program recorded thereon for estimating a tire performance by a computer, comprising the steps of:

(A) determining a tire model having a pattern configuration to which deformation can be imparted by at least one of ground contacting and rolling, and determining a fluid model which is partially or wholly filled with a fluid and which comes into contact with at least a portion of the tire model;

(B) executing a deformation calculation of the tire model;

(C) executing a fluid calculation of the fluid model; and (D) identifying a boundary surface between the tire model after the deformation calculation in step (B) and the fluid model after the fluid calculation in step (C), imparting a boundary condition concerning the identified boundary surface to the tire model and the fluid model, and performing the deformation calculation and the fluid calculation until the fluid model assumes a state of pseudo flow.

28. A method of designing a pneumatic tire, comprising the steps of:

(11) determining a tire model which includes at least a cross-sectional shape of a tire, including an internal structure, and which has a pattern configuration to which deformation can be imparted by at least one of ground contacting and rolling, determining a fluid model which is partially or wholly filled with a fluid and which comes into contact with at least a portion of the tire model, determining an objective function representing a physical quantity that evaluates tire performance, a design variable that evaluates a cross-sectional shape of the tire, a tire structure, or a pattern configuration, and determining a constraint that constrains at least one of the cross-sectional shape of the tire, the tire structure, the pattern configuration, the physical quantity that evaluates performance, and a tire size;

(12) estimating the tire performance on the basis of the physical quantity occurring in at least one of the tire model and the fluid model in at least one of a state of deformation of the tire model and a state of pseudo flow of the fluid model;

(13) determining a value of the design variable which gives an optimum value of the objective function while satisfying the estimated tire performance and the constraint; and

(14) designing the tire on the basis of the design variable which gives the optimum value of the objective function.

29. The method of designing a pneumatic tire according to claim 28, wherein step (12) includes the steps of:

(15) executing a deformation calculation of the tire model;

(16) executing a fluid calculation of the fluid model;

(17) identifying a boundary surface between the tire model after the deformation calculation in step (15) and the fluid model after the fluid calculation in step (16), imparting a boundary condition concerning the identified boundary surface to the tire model and the fluid model, and performing the deformation calculation and the fluid calculation until the fluid model assumes a state of pseudo flow;

(18) determining a physical quantity occurring in at least one of the tire model and the fluid model in step (15) or step (16); and

(19) estimating the tire performance on the basis of the physical quantity.

30. The method of claim 28, wherein step (11) comprises determining a road surface model in contact with the fluid model.

31. The method of claim 29, wherein step (15) comprises performing the deformation calculation repeatedly for a predetermined time duration.

32. The method of designing a pneumatic tire according to claim 29, wherein, in step (16), the fluid calculation is performed repeatedly for only a fixed time duration.

33. The method of designing a pneumatic tire according to claim 29, wherein, in step (17), the deformation calculation and the fluid calculation are performed repeatedly for a predetermined time duration.

34. The method of designing a pneumatic tire according to claim 28, wherein if the tire model is rolled, in step (11), the tire model is determined for which the deformation calculation and the fluid calculation for a time of charging with internal pressure and a time of load calculation is performed, and to which a rotational displacement or a speed or a straightly advancing displacement or speed is imparted.

35. The method of designing a pneumatic tire according to claim 28, wherein in a case where the tire model is rolled, in step (11), influx and efflux conditions representing that the fluid flows out freely from a top surface of the fluid model and that the fluid does not flow into or flow out of surfaces other than the top surface of the fluid model are imparted to the fluid model.

36. The method of designing a pneumatic tire according to claim 28, wherein if the tire model is not rolled, in step (11), the tire model is determined for which the deformation calculation and the fluid calculation for charging with internal pressure are performed, and for which load calculation is performed after the deformation calculation and the fluid calculation.

37. The method of designing a pneumatic tire according to claim 28, wherein in a case where the tire model is not rolled, in step (11), influx and efflux conditions representing that the fluid flows into a front surface of the fluid model at an advancing velocity, that the fluid flows out freely from a rear surface of the fluid model and a top surface of the fluid model, and that the fluid does not flow into or flow out of side surfaces of the fluid model and a lower surface of the fluid model are imparted to the fluid model.

38. The method of designing a pneumatic tire according to claim 28, wherein the tire model has a partial pattern.

39. The method of designing a pneumatic tire according to claim 28, wherein, as for the road surface model, a road surface condition is set by selecting a coefficient of friction $\mu$ representing at least one of road surface conditions including dry, wet, icy, snowy, and unpaved conditions.

40. The method of claim 28, said step (17) comprising:
generating an interfering portion between the tire model and the fluid model;
identifying the interference portion; and
dividing the fluid model by fluid elements with a surface of the tire model as a boundary surface.

41. The method of designing a pneumatic tire according to claim 28, wherein:
the fluid model contains at least water, at least one of a ground contact area and a ground contact pressure of the tire model is used as the physical quantity; and
a wet performance of the tire is estimated as the tire performance.

42. The method of designing a pneumatic tire according to claim 28, wherein:
the fluid model contains at least water;
at least one of a pressure, flow volume, and flow velocity of the fluid model is used as the physical quantity; and
a wet performance of the tire is estimated as the tire performance.

43. The method of designing a pneumatic tire according to claim 28, wherein:
the fluid model contains at least one of water and snow;
at least one of a ground contact area, a ground contact pressure, and a shearing force of the tire model on at least one of an icy road surface and a snowy road surface is used as the physical quantity; and
an on-ice and in-snow performance of the tire is estimated as the tire performance.

44. The method of designing a pneumatic tire according to claim 28, wherein:
the fluid model contains at least one of water and snow;
at least one of a pressure, flow volume, and flow velocity of the fluid model on at least one of an icy road surface and a snowy road surface is used as the physical quantity; and
an on-ice and in-snow performance of the tire is estimated as the tire performance.

45. The method of designing a pneumatic tire according to claim 28, wherein:
the fluid model contains at least water;
at least one of a pressure, flow volume, flow velocity, energy, and energy density of the fluid model is used as the physical quantity; and
a noise performance of the tire is estimated as the tire performance.

46. The method of designing a pneumatic tire according to claim 28, wherein step (13) comprises:
estimating an amount of change of the design variable which optimizes the objective function while satisfying the constraint on the basis of a sensitivity of the objective function, which is a ratio of an amount of change of the objective function to an amount of unit change of the design variable, and a sensitivity of the constraint, which is a ratio of an amount of change of the constraint to an amount of unit change of the design variable;
calculating a value of the objective function when the design variable is changed by an amount corresponding to the estimated amount and a value of the constraint when the design variable is changed by an amount corresponding to the estimated amount; and
determining a value of the design variable which optimizes the objective function on the basis of the estimated value and the calculated values while satisfying the constraint.

47. The method of designing a pneumatic tire according to claim 28, wherein the design variable includes at least one of:
a function representing a shape of at least one line selected from a carcass line, a turn-up ply line, a line representing an outer configuration of the tire, a line representing a tire crown shape, and a reinforcing-material line;
a variable representing at least one gauge distribution of a tire rubber member selected from a gauge distribution of a bead filler, a gauge distribution of a rubber chafer, a gauge distribution of side rubber, a gauge distribution of tread rubber, a gauge distribution of tread base rubber, a gauge distribution of inner-surface reinforcing rubber, a gauge distribution of inter-belt rubber, and a gauge distribution of belt end rubber;
a variable representing at least one structure of a belt portion selected from an angle of each belt layer, a width thereof, a cord type thereof, and a placing density thereof; and
a variable representing at least one configuration of a pattern selected from a configuration of a block, a position of a sipe, a number of sipes, and a length of each of said sipes.

48. The method of designing a pneumatic tire according to claim 28, wherein step (11) comprises:
determining a group subject to selection, including a plurality of tire models, each of which includes at least a cross-sectional shape of the tire including an internal structure and has a pattern configuration to which deformation can be imparted by at least one of ground contacting and rolling; and
determining, with respect to each of the tire models of the group subject to selection;
the objective function representing the physical quantity for evaluating the tire performance, the design variable for determining the cross-sectional shape of the tire or the tire structure or a pattern configuration, the constraint for constraining at least one of the cross-sectional shape of the tire, the tire structure, the pattern configuration, the physical quantity for evaluating performance, and the tire size, and an adaptive function which can be evaluated from the objective function and the constraint; and wherein, step (13) comprises:

selecting two tire models from the group based on the adaptive function;

effecting at least one of generating a new tire model by allowing design variables of the tire models to cross over each other at a predetermined probability, and generating a new tire model by changing a portion of the design variable of at least one of the tire models;

determining the objective function, the constraint, and the adaptive function of the new tire model with the design variable changed; preserving said new tire model and one of said plurality of tire models with the design variable not changed, the processing being repeated until the tire models preserved reach a predetermined number;

determining whether or not a new group including the predetermined number of the preserved tire models satisfies the predetermined convergence criterion;

if the convergence criterion is not satisfied, repeating the processing until the group subject to selection satisfies the predetermined convergence criterion by setting the new group as the group subject to selection; and if the predetermined convergence criterion is satisfied, determining a value of the design variable which gives an optimum value of the objective function among the predetermined number of the preserved tire models while satisfying the constraint.

49. The method of designing a pneumatic tire according to claim 48, wherein, in step (13), with respect to the tire model with the design variable changed, an amount of change of the design variable optimizes the objective function is estimated while satisfying the constraint on the basis of the sensitivity of the objective function, which is a ratio of an amount of change of the objective function to an amount of unit change of the design variable, and on the basis of the sensitivity of the constraint, which is a ratio of an amount of change of the constraint to an amount of unit change of the design variable, a value of the objective function when the design variable is changed by an amount corresponding to the estimated amount and a value of the constraint when the design variable is changed by an amount corresponding to the estimated amount are calculated, an adaptive function is determined from the value of the objective function and the value of the constraint, said new tire model and said one of the plurality of tire models with the design variable not changed are preserved, and the processing is repeated until a number of the preserved tire models reach the predetermined number.

50. The method of designing a pneumatic tire according to claim 28, wherein, in step (11), a transformation system is determined in which nonlinear correspondence is correlated between a design parameter of the tire which includes at least the cross-sectional shape of the tire, including the internal structure, and which has the pattern configuration to which deformation can be imparted by at least one of ground contacting and rolling on the one hand, and by the performance of said tire on the other hand, and a constraint that constrains an allowable range of at least one of the tire performance and a manufacturing condition of the tire is determined as the constraint;

in step (13), the design parameter of the tire the optimum value of the objective function on the objective function and the constraint is determined transformation system determined in step (11); and in step (14), the tire is designed on the basis parameter of the tire.

51. The method of designing a pneumatic tire according to claim 50, wherein, in step (13), the design parameter of the tire is set as the design variable, and the value of the design variable which optimizes the objective function is determined by using the transformation system determined in step (11) while satisfying the constraint; and in step (14), the tire is designed on the basis of the design variable which optimizes the objective function.

52. The method of designing a pneumatic tire according to claim 50, wherein the transformation system is formed by data of a multilayered feedforward-type neural network which has undergone learning so as to transform the design parameter of the tire into the tire performance.

53. The method of designing a pneumatic tire according to claim 28, wherein, in step (11), a basic model of a configuration representing one configuration selected from a configuration of a unit body of a block including an internal structure, a partial pattern configuration of a tire crown portion including the internal structure, and a configuration of a land portion continuing in a circumferential direction of the tire and including the internal structure is further determined; at least one input condition is imparted to the basic model of the configuration; a tread configuration representing at least one portion of the configuration of the unit body of the block, the pattern configuration, or the configuration of the land portion is set as the design variable; and a ground contact pressure of the tire under the input condition is calculated and set as the objective function.

54. The method of designing a pneumatic tire according to claim 53, wherein at least one of a tire contact area and a range of change of the design variable is further set as the constraint, and, in step (13), the value of the design variable is changed until an optimum value of the objective function is given while satisfying the constraint.

55. The method of designing a pneumatic tire according to claim 54, wherein, the design variable for at least one of a location where the ground contact pressure is higher than an average ground contact pressure of the tire, and a location where the ground contact pressure is lower than the average ground contact pressure of the tire, is changed.

56. The method of claim 28, further comprising designing a vulcanizing mold for a tire on the basis of the tire or the tire model.

57. A method of claim 56, further comprising making a vulcanizing mold for the designed tire.

58. A method of claim 56, further comprising making a vulcanizing mold for the designed tire; and manufacturing a pneumatic tire by using said vulcanizing mold.

59. A method of claim 28, further comprising manufacturing a pneumatic tire on the basis of the designed tire or the designed tire model.

60. An optimization analyzer comprising:

an estimator that estimates a performance of a tire from a design parameter of the tire;

a transformation-system computer that determines a nonlinear relationship of correspondence between the design parameter of the tire and the performance of the tire;

an input device that determines an objective function representing the tire performance, determines a constraint that constrains an allowable range of at least one of the tire performance and a manufacturing condition of the tire, and inputs the objective function and the constraint as items of optimization; and an optimization calculator that determines the design parameter of the tire which gives an optimum value of the objective function on the basis of the items of optimization inputted by said input means by using said transformation-system computer.

61. The optimization analyzer according to claim 60, wherein said transformation-system computer is a multilayered feedforward-type neural network which has undergone learning so as to transform the design parameter of the tire into the tire performance.

62. A recording medium with a tire optimization analysis program recorded thereon for designing a tire by a computer, wherein the optimization analysis program is arranged to:

estimate a performance of the tire from a design parameter of the tire;

determine a nonlinear relationship of correspondence between a design parameter of the tire and the performance of the tire;

determine an objective function representing the performance of the tire, determine a constraint that constrains an allowable range of at least one of the performance of the tire and a manufacturing condition of the tire; and determine the design parmeter of the tire which gives an optimum value of the objective function based on the determined relationship of correspondence, the objective function, and the constraint, and design the tire on the basis of the design parameter of the tire.

* * * * *

UNITED STATES PATENT AND TRADEMARK OFFICE
CERTIFICATE OF CORRECTION

PATENT NO. : 6,430,993 B1 Page 1 of 1
DATED : August 13, 2002
INVENTOR(S) : Eisuke Seta It is certified that error appears in the above-identified patent and that said Letters Patent is hereby corrected as shown below:

Title page,
Item [56], References Cited, FOREIGN PATENT DOCUMETNS, please insert the following references:
-- JP    10-55348      02-24-1998    Nakajima
   JP    11-201874    07-30-1999    Masaki et al.
   W/O 94/16877     01-27-1994    Nakajima et al. --
OTHER PUBLICATIONS, please insert the following references:
-- A.L. Browne and D. Whicker, "An Interactive Tire-Fluid Model for Dynamic Hydroplaning," ASTM Spec Tech Publ (Am. Soc. Test Mater.), No. 793 (1983), p.130-150. --

Signed and Sealed this

Twenty-third Day of September, 2003

JAMES E. ROGAN
*Director of the United States Patent and Trademark Office*